United States Patent [19]
Hamlin

[11] Patent Number: 5,434,972
[45] Date of Patent: Jul. 18, 1995

[54] NETWORK FOR DETERMINING ROUTE THROUGH NODES BY DIRECTING SEARCHING PATH SIGNAL ARRIVING AT ONE PORT OF NODE TO ANOTHER PORT RECEIVING FREE PATH SIGNAL

[75] Inventor: Derrick J. Hamlin, Rochester, United Kingdom

[73] Assignee: GEC-Marconi Limited, United Kingdom

[21] Appl. No.: 819,385

[22] Filed: Jan. 10, 1992

[30] Foreign Application Priority Data

Jan. 11, 1991 [GB] United Kingdom ............... 9100682
Apr. 23, 1991 [GB] United Kingdom ............... 9108696

[51] Int. Cl.$^6$ ............... G06F 15/173; G06F 15/163; G06F 15/16
[52] U.S. Cl. ............... 395/200; 395/800; 370/60; 364/229.41; 364/231.9; 364/242.94; 364/931.4; 364/931.41; 364/940.61; 364/940.64; 364/940.67; 364/949.91; 364/949.93; 364/DIG. 2
[58] Field of Search ............... 395/800, 200, 325; 370/60; 340/825.5, 825.52

[56] References Cited

U.S. PATENT DOCUMENTS

| | | | |
|---|---|---|---|
| 3,566,362 | 2/1971 | Taylor | 340/172.5 |
| 3,646,523 | 2/1972 | Berkling | 340/172.5 |
| 3,978,452 | 8/1976 | Barton et al. | 340/172.5 |
| 4,075,689 | 2/1978 | Berkling | 364/DIG. 1 |
| 4,156,903 | 5/1979 | Barton et al. | 364/DIG. 1 |
| 4,156,908 | 5/1979 | Missios et al. | 364/DIG. 1 |
| 4,156,910 | 5/1979 | Barton et al. | 364/DIG. 1 |
| 4,237,447 | 12/1980 | Clark | 340/147 |
| 4,251,861 | 2/1981 | Mago | 364/DIG. 1 |
| 4,251,879 | 2/1981 | Clark | 370/60 |

(List continued on next page.)

FOREIGN PATENT DOCUMENTS 0010934 5/1980 European Pat. Off. .
0077619 4/1983 European Pat. Off. .

(List continued on next page.)

OTHER PUBLICATIONS

M. Lease, M. Lively, "Comparing Production System Architectures", Computer Architecture News, vol. 16, No. 4 pp. 108 to 116, published Sep. 1988.

G. Magó, W. Partain "Implementing Dynamic Arrays: A Challenge for High Performance Machines" ICS 87, Second International Conference on Supercomputing. Proceedings, Supercomputing '87. pp. 491 to 493 vol. 1, 1987.

S. Momoi, S. Shimada, M. Kobayashi, T. Ishikawa, "Hierachical Array Processor System (HAP)" CONPAR 86, Conference on Algorithms and Hardware for Parallel Processing Proceedings. pp. 311 to 318, 1986.

(List continued on next page.)

Primary Examiner—Thomas G. Black
Assistant Examiner—Paul Harrity
Attorney, Agent, or Firm—Ostrolenk, Faber, Gerb & Soffen

[57] ABSTRACT

A large number of processor cells 11, the majority of which are standard cells 12 and others special cells 13, are connected to a communication network 14 in the form of several binary trees. The cells 11 are connected at the leaf positions of the binary trees, and the nodes of the binary trees are formed by switching circuits that allow individual cells to control the formation of signal paths through the nodes. In operation, cells may be in a waiting state, a free state, a calling state, searching state, a communicating state, or an internal operation state. Cells 12 in the free state transmit a free signal into the network 14. Cells 12 or 13 in a searching state transmit a searching signal into the network 14 where, on meeting a free signal at a node, a route is formed from the searching state cell to a free state cell. A calling state cell 12 establishes, with a calling signal, a route through the network 14 to another cell identified by destination information in the calling signal. Cells 11 in the waiting state are waiting to be called by a cell 12 in the calling state. Expressions, in the form of lambda expressions, to be reduced to a final result are so distributed through groups of the cells 11 that only primitive operations and communication need be carried out by the cells 11.

76 Claims, 107 Drawing Sheets

ABSOLUTE ADDRESSING
NON-DIRECTED, REMOTE FREE-SPACE SEARCH

U.S. PATENT DOCUMENTS

| | | |
|---|---|---|
| 4,307,446 | 12/1981 | Barton et al. .................. 364/DIG. 1 |
| 4,344,134 | 8/1982 | Barnes ........................... 364/DIG. 1 |
| 4,412,285 | 10/1983 | Neches et al. ....................... 395/650 |
| 4,445,171 | 4/1984 | Neches .......................... 364/DIG. 1 |
| 4,447,875 | 5/1984 | Bolton et al. ................. 364/DIG. 1 |
| 4,502,118 | 2/1985 | Hagenmaier, Jr. et al. ... 364/DIG. 1 |
| 4,583,164 | 4/1986 | Tolle ............................. 364/DIG. 1 |
| 4,591,971 | 5/1986 | Darlington et al. .......... 364/DIG. 1 |
| 4,598,400 | 7/1986 | Hillis ..................................... 370/60 |
| 4,638,475 | 1/1987 | Koike .................................... 370/60 |
| 4,663,708 | 5/1987 | Taub ............................ 364/DIG. 1 |
| 4,780,873 | 10/1988 | Mattheyses ........................... 370/60 |
| 4,814,973 | 3/1989 | Hillis ............................. 364/DIG. 1 |
| 4,814,980 | 3/1989 | Peterson et al. ..................... 395/200 |
| 4,831,519 | 5/1989 | Morton ......................... 364/DIG. 1 |
| 4,843,540 | 6/1989 | Stolfo ............................ 364/DIG. 1 |
| 4,858,177 | 8/1989 | Smith ........................... 364/DIG. 1 |
| 4,860,201 | 8/1989 | Stolfo et al. .................. 364/DIG. 1 |
| 4,908,751 | 3/1990 | Smith ........................... 364/DIG. 1 |
| 4,964,032 | 10/1990 | Smith ........................... 364/DIG. 1 |
| 5,047,917 | 9/1991 | Athas et al. ................... 364/DIG. 1 |
| 5,105,424 | 4/1992 | Flaig et al. .......................... 370/94.1 |
| 5,168,572 | 12/1992 | Perkins ................................. 395/800 |
| 5,175,733 | 12/1992 | Nugent ................................ 370/94.3 |
| 5,181,017 | 1/1993 | Frey, Jr. et al. ................ 340/825.02 |
| 5,265,207 | 11/1993 | Zak et al. ............................. 395/200 |
| 5,276,895 | 1/1994 | Grondalski .......................... 395/800 |

FOREIGN PATENT DOCUMENTS

| | | |
|---|---|---|
| 0208287 | 1/1987 | European Pat. Off. . |
| 0222405 | 5/1987 | European Pat. Off. . |
| 0230549 | 5/1987 | European Pat. Off. . |
| 57-02261 | 7/1982 | Japan . |
| 2194368 | 3/1988 | United Kingdom . |
| 8701485 | 3/1987 | WIPO . |
| 8801769 | 3/1988 | WIPO . |
| 8801771 | 3/1988 | WIPO . |
| 8907299 | 8/1989 | WIPO . |
| 9004235 | 4/1990 | WIPO . |

OTHER PUBLICATIONS

J. Seals, G. Grube, "Functional Programming Languages and Modern Multiprocessor Architectures: The EMSP Example" pp. 37-1 to 37-5, Software Engineering and its Application to Avionics. AGARD-CP-439, 1988.

A. Turing, "Proposals for Development in the Mathematics Division of an Automatic Computing Engine (ACE)" National Physical Laboratory, Com Sci 57, Apr. 1972.

W. Hillis, "The Connection Machine", Scientific American, vol. 256, No. 67, 1987, pp. 86 to 93.

Backus, J., "Can Programming Be Liberated From the von Neuann Style? A Functional Style and Its Algebra of Programs," *Communications of the ACM,* 1978.

K. Berkling, "A Computing Machine Based on Tree Structures," *IEEE Transactions on Computers,* Apr. 1971.

A. Booth, K. Booth, *Automatic Digital Calculators,* pp. 22–35. 1956.

*Byte,* (International Edition), Nov. 1988, "In Depth Parallel Processing".

J. Darlington, M. Reeve, S. Wright, "Declarative Lanugages and Program Transformation for Programming Parrellel Systems: A Case Study," *Concurrency: Practice and Experience,* vol. 2, Sep. 1990.

R. Duncan, "Evaluating Advanced Architectures for AI Production Systems," *IEEE,* 1989.

P. Franaszek, "Tree-Based Local Network," *IBM Technical Disclosure Bulletin,* vol. 25, Apr. 1983.

H. Huskey, "From ACE to the G-15," *Annals of the History of Computing,* vol. 6, Oct. 1984.

C. Leiserson, "FAT-TREES: Universal Networks for Hardware-Efficient Supercomputing," *IEEE,* 1985.

G. Magó, "A Network of Microprocessors to Execute Reduction Lanugages, Part I," *International Journal of Computer and Information Sciences,* vol. 8, 1979.

C. Magó, "A Network of Microprocessors to Execute Reduction Languages, Part II," *International Journal of Computer and Information Sciences,* vol. 8, No. 6, 1979.

G. Magó, "A Cellular Computer Architecture for Functional Programming," *IEEE,* 1980.

G. Magó, "Making Parallel Computation Simple: The FFP Machine," *IEEE,* 1985.

K. Ravikanth, K. Ramakrishnan, Y. Venkatesh, "A Reduction Architecture for the Optimal Scheduling of Binary Trees," *Future Generations Computer Systems* 4, 1988.

(List continued on next page.)

OTHER PUBLICATIONS

H. Siegel, R. McMillen, "The Multistage Cube: A Versatile Interconnection Network," *IEEE*, Dec. 1981.

T. Sterling, E. Chan, "A Practical Static Data Flow Computer Based on Associative Methods," *Proceedings of the 1988 Intn'l Conf on Parallel Processing*, Aug. 1988.

T. Sueyoshi, K. Saisho, I. Arita, "HYPHENC-16—A Prototype of Hierarchical Highly Parallel Processing System," Sep. 1984.

T. Sueyoshi, "Hierarchical Routing Bus," *Systems and Computers in Japan*, Nov. 1985.

T. Sueyoshi, K. Saisho, "Performance Evaluation of the Binary Tree Access Mechanism in MIMD Type Parallel Computers," *Systems and Computers in Japan, vol. 17, 1986.*

D. Turner, "A New Implementation Technique for Applicative Languages," *Software–Practice and Experience*, vol. 9, 1979.

S. Vegdahl, "A Survey of Proposed Architectures for the Execution of Functional Languages," *IEEE Transactions on Computers*, vol. C–33, No. 12, Dec. 1984.

K. E. Batcher, "Design of a Massively Parallel Processor," *IEEE Transactions on Computers*, vol. C–29, No. 9, Sep. 1980.

Ellis Horowitz and Alessandro Zorat, "The Binary Tree as an Interconnection Network: Applications to Multiprocessor Systems and VLSI", IEEE, 1981.

Sueyoshi, Toshinori et al., "Hyphen C–16—A Prototype of a Hierarchical Highly Parallel Processing System", J. Data Processing Soc., pp. 1–24, Apr. 1984.

T. Blank, "The MasPar MP–1 Architecture," *Proceedings of Compcon Spring 90—The Thirty–Fifth IEEE Computer Society International Conference*, Feb. 26–Mar. 2, 1990, pp. 20–24.

J. R. Nickols, "The Design of the MasPar MP–1: A cost Effective Massively Parallel Computer," *Proceedings of Compcon Spring 90—The Thirty–Fifth IEEE Computer Society Intn'l conf.*, Feb. 27–Mar. 2, 1990, pp. 20–24.

P. Christy, "Software to Support Massively Parallel Computing on the MasPar MP–1," *Digest of Papers Spring Compcon 1990*, Feb. 27–Mar. 1, 1990, pp. 29–33.

Burstall, R. M. et al., *Journal of the Association of Computing Machinery*, "A Transformation System for Developing Recursive Programs", vol. 24, No. 1, Jan. 1977, pp. 44–67.

Clarke, T. J. W., et al., *Proceedings of the LISP Conference*, "SKIM—The S,K,I, Reduction Machine", Stanford, 1980, pp. 128–135.

Darlington, John, et al., *Proceedings of ACM/MIT Conference on Functional Languages and Computer Architecture*, "Alice: A Multiprocessor Reduction Machine for the Parallel Evaluation of Applicative Languages", 1981, pp. 65–75.

Davis, A. L., *Proceedings of 1979 National Computer Conference*, "A data flow evaluation system based on the concept of recursive locality", AFIPS Press, Jun. 4–7, 1979, pp. 1079–1086.

Landin, P. J., *The Computer Journal*, "The mechanical evaluation of expressions", vol. 6, Apr. 1963 to Jan. 1964, pp. 308–320.

McCarthy, John, *Communications of the ACM*, "Recursive Functions of Symbolic Expressions and Their Computation by Machine, Part I", vol. 3, No. 4, 1960, pp. 184–195.

McCarthy, John, *ACM SIGPLAN Notices*, "History of LISP", vol. 13, No. 8, Aug. 1978, pp. 217–223.

Michie, Donald, *Nature*, "'Memo' Functions and Machine Learning ", vol. 218, No. 5136, Apr. 6, 1968, pp. 19–22.

Rettberg, Randall, et al., *Communications of ACM*, "Contention is no obstacle to shared–memory muliprocessing", vol. 29, No. 12, Dec. 1986, pp. 1202–1212.

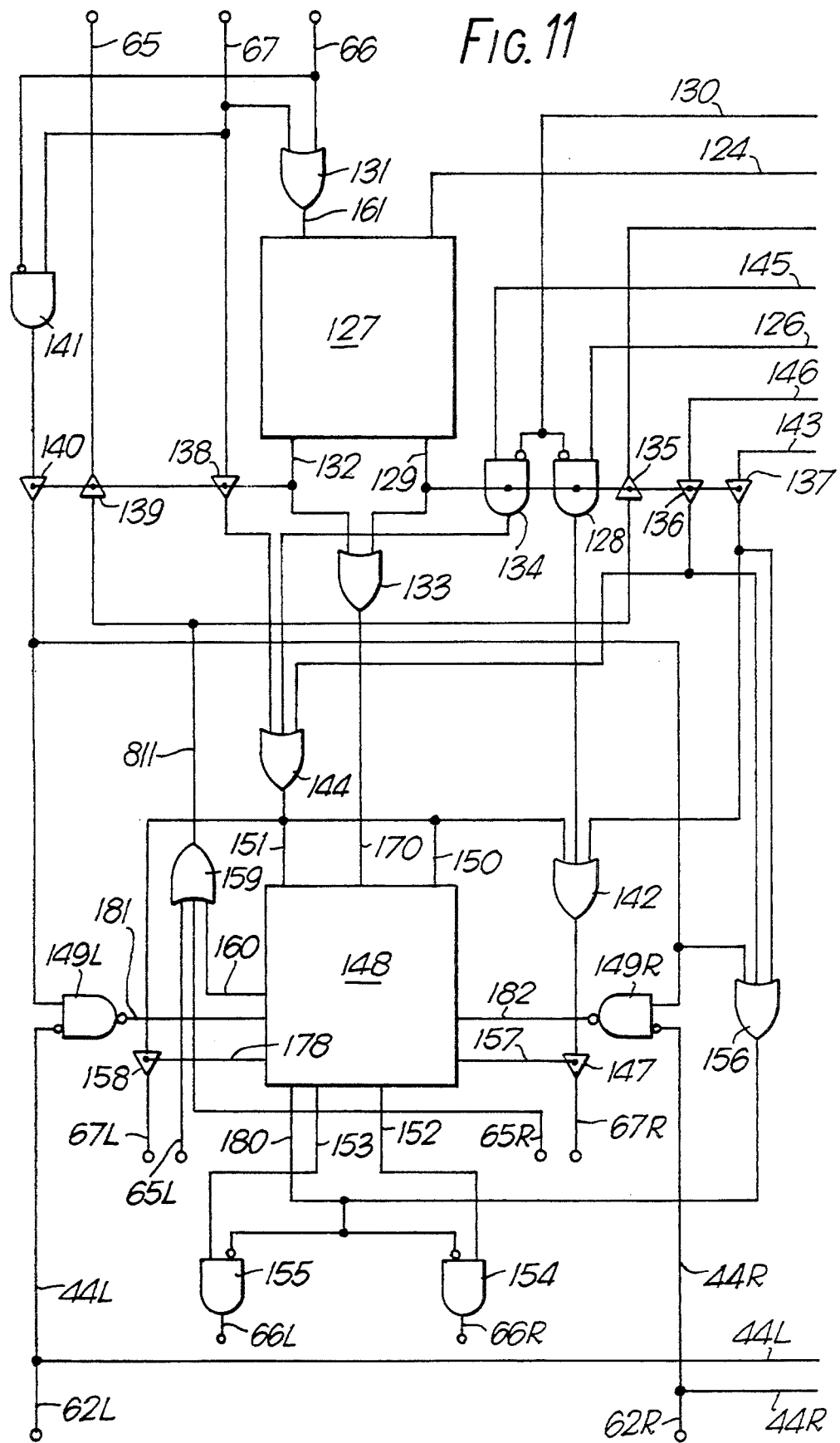

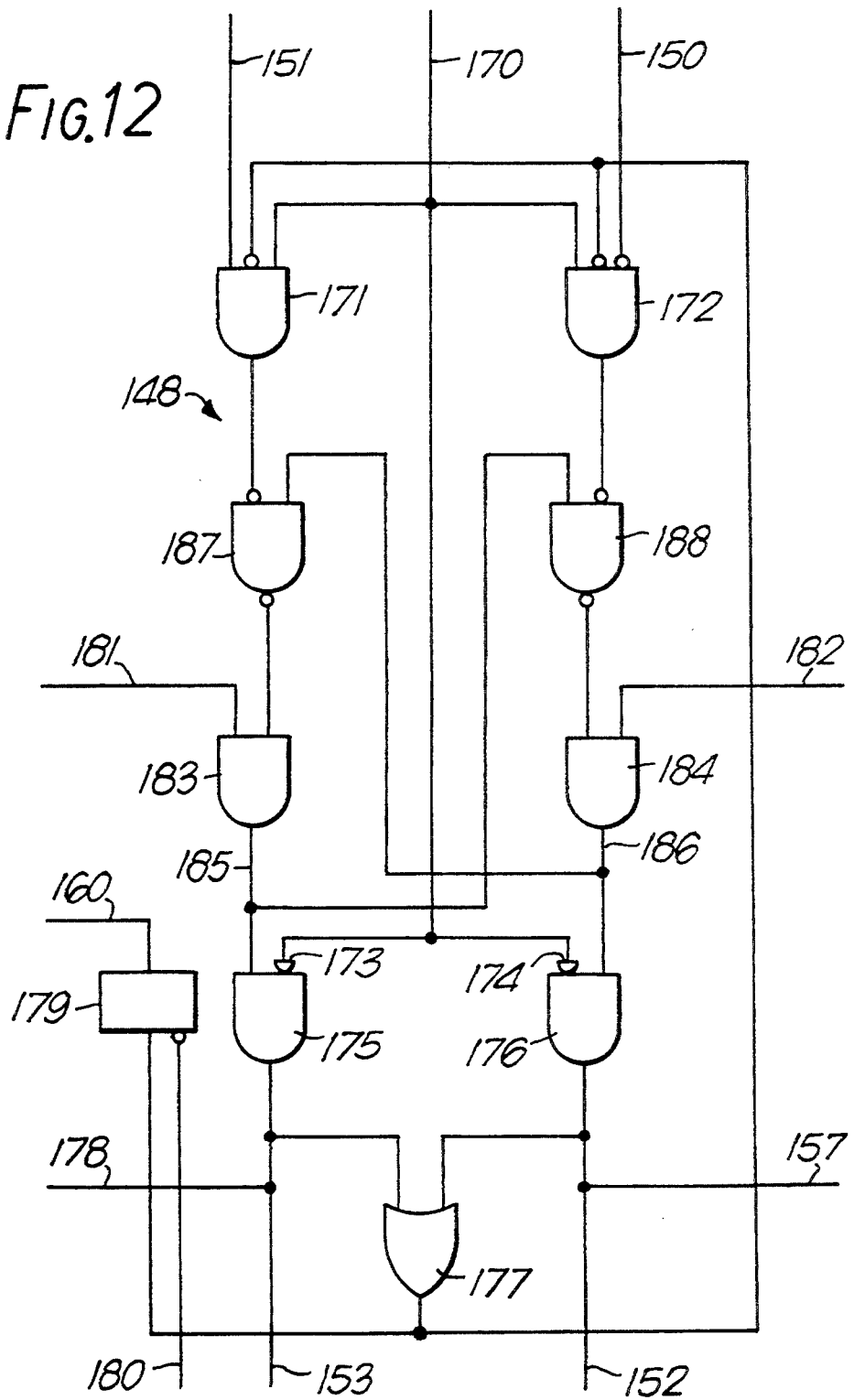

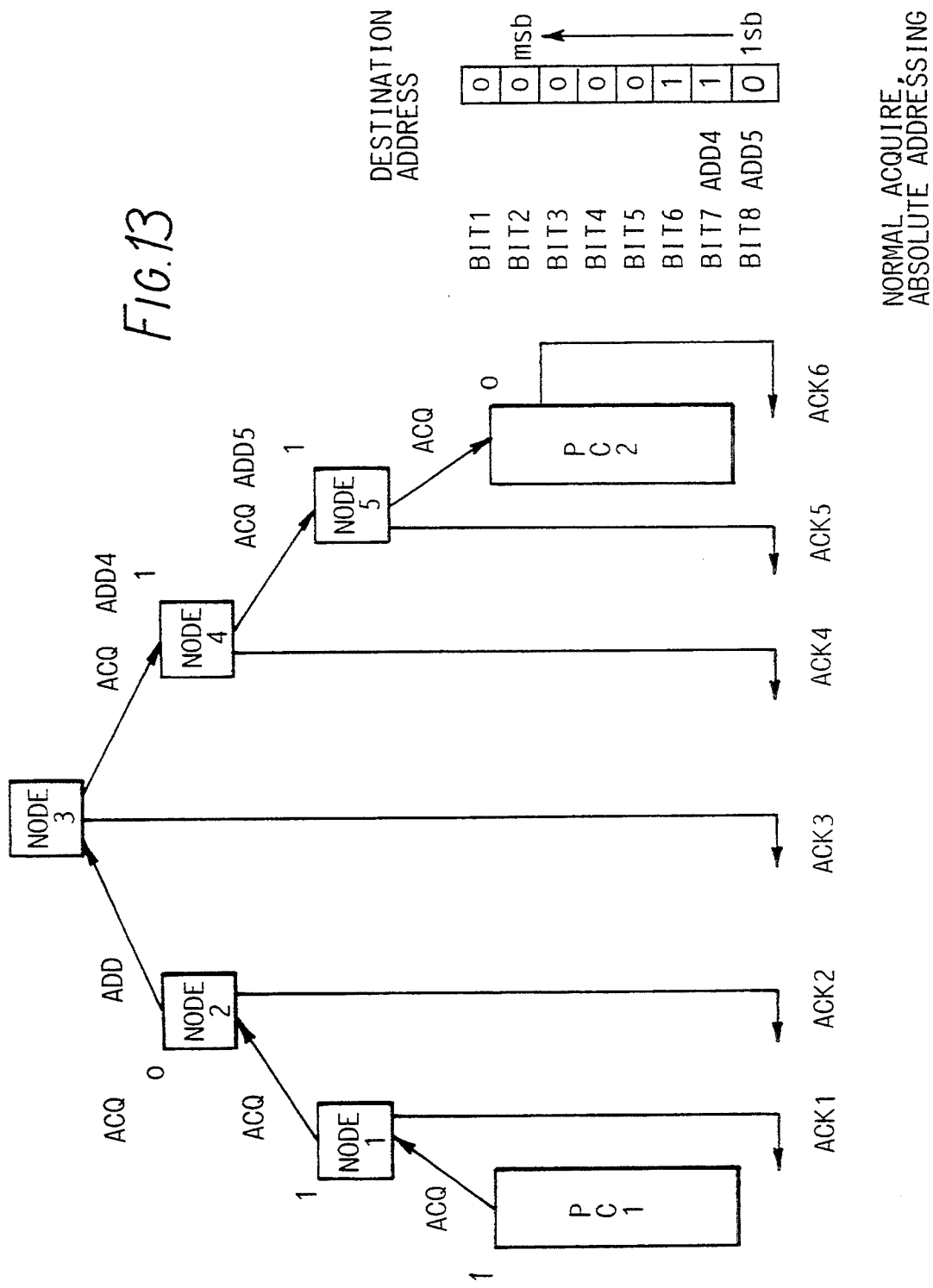

ABSOLUTE ADDRESSING
NON-DIRECTED, LOCAL FREE-SPACE SEARCH

ABSOLUTE ADDRESSING
NON-DIRECTED, REMOTE FREE-SPACE SEARCH

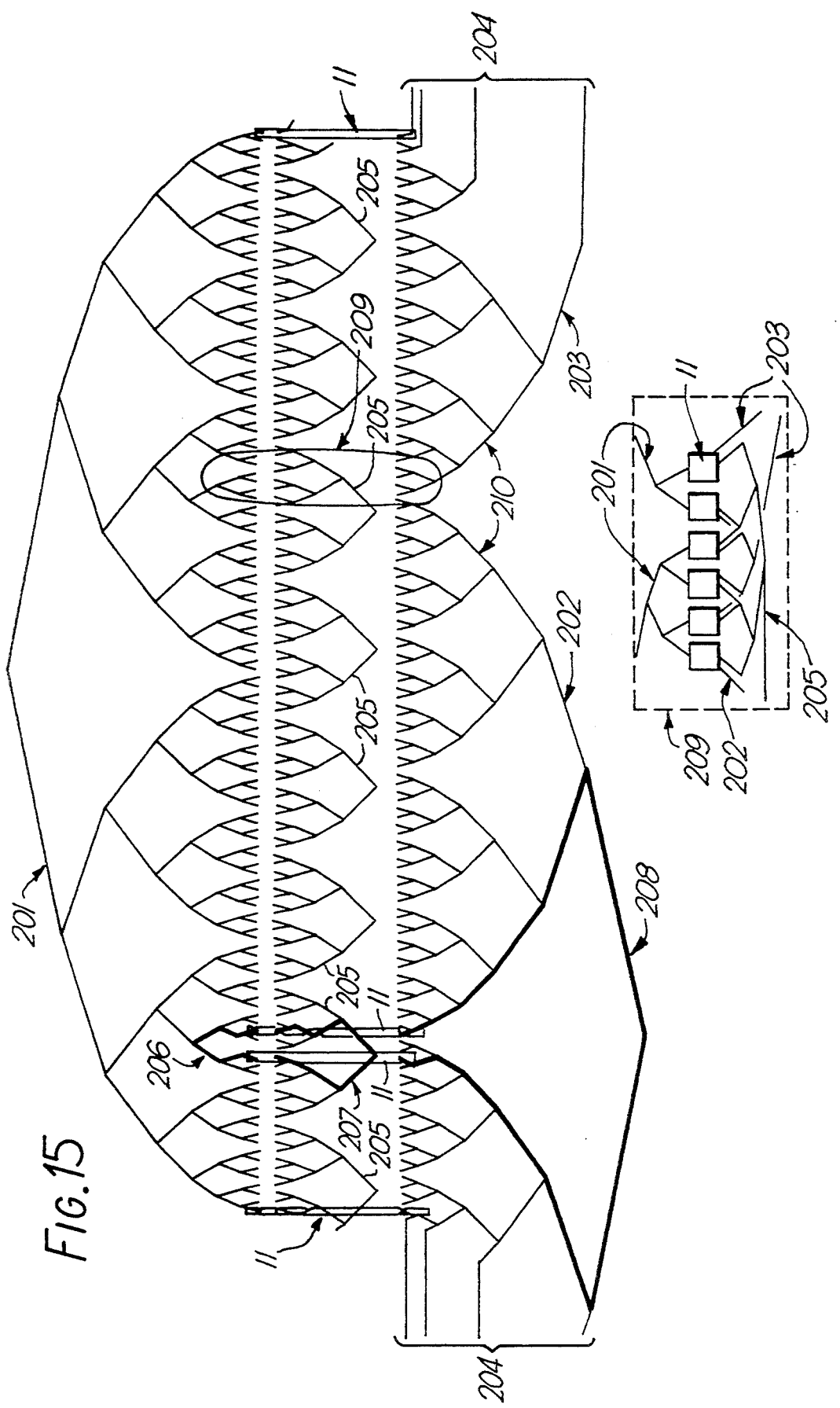

F/G. 20

238: $\left(\frac{1}{4}, \frac{3}{4}\right) \leftrightarrow ; \left(\frac{1}{2}, \frac{1}{2}\right) \updownarrow$ 236: $\left(\frac{1}{2}, \frac{1}{2}\right) \leftrightarrow ; \left(\frac{1}{4}, \frac{3}{4}\right) \updownarrow$ 237: $\left(\frac{3}{4}, \frac{1}{4}\right) \leftrightarrow ; \left(\frac{1}{4}, \frac{3}{4}\right) \updownarrow$ 235: $(1) \leftrightarrow ; (1) \leftrightarrow$

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| 15 | 2 | 1 | 16 | 13 | 4 | 3 | 14 | 11 | 6 | 5 | 12 | 9 | 8 | 7 | 10 |

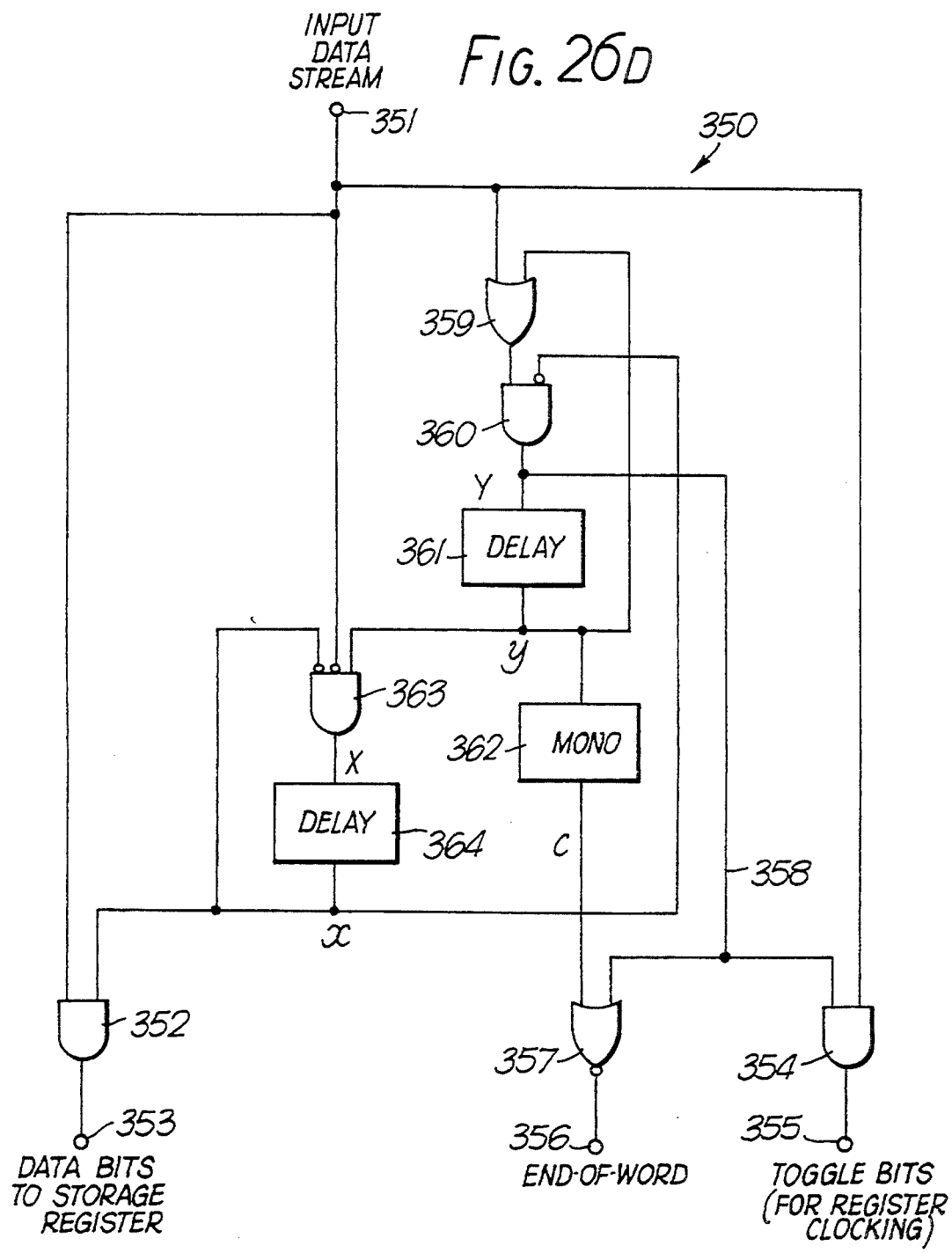

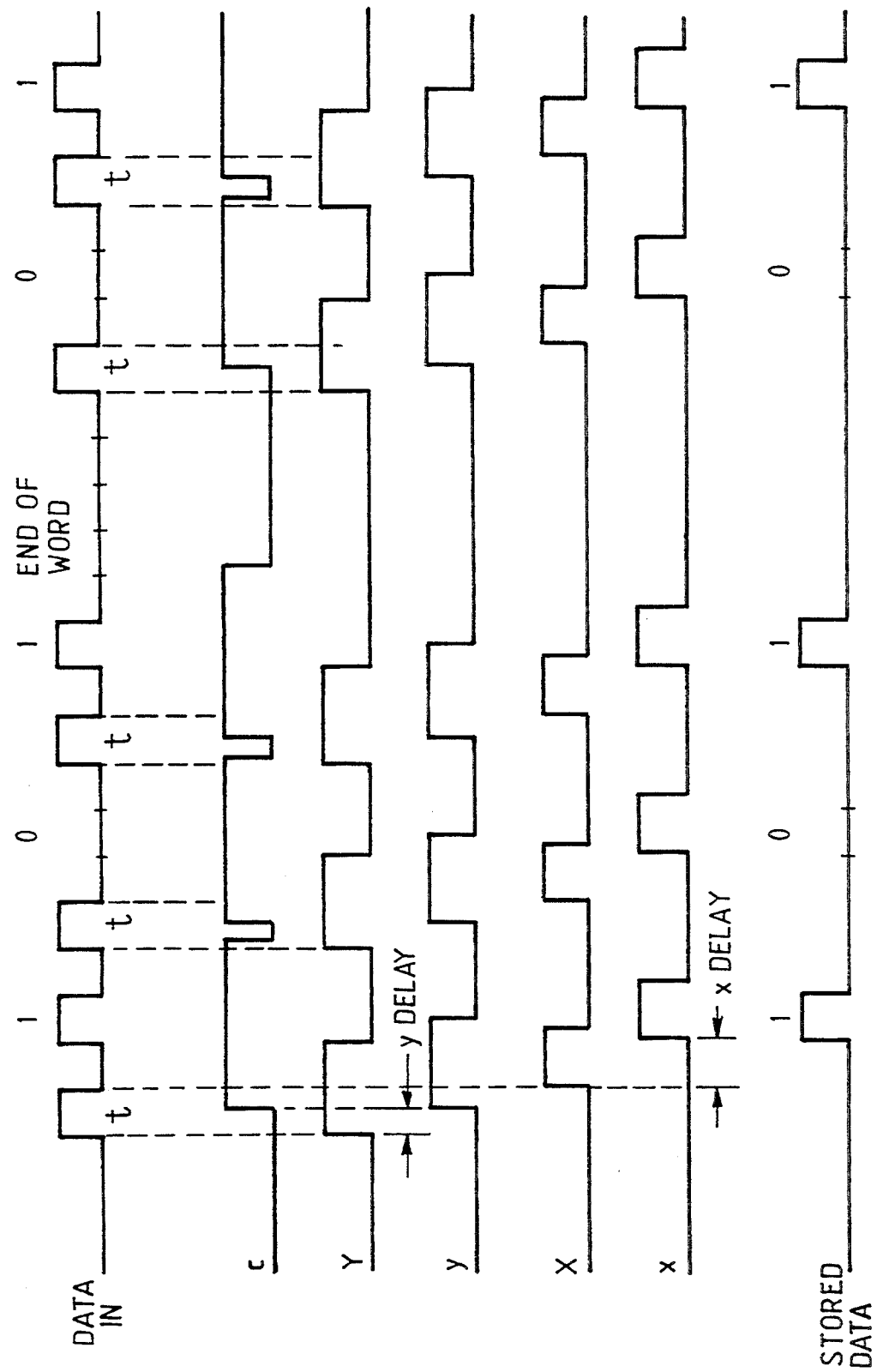

TRANSACTION ARBITER

N MINUS 1    0 < n ≤ 6

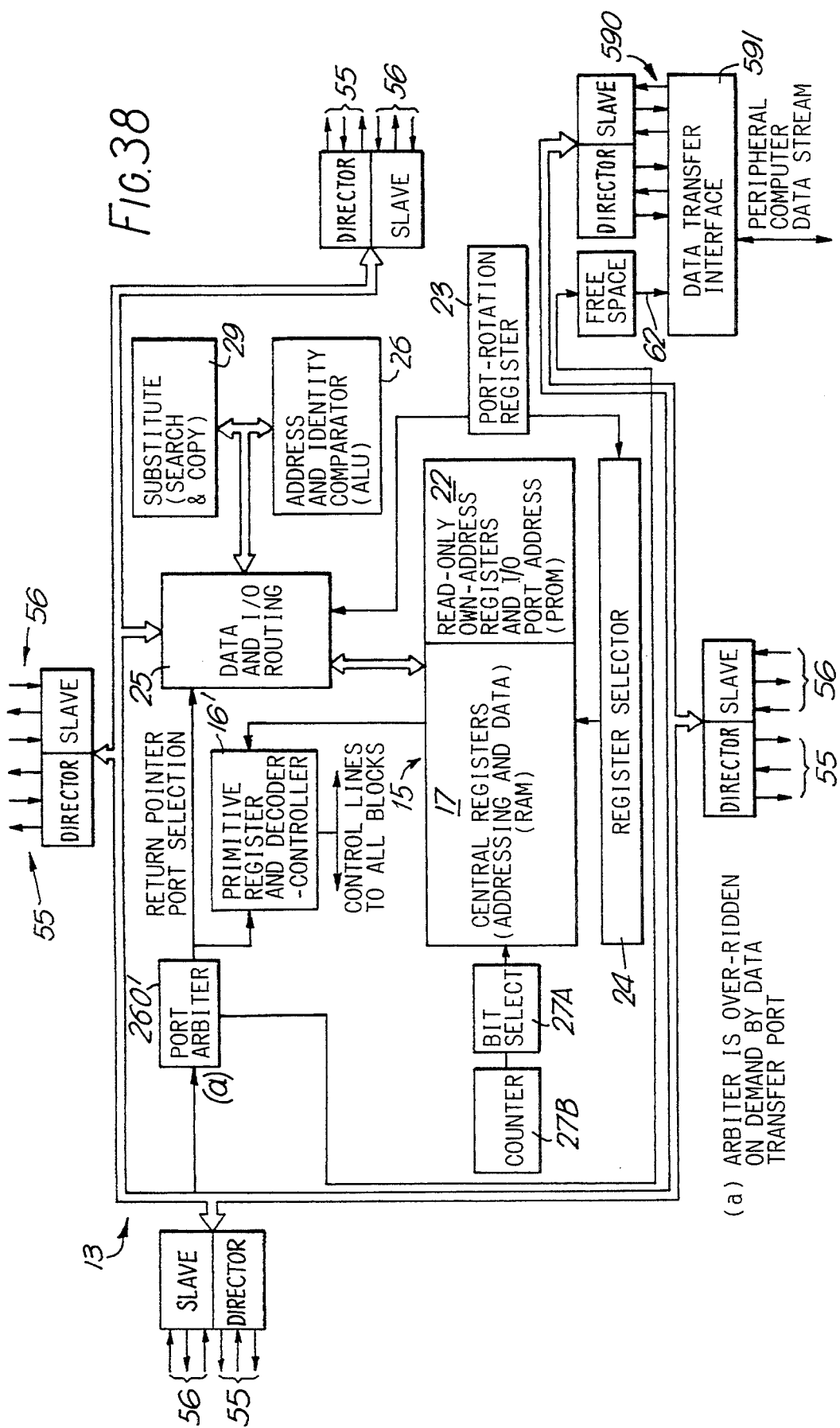

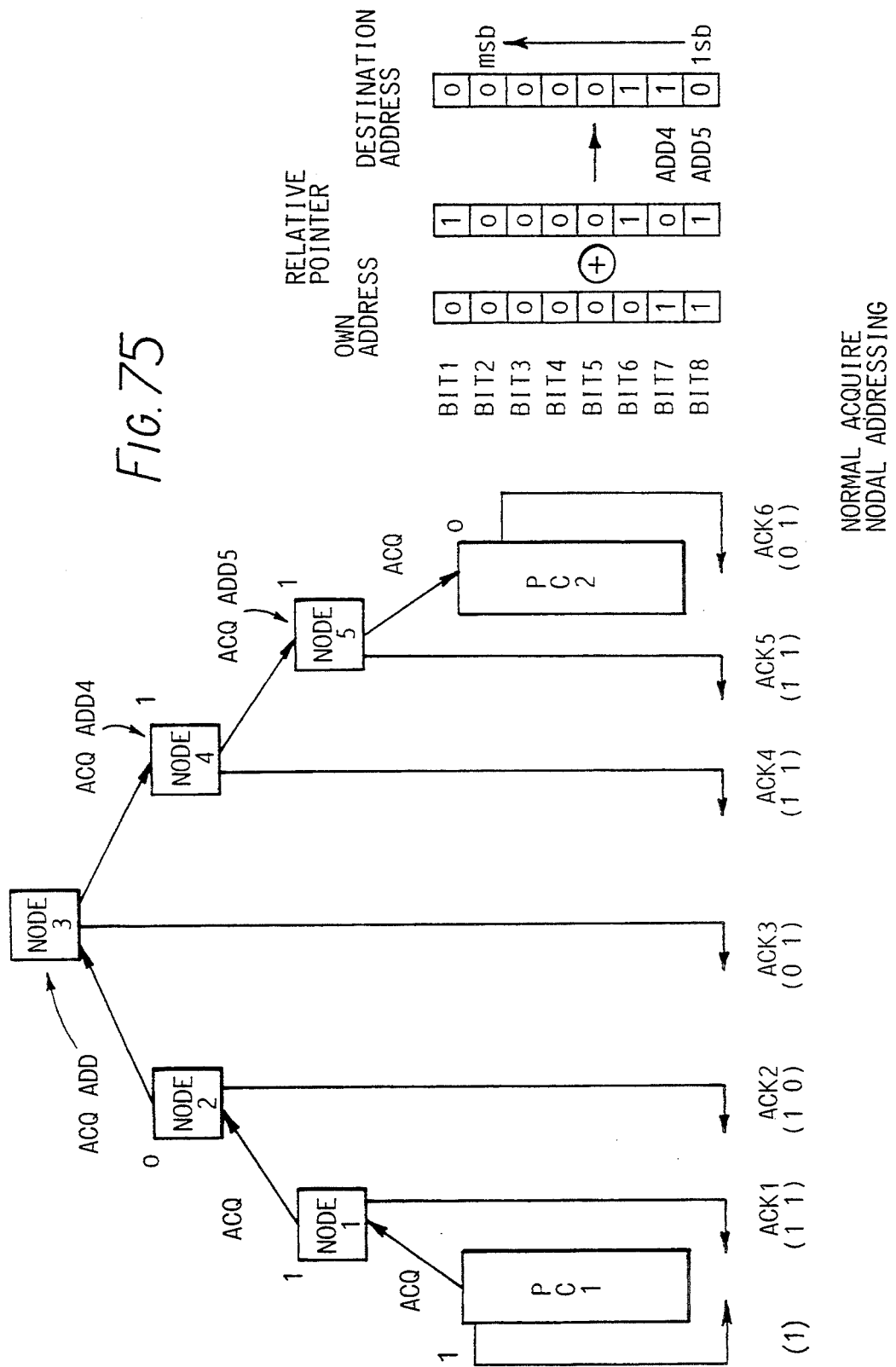

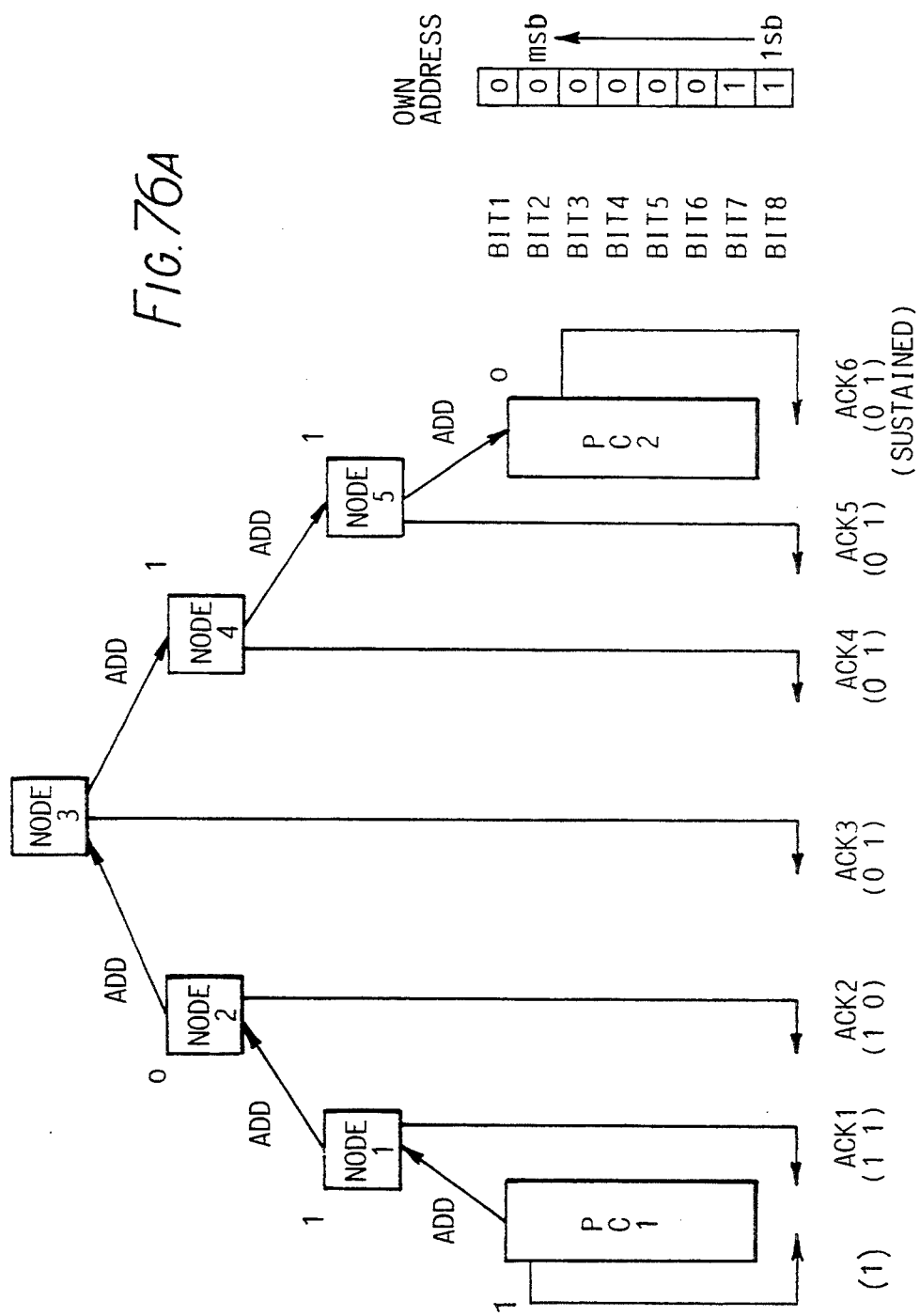

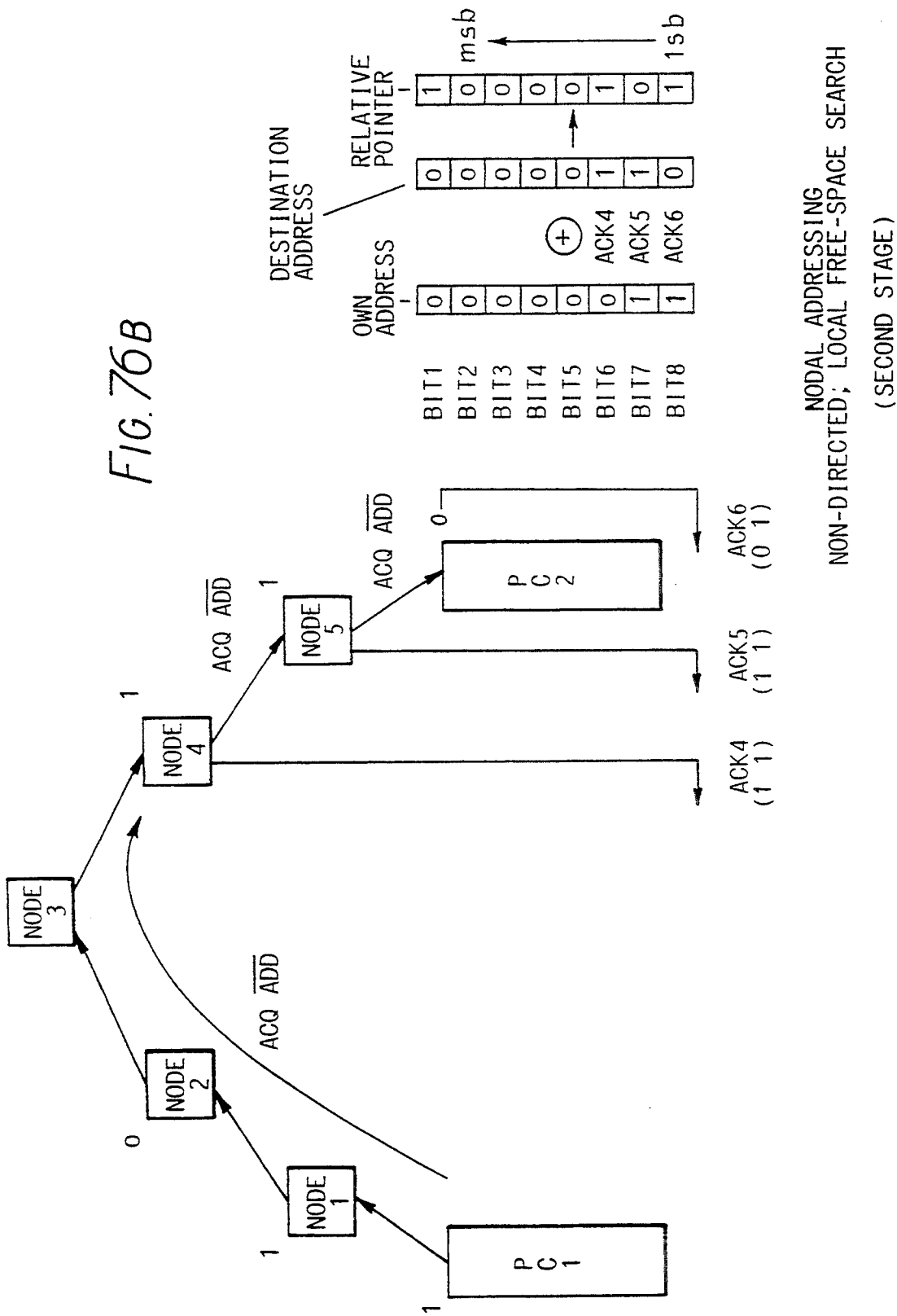

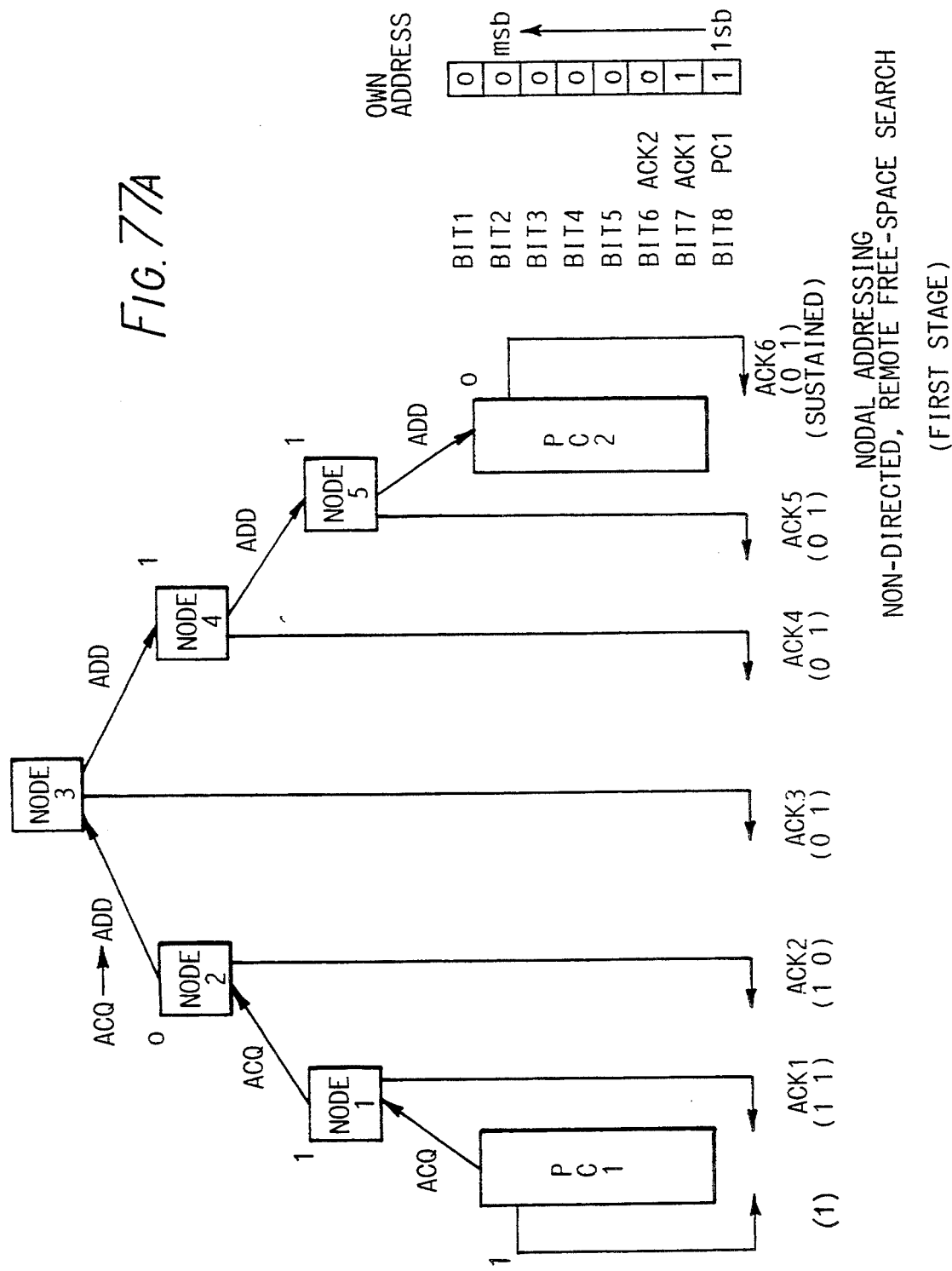

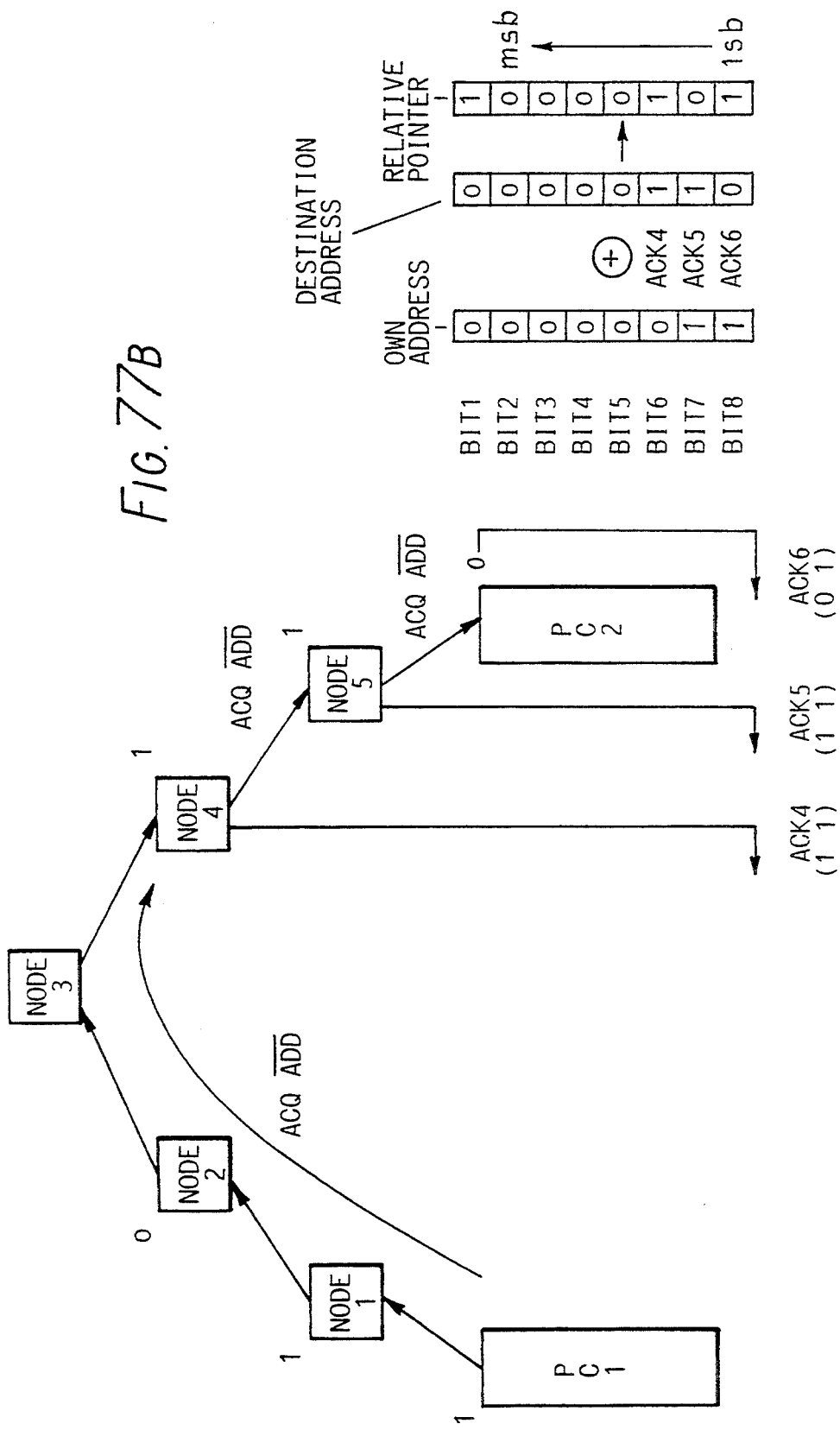

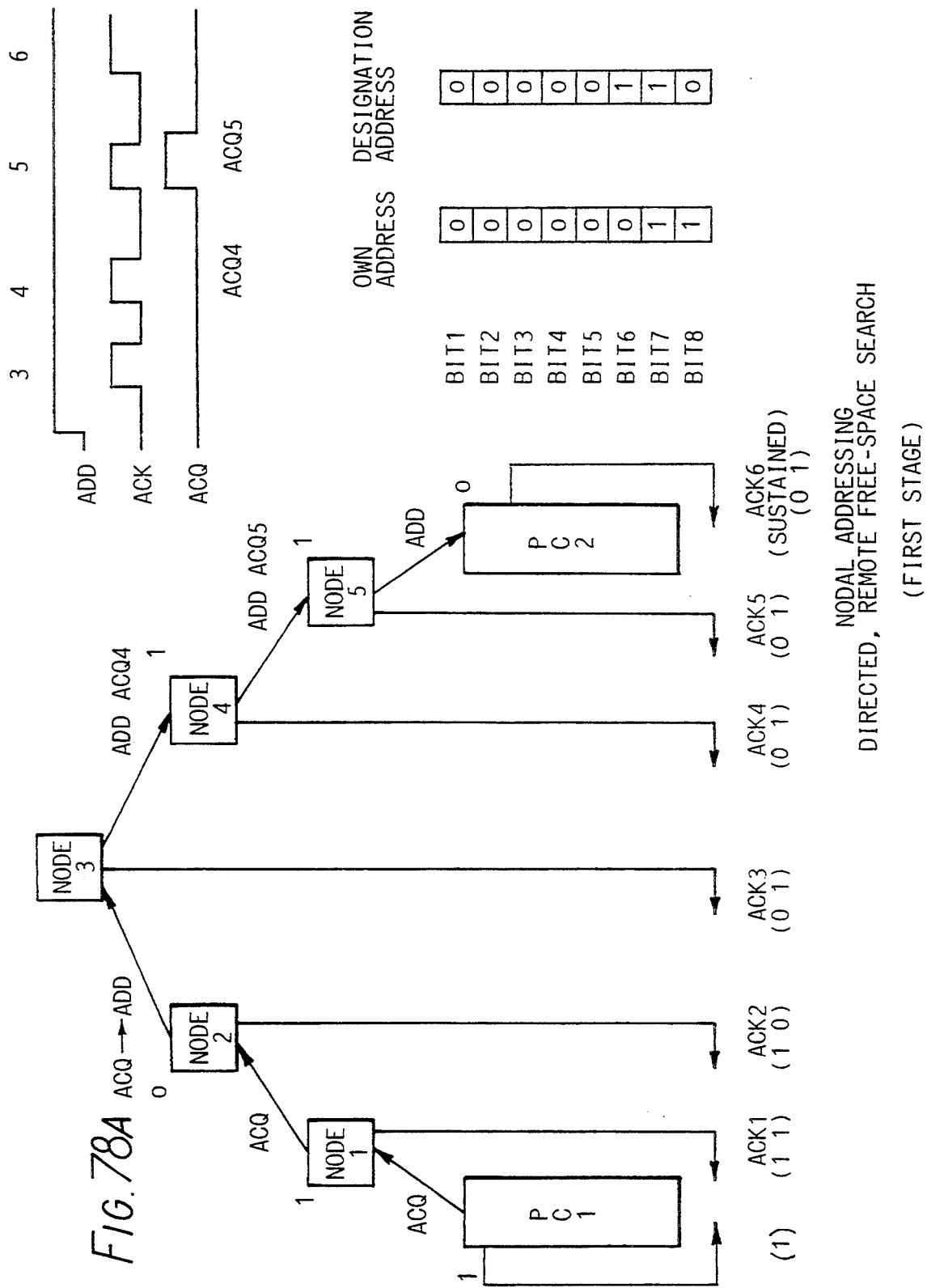

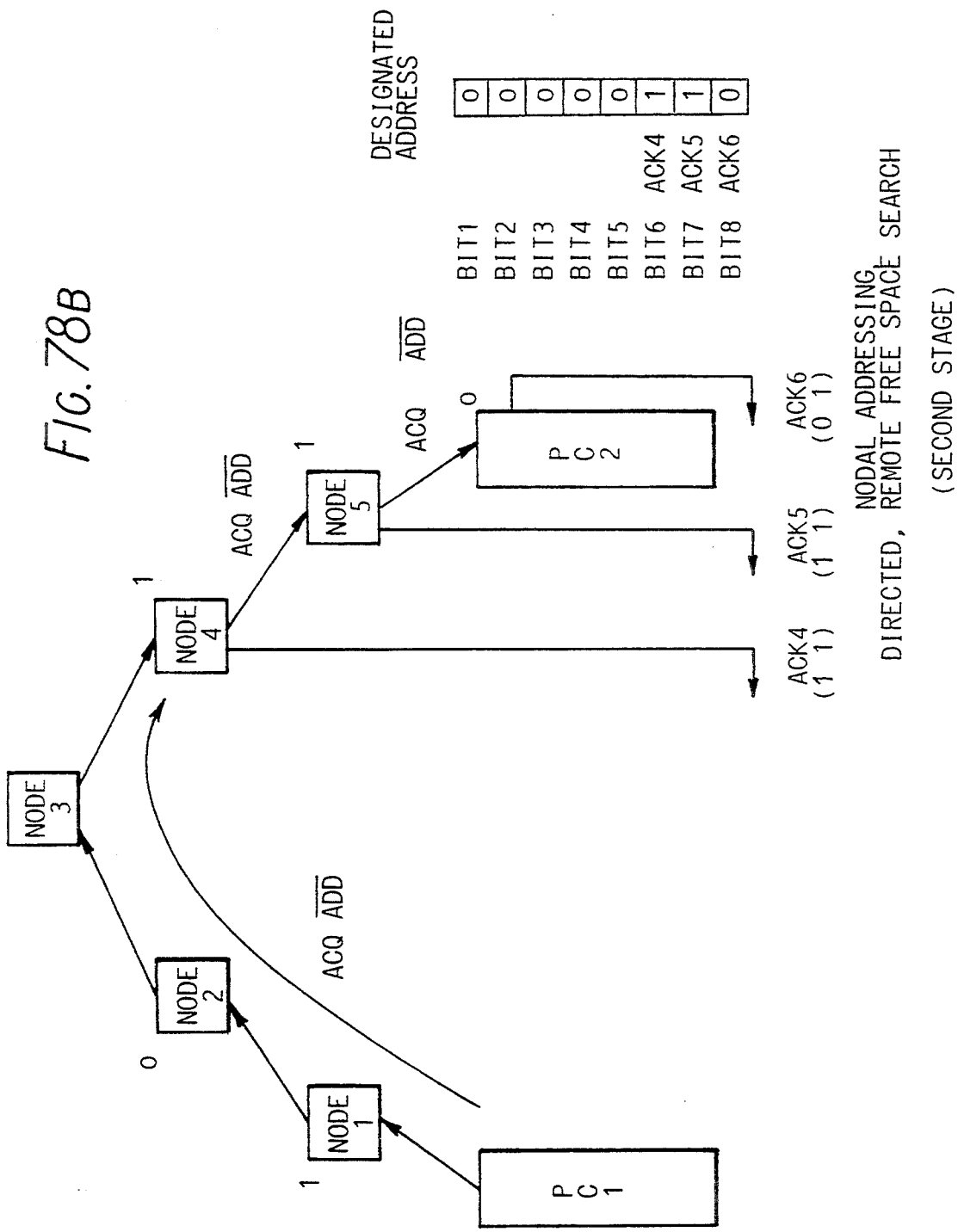

MASTER EXECUTIVE LOGIC

INHERIT DATA

CELL INTERNAL OPERATION STATE.

NETWORK FOR DETERMINING ROUTE THROUGH NODES BY DIRECTING SEARCHING PATH SIGNAL ARRIVING AT ONE PORT OF NODE TO ANOTHER PORT RECEIVING FREE PATH SIGNAL

This invention relates to apparatus for performing parallel processing.

BACKGROUND OF THE INVENTION

Many of the known types of apparatus for performing parallel processing are reviewed and discussed in Parallel Computers 2, Architecture, Programming and Algorithms, by R. W. Hockney and C. R. Jesshope, published in 1988 by Adam Hilger, Bristol, England, and Philadelphia, U.S.A., and a number of experimental computers are compared in an article entitled "A Survey of Proposed Architectures for the Execution of Functional Languages" by Steven R. Vegdahl, published in IEEE Transactions on Computers, Vol. C-33, No. 12, Dec. 1984, pages 1050 to 1071.

In a classical von Neumann computer architecture processing is carried out in a strictly sequential manner, the architecture having a single control unit, a single arithmetic and logic unit, and a memory in which program instructions and other data are stored in a sequence of addressable locations. During execution of a program, one instruction is called up at a time and executed. The address of the next instruction must either be provided by an instruction counter that simply counts through a regular numerical sequence of addresses, or by data supplied from the memory in the execution of the current program step. Such strictly sequential processing is a disadvantage in many circumstances, and attempts have been made to develop architectures which are not so limited. Attempts to avoid the sequential restrictions imposed by sequential programs have resulted in new memory structures which are to be operated on by one or more control units each having its own arithmetic and logic unit. Two examples of the latter development are described in U.S. Pat. Nos. 3,646,523 and 4,075,689 issued to Klaus Berkling. It is sometimes implied that designing a central control unit that operates without an instruction counter will lead to the elimination of the so-called von Neumann bottleneck, but in fact the bottleneck exists in processing apparatus which has a central control unit without an instruction counter, as can be seen from pages 34 and 35 of Automatic Digital Calculators, by A. D. and K. H. V. Booth, published in 1956 by Butterworths Scientific Publications, London, where it is pointed out that if each instruction contains the memory location of the next, the effect on the design of the central control unit is to eliminate the instruction counter.

The two United States patents mentioned hereinbefore, U.S. Pat. Nos. 3,646,523 and 4,075,689, both issued to Klaus Berkling, described early examples of reduction machines. A more recent example of a reduction machine architecture in which processing and memory are separate is described in U.S. Pat. No. 4,591,971, issued to John Darlington et al., and in an article entitled "Declarative languages and program transformation for programming parallel systems; a case study" by J. Darlington, M. Reeve, and S. Wright, in Concurrency: Practice and Experience, Vol. 2(3), pages 149 to 169, Sep. 1990.

A further attempt to avoid the disadvantages of strictly sequential processing has been the development of systems which have a plurality of von Neumann processors, each with its own central processing unit (CPU) and local memory, interconnected by a specially designed bus or network. Since each processor is inherently an independent processing entity, considerable effort is required in designing interfacing between the individual processor and the network and in the control and organisation of data transfer between the processors. Also, because of the so-called contention problem, the design of the interconnecting network has an effect on the efficiency of cooperation between the processors and hence on the extent to which the processing capabilities of the individual processors can be utilized. An example of such a system is described in an article entitled "Hierarchical Routing Bus" by T. Sueyoshi and I. Arita, in Systems and Computers in Japan, Vol. 16, No. 6, 1985, at pages 10 to 19, and in an article entitled "Performance Evaluation of the Binary Tree Access Mechanism in MIMD Type Parallel Computers" by T. Sueyoshi, K. Saisho, and I. Arita in Systems and Computers in Japan, Vol. 17, No. 9, 1986, at pages 47 to 57. The latter articles describe a shared-memory parallel processing system in which processor modules, each comprising a processor unit and a memory unit, are interconnected by a binary tree access mechanism. Each module has a system address. The address space of the system is represented by a two-dimensional address composed of the system address and a location in the module having that system address, so that a single address space is formed. Each processor unit can access any memory unit via the binary tree access mechanism. However, an instruction fetch can be made only from the memory unit within the module that contains the processor unit carrying out the instruction fetch. Thus each memory unit is the local memory for its own processor unit, and global memory for the other processor units. Another tree-type routing network for parallel processing is described in an article entitled "Fat-Trees: Universal Networks for Hardware Efficient Supercomputing" by C. E. Leiserson, at pages 393 to 402 of the Proceedings of the 1985 International Conference on Parallel Processing, published by IEEE Computer Society Press, and a tree-type local network is described in IBM Technical Disclosure Bulletin, Vol. 25, No. 11B, Apr. 1983, at pages 5974 to 5977, by P. A. Franaszek.

Several parallel processing architectures are outlined in Byte, Nov. 1988, at pages 275 to 349. Amongst those mentioned there is a hypercube architecture known as the connection machine, which is also described in "The Connection Machine" by W. D. Hillis at pages 86 to 93 in Scientific American, Vol. 256, No. 6, Jun. 1987, and in U.S. Pat. Nos. 4,598,400 and 4,814,973 issued to W. D. Hillis. In the connection machine, hypercube architecture is employed in the structure of an array of 32768 identical integrated circuits each containing 32 identical processor/memories, so that there are 1,048,576 identical processor/memories. Each processor/memory is connected to its four nearest neighbours. The direction of data flow through the array is controlled by a microcontroller of conventional design. Also, each integrated circuit is provided with logic circuitry to control the routing of messages through a Boolean n-cube of fifteen dimensions into which the integrated circuits are organised. Within each integrated circuit, bus connections are provided to the thirty-two processor/memories so that each processor/memory can send a message to every other processor/memory in that integrated circuit. To permit communication through the Boolean 15-cube, the connection machine is operated so that it has both processing cycles and routing cycles. Computations are performed during the processing cycles. During the routing cycles, the results of the computation are organised in the form of message packets, and these packets are routed from one integrated circuit to the next by routing circuitry in each integrated circuit in accordance with address information that is part of the packet. In the packet, the integrated circuit address information is relative to the address of the destination integrated circuit. The routing circuitry in all the integrated circuits is identical and operates in synchronism using the same routing cycle. Passage of a message packet from a source integrated circuit to a destination integrated circuit is effected by the routing circuits of the integrated circuits. Each routing circuit comprises a line assigner, a message detector, a buffer and address restorer, and a message injector. The line assigner comprises a fifteen by fifteen array of substantially identical routing logic cells. Each column of the array of routing logic cells controls the output of message packets in one dimension of the Boolean 15-cube. Each row of this array controls the storage of one message packet in the routing circuit. The message detector, buffer and address restorer, and message injector of each routing circuit comprises fifteen sets of processing and storage means corresponding to the fifteen rows of routing logic cells. Thus the connection machine, although having a large plurality of processor/memories instead of separate areas of processing and memory, relies on complex auxiliary routing control arrangements. A further aspect of routing in such a machine is described in international patent application publication no. WO89/07299 of Thinking Machines Corporation (inventor W. D. Hillis) which describes an array of processors and an interconnection network controlled by a control unit in the form of a Symbolics 3600 Series LISP machine and a microcontroller. Another example of a processor array with interconnection controlled by a separate control unit is described in international patent application publication no. WO87/01485 of The University of Southampton (inventors C. R. Jesshope, P. S. Pope, A. J. Hey, and D. A. Nicole) and uses transputers as processors. Cube networks for MIMD and SIMD processing in distributed systems are discussed generally in an article entitled "The Multistage Cube: A Versatile Interconnection Network" by H. J. Siegel and R. J. McMillen, at pages 65 to 76, Computer, Dec. 1981.

Another approach to parallel processing has been that of providing an interconnected array of processors where the interconnection is designed to correspond to a distribution of tasks into which a computation is to be resolved. Such an approach has as its background the development of programming languages known as applicative or functional programming languages, which was in particular stimulated by an article entitled "Can programming be liberated from the Von Neumann Style?. A functional style and its algebra of programs" by J. Backus at pages 613 to 641 in Communications of ACM (1978), No. 21. The functional programming languages are closely based on a formal notation known as the lambda calculus. Lambda calculus was originally described in the Calculi of Lambda-Conversion by Alonzo Church, first published in 1941 by Princeton University Press, with second printing in 1951. The pure Church Lambda calculus is described in Introduction to Combinators and λ-Calculus by J. Roger Hindley and Jonathan P. Seldin, published in 1986 by Cambridge University Press, Cambridge, England, and New York, U.S.A. The significance of the lambda calculus in relation to functional programming is discussed in Functional Programming by Anthony J. Field and Peter G. Harrison, published in 1988 by Addison-Wesley Publishing Company, Wokingham, England, Reading, Massachusetts, U.S.A., and Tokyo, Japan. A particular feature of the lambda calculus is a form of reduction known as Beta reduction, which is explained in section 1C of Introduction to Combinators and λ-Calculus, and section 6.2 of Functional Programming. A functional program for a computation can be resolved recursively into a tree structure of sub-tasks, and the final result of the program be independent of the order in which these sub-tasks are evaluated. One example of the design of an array of processors corresponding to a distribution of tasks into which a functional program can be resolved is described in an article entitled "A Reduction Architecture for the Optimal Scheduling of Binary Trees" by K. Ravikanth, P. S. Sastry, K. R. Ramakrishnan, and Y. V. Ventatesh, at pages 225 to 233 in Future Generations Computers Systems, No. 4, 1988, published by Elsevier Science Publishers B. V. (North Holland). In the latter article there is described an array of eight processors so interconnected that a binary tree of computing tasks can be mapped onto the array. The interconnections conform to the relationships expressed by $$L(Pi)=P2i\,modN \text{ and } R(Pi)=P(2i+1)modN \text{ for } i=0, 1\ldots, N-1,$$

where N=8, Pi is the (i+1)th processor of N identical processors, L means left-hand child, and R means right-hand child. It is assumed that the computation decomposes itself recursively into identical subproblems (tasks), and that every task down loads the two subtasks it spawns onto its immediate neighbours. Each processor in the network has four neighbours, two connected to paths coming into the processor, and two connected to paths going out from the processor. The memory of each processor is divided into three banks: a left-memory; a right-memory; and a local-memory. The local-memory is local to its own processor and contains all programs, relevant tables, etc. Each processor communicates with its left child through its own left-memory, and with its right child through its own right-memory. Thus a rigid system of communication between processors, which moreover is limited to communication with immediate neighbours, is imposed. Other tree arrays of processors with rigid systems of communication are also described in "A Network of Microprocessors to Expedite Reduction Languages", by G. A. Mag, at pages 349 to 385 and 435 to 471, in International Journal of Computer and Information Sciences, Vol. 8, 1979, "A Cellular Computer Architecture for Functional Programming", by G. A. Magó, at pages 179 to 187, 1980, IEEE, "Making Parallel Computation Simple: The FFP Machine", by G. Magó, 1985, IEEE, and U.S. Pat. Nos. 4,251,861 (issued to G. A. Magó) and 4,583,164 (issued to D. M. Tolle). Also, in "Comparing Production System Architectures" by M. Lease and M. Lively, of Computer Science Department, Texas A&M University, College Station, Texas 77843, reference is made to an array of 1023 processors connected to form a complete binary tree designed and built at Columbia University in the City of New York and known as DADO2. Such an array of processors is described in U.S. Pat. No. 4,843,540 issued to S. J. Stolfo and again relies on communication between nearest neighbours in the binary tree.

SUMMARY OF THE INVENTION

According to a first principal aspect of the invention there is provided apparatus for performing parallel processing, the apparatus having a plurality of processor cells, and a communication network, the network being such that a plurality of routes therethrough can co-exist, each such route interconnecting a respective pair of the cells and being established by operation of at least one of the said pair of cells and permitting transmission of data between the pair of cells, and each cell being capable of executing reduction operations in which the cell transforms data therein in accordance with rules for reducing expressions stored as data in groups of the cells. Preferably the communication network has means for forming a partial route in response to a searching signal supplied thereto by a processor cell, and a partial route in response to a free signal supplied thereto by another processor cell, and means to complete the partial route of a searching signal to the point at which a free signal is supplied to the network when the partial route of the said free signal and the partial route of the said searching signal meet. Preferably also, the said rules including rules for the execution of concurrent beta-reduction of functional expressions.

According to a second principal aspect of the invention there is provided a communication network having means for forming a partial route in response to a searching signal supplied thereto, and a partial route in response to a free signal supplied thereto, and means to complete the partial route of a searching signal to the point at which a free signal is supplied to the network when the partial route of the said free signal and the partial route of the said searching signal meet.

According to a third principal aspect of the invention there is provided a processor cell having storage means loadable with a plurality of different categories of data, means for determining the categories of data stored in the storage means and setting the processor in a selected one of a plurality of operative processes thereof in dependence upon the categories of data determined to be stored in the storage means, at least one of the operative processes including a computation step utilizing data stored in the storage means, the processor cell having computation means for executing the said computation step, means for receiving data for storage in the storage means, means for outputting data resulting from operative processes of the processor cell, the means determining the categories of data including means responsive to the presence of data in a category incompatible with the said computation step to inhibit operating of the executing means on such data, and means for outputting a status signal indicative of whether or not the selected operative process is a predetermined resting process.

According to another aspect of the invention there is provided apparatus for performing parallel processing, the apparatus having a plurality of processor cells, and a communication network, the said cells being connected to the communication network, the communication network including a plurality of nodes, each of at least some of the cells being settable, in use, at least in a searching state and in a free state and transmitting into the network a searching signal when in the searching state and a free signal when in the free state, and each node including means for so intercepting a searching signal that reaches the node when a free signal is present at the node that a communication route is established between a cell in the searching state and another cell in the free state through one or more nodes at which such interception occurs.

According to a further aspect of the invention there is provided apparatus for performing parallel processing, the apparatus having a plurality of processor cells, and a communication network, the said cells being connected to the communication network, the communication network including a plurality of nodes, each of at least some of the cells being settable, in use, in a calling state and transmitting into the network a calling signal when in its calling state, each node including means for routing a calling signal in accordance with destination information included in the calling signal and indicative of a route extending from the calling state cell that originates the calling signal to another of the cells and including the said node, and the network including a plurality of binary tree arrangements in which the cells are at leaf positions of each binary tree arrangement and the nodes are at nodal positions of the binary tree arrangements, each cell occupying a different leaf position in at least two binary tree arrangements, such that routes containing different numbers of nodes in the said two binary tree arrangements can be established between two cells.

Preferably the cells are arranged to form a planar array in which a unit pattern of four cells in a square is repeated to form a square array of the cells with the number of cells along any side of the array being an integer power of two.

According to a yet further aspect of the invention there is provided apparatus for performing parallel processing, the apparatus having a plurality of processor cells, and a communication network, the network being such that a plurality of routes therethrough can coexist, each such route interconnecting a respective pair of the cells, each cell being capable of executing a plurality of operations including a set of operations including communication operations, command operations in which the cell transmits command signals into the network to another of the cells, slave operations in which the cell executes commands transmitted thereto by another of the cells through the network, and reduction operations in which the cell transforms data, stored in the cell, in accordance with rules for reducing expressions stored as data in groups of the cells, the communication operations including operations in which the cell receives data from another of the cells through the network, and operations in which the cell transmits data to another of the cells through the network, the number of cells being sufficiently large for the reduction operations of each individual cell to be primitive operations in the rules for reducing expressions. Preferably the rules for reducing expressions are consistent with pure Church lambda calculus. Also preferably each cell includes means for testing data stored within the cell to determine whether a reduction operation can be executed on that data and, if the result of the test is negative, for setting the cell in a state such that the cell continues to store the said data until the cell receives from one or more other of the cells further data which when substituted for or combined with at least part of the first said data creates data giving a positive result to the said test, whereupon the cell executes the reduction operation.

According to another aspect of the invention there is provided apparatus for performing parallel processing, the apparatus having a plurality of processor cells, and a communication network, the network being such that a plurality of routes therethrough can coexist, each such route interconnecting a respective pair of the cells, each cell being capable of executing a plurality of operations including a set of operations including communication operations, command operations in which the cell transmits command signals into the network to another of the cells, slave operations in which the cell executes commands transmitted thereto by another of the cells through the network, and internal operations in which the cell processes data stored in the cell, the communication operations including operations in which the cell receives data from another of the cells through the network, and operations in which the cell transmits data to another of the cells through the network, the cell having a plurality of operative states, and being loadable with data in a plurality of categories, and the cell further including means for determining what categories of data are present therein and for setting the cell in a selected one of its plurality of operative states in dependence upon the combination of categories of data detected as being present in the cell.

According to a further aspect of the invention there is provided a communication network comprising a plurality of nodes and a larger plurality of path segments, each of at least a majority of the nodes forming a junction between at least three path segments, and each node having signal input means and signal output means at the connection of the node to each path segment connected thereto, means for transmitting signals from the input means at any one of the path segment connections thereto to the output means at at least one other path segment connection thereto, and means, responsive to the presence of a conditioning signal at the node received from at least one of the input means, for selecting a path through the node to the output means at the connection of the node to a predetermined one of the path segments for a further signal received in the node after arriving at the respective input means of another path segment at the node. Preferably each node has means responsive to an acquire signal received in the node from a path segment connected thereto for providing a path for the acquire signal through the node to the output means at the connection of the node to a selected other one of the path segments without dependence on the presence or absence of the said conditioning signal.

According to a yet further aspect of the invention there is provided apparatus for performing parallel processing, the apparatus including a plurality of processor cells and communication means for enabling communication between the cells, each cell having means for storing data and being loadable with a plurality of categories of data, and having means for determining the categories of data which are stored therein, means for executing predetermined operations with predetermined categories of data only when such predetermined categories of data are present therein, and means for transmitting data to and receiving data from others of the cells through the communication means, and the means for determining the categories of data including means responsive to the presence of data representing an inhibit command to inhibit operation of the executing means on predetermined categories of data. Preferably the predetermined operations include reduction operations, the categories of data include symbolic data and pointers, and the executing means includes means for determining whether symbolic data and pointers are present in the cell and for inhibiting one or more reduction operations if the determination is affirmative.

Preferred embodiments of the invention are defined hereinafter in appendant claims.

In a particular embodiment of the invention having a communication network as defined by claim 41, each node has means responsive to an acquire signal received in the node from a path segment connected thereto for providing a path for the acquire signal through the node to the output means to a selected other one of the path segments without dependence on the presence or absence of the said conditioning signal. The means responsive to an acquire signal is responsive to the state of a further signal, referred to hereinafter as an address/data signal, to select one or the other of the other path segments when the said further signal is received in the node from the same path segments as the acquire signal. The network is, in this embodiment, in the form of four binary tree arrangement with the nodes of the network at the nodal positions of the binary tree arrangements, and the processor cells at the leaf positions of the binary tree arrangements. Each of a majority of the cells is settable in a free state and has status signal transmitting means which transmits a status signal, indicative of whether the cell is in the free state or not, into the network. When the status signal indicates that the cell is in the free state, the status signal, referred to hereinafter as a free signal, acts as a conditioning signal along a partial route in the network. Each of a majority of the cells is also settable in a calling state in which it transmits into the network a calling signal which includes destination information indicative of a route, to another cell, from the calling cell. The calling signal includes, as a component, the said acquire signal. The said further signal, i.e. the address/data signal, constitutes the component of the calling signal containing the destination information. This embodiment has processor cells which have means for carrying out reduction operations and other operations on categories of data that include symbolic data and pointers. Data on which the apparatus as a whole operates, in this embodiment, constitute lambda expressions, and the reduction operations are based on the pure Church lambda calculus.

Briefly, a preferred embodiment of the present invention in the form of an apparatus for performing parallel processing comprises a large number of processor cells, the majority of which are standard cells which, in a free or resting state, transmit into a communication network a free signal, and others are special cells which are adapted to be coupled to peripheral sources and sinks for data; each cell includes means for storing data; the cells are connected to the communication network; the communication network is in the form of several binary trees having the cells connected at the leaf positions of the binary trees, and having the nodes of the trees formed by switching circuits that allow individual cells to control the formation of signal paths through the nodes; in operation, cells may be in a waiting state, a calling state, a searching state, a communicating state, an internal operation state, or the free state; any standard cell or special cell in a searching state transmits a searching signal into the network where, if the searching signal meets a free signal at a node, a route may be formed, through the network, from the searching state cell to a free state cell; any standard or special cell in a calling state establishes, with a calling signal, a route through the network to another one of the cells which is identified by destination information in the calling signal; any standard or special cell in the waiting state is waiting to be called by a cell in the calling state; and each standard cell is capable, by passing through a sequence of the said states, of copying a configuration of data stored in another of the cells. In a preferred method of operating the preferred apparatus, a functional expression, preferably in the form of at least one lambda expression, which is to be reduced to a final result, is so distributed in groups of the cells that individual cells need only carry out communication, in which data is transmitted between cells, arrangement and discarding of data within cells, and execution of primitive operations within cells. At least initially in the evaluation of a functional expression, at least one of the groups of cells consists of cells each of which is in a waiting state such that the respective group of cells serves as a passive definition of an expression. Furthermore each standard cell in the preferred embodiment includes means for detecting the presence therein of data representing a symbolic name for a defined expression and means which responds to detection of such symbolic data by setting the cell in a communicating state wherein the cell locates a definition of the defined expression constituted by a group of cells, and thereupon enters a sequence of states whereby the cell copies a configuration of data stored in one of the said group of cells and initiates copying by other cells of configurations of data stored in the remaining cells of the said group. Such copying is carried out in a manner that results in those cells which have copied the said configurations of data proceeding to process the data to produce a result contributing to the production of or constituting the said final result. Destination information used by cells in the calling state is in the form of pointers. Destination information may be stored in the cells or in the network, and each cell preferably includes means for computing pointers from destination information. In the preferred embodiment, transmission of a pointer to a cell which has entered a communicating state in response to the cell receiving, whilst in the free state, a searching signal, results in initiation of a procedure in which the cell copies a configuration of data stored in another cell to which the formerly free cell is related by the said pointer.

A preferred communication network according to the invention comprises:

means for forming a partial route in response to a searching signal supplied to the network, and a partial route in response to a free signal supplied to the network; and means to complete the partial route of a searching signal to the point at which a free signal is supplied to the network when the partial route of the said free signal and partial route of the said searching signal meet, a partial route formed in response to a free signal effecting a conditioning of the said means to complete within a portion of the network. Preferably the network is formed by a plurality of nodes interconnected by a larger plurality of path segments, and the said forming means and means to complete are incorporated in the nodes.

The invention will now be described by way of example with reference to the accompanying drawings.

BRIEF DESCRIPTION OF THE DRAWINGS

FIG. 11 is a circuit diagram of part of a node of FIG. 5.

FIG. 12 is a circuit diagram of part of a node of FIG. 5.

FIG. 13 is a diagram illustrating the formation of a route from a processor cell issuing a calling signal to a destination processor cell through the network in the embodiment of FIG. 1;

FIG. 15 is a diagram illustrating the use of multiple binary trees in an embodiment of the invention;

FIGS. 26A, 26B, 26C, 26D, 26F, and 26G are circuit diagrams of parts of communications circuitry in a processor cell of the embodiment of FIG. 1;

FIG. 26E is a graphical representation of signals appearing in the operation of the circuit of FIG. 26D;

FIG. 38 is a block diagram of a special processor cell of the embodiment of FIG. 1;

FIGS. 75, 76A, 76B, 77A, 77B, 78A, and 78B are diagrams illustrating the formation of routes between two cells using a network having nodes with the modification of FIGS. 73 and 74;

DETAILED DESCRIPTION OF PREFERRED EMBODIMENTS

Figure 1:
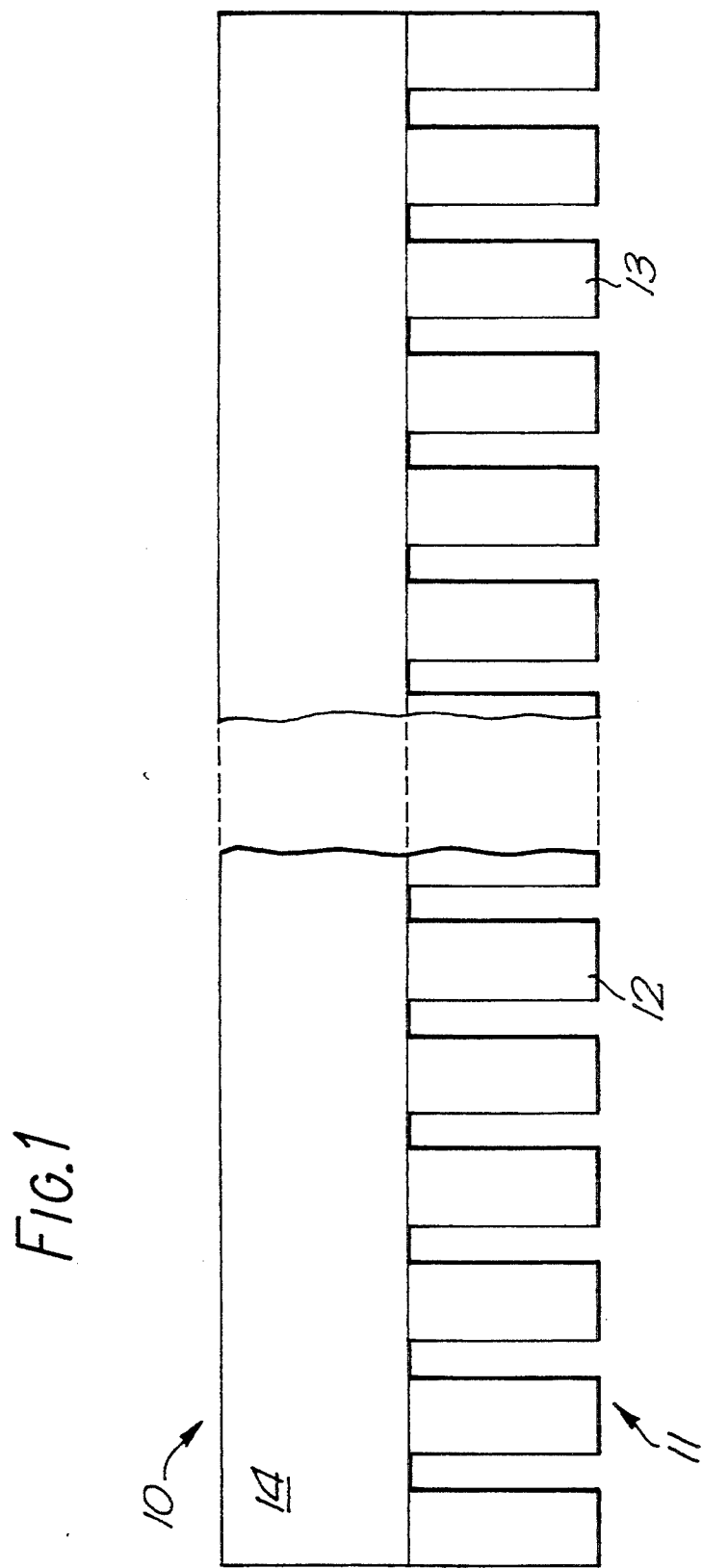
FIG. 1 is a block diagram schematically representing an embodiment of the invention.

FIG. 1 represents in block form a first example of a digital processing apparatus 10 embodying the invention. The apparatus 10 has a large plurality of processing cells 11. Most of the processing cells 11 have identical structure, and are therefore referred to herein as standard cells 12. Some of the processing cells 11 have a structure which includes some of the structure of a standard cell and additional structure, and such cells are referred to herein as special cells 13. One standard cell 12 and one special cell 13 are indicated in FIG. 1.

The apparatus 10 also has a communication network 14. Each processing cell 11 is connected to the communication network 14, and can establish a communication path to any other cell 11 through the network 14 if required to do so.

The apparatus 10 carries out the functions of data processing and main memory. The additional structure provided in the special cells 13 enables them to act as interfaces between the apparatus 10 and peripheral apparatus (not shown) such as input and output equipment and backing memory. In this first example, the apparatus 10 is the central processing and memory apparatus of a computer that carries out reduction of expressions.

When the apparatus 10 is in operation, each cell 11 is in one of a number of states. These states are referred to herein as the free state, the searching state, the calling state, the communication state, the waiting state, and the internal operation state. The free state is the resting state of a cell 11. A cell 11 automatically switches into the free state whenever it is not required to enter or remain in any other state.

Figure 2:
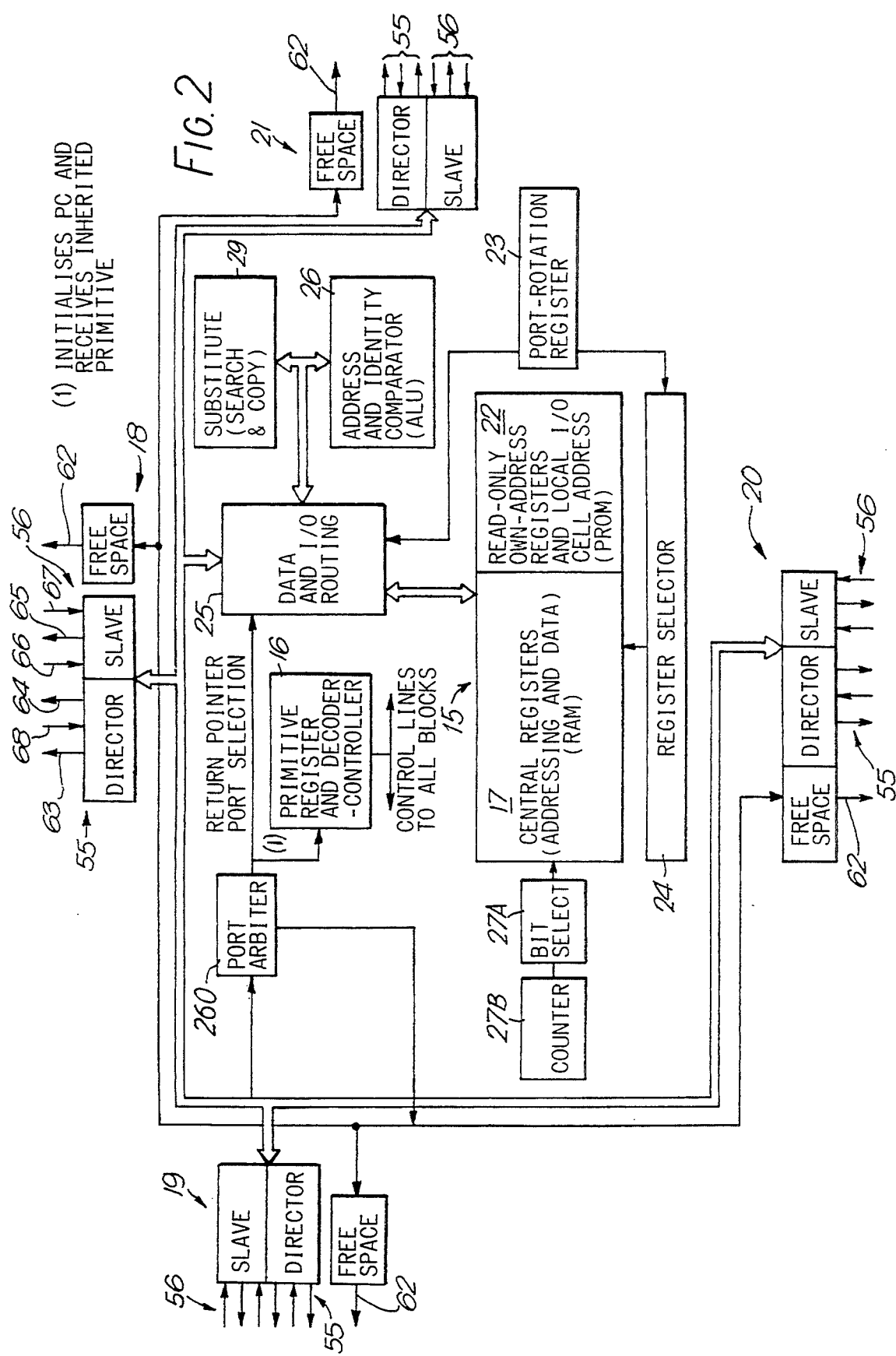
FIG. 2 is a block diagram of a processor cell of the embodiment of FIG. 1.

FIG. 2 is a schematic functional diagram of a standard cell 12. The standard cell 12 contains a decoding and control unit 16, network interfacing circuitry, and a small amount of storage in the form of registers 15. A pulse source (not shown) provides pulses for driving the elements of the cell 12, since the cell 12 is constructed mainly of serial circuitry, and communication through the network 14 is serial.

The network interfacing circuitry has four principals functions: status transmission, data transmission, control signal transmission and reception, and data reception.

The status of each standard cell 12 is transmitted into the network 14 by a signal which is high, represented here by F, whenever the cell 12 is in the free state, and is low, represented here by NOT-F or $\overline{F}$, whenever the cell 12 is not in the free state. Consequently each cell 12 transmits either F or NOT-F.

In use, some of the processing cells 11 are initially loaded with binary data. A loading operation may be carried out through a special cell 13 which communicates through the network 14 with those cells 11 which are to be loaded by that special cell 13. Such a special cell 13 has input interface structure through which it communicates with a source (not shown) of the binary data. The structure of a special cell 13 is shown in FIG. 38 and will be described hereinafter.

In an initial loading of the cells 11 of the apparatus 10, many such special cells 13 may be used to load different groups of the cells 11 at the same time.

At start up, before any initial loading is carried out, all the cells 11 are set in the free state. This can be effected by circuitry (not shown) of a known kind which generates a pulse at power up of the apparatus 10.

A special cell 13 thus operating as an input cell communicates in turn with each cell 11 which it is to load. A standard cell 12 receives data from an input cell 13 through a communication path established in the network 14 from the input cell 13 to the standard cell 12. Data loaded into a cell 11 represents one or more instructions or one or more names or one or more values, one or more addresses or combinations of such data. Various types of names are used in the present example and will be explained hereinafter.

Address data loaded into a cell 11 represent numerical addresses of one or more other cells 11. A numerical address of a cell 11 is a number uniquely identifying that cell 11 by its point of connection in the communication network 14.

A standard cell 12, and a special cell 13, in the searching state transmits control signals which, in cooperation with the free signals F transmitted by standard cells 12 in the free state, can establish a communication path through the network 14 to a cell 12 in the free state. A searching state ends when such a communication path is established, and it is followed immediately by a communication state in the searching cell 11, and by a communication state in the formerly free state cell 12 now connected through the communication path.

In the communication state, a cell 11 transmits at least control signals to another cell 11 to which it is connected by a communication path through the network 14. The communication state ends when the one cell 11 in this state senses that the other cell 11 has received the whole transmission from the one cell 11, and the other cell 11 has completed any transmission back to the one cell 11.

In the calling state, a standard cell 12, and a special cell 12, carries out operations involving the transmission of control signals and data. The cell 11 in the calling state uses the address of another cell 11, which is to be called, to establish a communication path through the communication network 14 to the cell 11 being called. The calling state ends when the required communication path is established and is immediately followed, in the calling cell 11, by the communication state if the called cell 11 acknowledges the call. If the cell 11 being called is in an appropriate waiting state at least immediately before calling cell 11 completes the communication path to it, the waiting state in the cell 11 called is followed by the communication state.

In the waiting state the cell 11 is not carrying out any internal operation involving the processing of data. Additionally, the cell 11 is not carrying out any operation involved in the transmission of either control signals or addresses and other data. However, the cell 11 does store data ready for use when the cell 11 is called by a cell 11 in the calling state. Also, the waiting cell 11 transmits the not free signal NOT-F, since it is not in the free state, if the cell is a standard cell 12.

In the internal operation state, a cell 11 is carrying out operations involving the decoding and control unit 16. These operations include certain operations on data stored in the registers 15 of the cell 11.

At any particular time during an overall operation of the apparatus 10, any cell 11 that is not in the free state or in the waiting state can, if required to do so, access any other cell 11 that is in the free state or in the waiting state. Cells 11 in the free state serve collectively as spare processing power with available memory space into which data and addresses can be written by other cells 11. Cells 11 in the waiting state may act collectively as a loaded area of memory, and in some cases a cell 11 in the calling state may in effect be carrying out a memory access operation.

A cell 11 in the communication state is writing in or reading from the cell 11 to which it is connected by the established communication path.

A cell 11 in the searching state can be regarded as attempting to find a standard cell 12 that is not currently in use.

The capacity of the memory formed by the cells 11 collectively depends primarily on the number of cells 11 in the system 10. If there are $2^{16}$ cells 11, i.e. 65536 cells 11, a complete numerical address of any cell 11 will, in binary representation, require 16 digits, i.e. 16 bits.

When a cell 12 reverts to the free state it becomes a location in the free, i.e. available, memory space, and is a location with processing power.

The standard cells 12 do not need a program counter. Although it is possible to construct the decoding and control unit 16 as a microprogrammed control and decoding processor, it is more economic to construct the unit 16 of a standard cell 12 as a hard-wired decoder-controller with an instruction register, referred to here as the primitive register. A microprogrammed control and decoding processor requires a source of accurate clock pulses. This source can be a clock pulse bus supplying the unit 16 from a crystal controlled clock pulse generator circuit. Such a microprogrammed processor would typically include a microprogram stored in an area of ROM, and a microprogram counter. The microprogram counter would not otherwise be required in the operations of the cell. It may be preferable to construct the unit 16 of a special cell 13 as a microprogrammed control and decoding processor.

Processing activity in the apparatus 10 creates intermediate results and final results which must be output from the apparatus 10. Such a result must be placed in a special cell 13 having output interface structure. In the present example, each special cell has both input and output interface structure, and it may be arranged that intermediate and final results occur at a respective special cell 13 that served initially as the input cell for some of the data that gave rise to the relevant intermediate or final result. A complex computing problem is solved by solving a large number of simple problems. Each such simple problem involves only a primitive operation. By a primitive operation is meant an operation that is not broken up into a number of simpler operations. Each cell 11 is designed to carry out primitive operations. The apparatus is intended to be used on problems in which the principle of referential transparency holds, so that a complex expression can be evaluated by substitution and the execution of primitive operations.

A complex operation, i.e. an operation requiring the use of a plurality of primitive operations, is given a name which is stored as a bit pattern in one of the registers 15 of a cell 11.. That cell 11 also stores a pointer to one of a group of other cells 11 which includes cells 11 loaded with instructions for executing the pattern of primitive operations which make up the complex operation. The cells loaded with these instructions thus constitute the function body of the complex operation, and together with the name cell and possibly one or more cells that link the function body to the name cell by pointers form the definition of the complex operation. Other data, such as values, which are required in connection with an execution of the complex operation may be stored in the cells another group of cells 11, a further cell 11 storing the complex operation name and also storing a pointer to one cell 11 in this other group. Such groups of cells 11 thus store data structures. Each cell 11 in such a group stores at least a pointer to one other cell 11 in that group. Such stored pointers linking the cells 11 of the group are formed by or from addresses of the cells.

If a primitive operation instruction is stored together with one or more pointers in a cell 11 in which the operation is to be executed, the execution of the primitive operation is inhibited until the stored pointer or pointers have been replaced by the intended values. Such a situation occurs where the values are themselves the results of other operations.

Where a particular complex operation is used more than once in a complex problem, it is essential to ensure that the form of the complex operation and the availability to it of values are not corrupted or destroyed by its use. It is therefore arranged that a cell 11 storing a name representing a complex operation does not directly use the cells 11 storing the primitive operation instructions and values defining the complex operation. Instead, a cell 11 storing the name initiates a process in which those cells are linked to free state cells, the various instructions and values and the pointers needed to enable required communication paths to be established are written into the free state cells, and the cell 11 storing the name has written into it a pointer to at least one of those free state cells written in. The cell 11 storing the name may itself be transformed, by a copying process, into the head of the active definition thus established. Thus the required definition and values for the name are copied from the cells 11 in which they are stored into available memory space. The data in the 'copy' cells can be modified, where necessary, by the execution of the complex operation.

To avoid confusion of pointers with instructions, names, and values, some bits of their respective bit patterns are dedicated to characterising the pattern as being (i) a pointer, or (ii) an instruction, or (iii) a name or a value, and the decoding and control unit 16 includes means for identifying each of the three types of pattern.

The communication network 14 is formed of path segments and nodes. The nodes interconnect path segments and are active in determining the communication paths formed between pairs of cells 11. In particular, each node incorporates a means enabling a control signal, referred to here as a search signal, from a cell in a searching state to so interact with a free signal present at the node that the search signal is directed to a cell 11 that has established or contributed to the presence of the free signal at the node.

In the present example, the network 14 consists of four binary trees. The cells 11 are at the leaf positions of the trees, and the nodes referred to hereinbefore are situated at the nodal positions of the trees. Each cell 11 has four ports 18, 19, 20, and 21 (FIG. 2) at which it is connected to the four binary trees respectively.

Figure 3:
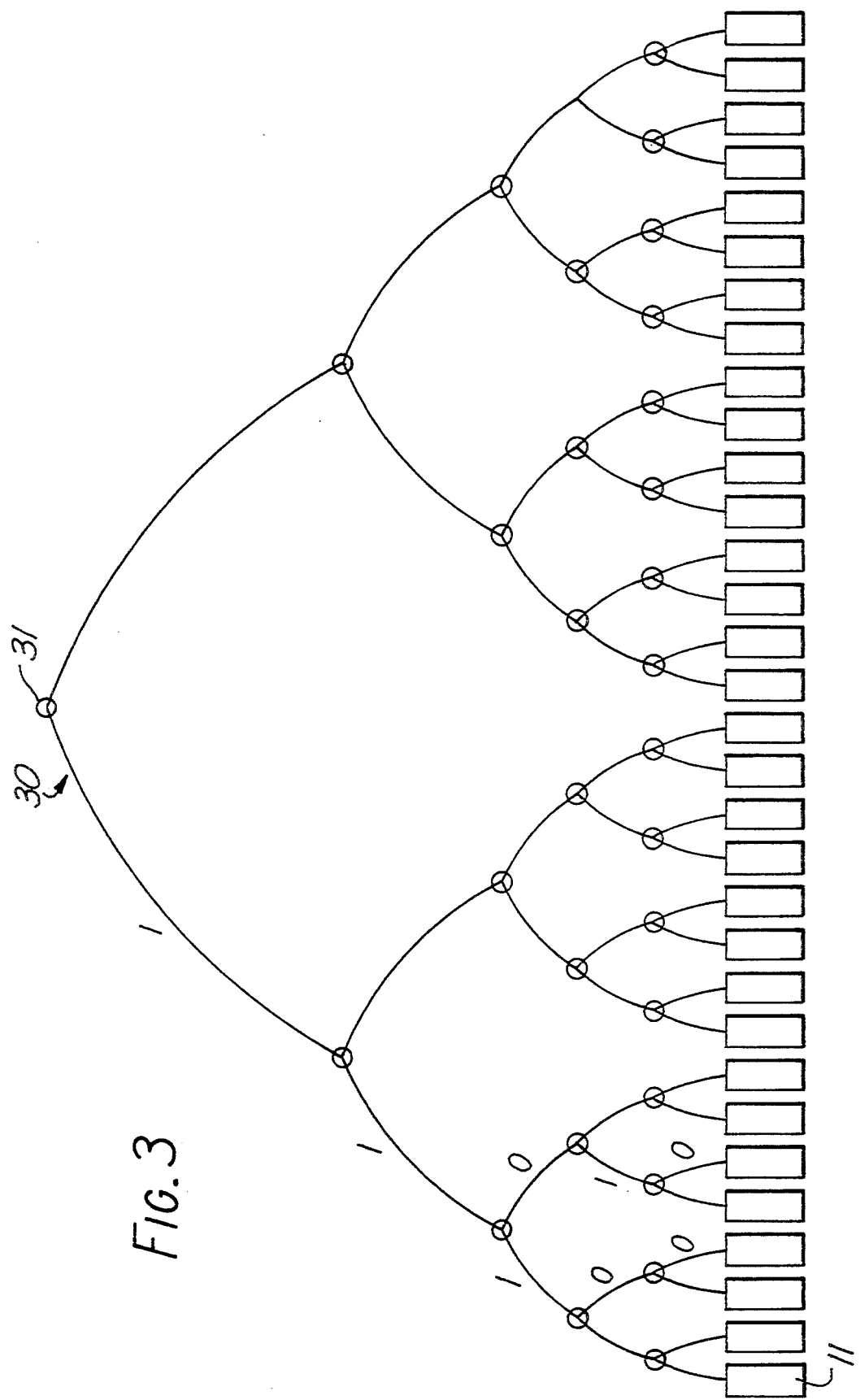
FIG. 3 is a schematic representation of a simple network and processor cell apparatus embodying the invention.

FIG. 3 illustrates schematically one binary tree 30 of the network 14, with the cells 11 at the leaf positions, but is greatly simplified in that in total only thirty-two cells 11 are shown whereas in practice a tree with thousands of cells 11, and hence as many leaf positions, would be implemented. Five bit binary addresses can be allocated to the cells 11 of FIG. 3 in such a way that each bit in the address of a cell 11 identifies a path segment in the route down the tree from its root node 31. The two lower path segments from any node are distinguished by one being associated with the binary digit '1' and the other being associated with the binary digit '0'. For example, if the cells 11 in FIG. 3 are numbered from right to left: 00000, 00001, . . . 11110, 11111, then every right hand lower path segment is associated with binary digit '0', and every left hand lower path segment is associated with binary digit '1'. A route interconnecting a pair of cells can be defined by selecting those bits of the respective addresses of the cells which constitute the respective parts of their addresses which differ.

For example, if the complete addresses of two cells are 11100 and 11010, then a route from the cell with address 11100 to the cell with address 11010 is defined by the three least significant bits of the first address, i.e. 100, taken in reverse order, followed by the three least significant bits of the second address, i.e. 010, taken in that order (from most to least significant). The three least significant bits of the first address define the upward or ascending branch of the route, and the three least significant bits of the second address define the downward or descending branch of the route. The part of the two complete addresses which is common to both, in this case the two most significant bits, which are 11, defines the position of the node at which the ascending and descending branches of the route meet. This example is illustrated in FIG. 3. In general, the address of any one cell at a leaf position of a binary tree differs from the address of any other cell at a leaf position of the tree by at least one bit, which is the least significant bit, and if two cells have part of their addresses in common, that part will include at least the most significant bit, and will consist of only the most significant bit or bits of their addresses. The terms upward and ascending are here used in relation to a binary tree arrangement to mean in the direction towards the root node of the tree, and similarly the terms downward and descending are used to mean in the direction away from the root node. The terms upper and lower and higher and lower are also used herein in relation to positions nearer and further away from the root node.

It will be seen from FIG. 3 that each node, except the root node 31, is the junction between three path segments: an upper segment, a left hand lower segment, and a right hand lower segment. The upper segment at any node is of course either a left hand lower segment or a right hand lower segment of the next higher node.

Figure 4:
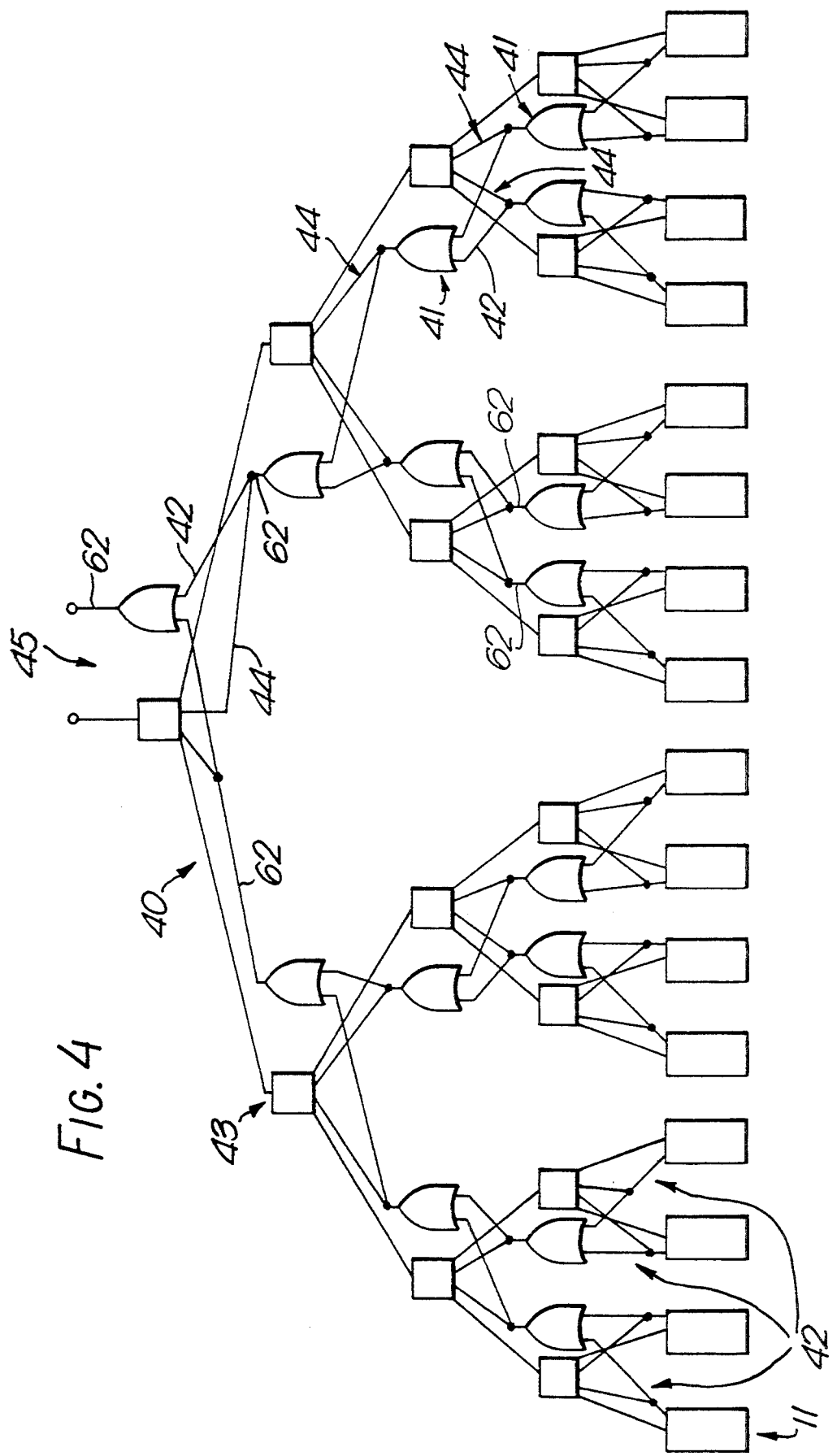
FIG. 4 is a schematic representation of part of the embodiment of FIG. 1.

FIG. 4 illustrates, for a binary tree 40 of sixteen leaf positions, the logic of the free signal transmission from the cells 11. The tree of FIG. 4 may be regarded as part of a larger binary tree. As shown, at each node position there is a two input OR gate 41 for free signals being transmitted into the tree from cells 11 in the free state. Each OR gate at the lowest level of the tree has its inputs 42 supplied by the two cells 11 connected to the lower segments from the node. The output from an OR gate supplies one input of the OR gate at the next higher level. The signals at the inputs to an OR gate are also supplied to the remainder of the node, represented in FIG. 4 by a square such as at 43, through connections such as those indicated at 44. As a result of this arrangement, the presence of a free signal at a high level node of the tree can be established by any one or more of the cells 11 at the leaf positions depending from that node. For example, the presence of a free signal at the highest node, 45, in FIG. 4 indicates that at least one of the sixteen cells 11 in FIG. 4 is in the free state. Furthermore, the free signal from any cell 11 conditions the nodes in the route from that cell 11 to the root node of the tree, unless intercepted by a search signal, as will be explained hereinafter.

Figure 5:
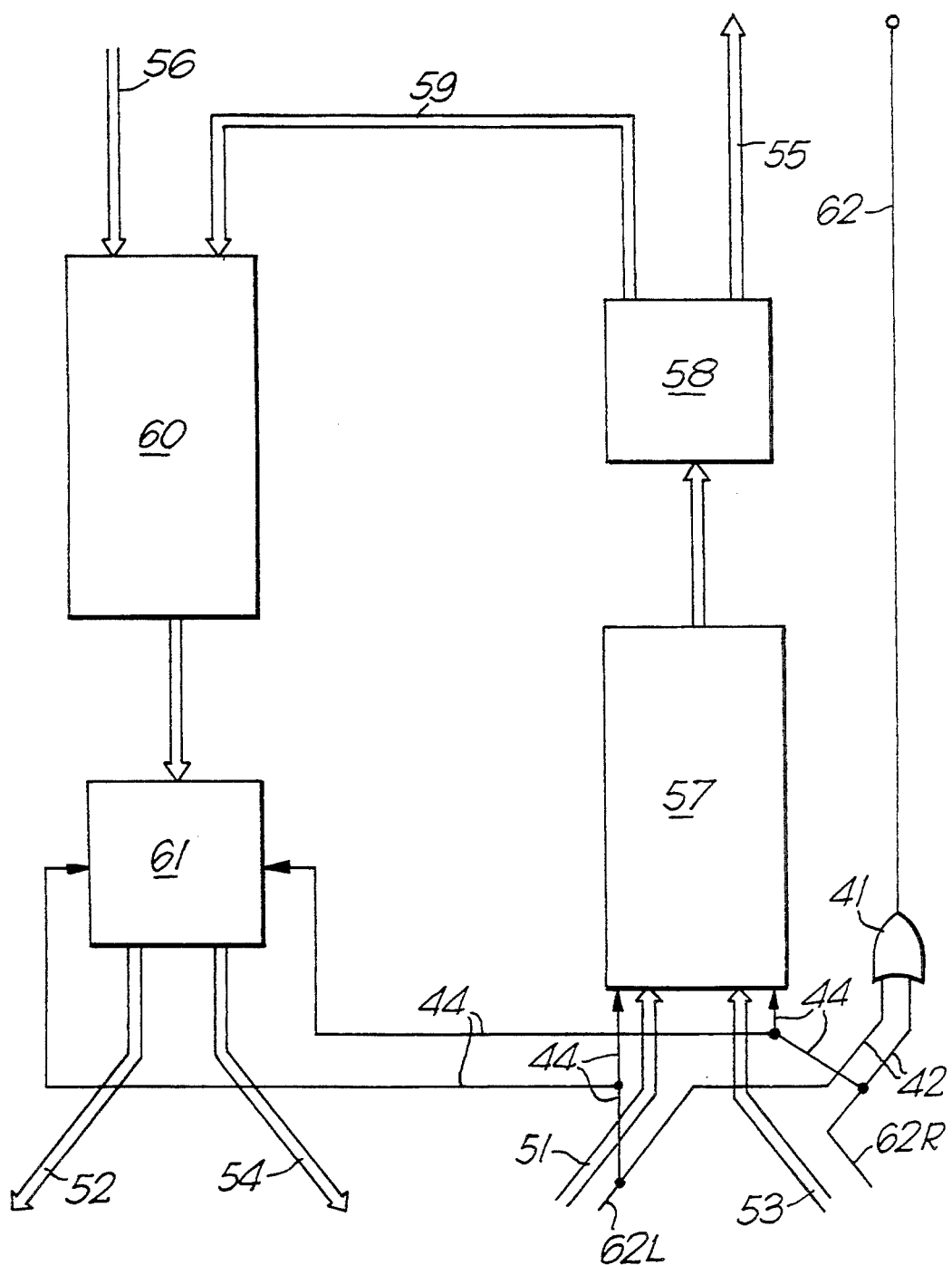
FIG. 5 is a block diagram of a network node of the embodiment of FIG. 1.

FIG. 5 illustrates schematically in block form one example of a preferred structure for a node of the network 14. The OR gate 41 and its connections 42 and 44 are shown again. The left hand lower path segment includes a left hand lower upwards channel 51, and a left hand lower downwards channel 52. Similarly the right hand lower path segment includes a right hand lower upwards channel 53 and a right hand lower downwards channel 54. The upper segment includes an upwards channel 55 and a downwards channel 56.

The lower upwards channels 51 and 53 and the free signal connections 44 enter an upwards arbiter 57 that supplies an upwards/crossover selector 58 that supplies the upwards channel 55 and a crossover channel 59. The upper downwards channel 56 and the crossover channel 59 supply a downwards arbiter 60 that supplies a downwards left/right selector 61 from which the left hand and right hand downwards channels 52 and 54 extend. The free signal connections 44 are also connected to the left/right selector 61.

The upwards arbiter 57 allows control signals on only one of the upwards channels 51 and 53 to pass to the upwards/crossover selector 58. As will be explained, the arbiter 57 ensures that the first active control signal to reach it from the channels 51 and 53 is the one that is passed to the selector 58. The later signal is merely blocked until the transaction initiated by the first signal has ended, whereupon the arbiter 57 passes the later signal to the selector 58.

The upwards/crossover selector 58 determines, in response to control signals that it receives from the arbiter 57, whether it is to the upwards channel 55 or to the crossover channel 59 that the arbiter 57 is connected.

The downwards arbiter 60 allows control signals on only one of the downwards channel 56 and the crossover channel 59 to pass to the left/right selector 61. Again the first active signal to arrive is the one passed to the selector 61, and the later signal is merely blocked.

The left/right selector 61 determines, in response to control signals that it receives from the arbiter 60 or in response to an active free signal on one of the connections 44, whether it is to the left hand lower channel 51 or to the right hand lower channel 54 that the arbiter 60 is connected.

The output from the OR gate 41 is supplied through a line 62 to a connection corresponding to one connection 44 and one input to the OR gate of the next higher node. Similarly, the pairs of connections 42 and 44 at the inputs to the OR gate 41 shown in FIG. 5 are supplied through corresponding lines 62L and 62R from the respective OR gates of the two lower nodes, or, if the node of FIG. 5 represents a lowest node, from a pair of adjacent cells 11.

It will be seen from FIG. 5 that the upper path segment from a node consists of a free signal line 62, an upward channel 55, and a downward channel 56, the left hand lower path segment consists of a free signal line 62L, an upward channel 51, and a downward channel 52, and the right hand lower path segment consists of a free signal line 62R, an upward channel 53, and a downward channel 54. The upper line 62 and channels 55 and 56 become either the left hand line 62L and channels 51 and 52 or the right hand line 62R and channels 53 and 54 of the next higher node.

Upward and downward channels 55 and 56 are physically distinct and do not interfere with one another.

Each of the channels 51 to 56 contains three lines: an acquire signal line, an address/data signal line, and an acknowledge signal line.

As shown in FIG. 2, each port 18, 19, 20, or 21 of a standard cell 12 is the origin of a free signal line 62, an outgoing acquire signal line 63, an outgoing address-/data signal line 64, and an outgoing acknowledge signal line 65, and the destination of an incoming acquire line 66, an incoming address/data line 67, and an incoming acknowledge line 68. The outgoing acquire and address/data signal lines 63 and 64 together with the incoming acknowledge line 68 make up an upwards channel 55 from the cell 12, and the incoming acquire and address/data signal lines 66 and 67 together with the outgoing acknowledge signal line 65 make up a downwards channel 56 to the cell 11. Since in the present example the cell 12 is at a leaf position in four binary trees, there are four ports and therefore four such groups of lines 62 to 68.

Each network port of a special cell 13 is the origin of an outgoing acquire signal line 63, an outgoing address-/data signal line 64, and an outgoing acknowledge signal line 65, and the destination of an incoming acquire line 66, an incoming address/data line 67, and an incoming acknowledge line 68. A special cell 13 provides a connection to a free signal line 62L or 62R of the node to which a network port of the cell 13 is connected directly, but does not transmit the free signal, the said connection being held permanently low.

Figure 6:
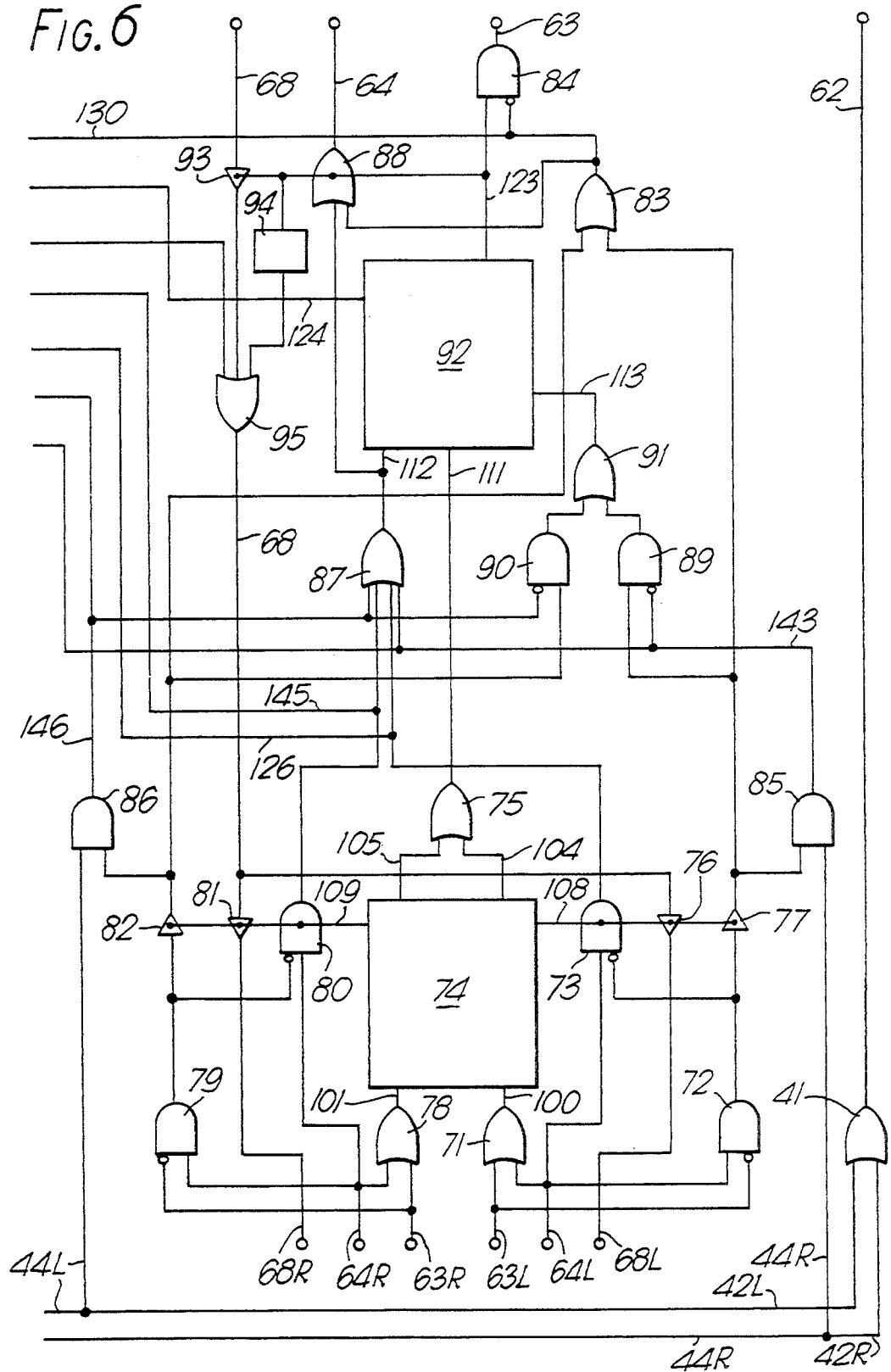
FIG. 6 is a circuit diagram of part of a node of FIG. 5.

The arbiter 57 and the selector 58 are shown in detail in FIG. 6, in which the connections 44 and the inputs 42 to the OR gate 41 are distinguished by a letter L to indicate those connected to the left hand path segment free signal line 62L and a letter R to indicate those connected to the right hand path segment free signal line 62R. Similarly, the outgoing and incoming lines for other signals are allocated L and R where necessary to indicate whether they belong to a left hand lower path segment (L) or a right hand lower path segment (R). The exchange of positions of the channels 51 and 52 implied by FIG. 6 is, for simplicity, omitted from FIG. 5.

At output from a cell 11 in the calling state, the outgoing acquire and address/data signals are used as control signals for establishing the route from the calling cell 11 to the desired destination cell 11. Initially, in the calling state, the cell 11 sets the acquire signal high, corresponding to logic 1, and the address/data signal low, corresponding to logic 0. Assuming that FIG. 6 represents the first node above the calling cell 11, and that the other cell 11 that is coupled to this node is not attempting to seize the node, if the calling cell is at the end of the left hand lower path segment (left cell), an OR gate 71 and two AND gates 72 and 73 receive signals from the calling cell and determine the operation of the node. The high output from the OR gate 71 sets a left/right latching circuit 74 so that a high signal appears at the output of an OR gate 75, and the AND gate 73 and two line switches 76 and 77 are enabled by the latching circuit 74. Since the cell at the end of the right hand lower path segment (right cell) is supplying a low signal on its outgoing acquire and address/data lines 63R and 64R, the corresponding OR gate 78 and AND gates 79 and 80 receive low inputs, and the AND gate 80 and the two corresponding line switches 81 and 82 are not enabled by the latching circuit 74.

It should be noted that in FIG. 6 and other gate circuit diagrams of the accompanying drawings, a convention is used in which an input connection for an enabling signal to a gate or a switch is represented by a dot at approximately the centre of the graphical symbol representing the gate or switch, and it is to be understood that if the enabling signal applied there is high, the output signal from the gate of switch is determined by the state(s) of the other input signal or signals to the gate or switch and the logical nature of the gate or switch, and if the enabling signal applied is low, the output signal from the gate or switch is low.

Each of the line switches 76, 77, 81 and 82 is a circuit which has one signal input, one signal output, and an enabling input. When the line switch receives a high signal at its enabling input, the input signal at its signal input appears at its signal output. When the line switch receives a low signal at its enabling input, the signal at its signal output is low, regardless of the state of the signal at its signal input. For example, the output signal from the AND gate 72 passes through the line switch 77 if the signal applied to the enabling input, represented by a central dot in item 77 in FIG. 6, is high, whereas if the signal applied to the enabling input is low, the output signal from the line switch 77 is low. Further line switches are used in the circuitry of the node.

Since the AND gate 72 receives a low input at its address/data input, its output is low. The outputs from the line switches 77 and 82 are therefore both low and an OR gate 83 fed by these two outputs supplies a low input to an inverter at one input of an AND gate 84 supplying the outgoing upward acquire signal line 63 of the node. The gate 84 is thus enabled to apply whatever signal appears at its other input to the line 63.

The low outputs from the AND gate 72 and the line switch 82 also set low the outputs of two AND gates 85 and 86 that supply two of the inputs of an OR gate 87.

The other two inputs to the gate 87 are from the AND gates 73 and 80 and are therefore also low. Consequently the two inputs to an OR gate 88 that supplies the outgoing upward address/data signal line 64 are also low.

Two AND gates 89 and 90 receive respective low inputs from the AND gate 72 and the line switch 82, so that an OR gate 91 that ORs their outputs supplies a low signal to an upwards/crossover latching circuit 92. When the latching circuit 92 receives low inputs from the OR gates 87 and 91 and a high input from the OR gate 75, the upwards/crossover latching circuit 92 supplies a high output to the AND gate 84, and enables the OR gate 88 and a line switch 93, and triggers a monostable 94. The AND gate 84 makes the line 63 high in this case since it is enabled, and the OR gate 88 sets the line 64 low, so that the respective high and low signals at the lines 63L and 64R now appear at the upper outgoing lines 63 and 64 respectively. The enabling of the line switch 93 couples the incoming acknowledge line 68 of the upper path segment through an OR gate 95 to the line switches 81 and 76. The triggering of the monostable 94 causes an acknowledge pulse to be emitted from the monostable 94 through the OR gate 95 and the line switch 76 to the left hand acknowledge signal line 68L and thus to the left cell, which is the calling cell.

Since the circuitry is symmetrical, a corresponding operation can be effected from the right hand cell if the left hand cell is not attempting to seize the node.

Figure 7:
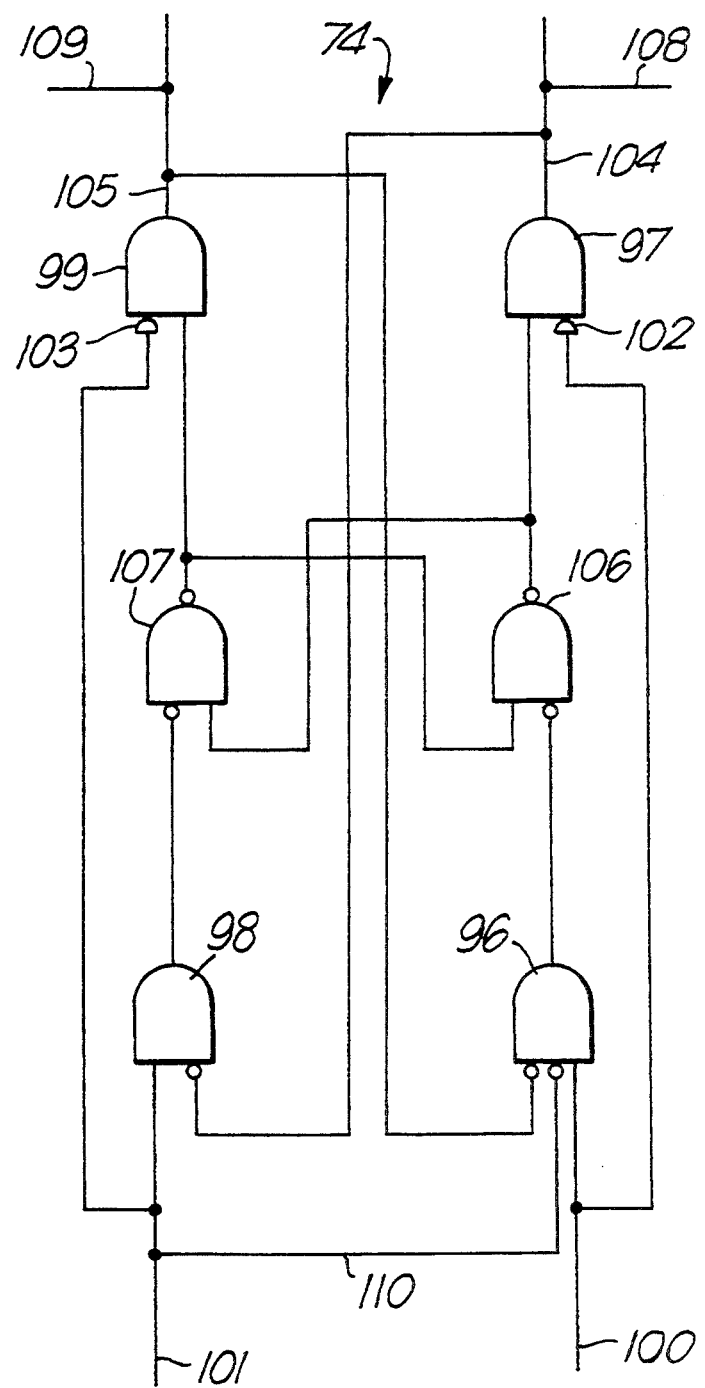
FIG. 7 is a circuit diagram of part of a node of FIG. 5.

If both cells attempt to seize the node, the left/right latching circuit 74 enables the cell whose signals arrive first to seize the node. FIG. 7 shows the left/right latching circuit 74 in detail. Inputs from the left cell are supplied to input and output AND gates 96 and 97, and inputs from the right cell are supplied to input and output AND gates 98 and 99, from input connections 100 and 101 respectively. In higher nodes, the signals supplied to the connections 100 and 101 originate from the respective left and right lower nodes. The input signals are supplied through delay elements 102 and 103 to the AND gates 97 and 99.

Starting from the condition in which there are low input signals at 100 and 101 and low output signals at the outputs 104 and 105 of the AND gate 97 and 99, it will be seen that an intermediate latch formed by two cross-coupled NAND gates 106 and 107 may be in any state. As soon as the signal at 100 or 101 changes to high, a high signal appears at the output of the corresponding input AND gate 96 or 98 since both AND gates 96 and 98 are enabled by their other inputs, which have inverters for this purpose. The appearance of a high signal at the output of either AND gate 96 or 98 forces the corresponding NAND gate of the latch to produce a high output, and the other NAND gate to produce a low output. For example, if 100 goes high, gates 96 and 106 produce high outputs, and gate 107 produces a low output. The high and low outputs from the latch correspondingly enable and disable the output AND gates. A high output at an output AND gate disables the input AND gate of the other side of the circuit. For example, if the gate 97 produces a high output, the inverter at the corresponding input to the input AND gate 98 ensures that the gate 98 produces a low output. Consequently, if for example, the signal at 101 goes high after the signal at 100 has gone high, the high signal at 101 has no effect on the output signals at 104 and 105.

The purpose of the delay elements 102 and 103 is to ensure that, following any change in the signals at the inputs 100 and 101, the latch NAND gates have time to operate in accordance with the new input signals and condition the output AND gates 97 and 99 before the new input signals are applied to the AND gates 97 and 99.

The output 104 is connected at 108 to the enable inputs of the gate 73 and switches 76 and 77, and the output 105 is connected at 109 to the enable inputs of the gate 80 and switches 81 and 82, as indicated in FIG. 6. Thus the set of one AND gate 73 or 80 and two line switches 76 and 77 or 81 and 82 associated with the input signal at 100 or 101 that arrives first is the set that is enabled, the other set of gate and switches remaining or becoming disabled.

The outputs 104 and 105 are connected to the inputs of the OR gate 75 so that seizure of the node through the operation of the latching circuit 74 in response to a high input signal at either 100 or 101 results in a high input to the upwards/crossover latching circuit 92.

It will be seen that the latching circuit 74 is symmetrical except for a third, inverted input to the gate 96, with a connection 110 to the input connection 101. The presence of the connection 110 and the third, inverted input to the gate 96 ensures that if high signals appear simultaneously following low signals, at both 100 and 101, one of the input gates, in this example the gate 98 connected to the input connection 101, will be driving gate and the other input gate, in this example the gate 96, will be inhibited. Thus the response of the latching circuit 74 is predictable for all input signal logic conditions.

Figure 8:
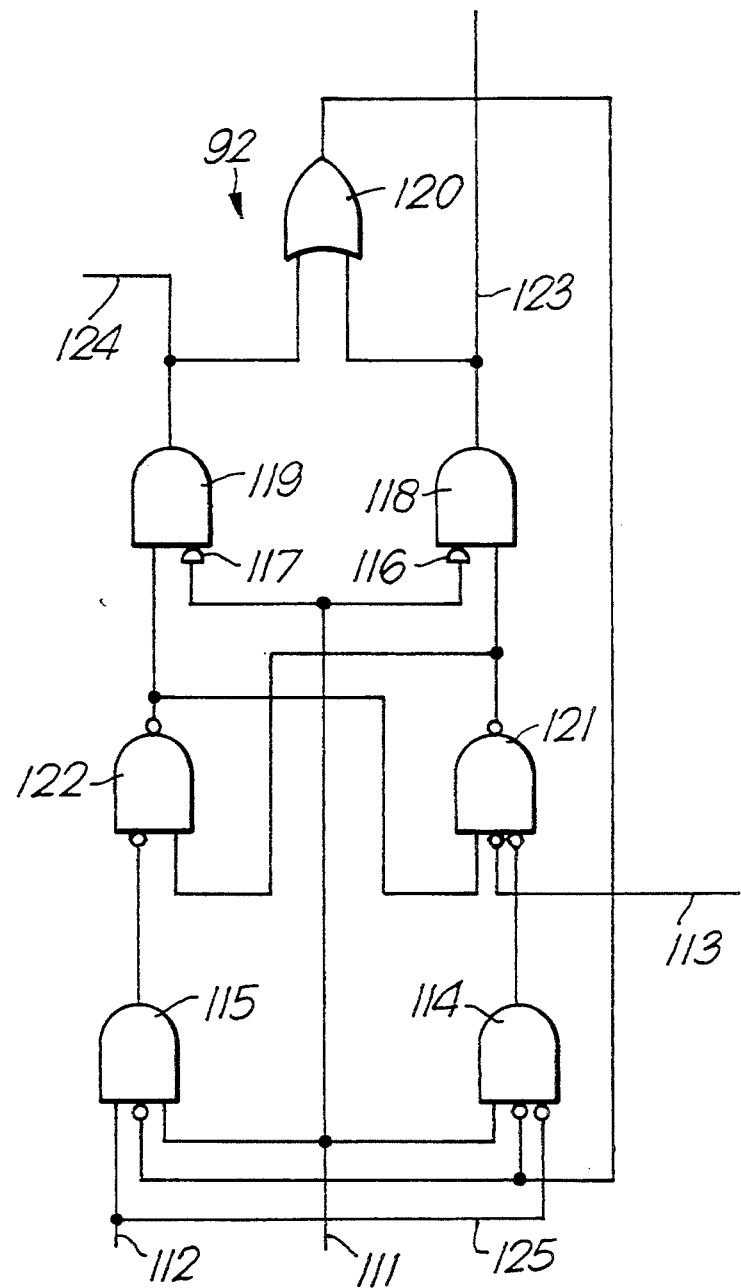
FIG. 8 is a circuit diagram of part of a node of FIG. 5.

FIG. 8 shows the detail of the upwards/crossover latching circuit 92. The circuit 92 receives the output from the OR gate 75 at an input connection 111, the output from the OR gate 87 at an input connection 112, and the output from the OR gate 91 at an input connection 113. The signal at 111 is applied directly to two input AND gates 114 and 115, and through delay elements 116 and 117 to two output AND gates 118 and 119. The outputs from the gates 118 and 119 are coupled through an OR gate 120 to inverted inputs of the input gates 114 and 115 so that the presence of a high output signal at either output gate 118 or 119 inhibits both input gates 114 and 115, thereby rendering the circuit 92 unable to respond to signal changes at the input connection 112.

The input connection 113 is connected to one inverted input of one NAND gate 121 of a latch, the other NAND gate 122 of which has only two inputs. When the signal on the input connection 113 is low, the latch NAND gates 121 and 122 operate between the input gates 114 and 115 and the output gates 118 and 119 in the same manner that the latch gates 106 and 107 operate in the context of the circuit 74.

In the present example of operation in which one of the left and right cells is in the calling state and the other is not attempting to seize the node, the signals at the input connections 112 and 113 are both low, so that, in response to a high signal appearing at the input connection 111 and assuming that both output AND gates 118 and 119 were before that time producing low output signals, the input AND gate 114 produces a high output signal, and the gate 115 produces a low output signal. The output signals from the NAND gates 121 and 122 are therefore respectively high and low, and the output AND gate 118 produces a high output signal on a connection 123 after the delay introduced by the delay element 116, and the OR gate 120 supplies an inhibiting signal to the input gates 114 and 115. The circuit 92 will become responsive again if the signal at 111 goes low for longer than the relaxation time of the elements 116 and 117.

This inhibition of the input AND gates 114 and 115 is needed since high signals are subsequently to be transmitted through the gates 87 and 88 (FIG. 6) to the outgoing address/data line 64 from, in this example of operation, the left hand outgoing address/data line 64L.

The connection 123 supplies the output signal of the gate 118 to the AND gate 84 that feeds the outgoing acquire signal line 63, as indicated in FIG. 6, from which it will also be seen that this signal determines whether the gate 88 and switch 93 are enabled, and whether the monostable 94 is triggered. The monostable 94 is of the type that is triggered by a rising edge, so that an acknowledge pulse is generated whenever the signal on the connection 123 goes from low to high.

The gate 119, in the present example of operation, applies a low signal to a connection 124.

If the calling cell, in this example the left cell, applies a high address/data signal with a high acquire signal to the OR gate 71 (FIG. 6), the circuitry as described so far operates as described except in the following respects.

Since the gate 73 is open, a high signal from the address/data signal line 64L reaches the OR gate 87 which therefore applies high signals to the gate 88 and the input connection 112 of the circuit 92. The signal at 112 is supplied by a connection 125 to an inverted input of the gate 114, so that the high signal closes the gate 114 and opens the gate 115. Thus the NAND GATE 122 receives a high input signal at its inverting input, and the gate 121 has a low input signal at both of its inverting inputs. Consequently the output AND gate 119 produces a high output signal on the connection 124, and the AND gate 118 produces a low output signal on the connection 123. As a result, the signal on the outgoing acquire line 63 from gate 84 is low, the gate 88 and switch 93 remain disabled, and the monostable 94 is not triggered. It will be seen from FIG. 6 that the high output from the AND gate 73 also appears on a connection 126.

Figure 9:
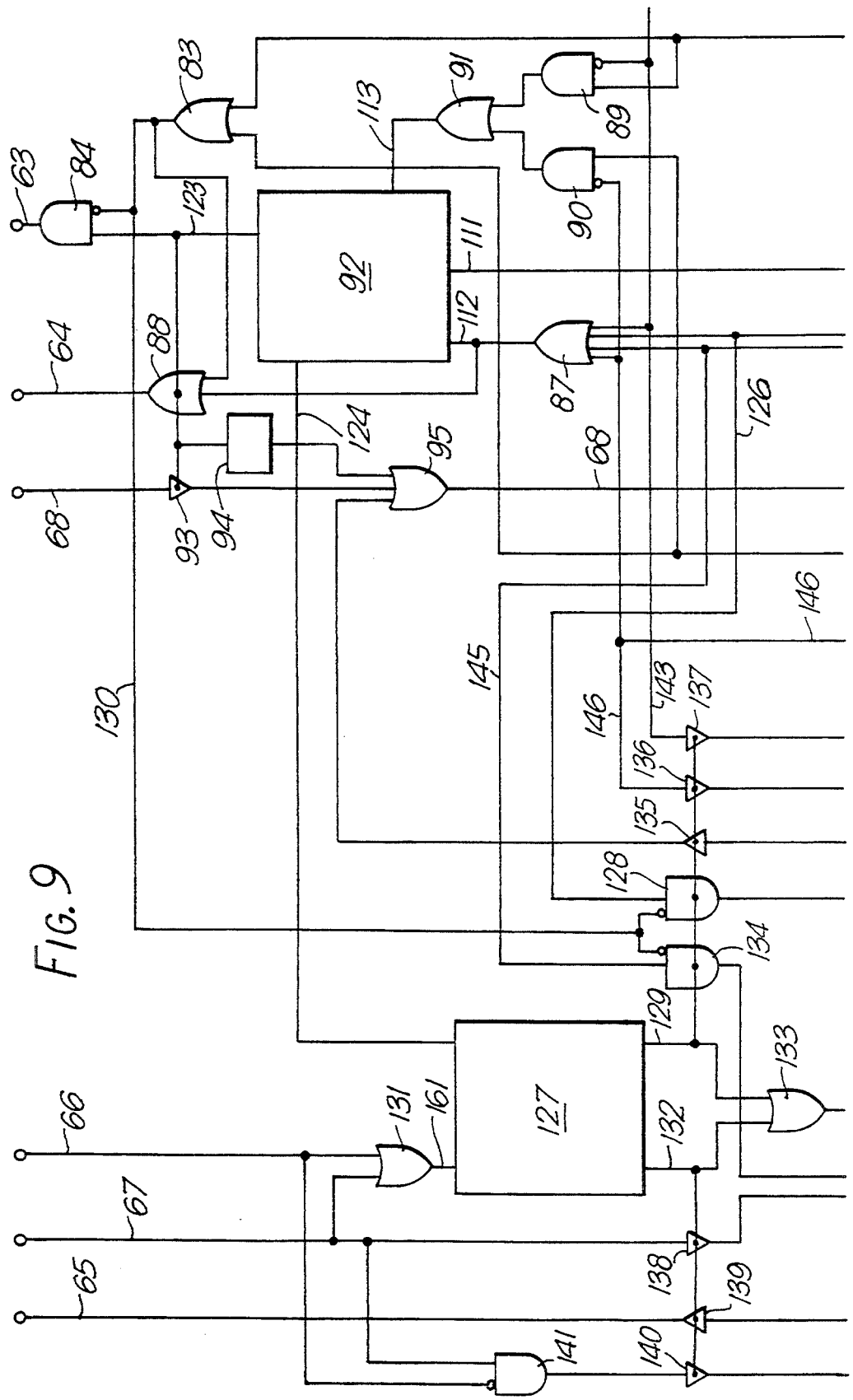
FIG. 9 is a circuit diagram of part of a node of FIG. 5.

FIG. 9 shows in more detail the selector 58 and the arbiter 60 of FIG. 5.

From FIG. 9 it will be seen that the connection 124 from the latching circuit 92 supplies an input to a downward/crossover latching circuit 127, and the connection 126, from the AND gate 73 of FIG. 6, supplies one input of an AND gate 128 having an enable input controlled by one output connection 129 from the latching circuit 127. The AND gate 128 also has an inverted input supplied by a connection 130 from the OR gate 83. The output signal from the OR gate 83 is low whenever the node is seized by a high acquire signal on either line 63L or 63R, as can be seen from the operation of the gates 72 and 79 (FIG. 6).

The latching circuit 127 also receives input signals from the incoming acquire signal line 66 and the incoming address/data signal line 67 of the channel 56 through an OR gate 131. The circuit 127 is identical to the latching circuit 74 of FIG. 7, as can be seen from FIG. 10 which shows the circuit 127 in detail. Starting from a condition in which the signal on the connection 124 and the output signal from the OR gate 131 are both low, if the signal on the connection 124 goes high first, a high output signal is produced at the output connection 129 of the circuit 127, and a low output signal at its other output connection 132. These two output signals are ORed by an OR gate 133 which in this operation produces a high output signal. The high signal at 129 enables the AND gate 128, another AND gate 134, and three line switches 135, 136, and 137. The low signal at 132 holds three further line switches 138, 139, and 140 closed. Disabling of the switch 138 blocks any incoming high signals on the incoming address/data line 67. Disabling of the switch 140 ensures that any high output signals from an AND gate 141 supplied by the line 67 and, through an inverting input, any low signals on the incoming acquire line 66, are blocked.

FIG. 11 shows the arbiter 60 and the selector 61 of FIG. 5 in detail.

Address/data signals on the connection 126 from the gate 73 (FIG. 6) pass, in the present mode of operation, through the gate 128 to an OR gate 142. This OR gate 142 also has an input from the line switch 137, which is supplied through a connection 143 from the AND gate 85 (FIG. 6), which in this case is low as a result of the low signal from the gate 72, and an input from an OR gate 144. The gate 144 has an input from the line switch 138 which, in this case, is disabled and therefore supplies a low signal, and inputs from the AND gate 134 and the line switch 136. The gate 134 is open because there is a low signal on the connection 130. The other input to the gate 134 is supplied on a connection 145 from the gate 80 (FIG. 6) which in the present case is supplying a low output signal, so that the gate 134 supplies a low signal to the OR gate 143. The switch 136, which is in this case enabled, supplies, from a connection 146, the output signal from the AND gate 86 (FIG. 6) which in this case is low because the line switch 82 is disabled. Consequently the address/data signals on the connection 126 are able to pass through the gate 142 to a line switch 147 controlled by a downward left/right latching circuit 148.

The line switch 140, being disabled, supplies a low signal to two NAND gates 149L and 149R which as a result enable both sides of the latching circuit 148. Both sides of the latching circuit 148 receive input signals from the OR gate 144, at input connections 150 and 151, which in this case are both low. The circuit 148 is thereby conditioned to couple the high input signal it receives from the OR gate 133 to a right hand output connection 152, and to set its left hand output connection 153 low. The signals on the connections 152 and 153 are supplied as inputs to respective right and left AND gates 154 and 155 with inverted control inputs from an OR gate 156. In the present case, the OR gate 156 receives low inputs from the line switches 140, 136, and 137 so that the AND gates 154 and 155 are open to allow a high signal to appear on the right hand incoming acquire signal line 66R to the right cell, and a low signal to appear on the left hand incoming acquire signal line 66L to the left cell. Also, since the right side of the circuit 148 is enabled, the line switch 147 is enabled by a signal on a connection 157 from the circuit 148 so that the address/data signals on the connection 126 appear on a right hand incoming address/data signal line 67R to the right cell.

If the circuit 127 had been seized by a signal crossing over from the right cell, the right cell being in the calling state and the left cell in the waiting state, a high signal would have been applied to the connection 145, resulting in the left hand side of the circuit 148 being enabled and the right hand side disabled. The line switch 147 would then be disabled and a line switch 158 enabled. A high signal would appear on the left hand incoming acquire signal line 66L to the left cell, and a low signal on the line 66R. Address/data signals would be transmitted to the left cell on the line 67L.

Acknowledge signals are applied by the left and right cells on outgoing acknowledge signal lines 65L and 65R respectively that are coupled through an OR gate 159 to the line switches 139 and 135. The circuit 148 has means for generating an acknowledge pulse that is supplied through a connection 160 to the gate 159.

It will be seen from FIG. 4 that if the node is a higher node, and therefore has its lower path segments connected to two lower nodes rather than to two cells, free signals may be present on either or both of the free signal lines 62L and 62R when an acquire signal from a calling cell seizes the latching circuit 74. However since the outputs from the gates 85 and 86 are then both low, the free signals have no effect on the latching circuit 92 and no effect on the gate 88. Furthermore, if the acquire signal crosses over and seizes the latching circuit 127, the signals on the connections 143 and 146 are both low for the same reason, and the signals applied by the line switch 140 to the gates 149L and 149R are both low so that these two gates enable both sides of the latching circuit 148 whether or not there are free signals present at lines 62L and 62R. Thus the passage of an ascending acquire signal that seizes the node is unaffected by the presence or absence of free signals at the node.

Figure 10:
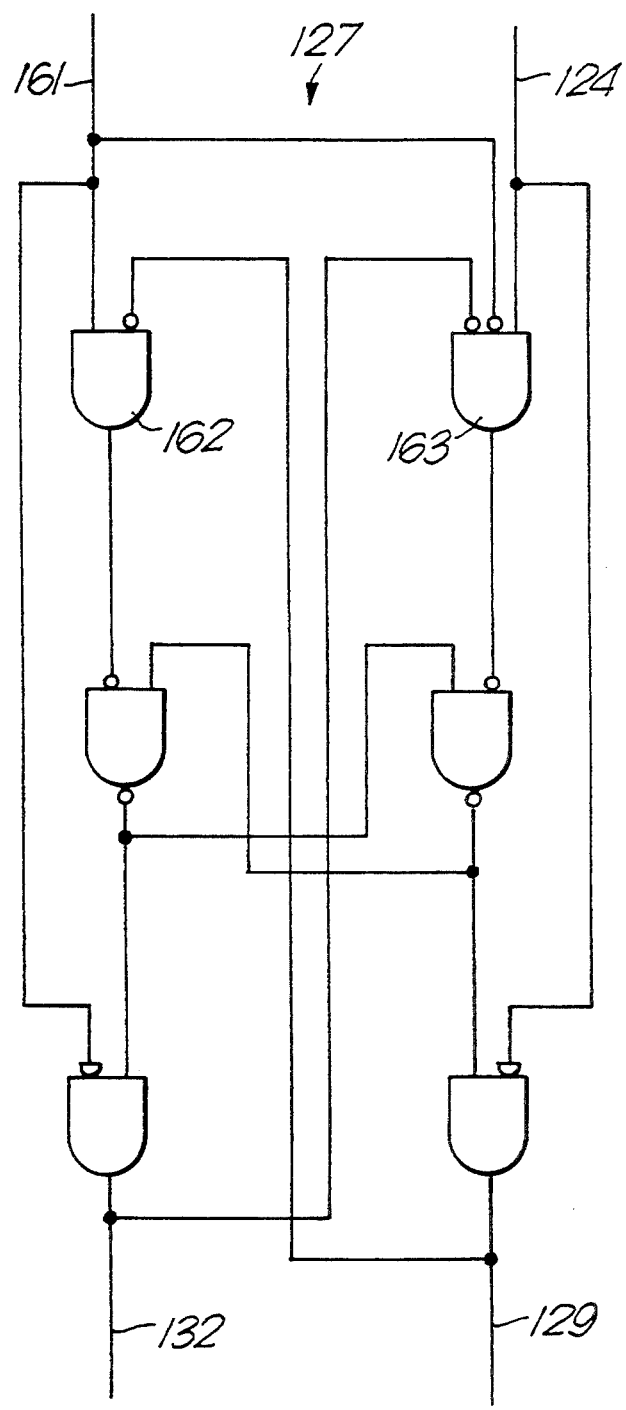
FIG. 10 is a circuit diagram of part of a node of FIG. 5.

A high signal that crosses over from the latching circuit 92 on the connection 124 to the latching circuit 127 is in competition with high signals output by the OR gate 131. FIG. 10 shows that the output from the OR gate 131 is supplied to an input connection 161 of the circuit 127 that supplies an input directly to one input AND gate 162 and through an inverter to an input of the other input AND gate 163. Consequently if high signals appear simultaneously at the input connections 124 and 161, the circuit 127 is seized by the high signal from the OR gate 131.

When an acquire signal on the incoming line 66 seizes the latching circuit 127, a high signal appears at the output connection 132 and a low signal appears at the output connection 129. As a result, the gates 134, 128, and switches 135, 136 and 137 are disabled, and the switches 138, 139 and 140 are enabled. The high signal at line 66 establishes a low output from the AND gate 141 and hence from the gate 140. The NAND gates 149L and 149R therefore enable both sides of the latching circuit 148, so that the circuit 148 is unaffected by the presence or absence of free signals on the lines 62L and 62R. The high output signal from the OR gate 133 is transmitted to either the connection 152 or to the connection 153 in dependence upon the state of the signal on the address/data line 67 passed through the OR gate 144 to the connections 150 and 151. This signal is then passed either to the right address/data line 67R or to the left address/data line 67L depending on which of the two line switches 147 and 158 is enabled. The OR gate 156 receives only low inputs, so that the AND gates 154 and 155 are enabled.

FIG. 12 shows the latching circuit 148 in detail.

In the circuit 148, the output from the OR gate 133 is supplied through a connection 170 directly to two input AND gates 171 and 172, and through delay elements 173 and 174 to output AND gates 175 and 176. The outputs of the AND gates 175 and 176 are supplied respectively through connections 152 and 153 to the gates 154 and 155, to an OR gate 177, and through connections 157 and 178 to the enable inputs of the line switches 147 and 158. The output from the gate 177 is supplied to inverting inputs of the input AND gates 171 and 172 and to the triggering input of a monostable 179, the output of which is applied to the connection 160.

The output of the OR gate 156 is applied through a connection 180 to an inverter at an enable input to the monostable 179, so that the monostable 179 is enabled unless the gate 156 outputs a high signal.

The outputs from the NAND gates 149L and 149R are supplied respectively through connections 181 and 182 to two AND gates 183 and 184 that respectively control the steering inputs to the output AND gates 175 and 176 through connections 185 and 186.

The AND gates 183 and 184 are incorporated in a NAND gate latch with NAND gates 187 and 188 supplied respectively with the outputs from the input AND gates 171 and 172, so that the output of the AND gate 183 is supplied directly to the one input of the NAND gate 188, and the output of the AND gate 184 is supplied directly to one input of the NAND gate 187. When high signals are present on both connections 181 and 182 from the NAND gates 149L and 149R, the latch 183, 184, 187, 188 operates as though the AND gates 183, 184 were transparent. If a high signal is present on only one of the connections 181 and 182, only the corresponding AND gate 183 or 184 may supply a high signal to its output AND gate 175 or 176.

It will be seen from FIGS. 11 and 12 that if the output on connections 150 and 151 from the OR gate 144 is high, a high signal is applied to the gate 171 and low signal to the gate 172, so that if there is a high signal on the connection 170, and the gates 183 and 184 are transparent, the gate 175 will supply a high signal to the gate 155, and the gate 176 will supply a low signal to, the gate 154. Similarly, a low signal from the OR gate 144 when there is a high signal at 170 and the gates 183 and 184 are transparent will produce a high signal from the gate 176 and a low signal from the gate 175. Thus the state of the signal on the address/data signal line 67 can steer the route through the node to the left lower path segment or to the right lower path segment, the left segment being selected by a high address/data signal and the right segment being selected by a low address/data signal. This arrangement makes it possible to use the address of a cell, or part of its address, as the control data that selects the downwards part of the incoming route to the cell.

The appearance of a high signal at the output of the OR gate 177 when there is a low signal on the connection 180 triggers the monostable 179, which is triggered by a rising edge, thereby generating an acknowledge pulse that is transmitted through the connection 160 and the OR gate 159. The reception of an acknowledge pulse by the calling cell from the line 65 causes the cell to apply the next steering bit to the address/data line 67.

When an acquire signal crosses over from the left lower segment to the right lower segment, the address/data signal crosses over on the connection 126 and does not affect the circuit 148, which is steered by the low signals from the switch 136, gate 134, and switch 138. However, when an acquire signal crosses over from the right lower segment to the left lower segment the address/data signal crosses over on the connection 145 and therefore is supplied through the OR gate 144 to the input connections 150 and 151 of the circuit 148. The address/data signal is set high to cause the latching circuit 92 to select the crossover connection 124, and to ensure that the latching circuit 148 is steered to produce a high output at the left output connection 153 and a low output at the right output connection 152. Left to right crossover is not distinguished from right to left crossover by the calling cell, which sets its address/data line 64 high for any crossover in order to provide a high signal at the input connection 112 of the upwards/crossover latching circuit 92.

A cell in the searching state produces a high address/data signal and a low acquire signal on its outgoing lines 64 and 63. The response of a node will now be described, starting with FIG. 6, to an outgoing search reaching the node from the lower left segment. For simplicity it is first assumed that the signals on the lines 63R and 64R are both low, and that there are no free signals at the node, i.e. the signals on lines 62L and 62R are both low.

The OR gate 71 produces a high output that seizes the latching circuit 74 and results in the gate 73, and switches 76 and 77 being enabled, the gate 80, and switches 81 and 82 remaining disabled, and a high output from the OR gate 75. The AND gate 72 also produces a high output because the lines 63L and 64L are respectively low and high, so that a high signal passes to the OR gate 83, and the AND gate 84 provides, as a result, a low signal on the acquire line 63. The AND gate 85 produces a low output signal because there is no free signal at 44R. Therefore the AND gate 89 supplies a high signal through the OR gate 91 to the inverting input of the NAND gate 121 of the latching circuit 92 (FIG. 8). This ensures that the AND gate 118 supplies a high signal on the connection 123, and that the AND gate 119 supplies a low signal on the crossover connection 124. The high output from the AND gate 72 is also applied to an inverting input of the AND gate 73 which therefore produces a low output signal. The low signal from the AND gate 73 passes through the OR gate 87 to the connection 112 where it is applied to the input AND gate 115 of the circuit 92, and to the OR gate 88 which receives a high input from the OR gate 83. Hence a high signal is supplied to the outgoing address/data line 64. The signals supplied to the gates 134, 128, and switches 135, 136 and 137 on the crossover connections 145, 126, 146 and 143 are all low so that the activity of the circuitry of FIG. 6 does not affect the circuitry of FIG. 11. The signal supplied to the gates 134 and 128 on the crossover connection 130 is high.

Since the circuitry of FIG. 6 is symmetrical for a combination of a high address/data signal on line 64R and a low acquire signal on line 63R in the absence of free signals, such a combination is passed in the same way to the outgoing line 64 and 63 of the upper path segment.

Competition between combinations of high address/data signals and low acquire signals arriving simultaneously at the lines 64L, 63L, 64R, and 63R is resolved by the latching circuit 74 as described for high acquire signals, since the OR gates 71 and 78 mask the difference between high acquire and high address/data signals.

If when a combination of a high address/data signal on line 64L and a low acquire signal on line 63L seizes the latching circuit 74 there is a free signal present on the line 62R, a high signal is supplied to the AND gate 85 through the connection 44R, and a high signal is therefore applied by the gate 85 to the inverted input of the AND gate 89, which therefore outputs a low signal. The line switch 82 is disabled, so that the AND gate 90 outputs a low signal. The signal on the connection 113 from the OR gate 91 is therefore low and the NAND gate 121 is enabled to respond to inputs from the AND gate 114 and the NAND gate 122. The high output from the gate 85 is also supplied through the connection 143 to the OR gate 87 which therefore enables the AND gate 115 and disables the AND gate 114. Consequently the latch 121, 122 supplies a high signal to the gate 119 and a low signal to the gate 118, thereby transmitting the high signal on the connection 111 to the crossover connection 124, and establishing a low signal on the connection 123. Thus the outgoing lines 63 and 64 are set low, the monostable 94 is not triggered, and a high signal is supplied to the gate 163 of the circuit 127 (FIG. 10).

If the high signal at 124 seizes the circuit 127, a high signal appears at the connection 129 and a low signal at the connection 132, and the circuit 148 receives a high input on the connection 170. The high signal on the connection 143 from gate 85 passes through the line switch 137 to the OR gate 142. The signals to the OR gate 144 from switch 138, gate 134, and switch 136 are low, and the signals to the NAND gates 149L and 149R are low, so that the circuit 148 selects the connections 152 and 157 to be high, and connections 153 and 178 to be low. The high signal from connection 143 also passes through the OR gate 156 and therefore disables the monostable 179 and the AND gates 154 and 155. Hence a high signal appears on the address/data line 67R, and low signals remain on the acquire line 66R, and the address/data line 67L and the acquire line 66L.

It will be appreciated from the foregoing description that the presence of the free signal on the line 62R has resulted in the combination of the high address/data signal on line 64L and the low acquire signal on line 63L producing a high signal on the connection 143 that ensures that the same combination crosses over to proceed down the right hand path segment. Similarly, a free signal on line 62L can intercept and cause crossing over of a high address/data signal, low acquire signal combination on the lines 64R and 63R that seizes the latching circuit 74.

For the communication state, the address/data lines must be able to transmit both high and low signals. Therefore after a route has been established between a searching cell and a free cell, the acquire signal from the searching cell is set high while the address/data signal is still high, and the nodes along the route maintain the route and allow data to be transmitted as the address/data signal. The OR gates 71, 78 (FIG. 6), and 131 (FIG. 11) ensure that the change from high address/data to high acquire has no effect on the routes established. The AND gates 72 and 79 respectively supply low output signals as soon as the corresponding acquire signal, on line 63L and 63R, goes high, so that data can be transmitted through the AND gate 73 or 80, and, if there has been crossover, through AND gate 128 or 134. The high output from the OR gate 120 isolates the latch 121, 122 from data on the connection 112. Similarly, the latch 183, 184, 187, 188 of circuit 148 (FIG. 12) is isolated from data on the connections 150 and 151 by the OR gate 177.

When a high address/data signal and a low acquire signal on the incoming lines 67 and 66 from the upper path segment seize the latching circuit 127, a high signal is supplied from the AND gate 141 (FIG. 11) through the line switch 140 to the NAND gates 149L and 149R, which are thereby enabled to respond to the presence or absence of free signals on the lines 62L and 62R. The high address/data signal on line 67 passes through the line switch 138 and the OR gate 144 to the connections 150 and 151. If there are no free signals present, the NAND gates 149L and 149R apply low signals to the AND gates 183 and 184 (FIG. 12), thereby preventing the high signal on connections 150 and 151 from seizing the circuit 148. Thus high signals produced on the connections 181 and 182 in the absence of free signals at the node are changed by the occurrence of the high address/data signal and low acquire signal at the lines 67 and 66 to low signals, and the combination of signals from the searching cell is unable to pass further down the tree. If there are free signals present on both lines 62L and 62R, the NAND gates 149L and 149R supply high signals to the AND gates 183 and 182 so that the high signal on the connections 151 and 150 selects the output gate 175 to produce a high output, and the output gate 176 produces a low output. Thus if free cells are present below both the left and right lower path segments, the circuit 148 selects the left segment.

If a free signal is present at only the line 62R, the NAND gate 149R supplies a high signal to enable the AND gate 184, and the NAND gate 149L supplies a low signal that closes the AND gate 183, thereby forcing a low signal to be applied to the latch NAND gate 88 from the connection 185. A high signal is therefore produced by the AND gate 176, and a low signal by the AND gate 175. The high address/data signal on line 67 accordingly passes through to the line 67R. The high signal from the AND gate 141 ensures that the gates 154 and 155 produce low output signals on the acquire lines 66R and 66L. If a free signal is present at only the line 62L, the operation of the circuit 148 is such that the high address/data signal on line 67 passes through to the line 67L. Thus a free signal guides the high address/data, low acquire combination down towards the origin of the free signal.

When a route from a searching cell to a free cell has been established by a high address/data signal with a low acquire signal, the acquire signal is set high. This results in both NAND gates 149L and 149R supplying high signals to the circuit 148. However, as the latch 183, 184, 187, 188 has already been isolated by the output from the OR gate 177, no further change in its state takes place, and the states of the output signals on the connections 157 and 178 remain as set by the high address/data, low acquire combination interacting with the one or more free signals from lines 62L and 62R.

Competition between a high address/data, low acquire combination, and a high acquire can occur at the latching circuit 74, and, in effect, at the latching circuit 127. The mode of operation of the node circuitry depends on whether the circuit 74 is seized by the high address/data, low acquire combination or by the high acquire, and whether the circuit 127 is seized by the combination or the high acquire.

Since the gates 134, 128, and switches 135, 136, and 137 are disabled when an incoming signal at the OR gate 131 seizes the circuit 127, two routes through the node can coexist, namely, a route through the circuits 74 and 92 from either lower path segment to the upper path segment, and a route through the circuits 127 and 148 from the upper path segment to either lower path segment. However, when a crossover route is established, only that one route can exist through the node, since the circuits 74 and 127 block other routes.

From the foregoing description of the operation of the node, it will be appreciated that a calling signal consisting of a high acquire signal and a low address/data signal transmitted into the network by a cell 11 will automatically pass upwards in the binary tree into which it has been emitted, i.e. will pass from a lower path segment to the upper path segment at each node, until the address/data signal is set high to establish a crossover in a chosen node. As a result of the binary tree structure, the route being formed by a calling signal ascending from the calling cell automatically corresponds to the sequence of path segments between the root node of the binary tree and the cell that defines the address of the cell, but taken in reverse order. Hence in forming a route to another cell, the calling cell need only count the nodes, by counting acknowledge pulses, on the ascending part of the route. Steering by the address/data signal is required only on the descending part of the route. Formation of a route by a calling signal may be referred to as formation by normal acquire.

A search signal ascends by the same route from a cell as does a calling signal. Acknowledge pulses are counted on the ascending part of the route so that the cell has information that will enable the cell to compute how many of the least significant bits of its own address in the relevant binary tree will differ from the address of the found free cell in that tree.

If the node is the highest node, i.e. the root node, of a binary tree, then the lines 63, 64, 65, 66, 67, and 68 of FIG. 9 must be provided with suitable terminations if the node is not connected to a peripheral unit. In the absence of a peripheral unit, lines 66, 67, and 68 are connected to sources of a permanent low signal, and lines 63, 64, and 65 are coupled to ground through suitable resistive elements.

FIG. 13 illustrates the formation of a route from one processor cell, PC1, to another processor cell, PC2, through a binary tree of the network 14 when the processor cell PC1 is in the calling state and the other cell PC2 is in the waiting state, and it is assumed that the two cells are at the remote leaf positions of a subtree having eight leaf positions. Only the relevant five nodes are shown. Each node transmits one acknowledge pulse back to the calling cell PC1 as that node is seized by the high acquire signal. These pulses are short in comparison with a long acknowledge pulse that is transmitted back to the calling cell PC1 by the waiting cell PC2 when the latter receives the high acquire signal. Only part of that part of the address of the waiting cell PC2 (the destination address) which differs from the address of the calling cell PC1 is used to guide the high acquire signal. For example, if the last three significant bits of the address of PC1 are 011 and the last three significant bits of the address of PC2 are 110, then only 10 is used to guide the high acquire signal down from nodes 4 and 5, in succession, to the waiting cell PC2. The most significant of the three different bits 110 is not needed since the other downward segment is automatically selected at the topmost node of the route, i.e. node 3 in this example, where crossover takes place. The calling cell PC1 computes the point at which to set the address/data line high, in order to cause crossover in the node acquired, by counting off the acknowledge pulses received from those nodes, nodes 1 and 2, on the upward part of the route, against the number of bits in the different part of the address of the waiting cell PC2, minus one. The different part of the address of a waiting cell may be referred to hereinafter as the truncated destination address. The calling cell computes the truncated destination address by comparing the full address of the cell to be called, in the relevant binary tree, with the calling cells own address in the same binary tree, to find that part of the address of the cell to be called which differs from the calling cells own address. In the example of FIG. 13, each cell is assumed to have an address of seven bits, and a most significant bit, bit 1, is additionally provided to indicate that the other seven bits, bits 2 to 8, are address bits.

Figure 14A:
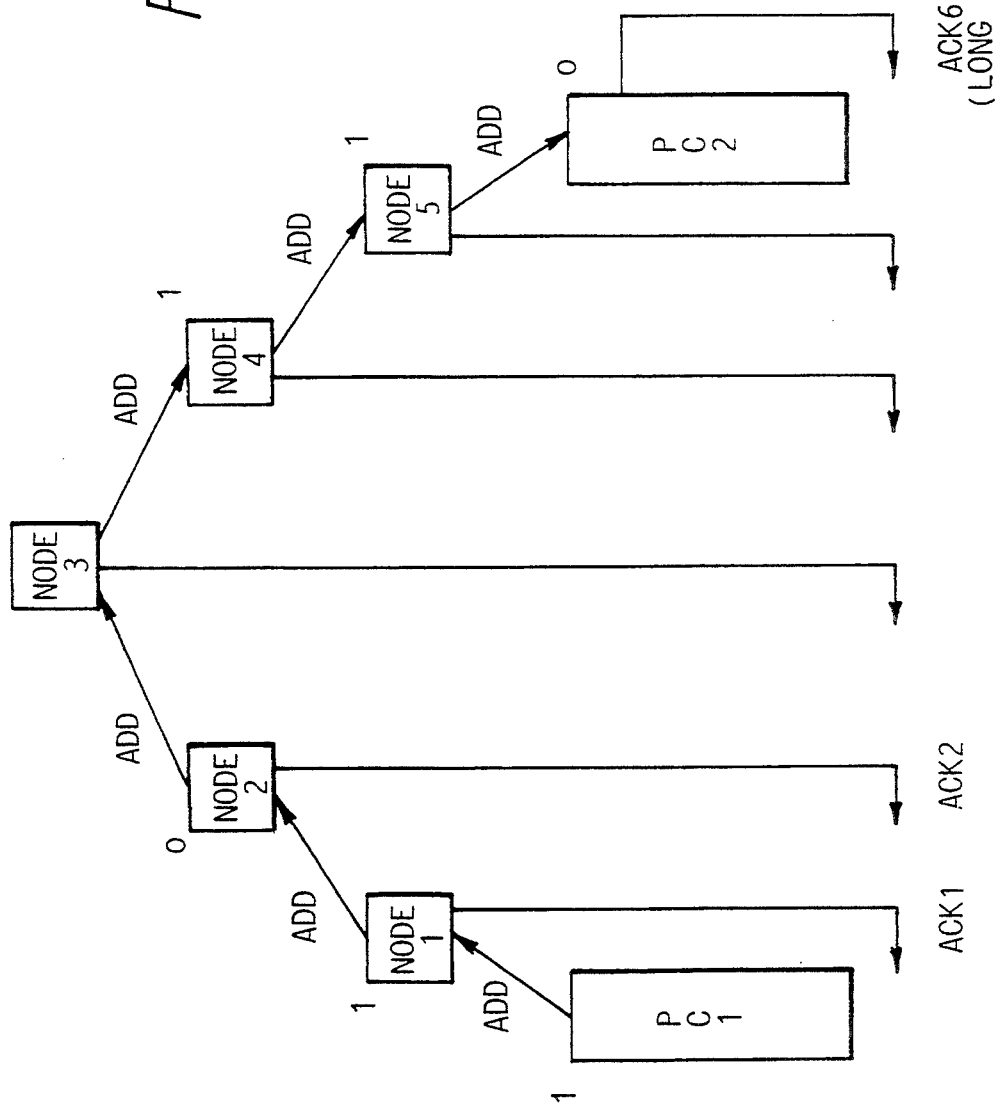
FIGS. 14A and B are diagrams illustrating the formation of a network route from a processor cell issuing a search signal that is intercepted by a free signal from a processor cell in the free state in the embodiment of FIG. 1.

FIG. 14A illustrates the formation of a route from a cell PC1 in the searching state to another cell PC2 in the free state. The sequence of events may be referred to as a free space (F.S.) search sequence. It is assumed in this example that the searching combination, high address/data, low acquire, from the searching cell PC1 is intercepted by a free signal from the free cell PC2 at the root node of an eight leaf subtree, so that the root node is the third node, node 3, reached in the route from the searching cell PC1. Only nodes 1 and 2 transmit acknowledge pulses back to the searching cell PC1. A high signal from the OR gate 156 (FIG. 11) inhibits the monostable 179 at nodes 3, 4, and 5, i.e. at the topmost node and all nodes on the downward part of the route. The free cell PC2 transmits a long acknowledge pulse back to the searching cell PC1 when the high address/data, low acquire combination is received at the cell PC2. The acknowledge pulses from the nodes, nodes 1 and 2, on the upward part of the route may be used by the searching cell PC1 to compute its own truncated address for transmission to the free cell PC2 and the cell PC2 may then compute and transmit its own suitably truncated address to the searching cell PC1, if required.

When a route is established between a calling cell and a waiting cell, data is passed from the calling cell to the other cell over the outgoing address/data line 64 from the calling cell. Data sent by the other cell, formerly the waiting cell, is transmitted over the outgoing acknowledge line 65 from that cell to the calling cell. It will be seen from the circuitry of the nodes that wherever gates or switches in the line carrying address/data signals are enabled, line switches for the acknowledge signals passing back to the calling cell are enabled, so that a transmission line for data from the waiting cell is established.

Similarly, when a route is established between a searching cell and a free cell, the outgoing address/data signal line from the searching cell becomes the line along which data is transmitted to the other cell, formerly the free cell, and the outgoing acknowledge signal line from the cell which was the free cell becomes the line along which data is transmitted back to the searching cell.

Figure 14B:
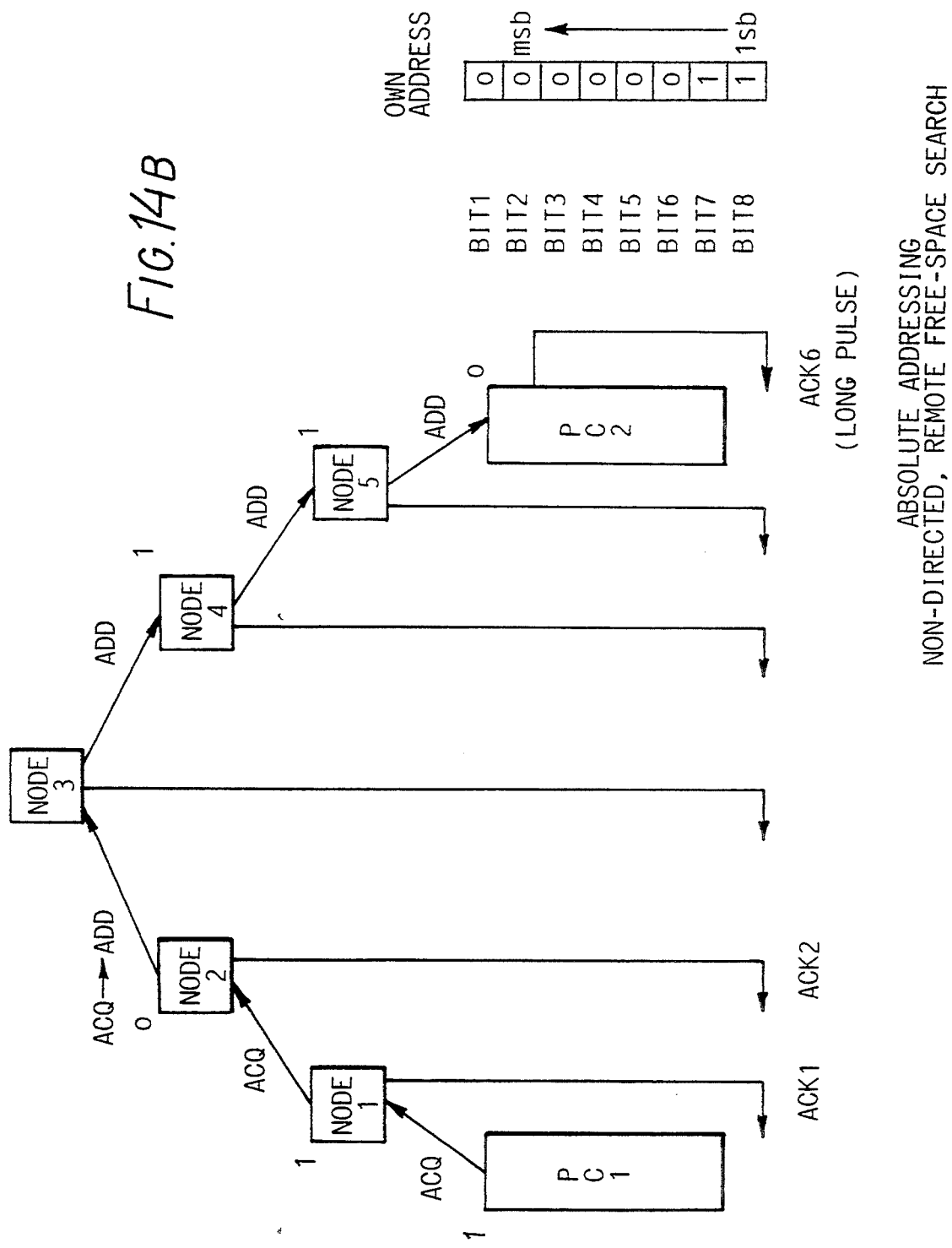

In the free space search of FIG. 14A, the searching signal is a high address/data signal accompanied by a low acquire signal and ascends from node to node up the binary tree illustrated until it meets a free signal at a node, which is node 3 in this example. Thus the searching signal begins the descending part of its route at the first and therefore nearest node conditioned by a free signal. Such a process can be referred to as a non-directed, local, free-space search. It may be desirable in some circumstances that the descending part of a free space search cannot begin until the searching signal has reached a minimum number of nodes' distance from the searching cell. Such a free space search may be referred to as a non-directed, remote free-space search, and one example is illustrated in FIG. 14B. The search signal in a non-directed remote free-space search is initially a high acquire signal accompanied by a low address/data signal and therefore ascends from the searching cell (PC1 in FIG. 14B) in the same way as a calling signal in normal acquire. The searching cell, PC1, counts the acknowledge pulses received from the nodes (nodes 1 and 2) on the ascending part of the route until the number of nodes is one less than the minimum distance node at which descent is required to begin. The searching cell thereupon switches over its searching signal to a high address/data signal accompanied by a low acquire signal which therefore proceeds, possibly through a plurality of higher nodes, until diverted by a free signal. In FIG. 14B, it is assumed that there is a free signal present at node 3, so that the descending part of the route begins immediately at the minimum distance node, which is node 3 in this case. The descending part of the route is completed in the same way as described hereinbefore for a non-directed local free-space search.

If, at a stage in a local or remote free space search when the searching signal in the form of a high address/data signal with a low acquire signal has reached a node at which cross-over occurs or has reached a node in a descending part of the route being formed, the source or sources of the free signal(s) at the node just reached by the searching signal become not free, so that the free signal(s) at the node are replaced by logic 0, then if that node is the cross-over node, the searching signal will be forced to ascend to at least the next higher node, and if the node is a node in a descending part of the route being formed, the searching signal will be forced to retreat to at least the next higher node in the route being formed. The mechanisms by which such dying back of the path of a search signal occurs can be understood from FIGS. 4 to 12 as described hereinbefore.

For the communication route forming procedures described with reference to FIGS. 13, 14, and 14A, the cells store their own addresses for route computing purposes as described. Such arrangements in which the cells store their own addresses are referred to herein as absolute addressing procedures.

FIG. 15 illustrates how the use of more than one binary tree to form the network 14 can allow not merely more possible routes between pairs of cells 11 to be provided, but also routes of different lengths, so that routes can be distributed more evenly throughout the network 14. In FIG. 15, parts 201, 202, 203, and 205 of three different binary trees are shown schematically with leaf positions attached to cells 11, only some of which are indicated. The parts 202 and 203 make up one complete binary tree by a "wrapping around" at 204. The part 201 is the whole of another tree in this simple example. The parts 205 are subtrees of another equal binary tree not shown in full. It will be seen that there is a wrap around for this third tree also. Examples of routes of different lengths between the same two cells 11 are shown at 206, 207, and 208 in heavy line. An area 209 is shown enlarged to illustrate details of connections to six cells 11 with the trees 201, 205, 202, and 203. The boundaries of the parts 202 and 203 are indicated at 210.

Figure 16:
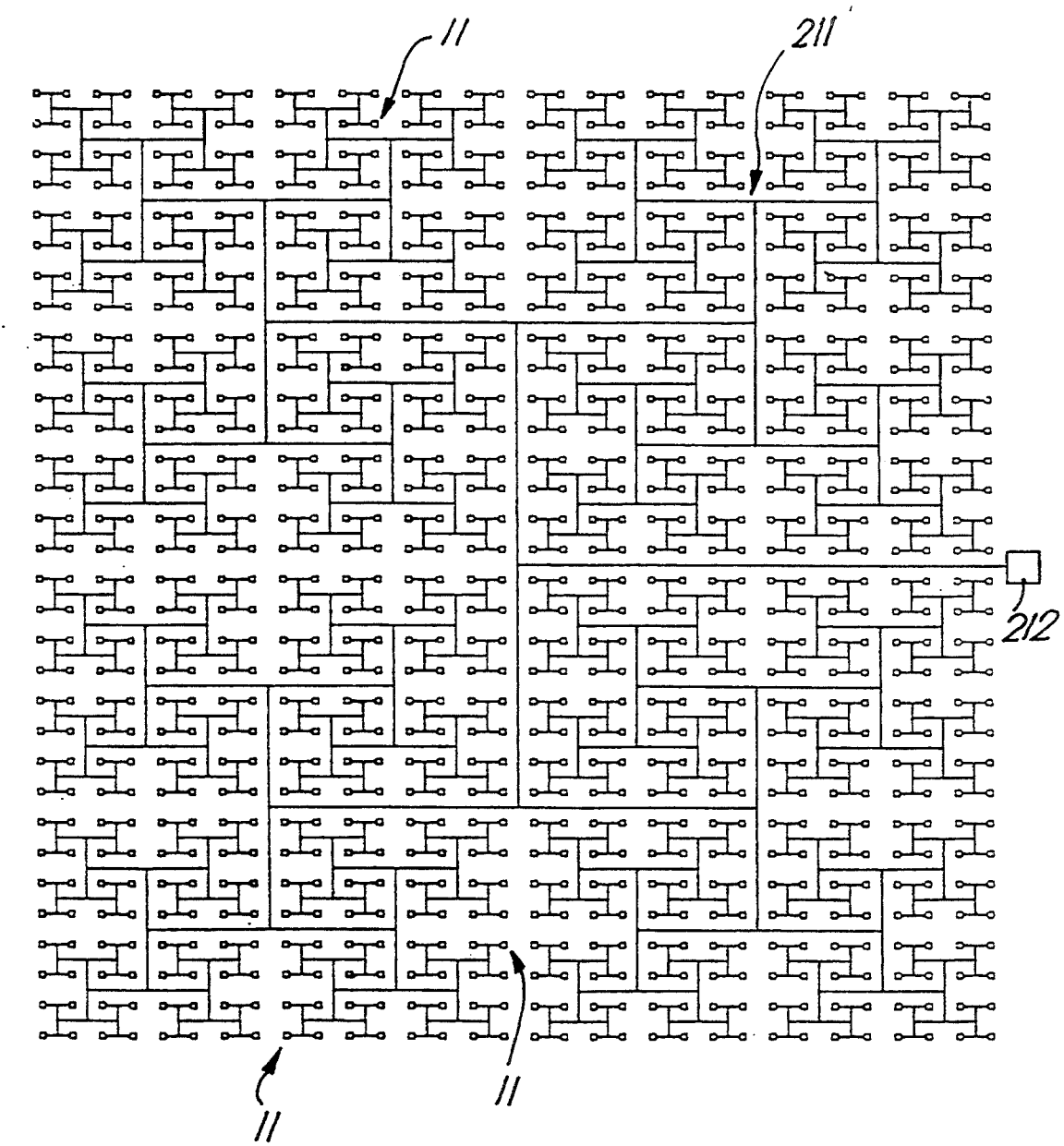
FIG. 16 is a schematic representation of a preferred planar array of processor cells interconnected by a binary tree in accordance with the invention.

FIG. 16 illustrates the preferred two dimensional arrangement of the cells 11, which are represented by small squares. This arrangement is based on a unit pattern of a square array of four cells 11, with grouping of the unit patterns into a square of four, and further arrangement of such groups into a square of four, and so on, so that each subpattern is a square arrangement of four smaller patterns, and all subpatterns are arranged into a larger pattern of four in a square. Only one binary tree is shown interconnecting the cells 11 in FIG. 16. The position of one node is indicated at 211. The root node is shown connected, in this example, to an input-/output unit 212 for accessing any cell 11.

Figure 17:
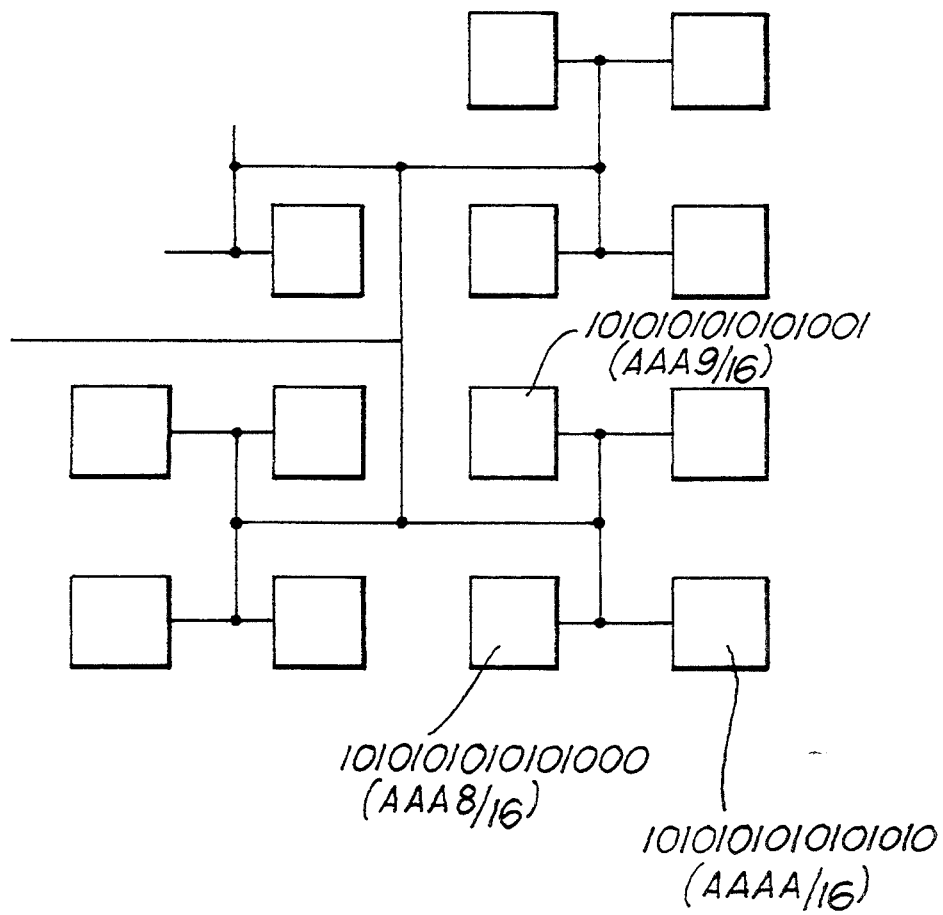
FIG. 17 is a schematic representation of part of the array of FIG. 16 on a larger scale.

FIG. 17 illustrates a small part of the arrangement of FIG. 16 to show how individual cells 11 may have addresses allocated.

Figure 18:
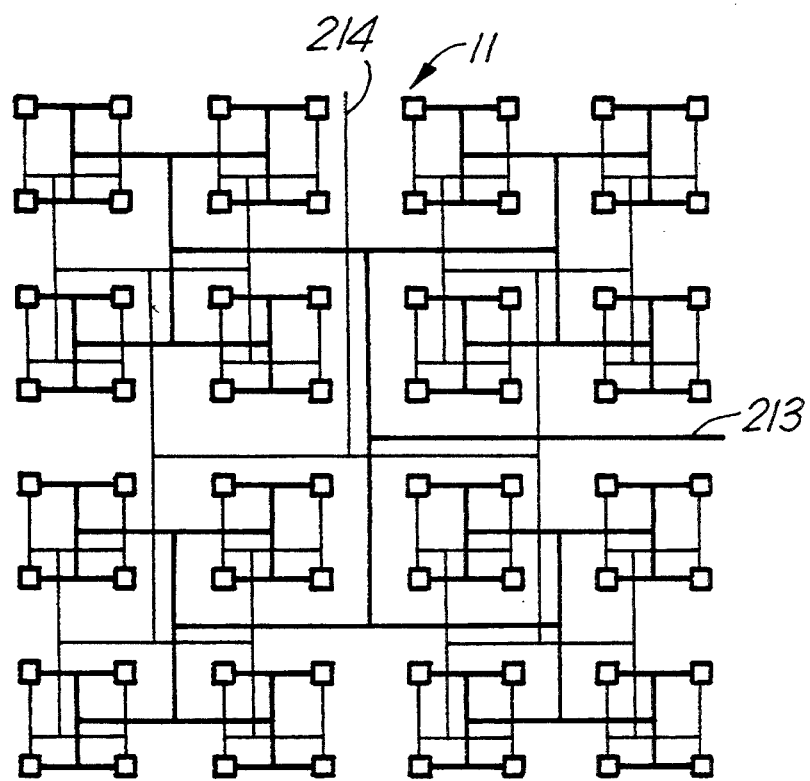
FIG. 18 is a schematic representation of a simple embodiment of the invention having the processor cells disposed in a preferred planar array arrangement and interconnected by two binary trees.
Figure 19:
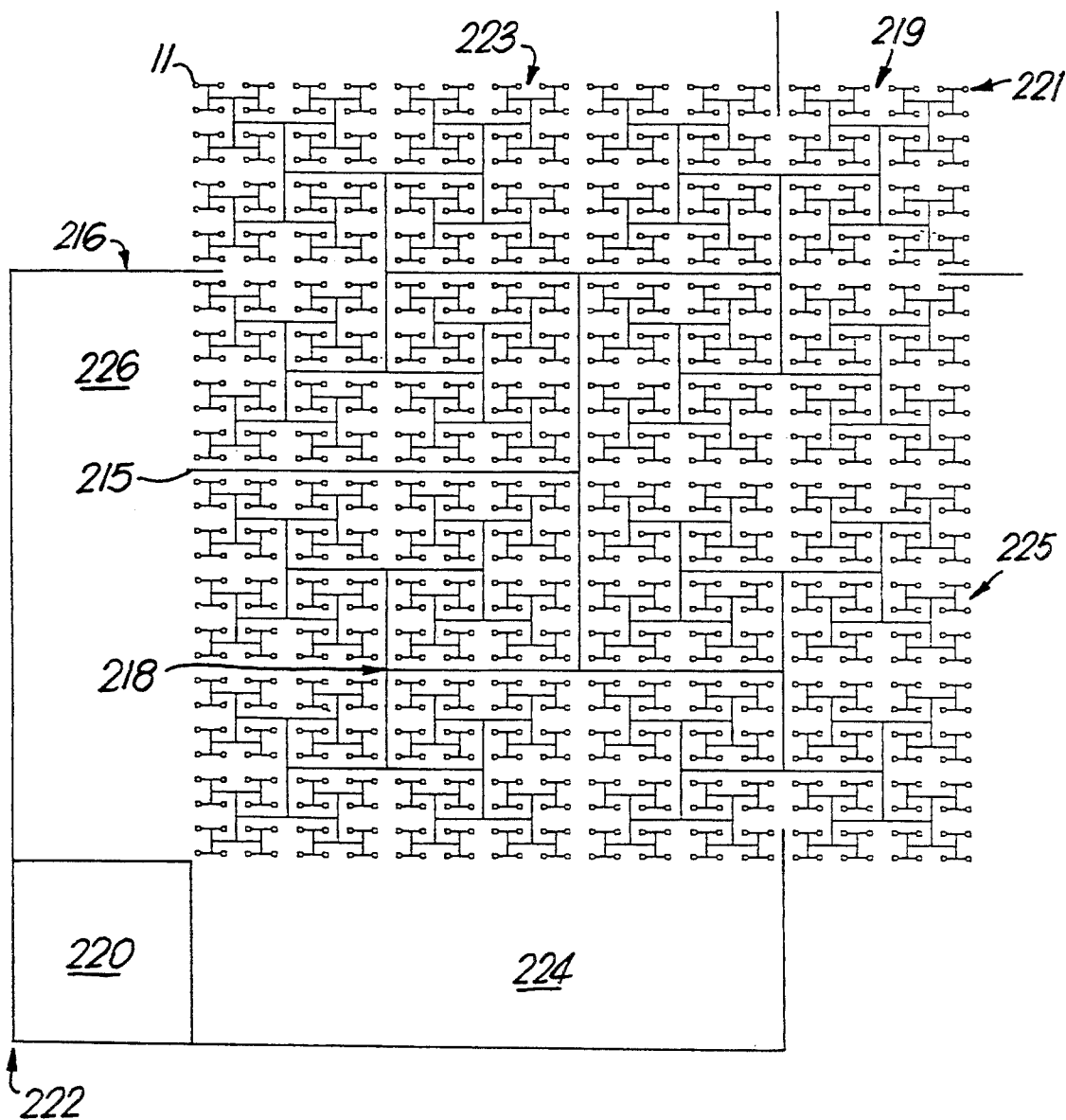
FIG. 19 is a diagram of a preferred planar array of processor cells illustrating a preferred scheme of interconnection of the cells by two binary trees.

FIG. 18 illustrates a much smaller number of cells 11 than FIG. 16 and one way in which they can be interconnected by two binary trees 213 and 214, shown in heavy and light lines respectively. However, it is preferred that the overlap between binary trees be as near to the ratio $\frac{1}{4}:\frac{3}{4}$ as possible, as in the case of the trees 201 and 202, 203 of FIG. 15. FIG. 19 illustrates the ratio $\frac{1}{4}:\frac{3}{4}$ achievable in two dimensions with two trees interconnecting a square array of (32×32)=1024 cells 11. One binary tree 215 is shown interconnecting the cells 11, with its root node at the centre of the square array of cells 11. A partial outline 216 of a square the same size as the cell array represents the notional position of a second binary tree, the root node of which would be at the position 218. Those cells 11 of the array which lie within the outline 216 are connected to the second binary tree as though the root node were at 218. The sixty-four cells in the top right hand sixteenth 219 of the array are connected to the second binary tree as though they occupied a mirror image, relative to the top left to bottom right diagonal of the array, displaced to the bottom left sixteenth 220 of the outline 216, with the cell at the positions 221 being connected as if it were at the corner position 222. Similarly, the eight by twenty four cells at 223 are connected as if reflected in the horizontal mid line of the array and displaced to the area 224, and the eight by twenty four cells at 225 are connected as if reflected and displaced to the area 226.

Figure 20:
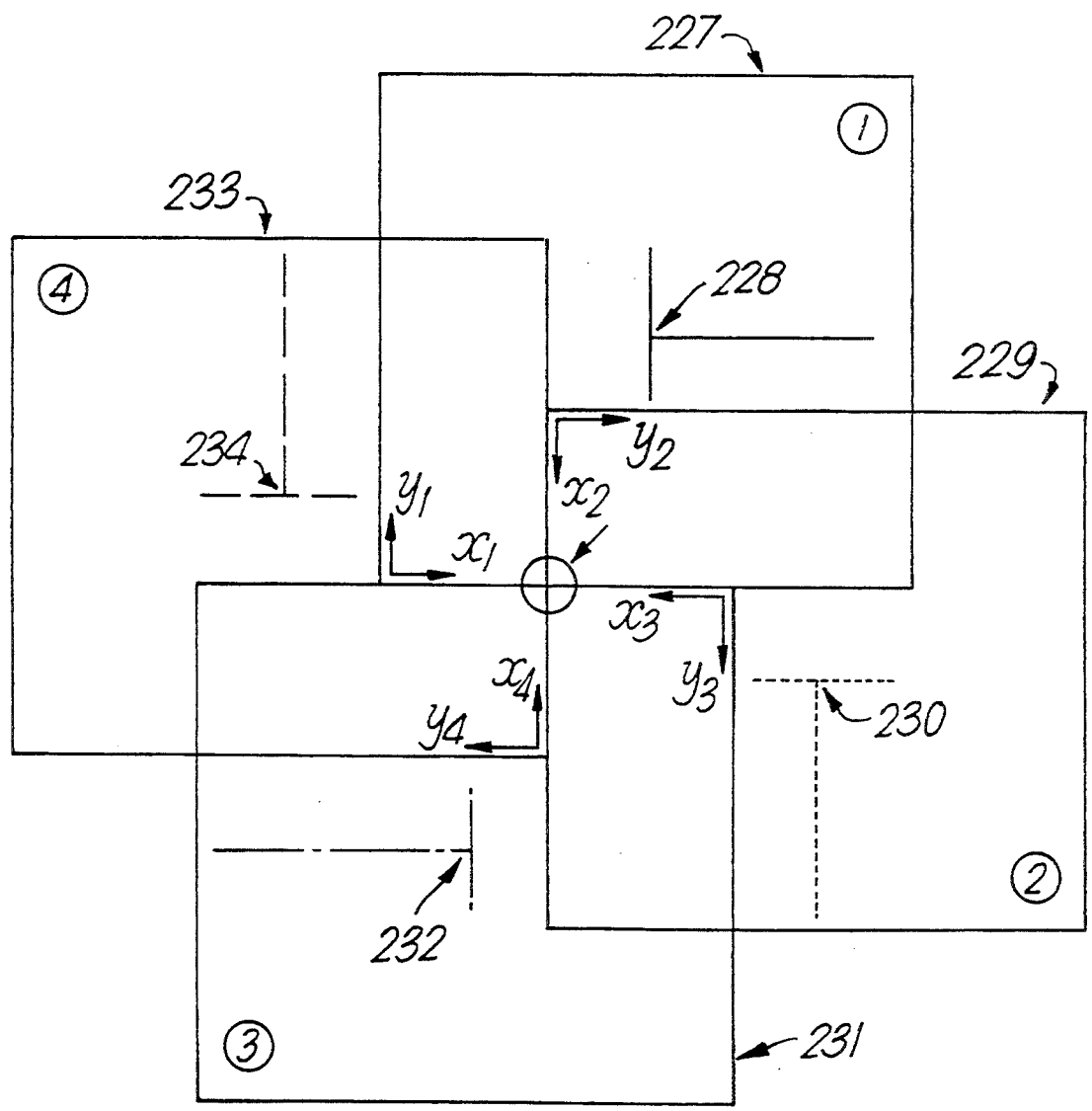
FIG. 20 is a diagram illustrating a preferred scheme of interconnection of a preferred planar array of processor cells by four binary trees in accordance with the invention.

FIG. 20 illustrates how a square array of cells can be interconnected by a network consisting of four binary trees, with the cells at the leaf positions of each tree, each cell occupying a different leaf position in each tree, and the trees overlapping each other in a ratio $\frac{1}{4}$ to $\frac{3}{4}$ in each of the two dimensions. As in the previous planar arrays, the unit pattern of a square of four cells is the basis of the array, and the number of cells along each side of the array is an integer power of two. In FIG. 20 it is assumed that the leaf positions of a first one, 227, of the trees are mapped onto the array of cells. The root nodal position of the tree 227 is indicated at 228. The notional positions of the other three trees 229, 231, and 233 are shown to overlap each other and the tree 227 in the ratio $\frac{1}{4}$ to $\frac{3}{4}$ in both dimensions, their root nodal positions being indicated respectively at 230, 232, and 234. By reflection and displacement, the areas of the trees 229, 231, and 233 outside the boundaries of the array position, which coincides with the tree 227, can be mapped onto the array.

Figure 21:
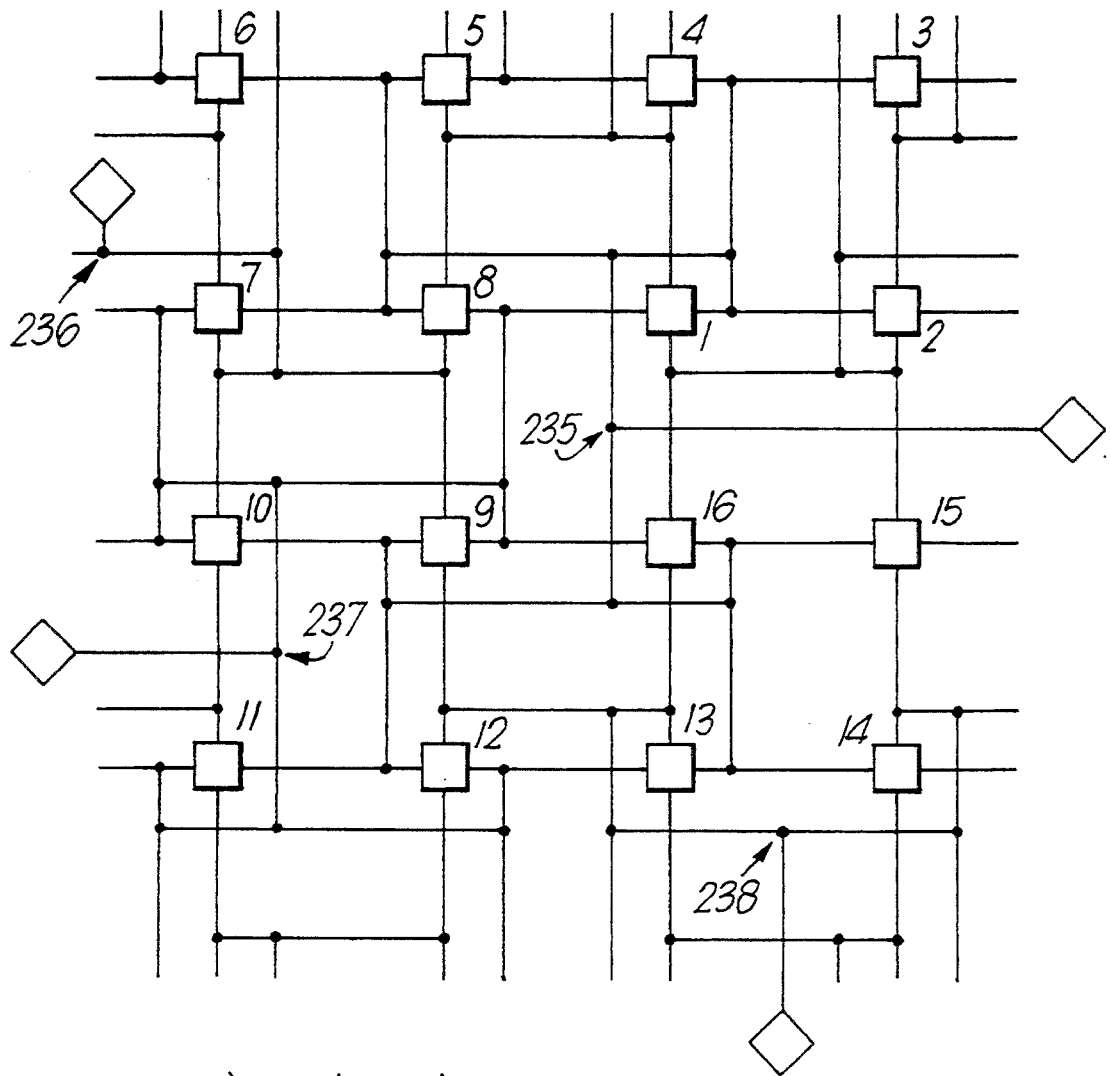
FIG. 21 is a diagram illustrating a simple embodiment of the invention having a preferred planar array of processor cells interconnected by four binary trees.

FIG. 21 illustrates, in a simple arrangement having a square array of sixteen cells and therefore sixteen leaf positions, the interconnections achieved by four binary trees that overlap in the ratio $\frac{1}{4}$ to $\frac{3}{4}$ in at least one dimension. The root nodal positions of the four trees are indicated at 235, 236, 237, and 238 respectively. The cell positions are numbered 1 to 16 for the tree with root nodal position 235. The degree of overlap horizontally and vertically for each tree is indicated below the diagram, and the numerical leaf positions for the tree with root nodal position 238 are shown, as an example, below the numerical leaf positions of the tree with root nodal position 235. For clarity, wrap around connections are not shown.

Figure 22:
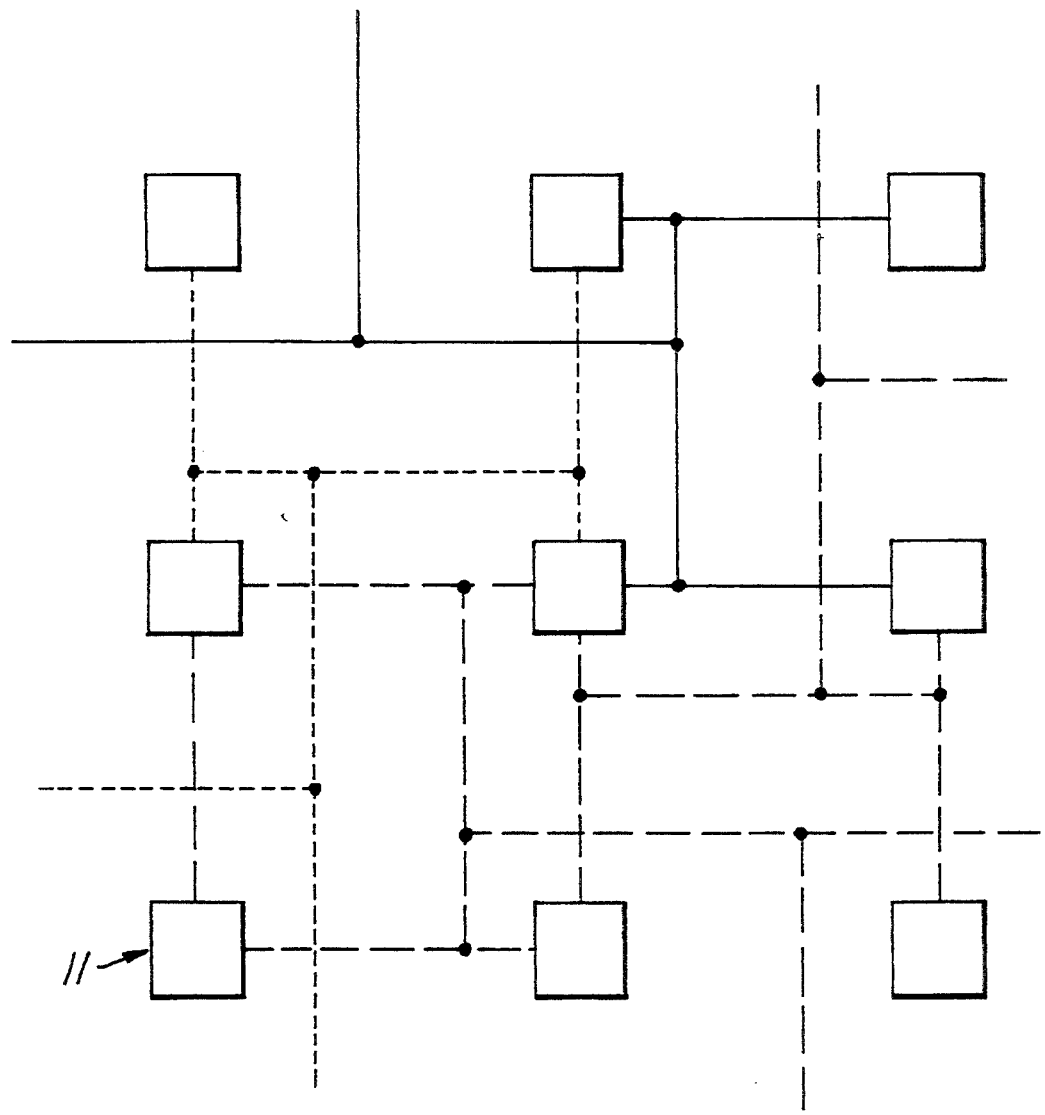
FIG. 22 is a schematic representation of a planar pattern formed by part of an embodiment having four binary trees forming the network.

FIG. 22 shows on a larger scale part of the interconnection pattern that can be achieved with four binary trees and a square array of the cells based on a square unit pattern of four cells. Such patterns are suitable for the basis of large scale integrated circuits to be fabricated incorporating many thousands of the cells interconnected by a plurality, for example four, of overlapping binary trees forming the communication network. It should be noted that the patterns preserve a regular order despite the variety of different interconnection paths provided between any pair of the cells. The two corresponding numerical leaf positions given at the foot of FIG. 21 illustrate that a linear array of the cells does not provide such order.

Figure 23:
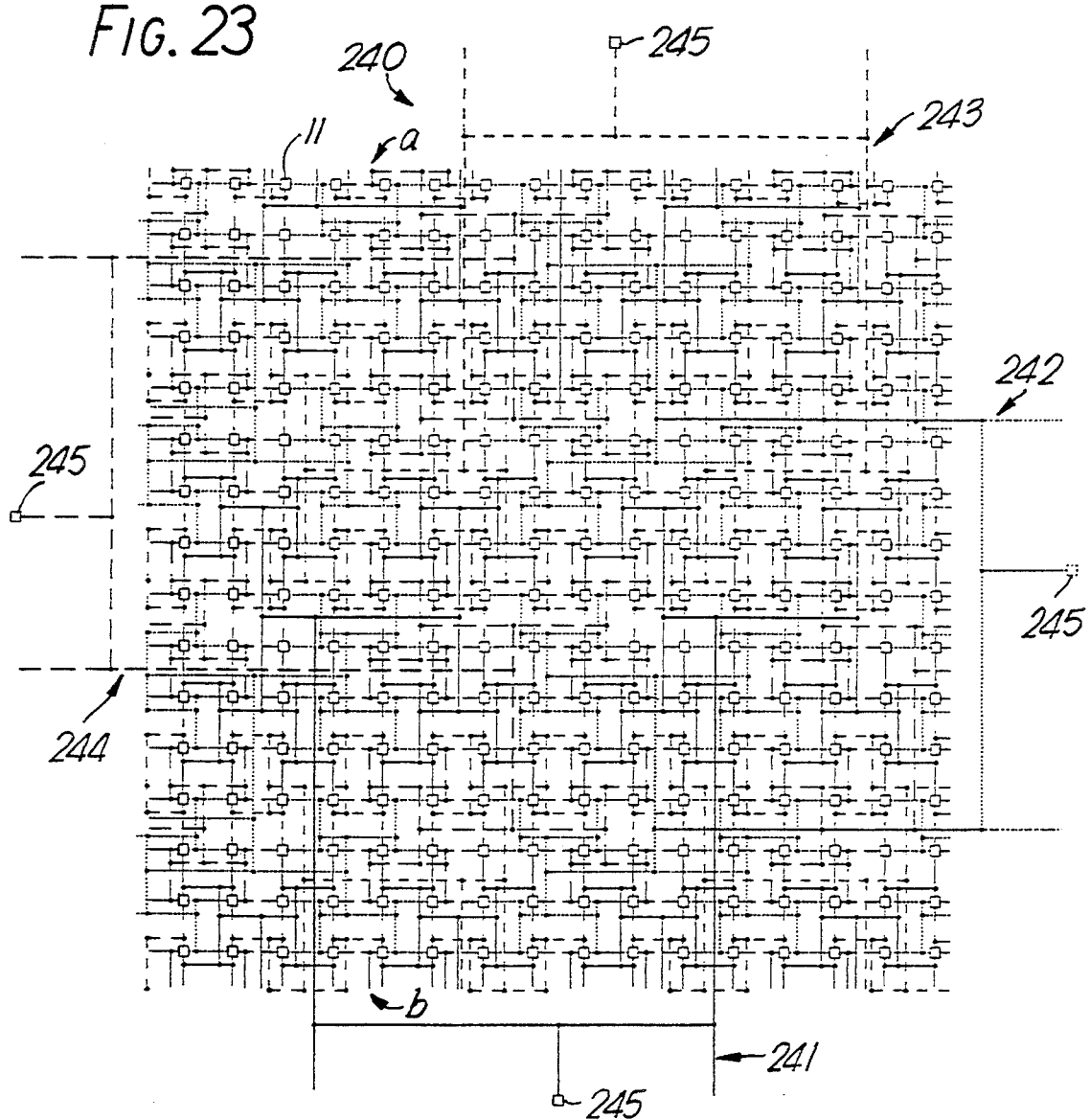
FIG. 23 is a schematic representation of an embodiment similar to that of FIG. 21 but having 256 processor cells.

FIG. 23 illustrates a sixteen by sixteen array 240 of cells 11 having a communication network formed by four binary trees 241, 242, 243, and 244 indicated respectively in full line, dotted line, short broken lines, and long broken lines. It will be seen that in this case the root nodal positions are outside the boundaries of the array, and that an input/output terminal 245 is provided on an upper path segment from each root node. Wrap around connections are omitted for clarity, but are implemented in another, parallel plane as single links crossing horizontally and vertically across the array. For example, 'a' is connected to 'b'.

Supply lines for power, ground, and clock pulses are provided also for a large scale integrated circuit fabricated in accordance with the planar patterns described hereinbefore. In one example in which a plurality of such integrated circuits are used in combination to form a processing apparatus embodying the invention, each such circuit is provided with its own source of clock pulses to ensure integrity of data output by the individual integrated circuits. Data transmission through the binary trees is asynchronous and clock skew is not significant for a large combination of such circuits in this example.

Figure 24:
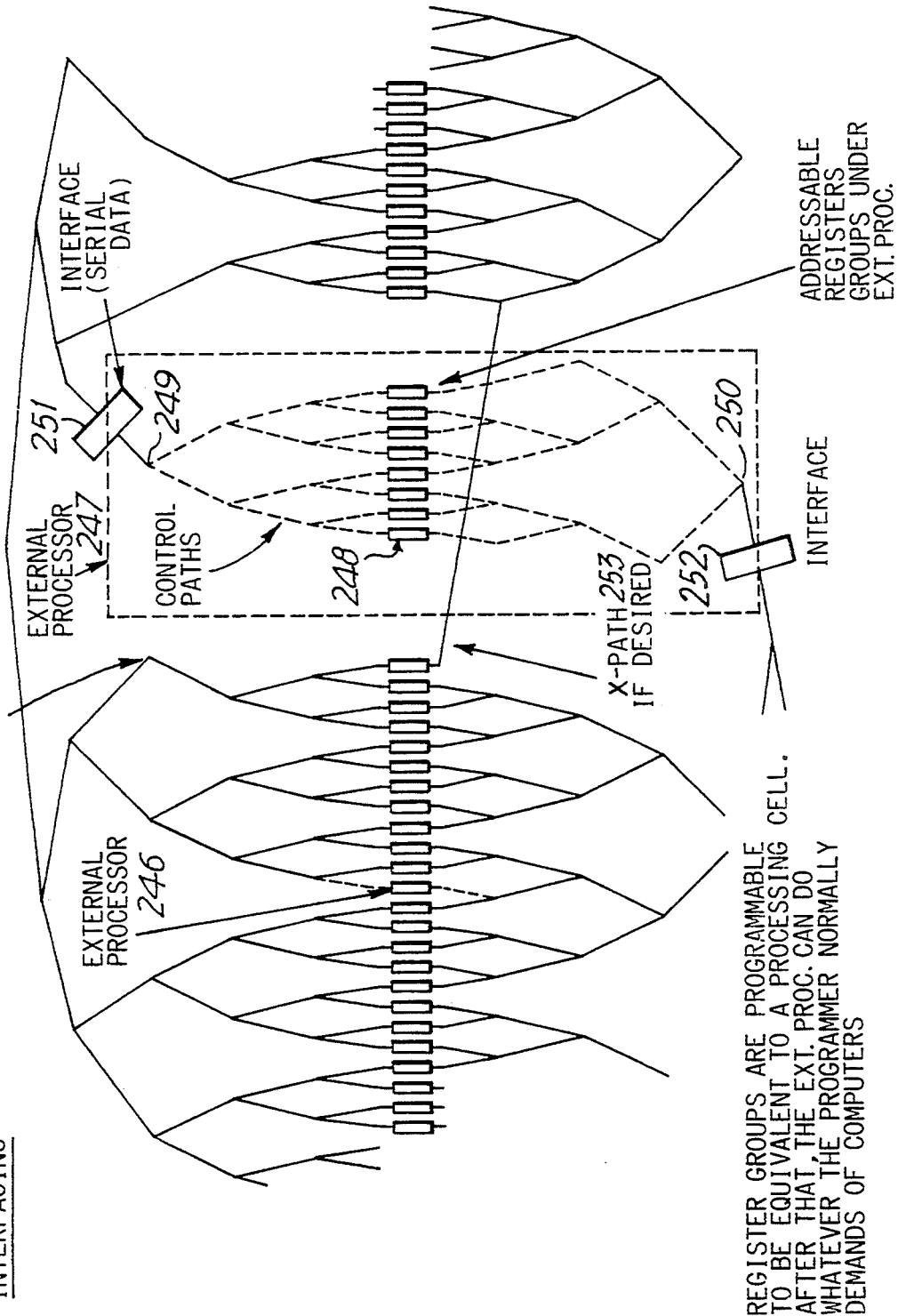
FIG. 24 is a diagram illustrating alternative means of providing input and output in an embodiment of the invention.

Two examples of input/output interfacing methods are illustrated in FIG. 24. In one of these methods a conventional processor 246 is connected into the network at a leaf position. In the other method a conventional processor 247 is programmed to simulate a number of cells 248 and the part of the network in which they occupy leaf positions. Root node positions of this simulated part of the network, such as node positions 249 and 250, are linked through serial ports 251 and 252 to appropriate points in the actual network. Cross paths, such as that indicated at 253, may be provided to allow jumping across the external processor 247.

The external processor 246 serves as a special cell 13, and the simulated cells 248 also serve as special cells 13. However, a special cell 13 may equally consist of most of the structure of standard cell 12 combined with a serial interface for connection to the desired peripheral equipment.

The use of binary trees to form the communication network 14 allows binary addresses for the cells 11 to be used as routing or destination information in the network. Registers are provided in each cell for storing such information and accordingly their length is related to the number of bits required to form a complete address. For example, if all the cells are at the leaf positions of a binary tree, and there are 524288, registers for more than nineteen bits will allow storage of a complete address and one or more other bits.

In an embodiment in which the network includes binary trees which have fewer leaf positions than the total number of cells, the network includes means for interconnecting the root nodes of such trees, and address bits are provided to distinguish between the different trees.

Figure 25:
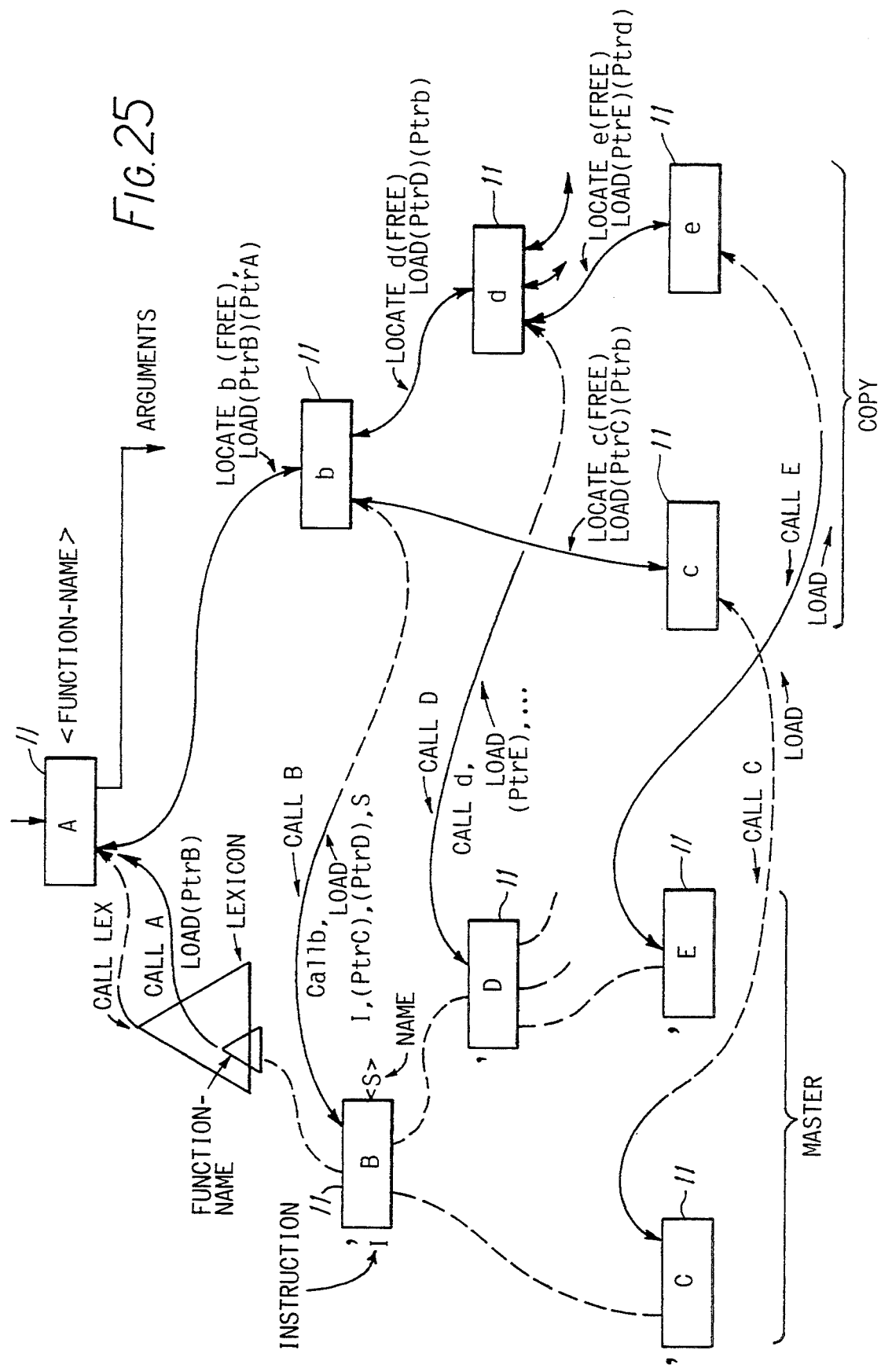
FIG. 25 is a diagram illustrating the use of lexical arrangements in an embodiment of the invention.

FIG. 25 is a simplified partial schematic representation of processes carried by cells 11 and the network in which a complex operation having a name and a definition is copied when that operation is to be executed with certain given arguments. A processor cell A has stored in it the name of the operation, denoted by FUNCTION-NAME in FIG. 25, and pointers to further cells 11 (not shown) containing the given arguments. A group of cells 11, represented by nested triangles in FIG. 25 and denoted by LEXICON, contains cells 11 storing the names and definitions of complex operations. The definition of FUNCTION-NAME is stored in a group of cells 11: B, C, D, E, and others not shown. This group of cells should be regarded as included within the smaller triangle of LEXICON, which triangle has its apex a cell storing FUNCTION-NAME.

In a simple mode of operation, the cell A has been loaded also with a pointer to the FUNCTION-NAME cell in LEXICON. Alternatively, as represented in FIG. 25, only a pointer to the 'apex' cell 11 of the whole of LEXICON is loaded into cell A, and a comparison and communication operation is provided for in which cell A transmits FUNCTION-NAME and a return pointer to itself to the 'apex' cell which compares the name it contains with FUNCTION-NAME and, if the test is negative, transmits FUNCTION-NAME and the return pointer for cell A to a next cell 11 which holds a name and is next in a predetermined order in LEXICON for the same test. In an alternative method, if the test at the apex cell is negative, the apex cell transmits back to the cell A a test failure signal and a pointer to the next cell 11 in order in LEXICON, and the cell A then repeats the process, transmitting FUNCTION-NAME and a return pointer to itself to the next cell 11 in LEXICON. Such testing and transmission continues until FUNCTION-NAME reaches a cell 11 in LEXICON that provides a positive result, whereupon that cell transmits to cell A, using the return pointer to construct a route through the network to cell A, a pointer to the head cell 11 of the definition of FUNCTION-NAME, which in this example is a pointer to cell B. When cell A receives the pointer to cell B, cell A searches for a cell in the free state. Such a cell 11 is denoted by cell b in FIG. 25. Having located the free cell b, cell A loads cell b with the pointer to cell B, denoted by LOAD (Ptr B), and, in effect, an instruction to call the cell pointed to, and waits. Cell b calls cell B which in response transmits its functional (expression) contents to cell b. Cell B contains an instruction I for an internal operation that produces the final result of the complex operation FUNCTION-NAME, a further name, designated S, which symbolises a sub-definition incorporated within the overall definition of FUNCTION-NAME, and pointers to two cells, cells C and D, of the definition. It is assumed in this example that LEXICON contains the definition of S. Alternatively, S may denote a value such as true or false, or 1 or 0. Thus cell b is loaded with I, the pointers to C and D, and S by cell B. On receiving these data, cell b tests the categories of data it now contains in order to determine whether it has an internal operation instruction and data with which that operation can be executed immediately. The test is negative since part of the data is pointers, and, if S is a name, another part is symbolic data, not a value. Cell b therefore searches for two free cells and, having located two free cells c and d, loads cell c with the pointer to and an instruction to call cell C, and cell d with the pointer to and an instruction to call cell D. Cells c and d therefore respectively call cells C and D and are loaded by those cells, and carry out the testing of the categories of data thus received. In FIG. 25 it is indicated by way of example that cell D contains pointers to cell E and further definition cells, so that cell d must locate further free cells 11. The cell b also calls LEXICON to obtain the definition of S.

As soon as one of the free cells thus utilized and loaded determines that its contents provide a positive result to their testing, that cell executes its instruction and passes the result to the cell which initially located it. Such a cell may be termed the parent cell, and the located, formerly free, cell, a child cell. For example, cell d is a child cell of cell b, and is the parent cell of cell e. So that a child cell can pass a result to its parent cell, any child cell is loaded by its parent cell with a return pointer, i.e. a pointer to the parent cell. Thus, as indicated in FIG. 25, cell b is loaded with a pointer to cell A by cell A, cell d is loaded with a pointer to cell b by cell b, and so on.

Where a parent cell has more than one child cell, copying operations carried out by the child cells can take place in parallel to the extent permitted by the state of the communication network interconnecting the cells. Preferably, plural child cells of a parent cell communicate with the parent cell through different binary tree arrangements so that contention amongst the child cells is avoided and simultaneous acquisition permitted.

The contents of the definition cells B, C, D, E, and so on, are held in such a manner that no execution takes place, and this condition is represented in FIG. 25 by a quotation mark adjacent the respective cells where shown. Thus whereas evaluation can proceed in the copy of the definition formed by the cells b, c, d, e, and so on, evaluation is inhibited in the cells B, C, D, E, and so on in LEXICON.

When a cell 11 has been loaded as a result of an input loading from a special cell 13 or as a result of a copy operation or some other activity by one or more other cells, the decoding and control unit 16 (FIG. 2) of the cell 11 initially tests the contents of a read-write set of registers, denoted the central registers 17 in FIG. 2, which together with a register in the unit 16 contain the data loaded into the cell. The register in the unit 16 is denoted the primitive register in FIG. 2 since it contains any instruction loaded into the cell for carrying out an operation on the contents of the central registers 17 in accordance with reduction rules for reducing sets of data representing elements of expressions. Instructions loaded into the primitive register are primitive in the sense that no primitive instruction can be replaced by a plurality of simpler instructions giving finally the same result. The tests carried out by the unit 16 include tests to determine the contents of the primitive register and to determine the categories of data held in the registers 17. If an address is found, i.e. data in the pointer category, the cell may be required to locate a free cell which is to become a child cell. If symbolic data is found in the registers 17, i.e. data representing a name, the cell may set itself in a state for finding the definition or value to be substituted for the symbolic data. If value data is found, i.e. data representing a numerical or logical value, the cell may set itself in a state for transmitting the value data to its parent cell, making use of a pointer, already stored in the registers 17, to the parent cell. Also, if a test indicates that the contents of the registers 17 are no longer required for processing, the cell sets itself in a state for transmitting a free state indicator to any child cell and subsequently switching itself into the free state. Furthermore, data of a predetermined category may be transferred between individual central registers 17.

Detailed examples of handling of data within a cell are described hereinafter in detail with reference to FIGS. 40 to 64.

The cell 12 shown in FIG. 2 is connected to the network 14 at respective leaf positions in four binary tree arrangements, and therefore has four ports 18, 19, 20, and 21. The registers 15 include read-only registers 22, formed by programmable read only memory (PROM), where the address of the cell 12 in each binary tree arrangement is stored. The address of a nearby input-/output special cell 13 may also be stored in one of the registers 22.

Each of the ports 18 to 21 includes director and slave transmitting and receiving circuitry, and free signal transmitting circuitry, denoted FREE SPACE in FIG. 2.

Figure 26A:
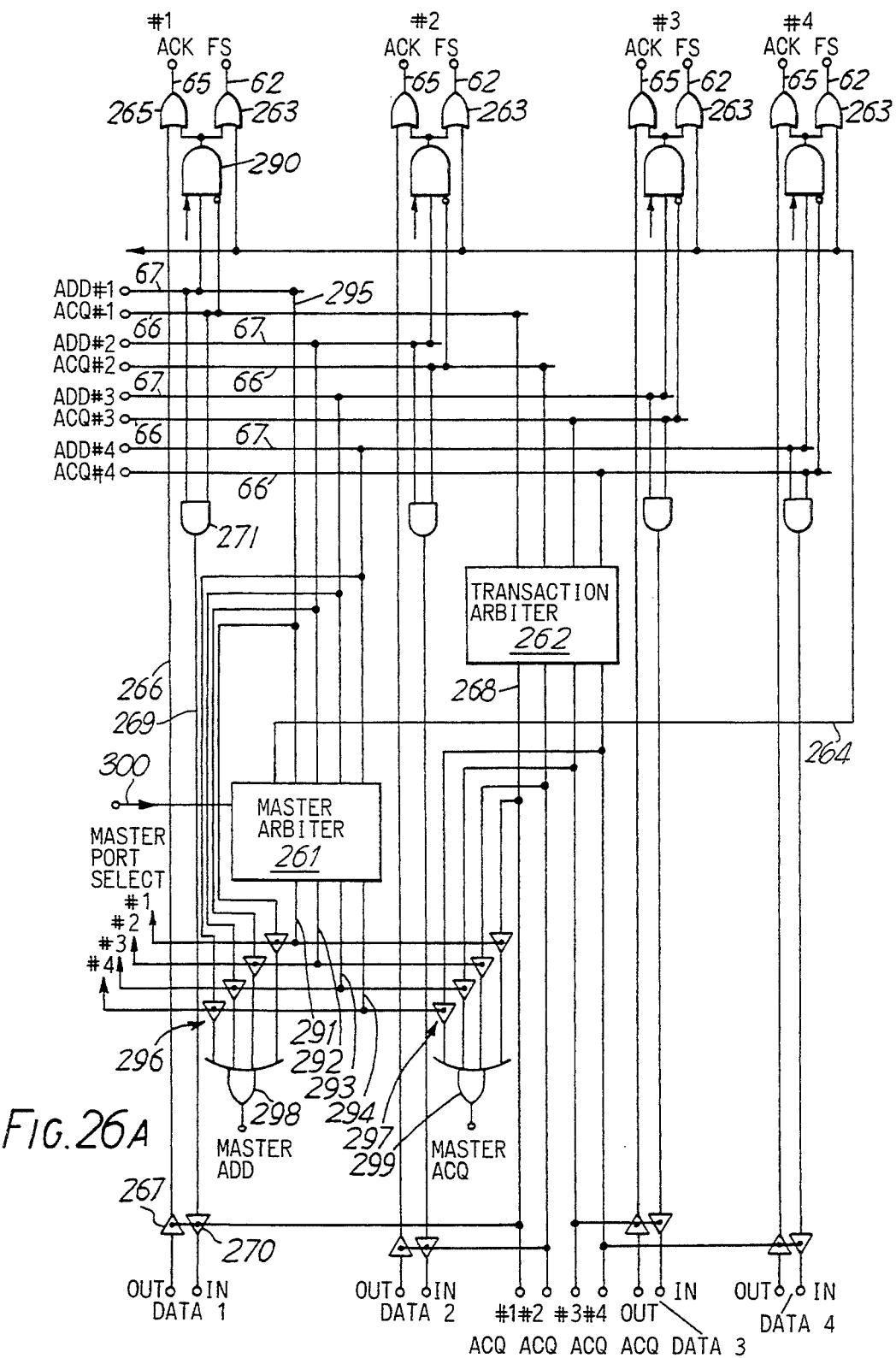

FIG. 26A illustrates logic circuitry forming the slave and free space circuitry of the four ports 18 to 21 of a standard cell 12, and shows interconnections with two units 261 and 262 of a port arbiter 260 (FIG. 2).

The free signal line 62 of each port originates at the output of a two input OR gate 263 having one input connected to a cell free signal line 264 that supplies a signal from one unit, referred to as the master arbiter 261, of the port arbiter 260. The signal on the line 264 indicates, when high, that the cell is in the free state, and, when the signal is low, that the cell is not in the free state. Hence all the free signal lines 62 are high when the cell free signal is high.

The circuitry shown in FIG. 26A for each of the four ports is the same, and therefore only the circuitry for a first port, the port #1 attached to tree #1 of the network 14, will be described. The outgoing acknowledge line 65 originates at the output of a two input OR gate 265 having one input supplied by an outgoing data line 266 from a line switch 267 controlled by one (268) of four outputs from the second unit, referred to as the transaction arbiter 262, of the port arbiter 260. Incoming data at port #1 appears on a line 269, which supplies a line switch 270 also controlled by the output 268 of the transaction arbiter 262. The line 269 is supplied by the output of a two input AND gate 271 that receives its inputs from the incoming address/data signal line 67 and acquire signal line 66 of port #1, so that data can only appear on line 269 when the acquire signal is high. The transaction arbiter 262 controls the passage of data from the interior of the cell to the outgoing data line 266 and the passage of data on the incoming data line 269 to the interior of the cell by means of the signal at its output 268, the line switches 267 and 270 being both conductive if the signal at output 268 is high, and being both non-conductive if the signal at output 268 is low. Outgoing and incoming data for each of the other three ports, #2, #3, and #4, is likewise controlled by a respective output of the transaction arbiter 262, as shown in FIG. 26A.

The transaction arbiter 262 has four inputs which are taken directly from the four incoming acquire signal lines 66 of the four ports #1, #2, #3, #4 as shown. The function of the transaction arbiter 262 is to select the first high incoming acquire signal to reach the cell or if more than one high incoming acquire signal arrives at the same time, to select one in a predetermined manner. The selection is indicated by the transaction arbiter 262 setting high one only of its four outputs. The circuitry of the transaction arbiter 262 is shown in FIG. 26F from which it will be seen to consist of a combination of three similar circuits 272, 273, and 274, two of which, 273, 274, receive the signals on the four lines 66 as inputs and supply four line switches 275, 276, 277, 278 which provide the four outputs from the transaction arbiter 262. The two outputs from circuit 272 that supply the line switches 275 and 276 also provide the input to a two input OR gate 279 which supplies one input of circuit 274. The two outputs of the circuit 273 are similarly coupled to the other input of circuit 274. Operation of each of the circuits 272, 273, and 274 will be understood from a comparison with the circuit of FIG. 7 described hereinbefore. Circuit 272 selects between high acquire signals arriving at port #1 and port #2. Circuit 273 selects between high acquire signals arriving at port #3 and port #4. Circuit 274 selects between the outputs of circuits 272 and 273 by controlling the pairs of line switches 275, 276, and 277, 278. When the transaction arbiter 262 has selected one of the four incoming acquire signals as being the first received high acquire, the transaction arbiter 262 maintains the corresponding high output which enables the corresponding pair of data line switches and retains disabled the other three pairs of data line switches, until the first received high acquire signal goes low for sufficient time to unlatch the circuit 272 or 273. For example, if the first high acquire signal to be received is a high acquire on line 66 of port #1, then the output 268 is set high by the transaction arbiter 262 and its other three outputs remain low. As a result, the pair of line switches 267 and 270 are enabled and the other three pairs of data line switches (not numbered) remain disabled. Thereafter, when the high acquire on line 66 of port #1 goes low for a sufficient time, the high output signal at 268 is replaced by a low output signal and the line switches 267 and 270 are disabled. It will be seen from FIG. 26F that if high acquire signals appear simultaneously at ports #1 and #2, then the port #2 high acquire is selected by the circuit 272, and if high acquire signals appear simultaneously at ports #3 and #4, then port #3 is selected by circuit 273. Similarly if the outputs of circuits 272 and 273 go high simultaneously, that of circuit 273 is selected. Hence the order of priority of the four ports in this example is #3, #4, #2, #1, with #3 having the highest priority.

The free signal and outgoing acknowledge signal OR gates 263 and 265 receive their second inputs from a three input AND gate 290. The gate 290 receives one input directly from the incoming address/data signal line 67 of port #1, and one input through an input inverter from the incoming acquire signal line 66 of port #1. The third input to the gate 290 is supplied by one output 291 of the first unit, referred to as the master arbiter 261, of the port arbiter 260. The master arbiter 261 provides, in addition to the cell free signal on line 264, four outputs 291, 292, 293, 294, a selected one of which is set high whenever the cell leaves the free state. When the cell is in the free state, all of the outputs 291 to 294 are low. If the cell is in the free state and a searching signal arrives at one of the ports #1 to #4, the incoming address/data line 67 is high and the incoming acquire line 66 is low. For example, if port #1 receives a searching signal when the cell is in the free state, a high address/data signal and a low acquire signal are supplied as two inputs to the AND gate 290, and the master arbiter 261 receives the high address/data signal on a line 295. The master arbiter 261 is similarly connected to receive signals on the other three incoming address/data lines 67. In response to a high signal on line 295, the master arbiter 261 sets its output 291 high, and sets the cell free signal on line 264 low. Thus the AND gate 290 is enabled to provide a high output to gates 263 and 265, and the signal supplied by the line 264 to the four OR gates 263 is low. Consequently the free signal lines 62 at ports #2, #3, and #4 are set low, but the free signal line 62 at port #1, which has received the searching signal, is maintained high by the output of gate 290. Also, the high output from gate 290 is coupled through OR gate 265 of port #1 to its outgoing acknowledge line 65 as a long acknowledge pulse, this line 65 being maintained high until the cell which has originated the searching signal switches to acquire signal high and thereby produces a low output from the AND gate 290. The free signal on line 62 from port #1 is also maintained high until the high acquire signal reaches port #1 since its high state is required to maintain the route from the searching cell to the receiving cell until the high acquire signal reaches the receiving cell through the same route. Since the searching cell to which a cell in the free state responds becomes the parent cell, as will be explained hereinafter, of the formerly free cell, the formerly free cell distinguishes communications received from the parent cell from communications received from other cells. The means for making this distinction is partly provided by the master arbiter 261 by the use of its four outputs 291 to 294 to control two sets 296 and 297 of four line switches. The four lines switches 296 control the connection of the line 295 and the three corresponding lines from the address/data signal lines 67 to the four inputs of an OR gate 298. The four line switches 297 control the connection of the four outputs of the transaction arbiter 262 to the four inputs of an OR gate 299. It is thereby arranged that the signals on the address/data signal line 67 and indication of selection or not of the acquire signal line 66 of the port selected by the master arbiter 261 appear at the outputs of the OR gates 298 and 299 respectively. The port thus selected by the master arbiter 261 is referred to as the master port. The master arbiter 261 also receives as an input from the interior of the cell a latch signal on a line 300. The circuitry of the master arbiter 261 is shown in FIG. 26G. When the cell is in the free state, the latch signal on the line 300 is low. When the master arbiter 261 subsequently selects a port as master port, the cell detects the output from the master address/data OR gate 298 and sets the latch signal high on line 300. Setting line 300 high latches the state of the circuitry of the master arbiter 261 and renders it insensitive to changes in the signals on the incoming address-/data signal lines 67.

From FIG. 26G it will be seen that the master arbiter 261 includes three latch circuits 301, 302, and 303 providing respectively, output signals $z$ and $\bar{z}$, $x$ and $\bar{x}$, and $y$ and $\bar{y}$. Four two input AND gates 304, 305, 306, and 307 decode the outputs of the latch circuits 301, 302, and 303 to provide the four outputs 291, 292, 293, and 294 of the master arbiter 261 as follows o/p 291 = x.z o/p 292 = x.$\bar{y}$ o/p 293 = $\bar{x}$.y o/p 294 = $\bar{x}$.z It will be see from these relationships that the state of the latches 301, 302, and 303 when the cell is in the free state is either x.y.$\bar{z}$ or $\bar{x}$.$\bar{y}$.z. These two states are decoded by an exclusive-NOR gate 308 and a two input AND gate 309. The inputs to the exclusive-NOR gate 308 are s x and $\bar{y}$, and the inputs to the AND gate 309 are the output of the exclusive-NOR gate 308 and $\bar{z}$. The output of the AND gate 309 supplies the cell free signal line 264.

The latch signal on line 300 is supplied to two three input AND gates 330 and 332 which respectively supply inputs to two four input OR gates 331 and 333. The outputs of the OR gates 331 and 333 respectively supply the inputs of the latches 302 and 303. The latch signal on line 300 is also supplied to one input of a two input AND gate 334 that has its output coupled through a two input OR gate 335 to the inputs of the latch 301. The other input of the AND gate 334 is provided by the z output of the latch 301. The latch signal is also supplied to one input of a three input AND gate 336 which supplies its output to the OR gates 331 and 333.

Since the latch signal is low when the cell is in the free state, the outputs from the AND gates 330, 332, 334, and 336 are all low in the free state, thereby leaving the latch circuits 301, 302, and 303 free to respond to the outputs of two AND gates 337 and 338 enabled by the output of a three input AND gate 339 if x.y is true, or to the output of a four input AND gate 340 if $\bar{x}$.$\bar{y}$ is true.

The incoming address/data signals from ports #1, #2, #3, and #4 are supplied respectively to terminals numbered #1, #2, #3, and #4 in FIG. 26G.

Until a high signal arrives at one of the terminals #1 to #4, the outputs from the AND gates 337, 338, 342, and a four input OR gate 345 are all low. Consequently the outputs from the OR gates 331 and 333 are low and the latches 302 and 303 are set in the state in which $\bar{x}$.$\bar{y}$ is true. Consequently the AND gate 339 produces a low output that disables gates 337, 338 and 342, and the AND gate 340 is enabled by the state $\bar{x}$.$\bar{y}$.z is true. When a high signal arrives at one of the terminals #1 to #4, the OR gate 345 supplies a high signal to the AND gate 340, which in response supplies a high signal through the OR gates 331 and 333 to the inputs of the latches 302 and 303, which are thereby switched to provide the state x.y is true. Since x.y.z is now true, AND gate 339 supplies a high output to the AND gates 337, 338, and 342.

A high address/date signal at port #1, is now coupled through an OR gate 341, AND gate 342 enabled by the output of gate 339, and the OR gate 335 to the inputs of the latch 301 which is thereby switched into the state producing output z. The high address/data signal is also coupled separately through two OR gates 343 and 344 to the AND gates 337 and 338 while these two AND gates are still enabled by gate 339. Since x.y is already true, the high outputs from the gates 337 and 338 cause no change at the latches 302 and 303. However, since the latch 301 now outputs z, the gate 304 provides a high output 291 indicating selection of port #1 as master port. Since z is now true, there is a low output from gate 339 which disables the AND gates 342, 337, and 338, thereby isolating the latches 301, 302, and 303 from changes at terminals #1, #2, #3, and #4. The latch signal is set high in response to the high output 291, so that AND gate 336 maintains the latches 302 and 303 producing x and y respectively. The cell free signal on line 264 goes low when $\bar{z}$ goes low. If the high signal that arrives when the cell is in the free state is at port #2, only a two input AND gate 346 supplies a high output, which is coupled through gates 343, 337, and 331 to latch 302. Latch 303 receives only low inputs from gates 340, 336, 338, and 332, and the low $\bar{x}$ output from latch 302 remains to keep the output of gate 332 low when the latch signal is set high. The output of gate 336 remains low since the latch 301 is not switched, i.e. $\bar{z}$ remains true. Consequently gate 305 sets output 292 high.

A high signal arriving at terminal 03 when the cell is in the free state similarly results in a high output 293, the high signal at terminal 03 being coupled through a three input AND gate 347 and gates 344, 338, and 333 to latch 303 to produce the state $\bar{x}.y.\bar{z}$ is true.

When a high signal arrives at terminal 04 when the cell is in the free state, a four input AND gate 348 couples the high signal through to gate 341 and hence through gates 342 and 335 to latch 301 which therefore switches to provide z is true. Before this occurs, the latches 302 and 303 are switched to provide x.y is true, through the action of gate 340, but are switched back again to provide $\bar{x}$. is true when the output from the gate 340 returns to low. Hence $\bar{x}.z$ becomes true and gate 307 sets output 294 high. Although the latch signal then goes high as a result, only latch 301 is held by feedback of z through gate 334. The AND gates 336, 330, and 332 continue to provide low outputs since $\bar{x}.\bar{y}$ is true.

When the cell is not in the free state, one of the ports #1 to #4 is selected, the latch signal on line 300 is high, and x.z is true, or x is true, or y is true. When the latch signal is high, the output x or y or z is held by feedback through the respective AND gate 330 or 332 or 334. Consequently when the latch signal on line 300 is set low, any latch 301, 302, or 303 held by feedback is switched into its other state. Hence when the cell is set in the free state, the latch signal is set low and the latches 301, 302, and 303 are set to provide $\bar{x}.\bar{y}.\bar{z}$ is true.

Figure 26B:
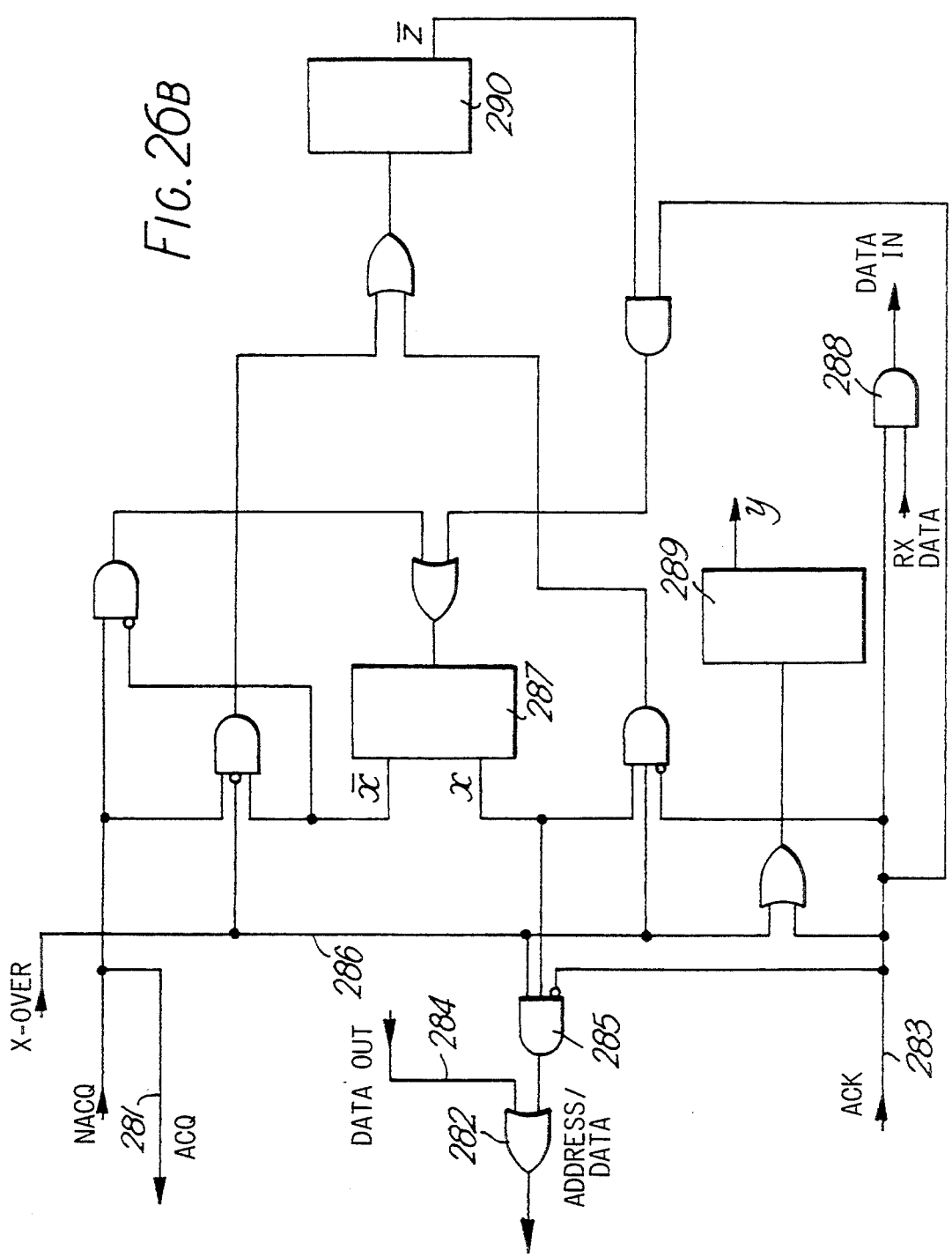

FIG. 26B represents logic circuitry forming that part of the director circuitry of one port which is used in a normal acquire operation i.e. during the transmission of a calling signal.

The state of an internal signal NACQ, which is high for the normal acquire operation and low otherwise, provides the high acquire signal ACQ for a normal acquire (calling) signal. The signal NACQ is therefore applied to an outgoing connection 281. Address/data signals to be transmitted appear at the output of an OR gate 282, and acknowledge pulses and incoming data are applied to a connection 283. One input connection 284 to the OR gate 282 supplies the bits used from the address of the called cell to control nodes in the downward part of the network route from the node at which crossover occurs to the called cell, and any subsequently transmitted data. The other input to the OR gate 282 is supplied by the output of an AND gate 285 which receives at one input, from a connection 286, a crossover control signal X-OVER. The X-OVER signal is high when crossover is to be effected at a node. The AND gate 285 has one other direct input, x, from the Q output of a flip-flop 287, and an inverted input from the incoming acknowledge signal connection 283. The connection 283 provides high signals at each node seizing on a route from the cell but is low otherwise, and is low when a crossover is effected.

Data received on the connection 283 is gated by an internally generated receiving state signal RX DATA at an AND gate 288.

Further circuitry shown in FIG. 26B is used to generate state signals, the circuitry including a flip-flop 289 that generates a signal y at its Q output, and a flip-flop 290 that generates a signal $\bar{z}$ at its complementary output $\bar{Q}$.

Figure 26C:
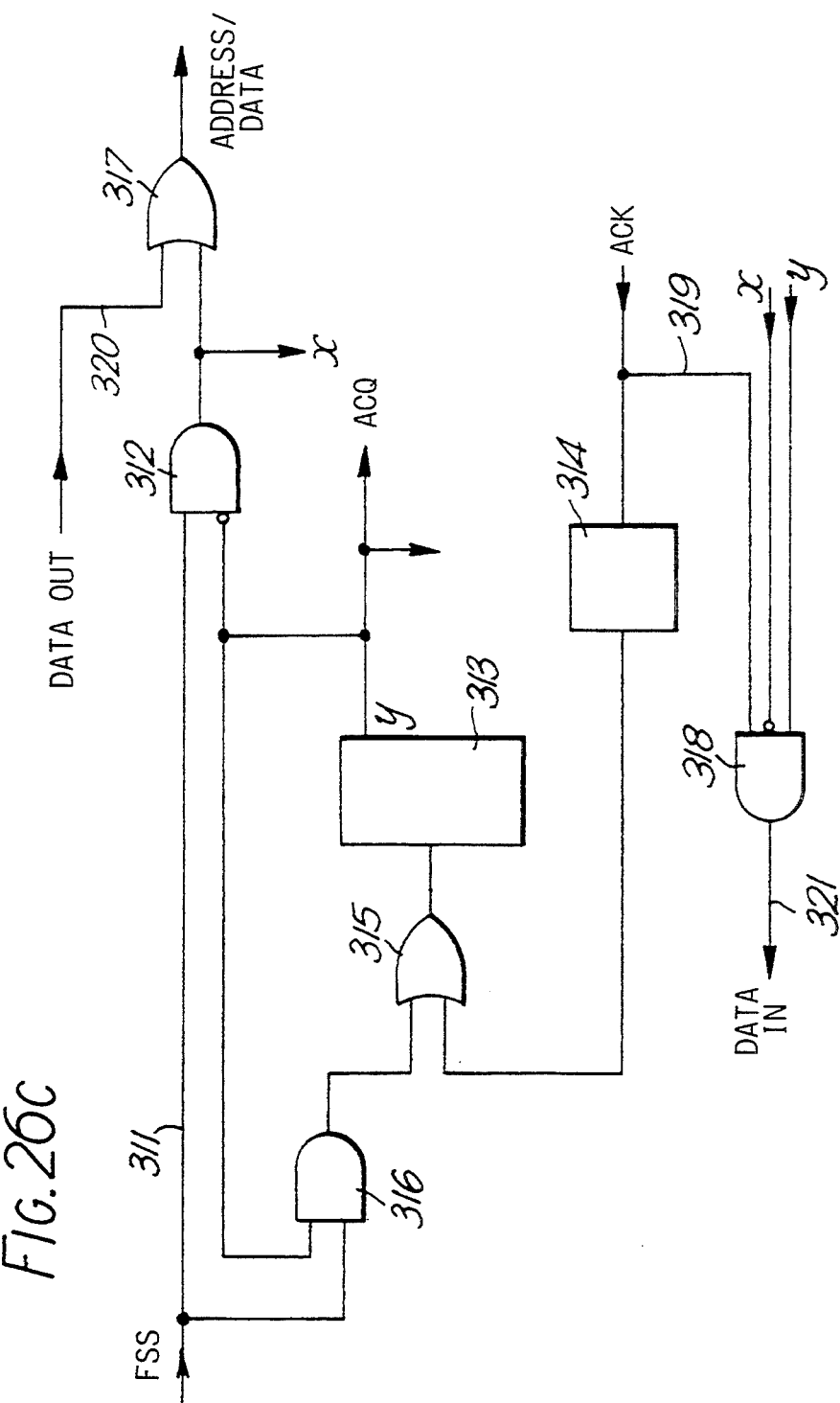
Figure 26F:
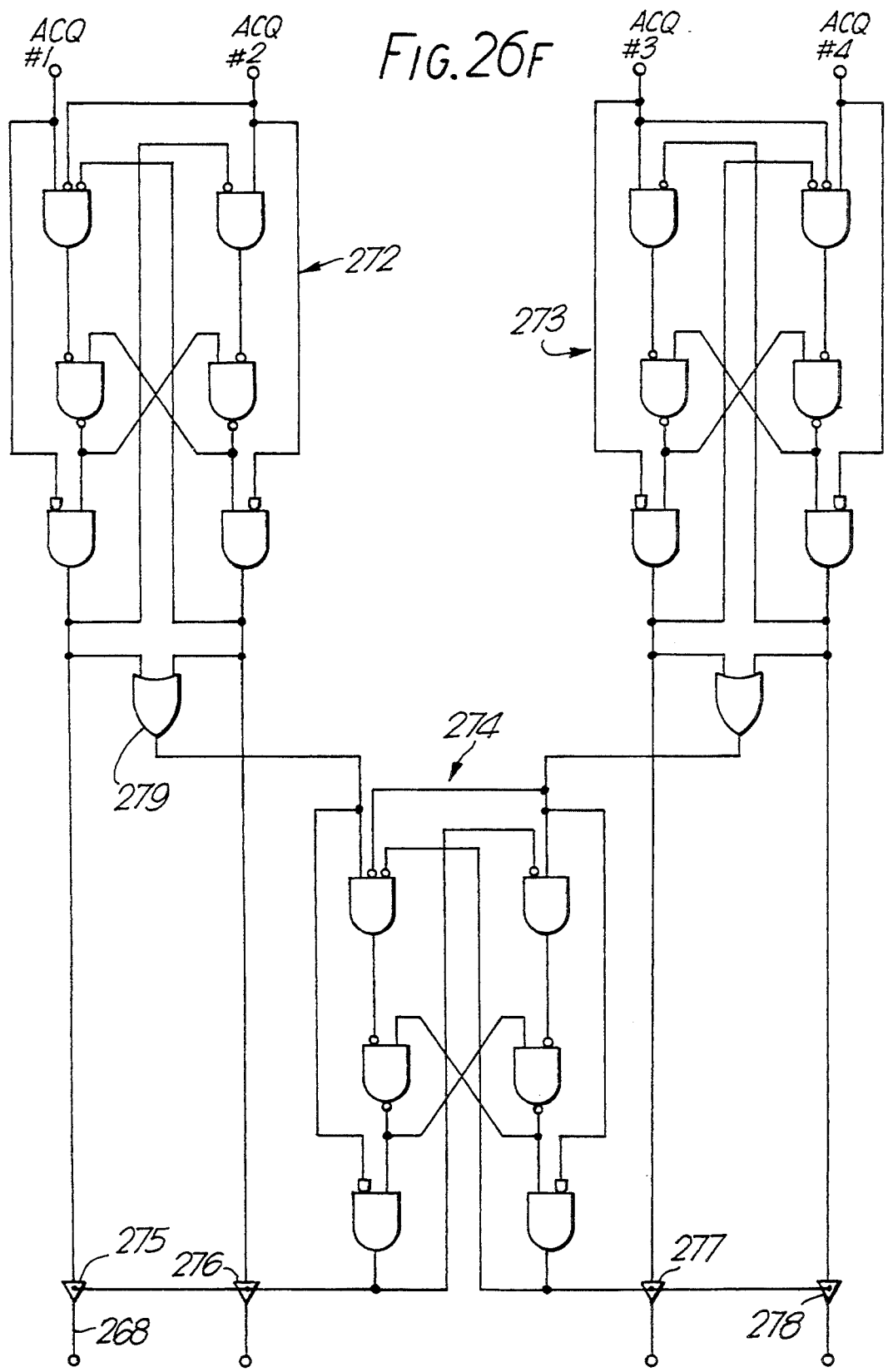
Figure 26G:
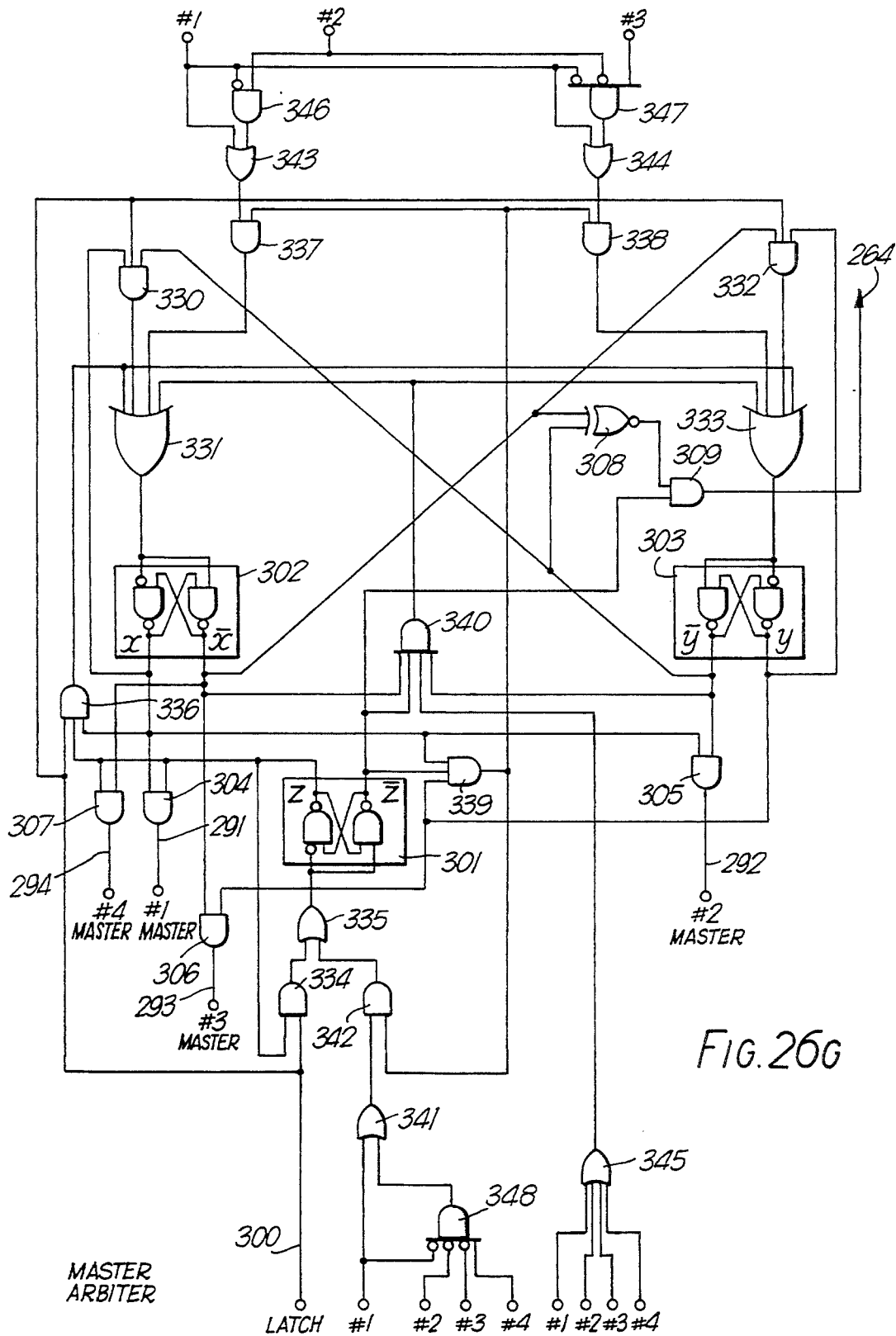

FIG. 26C represents logic circuitry forming that part of the director circuitry of one port which is used in a search operation i.e. during the transmission of a search signal into the network 14.

The state of an internal signal FSS, which is high for the search operation and low otherwise, is supplied on a connection 311 directly to one input of an AND gate 312 having an inverted input supplied with the Q output y of a flip-flop 313.

Immediately before the internal signal FSS goes high, the output of a timing circuit 314 is low, so that the flip-flop 313 receives a low input from an OR gate 315 having as inputs the output from the timing circuit 314 and the output of an AND gate 316 having the flip-flop output y and the internal signal FSS as inputs. Consequently at this time the flip-flop output y is low, and the output x from the AND gate 312 is low. When the internal signal FSS goes high, the flip-flop output y remains low because there is no change in the outputs from the AND gate 316 and the timing circuit 314. The output x from the AND gate 312 goes high since now FSS is high and y is low.

The high output x is supplied through an OR gate 317 as the high address/data signal of the search signal, and the low output y is supplied directly as the low acquire signal of the search signal.

Acknowledge pulses received from nodes of the network 14 along the upward part of the route, i.e. prior to interception of the search signal by a free signal, are too short to produce an output from the timing circuit 314, so that there is no change in the input to the flip-flop 313. Also an AND gate 318 is held closed by receiving the low output y directly and the high output x through an input inverter, so that the acknowledge pulses, which are supplied directly to a third input of the gate 318 on a connection 319 do not pass through the gate 318.

When a cell in the free state is reached by the search signal, the high address/data signal from the OR gate 317 and the low acquire signal from the flip-flop 313 produce a high output from the AND gate 290 of FIG. 26A which provides a high signal on the acknowledge signal line 65 from the OR gate 265 of FIG. 26A. This high acknowledge signal therefore appears as the input to the timing circuit 314 which, after its predetermined delay time, produces a high output signal which, acting through the OR gate 315, results in the output y of the flip-flop 313 becoming high. Thus a high acquire signal is produced which secures the route to the free cell. The high y signal also results in the output signal x from the AND gate 312 going low, and the address/data signal from the OR gate 317 also goes low. The high acquire signal and low address/data signal produce a low output from the AND gate 290 of FIG. 26A and hence set the acknowledge signal from the OR gate 265 of FIG.

26A low again. The internal signal FSS remains high so that the flip-flop 313 is latched with its output y high. The output of the timing circuit 314 goes low in response to the low acknowledge signal, but this change does not affect the output of the OR gate 315 which is held high by the output of the AND gate 316.

Since the output signal x is low, data can be transmitted out through the OR gate 317 from a data input connection 320. Also, since x is low and y is high, the AND gate 318 is open and data transmitted from the formerly free cell on the acknowledge signal line can be received at the output 321 of the AND gate 318 from the connection 319. The data pulses are too short to change the output from the timing circuit 314.

At the end of the exchange of messages between the formerly free cell and the cell using its director circuitry as described with reference to FIG. 26C, the internal signal FSS is set low so that the output signal y, and hence the acquire signal, goes low.

The timing circuit 314 may be in the form of an integrator circuit followed by a monostable circuit. The time constant of the integrator circuit is then chosen to ensure that the triggering level of the monostable circuit is not reached unless the acknowledge signal remains high for a time sufficiently long to discriminate against acknowledge pulses from the nodes, and data pulses.

During the transmission of data, toggle bits are inserted so that the beginnings and ends of words can be identified, the first toggle bit being 1 and the last 0. At reception of data, the toggle bits are removed. An example of a train of four words of data with toggle bits is given as follows, in which it is assumed that the order to transmission of the bits is from right to left:

001000111010001010001011000

It will be seen that, preserving the same order, right to left, of transmission, the data bits of the words transmitted are

0; 010; 00; 001

A further rule of data transmission illustrated in the above example is that only zeros are transmitted between words.

FIG. 26D shows the circuit of a toggled data detector 350 used in each cell to separate the data bits and toggle bits into separate streams from an incoming data stream. The input data stream is supplied to an input terminal 351 which is directly connected to one input of a two input AND gate 352 which supplies only the data bits to a data bit output terminal 353. The input terminal 351 is also directly connected to one input of another two input AND gate 354 which supplies only the toggle bits to a toggle bit output terminal 355. The circuitry has a third output terminal 356, supplied by a two input NOR gate 357, at which the signal is 0 except when the end of a data word is to be indicated, in which circumstances the output signal at the terminal 356 is 1.

The circuit generates a toggle window signal Y for toggle bits, the toggle window signal Y being supplied on a line 358 to the other input of the AND gate 354 and to one input of the NOR gate 357. The toggle window signal Y is a lengthened version of each toggle bit and is generated by supplying the input data stream from the terminal 351 to one input of a two input OR gate 359 having its output connected to one input of a two input AND gate 360, generating a data bit window signal x and supplying the signal x to an inverter at the other input of the AND gate 360, and generating a delayed version y of the toggle bit window signal Y and supplying this delayed signal y to the other input of the OR gate 359. The data bit window signal x, being inverted, cause the toggle bit window signal Y to be 0 during each data bit duration. The feeding back of the delayed signal y to the gate 359 ensures that the non-inverted input to the AND gate 360 is 1 from substantially the beginning of each toggle bit until substantially halfway through the duration of the following data bit, the delay introduced by a delay circuit 361 which is fed with the toggle bit window signal Y and which supplies the delayed signal y being chosen appropriately. Thus the signal Y is 1 during each toggle bit and 0 during each data bit. Consequently the AND gate 354 provides only toggle bits, which are all ones, at the toggle bit output terminal 355.

The delayed signal y is also supplied to a rising-edge-triggered monostable circuit 362 having a time constant such that the circuit 362 produces a pulse with a duration equal to the period between corresponding edges of adjacent toggle bits in a data word. The output signal from the monostable circuit 362 is designated c in FIG. 26D. Since the toggle bit window signal Y goes to 1 at the beginning of each toggle bit, (Y OR c) is 1 unless a toggle bit does not occur. When a toggle bit does not occur, (Y OR c) changes to 0 substantially halfway through the duration of the missing toggle bit, since c is 1 until that point. Then (Y OR c) remains at 0 until a further toggle bit occurs. Thus (Y OR c) is 1 except from the end of a word to the beginning of the next word. The NOR gate 357 thus provides at the output terminal 356 a signal that is 0 during any data word and is 1 between the end of any one data word and the beginning of the next data word.

To generate the data bit window signal x the circuit has a three input AND gate 363 that produces an output signal X, and a delay circuit 364 which delays the signal X to produce the window signal x. The window signal x is supplied to and inverted at the AND gate 360 as described hereinbefore, and is supplied to the AND gate 352 to block all but the data bits, and is fed back to an inverter at one input of the AND gate 363. The input data stream from the terminal 351 is supplied to an inverter at a second input of the AND gate 363 so that the gate 363 is closed during each toggle bit. The delayed signal y is supplied to the third input of the gate 363 so that the gate 363 is closed from substantially half way through each data bit until substantially halfway through the next toggle bit (during which, if that toggle bit occurs, the gate will be closed by the signal from the input terminal 351). Hence the gate 363 opens immediately after the falling edge of each toggle bit. The delay introduced by the delay circuit 364 is chosen to be equal to the interval between the end of a toggle bit and the 5eginning of the following data bit. Consequently the output signal X switches to 1 immediately after each toggle bit in the input data stream, and switches to 0 at the beginning of the time for the following data bit in the input data stream. The duration of the interval between a toggle bit and the following data bit is chosen to be equal to or slightly longer than the duration of a data bit. Hence x is 1 during each data bit and is 0 during all toggle bits.

FIG. 26E illustrates graphically the signals c, Y, y, X, and the output data bits (STORED DATA) for two data words (DATA IN) in which toggle bits t are indicated, data bit values 1 and 0 are shown, and an END-OF-WORD indicated between the two words.

Each of the delay circuits 361 and 364 can be an SR type circuit in which the output follows the input signal with a delay which is the inherent delay due to the gates comprising the delay circuit.

Figure 27:
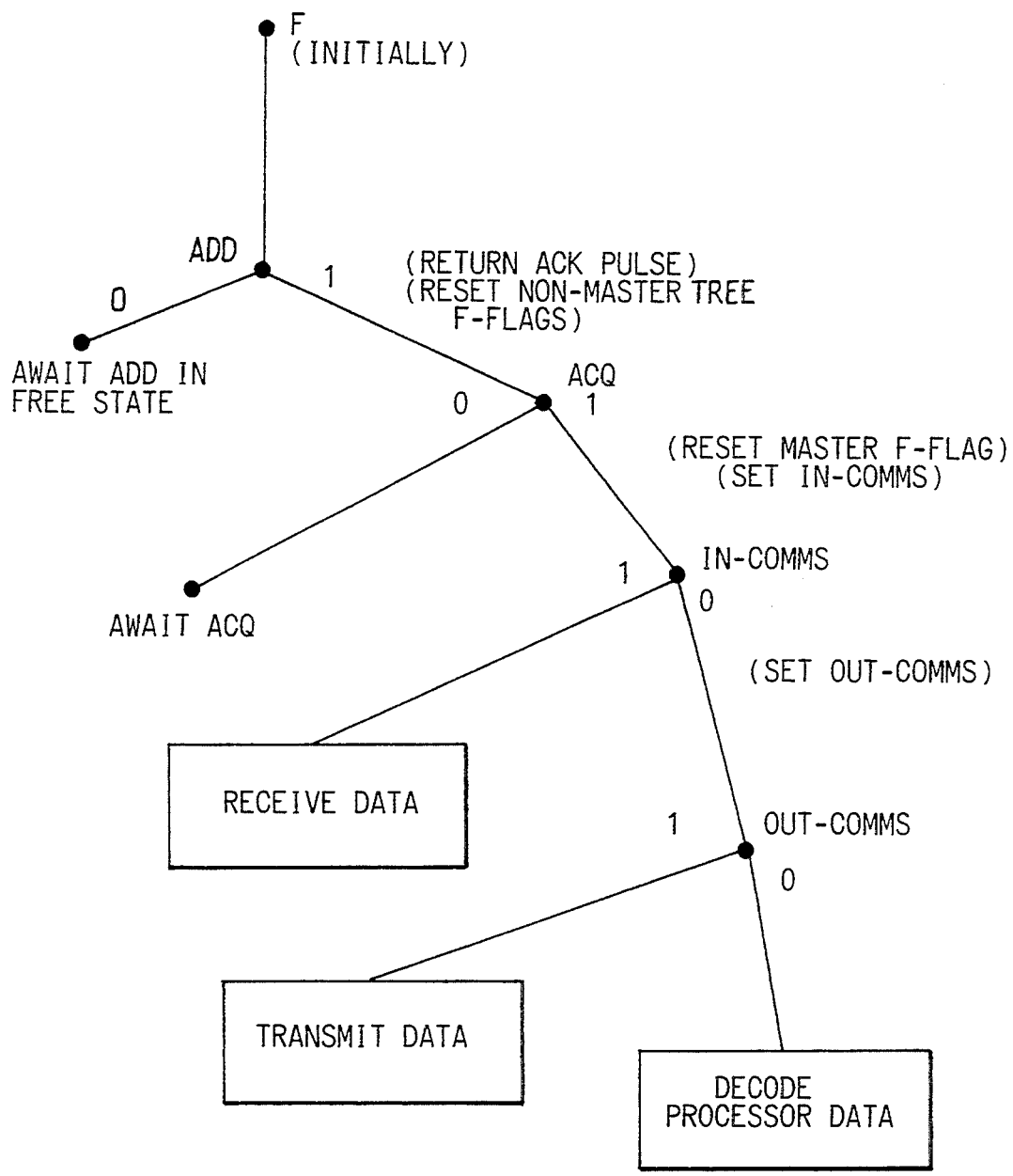
FIG. 27 is a graphical representation of a communication operation of a processor cell of the embodiment of FIG. 1.

The process of the cell 12 passing from a free state to a claimed state as a result of receiving a search signal, acknowledging the search signal, receiving data, transmitting data, and subsequently examining the categories of data received is summarised graphically in FIG. 27.

The cell 12 includes a port rotation register 23, in the form of a shift register with input to output coupling to establish a ring counter mode of operation, coupled to a register selector 24 and data and input/output routing circuitry 25 to ensure that each port communicates with only a selected central register at a time, and that an order of rotation is preserved during operations of the cell.

A first set of primitive instructions, any one of which may be stored in the primitive register of the decoding and control unit 16, consists of the set of five shown in Table 1 below.

TABLE 1

| PRIMITIVE INSTRUCTION | GRAPHICAL SYMBOL | BINARY CODE |
| --- | --- | --- |
| TRUE | T | 1000 |
| SYMBOL | $ | 1101 |
| LAMBDA | λ | 1110 |
| IDENTITY | = | 1100 |
| LAMBDA-SYMBOL | λ-$ | 1111 |

It will be seen that the primitive instruction lambda-symbol λ—$ is formed by a combination, involving masking of code zeros by code ones, of lambda and symbol, that is to say the lambda binary code and the symbol binary code are subjected to the logical OR operation.

The symbol primitive $ when present in the primitive register indicates that at least one of the central registers is storing a code representing a symbolic name for which a definition or a value must be obtained.

The lambda primitive λ when present in the primitive register indicates that one of the central registers is storing a code which is a pointer to another cell temporarily containing a symbol primitive $, and that two others of the central registers are storing pointers, one to a parent cell and the other to a child cell.

The identity primitive =, when present in the primitive register indicates that an operation is to be carried out in which a value in or to be located in one central register is to be compared with a value in or to be located in another central register and if the values are found to be identical, a value in or to be located in a further central register is to be transmitted to a parent cell for which a return pointer is stored in yet another central register. If the values compared are not identical, a nil indicator ⊥, is transmitted to the parent cell.

The true primitive T when present in the primitive register indicates that one or more central registers contain pointers to child cells, and that the registers 17 also contain a return pointer to a parent cell.

The lambda-symbol instruction λ—$ when present in the primitive register indicates that one or more of the central registers is storing a symbolic name, that one of the registers is storing a return pointer to the parent cell of a cell that has the lambda primitive λ in its primitive register, and that the parent cell of the lambda cell, i.e. the grandparent cell, is storing a pointer or pointers to the definition or definitions of the symbolic name or names, or a value or values for the symbolic name or names, or a pointer to a further cell or set of cells one of which is storing a pointer or pointers to the definition, definitions, value, or values. The presence of the lambda-symbol instruction accordingly sets the cell in a state in which it transmits the symbolic name or names first to the grandparent cell where this name or the names may be stored as identifiers of the definition or definitions, or value or values.

The main categories of data: (i) pointer; (ii) instruction; and (iii) symbolic name or value; are made distinguishable in the cell 11 and in the format in which they are transmitted through the network 14, by having respective distinct prefix codes of two bits. Hence the decoding and control unit 16 is able to determine what category of data is present in or should be stored in any one of the central registers, and the prefix codes for values and pointers can serve as commands that modify execution of primitive instructions such as the true primitive and the identity primitive.

In the first example to be described hereinafter, pointers transmitted as data through the network and stored in the central registers 17 are the complete addresses of the cells to which they refer. However, usually only part of such an address will be needed to form the control signal applied to an outgoing address line 64, that part being computed, as explained hereinbefore with reference to FIG. 13. Comparison of a complete address stored as a pointer in a central register with the address of the cell itself, referred to hereinafter as an own address, in the corresponding binary tree is carried out by an address and identity comparator 26.

The address and identity comparator 26 is also used to carry out comparison of a symbolic name transmitted to the cell with a symbolic name stored in a central register of the cell.

The address and identity comparator 26 can be constructed as a simple conventional serial comparator based on a single exclusive-OR gate (not shown), and constitutes the arithmetic and logic unit (ALU) of the cell. In other embodiments in which each cell is to carry out primitive operations of, for example, addition, subtraction, AND, OR, complementing, NOR, NAND, and other basic arithmetic and logic functions, the ALU of the cell is constructed preferably as a serial ALU for carrying out such operations. Such ALU circuitry is well known to those skilled in the art.

Reading from and writing to the central registers 17 is serial in the present example and therefore the cell includes a bit selector 27A for addressing individual locations in registers, and a counter 27B to drive the bit selector 27A.

One cell process, which is a substitution process including acquiring and copying the contents of another cell, is represented schematically by a block 29 in FIG. 2.

A second set of primitive compound instructions is formed from the true T, symbol S, lambda λ, and identity =, primitive instructions and have codes which are complements of those of the related primitive instruction and may therefore be referred to hereinafter as inverted primitive instructions. Table 2 below shows the inverted primitive instructions.

TABLE 2

| INVERTED INSTRUCTION | GRAPHICAL SYMBOL | BINARY CODE |
|---|---|---|
| NIL-TRUE | $\overline{T}$ | 0111 |
| NIL-SYMBOL | $\overline{S}$ | 0010 |
| NIL-LAMBDA | $\overline{\lambda}$ | 0001 |
| NIL-IDENTITY | = | 0011 |

A further primitive instruction, called NIL, graphical symbol ⊥, is used to represent the nil indicator ⊥, and false, and has the binary code 0000. The constant NIL, i.e. the nil indicator, is an important element in many of the messages transmitted between cells, and, when temporarily present in the primitive register of a cell, has a special role in the process of copying a definition cell by a formerly free cell. Because of this special rôle the inverted primitive instructions may be referred to hereinafter as nil primitives, and, where it is not necessary to distinguish between the four nil primitives, each nil primitive may be referred to graphically as ⊥-, as in FIG. 45.

The primitive instruction true, T, is also used as a constant in messages.

Figure 28:
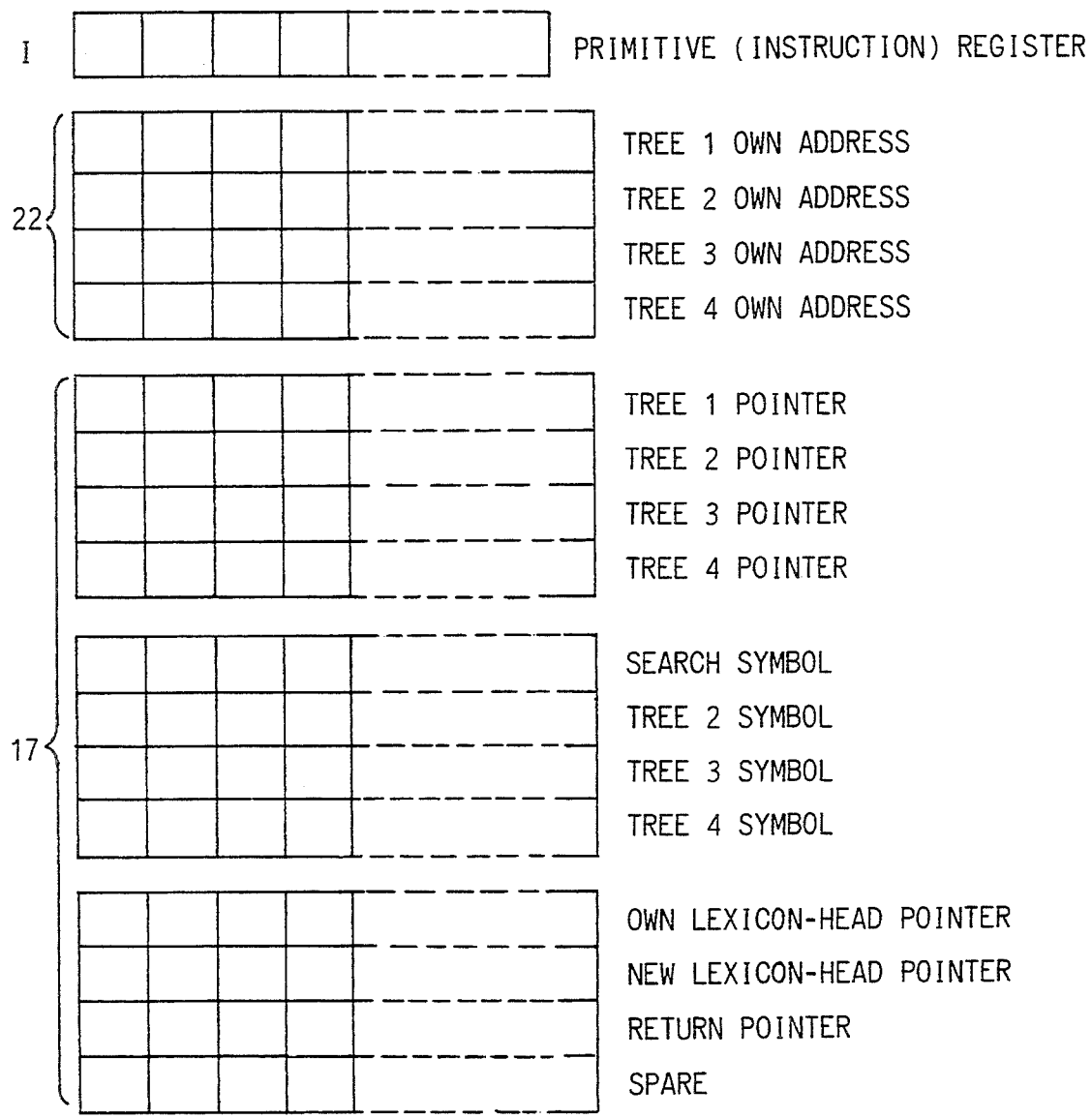
FIG. 28 is a diagram representing registers in a processor cell of the embodiment of FIG. 1.

FIG. 28 represents the primitive register, central registers 17, and read-only registers 22. The first four bit positions in each register are shown. The intended content of each register is shown on the right hand side of the figure, except in the case of the last of the lowermost set of four registers, which is spare, i.e. normally empty. The spare register may be used during copying and symbol transmitting processes. The first register in the set of four symbol registers is also normally empty but is in particular used as temporary storage for a symbolic name passed to the cell for comparison with the symbolic names in the tree 2, tree 3, and tree 4 symbol registers. The trees 1 to 4 are the four binary tree arrangements of the network 14. The four pointer registers and the four symbol registers may each be alternatively loaded with a value. Pointers and values are distinguished by their respective different prefix codes.

Figure 29:
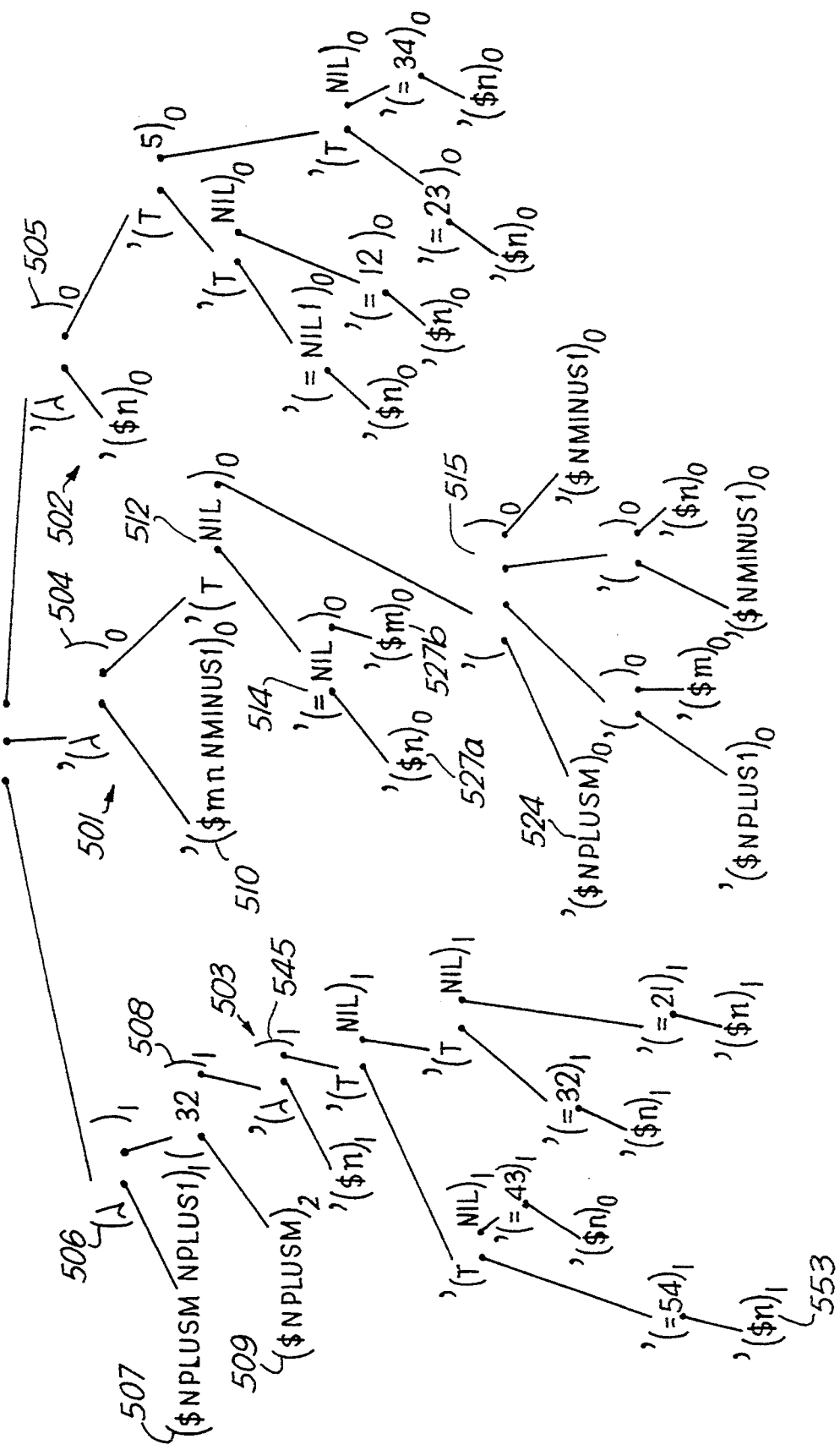
FIG. 29 is a diagram illustrating a stage in the use of the embodiment of FIG. 1 to evaluate a lambda expression.

FIG. 29 represents graphically the expression contents and relationships between cells 11 in the apparatus for computing the value of the expression NPLUSM when n=2 and m=3. Table 3 shows the lambda expressions in string form which are required and are embodied in the cells and relationships represented by FIG. 29.

symbols for primitive instructions, names of symbolic data, and values are indicated between the opening and closing brackets. Only a primitive instruction graphical symbol placed immediately to the right of an opening bracket represents a primitive instruction resident in the primitive register of the cell. Pointers to child cells are indicated by a dot between the cell brackets and a line extending to the cell pointed to. Cells in which the primitive instruction indicated is not to be executed are indicated by a quotation mark or apostrophe ' before the opening bracket. Such cells may be referred to as quoted cells. The primitive instruction indicated inside the brackets representing a quoted cell is therefore to be understood to refer to the inverted primitive instruction. For example T in a quoted cell represents NIL-TRUE. The positions of dots representing pointers is related to the binary tree arrangements in the following way. If there is no primitive instruction graphical symbol immediately to the right of the opening bracket, the dots from left to right between the brackets represent a tree 1 pointer, a tree 2 pointer, a tree 3 pointer, and a tree 4 pointer, and if there are fewer than four dots, the dots left to right start at tree 1 pointer and continue in numerical order of the trees, unless interrupted by values. If there is a primitive instruction in the primitive register, the left most dot is a tree 2 pointer and dots to the right continue in the order of the trees, unless interrupted by values. Where values such as 3, 2, or NIL occur in a cell, a tree is omitted from the numerical order of trees for the pointers. For example, a cell represented by (. 3 2 .) has a tree 1 pointer and tree 4 pointer, and a cell represented by (=. NIL .) has a tree 2 pointer and a tree 4 pointer. The names of symbolic data which appear in cells represented in FIG. 29 are NPLUSM, NPLUS1, NMINUS1, m, and n. Each cell containing one or more such data items has the symbol primitive $, or its inverted form (the inverted primitive instruction NIL-SYMBOL) in the primitive register. The names n and m are the names of parameters and, in the appropriate circumstances, are replaced by values or by operations that result in values. The names NPLUSM, NPLUS1, and NMINUS1 are the names of complex operations (functions) and have definitions. A group 501 of cells forms the definition of NPLUSM, another group 502 of cells forms the definition of NPLUS1, and a further group 503 of cells forms the definition of NMINUS1. The head cells, 504, and 505, of the first two of

TABLE 3

```
((LAMBDA (SYMBOL NPLUSM NPLUS1)
        ((SYMBOL NPLUSM) 3 2
        '(LAMBDA '(SYMBOL n)
                '(TRUE    '(EQUAL ' (SYMBOL n) 5 4)
                          '(EQUAL ' (SYMBOL n) 4 3)
                          '(EQUAL ' (SYMBOL n) 3 2)
                          '(EQUAL ' (SYMBOL n) 2 1)))))

'(LAMBDA '(SYMBOL m n NMINUS1)
        '(TRUE   '( EQUAL '(SYMBOL n) NIL '(SYMBOL m))
                 ' (' (SYMBOL NPLUSM )
                 ' (' (SYMBOL NPLUS1 ) '(SYMBOL m))
                 ' (' (SYMBOL NMINUS1) '(SYMBOL) n))
                 ' (SYMBOL NMINUS1))))

'(LAMBDA '(SYMBOL n)
        '(TRUE  '(EQUAL '(SYMBOL n) NIL 1)
                '(EQUAL '(SYMBOL n)  1  2)
                '(EQUAL '(SYMBOL n)  2  3)
                '(EQUAL '(SYMBOL n)  3  4) 5)))
```

In FIG. 29, individual cells 11 are represented by an opening and a closing round bracket. The graphical-these definitions are pointed to by pointers in a cell 500, which is of a type referred to herein as a function cell since it serves as the receiver of the final value resulting from an evaluation of a function, and holds the pointer to the function being evaluated. In the present example, the function which is to be evaluated is NPLUSM applied to the parameter values 3 and 2.

The finding of definitions in this detailed example differs from the methods described hereinbefore with reference to FIG. 25, and illustrates the use of dynamic scoping.

The function cell 500 also points to a cell 506 having the lambda primitive in its primitive register, and two pointers, a tree 2 pointer and a tree 3 pointer. The tree 2 pointer points to a cell 507 having a symbol primitive $ in its primitive register, and symbolic data, the names NPLUSM and NPLUS1, in its tree 2 and tree 3 symbol registers. The tree 3 pointer of the lambda cell 506 points to a cell 508 having a tree 1 pointer, values in the tree 2 and tree 3 pointer registers, and a tree 4 pointer. The tree 4 pointer points to the head cell of the definition 503 of NMINUS1. The tree 1 pointer points to a cell 509 that stores the name of the function NPLUSM. The values 3 and 2 in the cell 508 are the values of m and n for which NPLUSM is to be evaluated.

FIG. 29 substantially represents the contents of standard cells 12 of the apparatus 10 immediately after the loading of the cells by peripheral equipment (not shown) operating through a special cell 13 (not shown in FIG. 29). The cell 500 is a special cell 13.

For the configuration represented by FIG. 29, cell 509 must be the last to be loaded.

Figure 30:
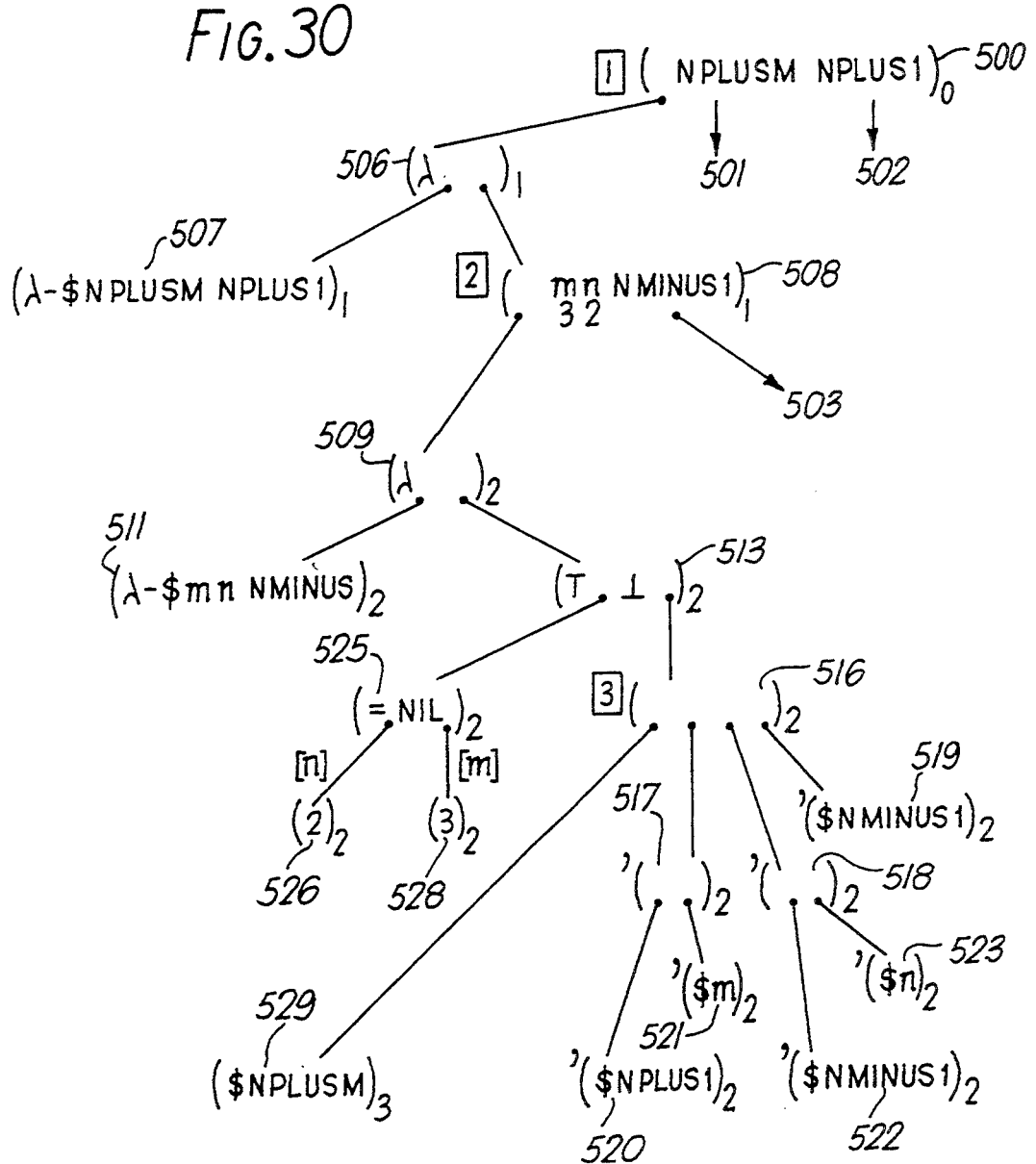
FIG. 30 is a diagram illustrating a stage in the use of the embodiment of FIG. 1 to evaluate a lambda expression.
Figure 31:
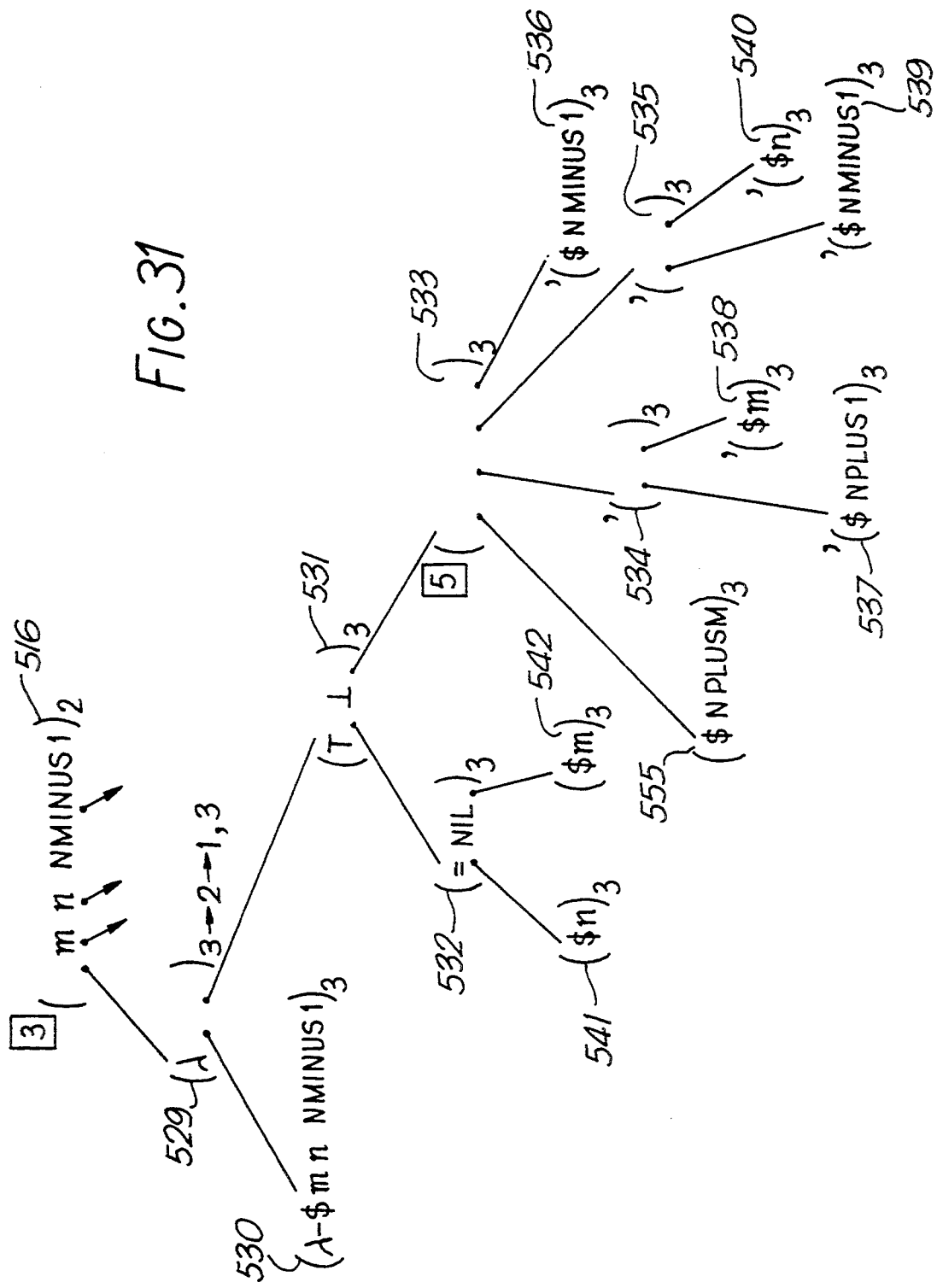
FIG. 31 is a diagram illustrating a stage in the use of the embodiment of FIG. 1 to evaluate a lambda expression.
Figure 32:
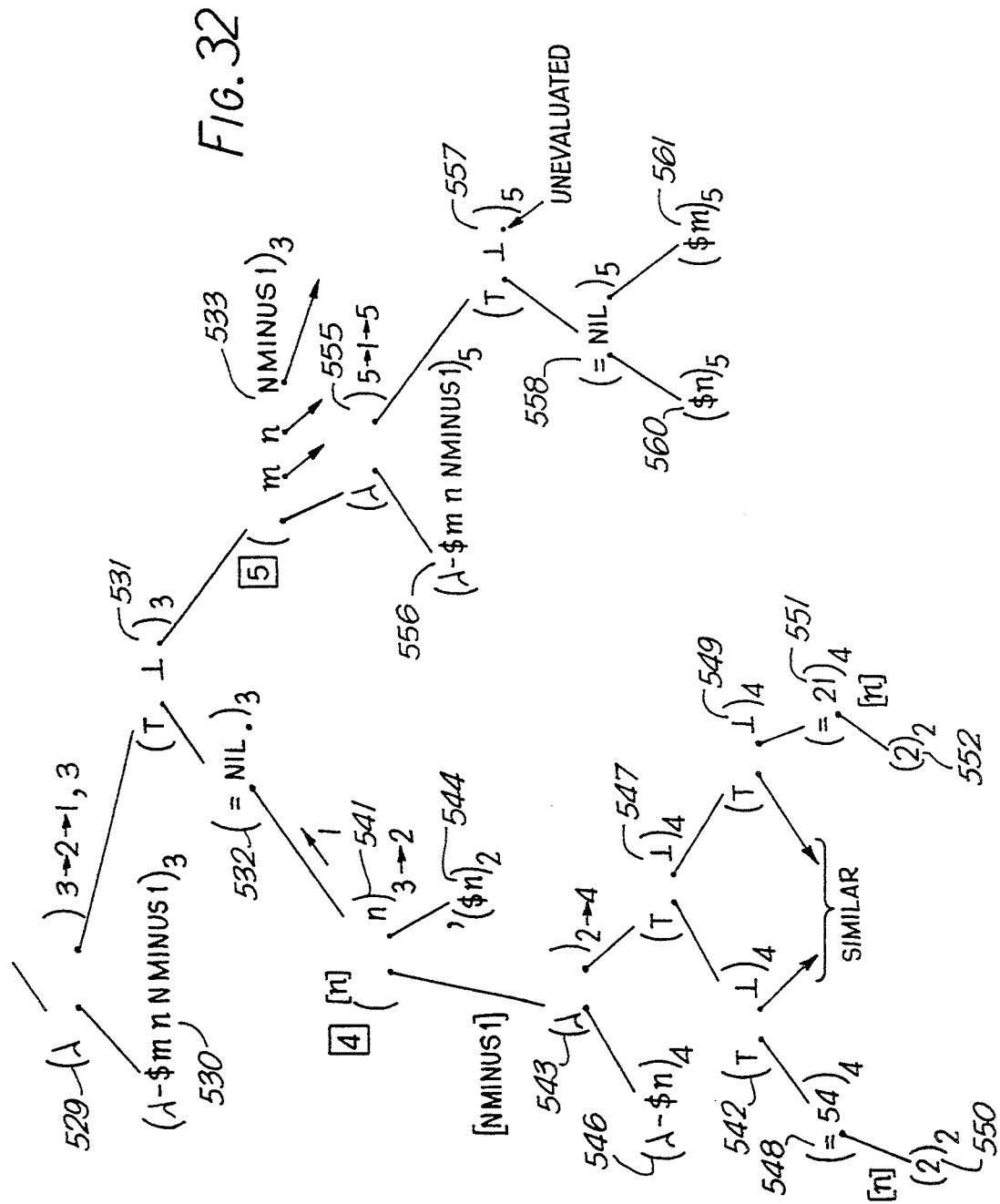
FIG. 32 is a diagram illustrating a stage in the use of the embodiment of FIG. 1 to evaluate a lambda expression.

FIGS. 30, 31, 32, and 33 represent the contents of cells of the apparatus 10 at times after the loading. In particular, FIG. 30 shows the first establishment of an active definition of NPLUSM by the cell 509 and partial evaluation of NPLUSM for n=2, m=3; FIG. 31 shows the establishment of a second active definition of NPLUSM by a cell 529; FIG. 32 shows a partial evaluation of the second active definition of NPLUSM, with n=1; and FIGS. 33 to 36 illustrate a third partial evaluation of NPLUSM with n=NIL, m=5. The function cell 500 and the cells 506, 507, 508 and 509 are shown in FIG. 30. The numerals 1 and 2, within a square, are shown adjacent the cells 500 and 508 to indicate their respective roles as head cells of lexicons 1 and 2. Lexicon 1 contains the definitions of NPLUSM and NPLUS1. Lexicon 2 contains final definitions of m, n and NMINUS1, as will be explained hereinafter.

Each cell when loaded can be provided with an own lexicon-head pointer in its own lexicon-head pointer register. The own lexicon-head pointer is a pointer to a cell that will store pointers to definitions needed by the cell storing the own lexicon-head pointer or to the first of a series of cells the last of which will store such pointers. In FIGS. 29 to 36, the own lexicon-head pointer is represented by a numeral subscripted to the closing bracket. The function cell 500 and the cells of the definitions 501 and 502 do not require further definitions, and are directly related by the pointers of the cell 500, and are therefore all given blanks (NIL) in their own lexicon-head pointer registers. These blanks are represented by a subscript zero.

The symbol cell 507 serves to supply the names (i.e. symbolic data), NPLUSM and NPLUS1, of the definitions 501 and 502 to the function cell 500. This operation is carried out as a response to transmission of the lambda primitive λ from the lambda cell 506 to the symbol cell 507, where the lambda-symbol primitive λ-$ is formed in the primitive register of the cell 507. The presence of the lambda-symbol primitive causes the cell 507 to transmit its symbolic data, the names NPLUSM and NPLUS1 in that order, to the lexicon-head cell pointed to by the lexicon-head pointer held in its own lexicon-head pointer register, which is the cell 500. The order in which cell 507 transmits NPLUSM and NPLUS1 indicates that NPLUSM is stored in the second symbol register and NPLUS1 is stored in the third symbol register. The cell 500 uses the order of the data to ensure that NPLUSM is stored in its own second symbol register, which is operatively associated with the tree 2 pointer, and NPLUS1 is stored in its own third symbol register, which is operatively associated with the tree 3 pointer. Thus NPLUSM is associated with a pointer to its definition 501, and NPLUS1 is associated with a pointer to its definition 502. These operations are completed before loading of cell 509. For convenience, FIG. 29 does not show this.

All of the lexicon-head pointers are tree 4 pointers. Hence the tree 4 own addresses of the cells which are lexicon-head cells provide the lexicon-head pointers.

The cell 509, which, as shown by FIG. 29, was initially loaded with $NPLUSM, responds to the presence of the symbol primitive $ in its primitive register by calling the lexicon-head cell to which its own lexicon-head pointer points, which in this case is lexicon cell 2, i.e. cell 508. Having established a route through tree 4 to cell 508 by the normal acquire process (high acquire signal), the cell 509 transmits its own tree 4 address and the symbolic data NPLUSM, which being the first symbolic data in the message indicates the tree 2 symbol register as origin to cell 508 which, using its address and identity comparator 26, compares NPLUSM with the symbolic data held in its own tree 2 symbol register. No match is found, since the called cell's tree 2 symbol register is empty at this stage, so cell 508 compares NPLUSM with the symbolic data held in its own tree 3 symbol register, finds again no match, and then compares NPLUSM with the symbolic data in its own tree 4 symbol register and again finds no match. The cell 508 therefore transmits, over the tree 4 route to cell 509, a NIL value and the pointer in its own lexicon-head pointer register, which in this case points to lexicon cell 1, i.e. cell 500. After receiving these data, cell 509 unlatches the tree 4 route to cell 508. The transmission of data is carried out non-destructively i.e. the contents of a register are read and a copy is transmitted. Transmission of a lexicon pointer includes transmission of additional data indicating that the pointer is a tree 4 pointer and that it is a lexicon pointer. The transmitted lexicon pointer received by cell 509 is stored in its new lexicon-head pointer register and the cell 509 calls the new lexicon head cell 500 and transmits through the consequent tree 4 route the symbolic data NPLUSM and its own tree 4 address. Since cell 500 has already received and stored NPLUSM from cell 507, the cell 500, on receiving a further NPLUSM from cell 509 and using its comparator 26, finds that the two names match and transmits back to cell 509 over the tree 4 route the tree 2 pointer to the cell 504 at the head of the definition 501 together with data identifying that pointer as a tree 2 pointer. On receiving this pointer, cell 509 stores the pointer in its new lexicon head register, unlatches the tree 4 route to cell 500 and then calls cell 504 through tree 2. Cell 504 responds by transmitting back to cell 509 its primitive instruction, and the contents of its pointer, symbol and own lexicon-head pointer registers. In the present case, cell 504 holds the NIL-LAMBDA primitive, and blanks in its symbol registers, and a tree 2 pointer and a tree 3 pointer. The cell 509 first inverts the NIL-LAMBDA primitive. Since the inversion produces a lambda primitive, the cell 509 does not utilize the own lexicon-head pointer sent by cell 504 but retains its own lexicon-head pointer to lexicon cell 2, i.e. cell 508. The cell 509 also retains a return pointer to cell 508 in its return pointer register. The purpose of the return pointer is explained hereinafter. Cell 508 holds a return pointer to cell 506, and cell 506 holds a return pointer to cell 500. In general, a child cell holds a return pointer to its parent cell.

The transmission of NIL-LAMBDA and the tree 2 and tree 3 pointers by cell 504 to cell 509 is part of a copy process whereby cell 509 copies the expression contents of the definition cell 504. The transmission includes of course additional data identifying which registers the tree pointers relate to so that the receiving cell 509 can store them in the correct registers. Having thus copied the expression contents of cell 504, cell 509 transmits a searching signal into tree 2 to locate a free cell. On establishing communication through a tree 2 route to a free cell, cell 509 transmits to this cell the lambda primitive λ, its own tree 2 address, its own lexicon-head pointer, and the tree 2 pointer originating from cell 504. The tree 2 pointer points to a definition cell 510 which is a tree 2 child of cell 504. The formerly free cell, cell 511 in FIG. 30, first transmits its own tree 2 address back to cell 509, calls cell 510, and copies the expression contents of cell 510, so that the expression contents of cell 511 become the symbol primitive $, tree 2 and tree 3 names m and n, and a tree 4 name NMINUS1. The lambda primitive λ inherited by the cell 511 from the cell 509 is stored in the spare register of the cell 511 until the copy process with cell 510 is complete. The cell 511 then combines the lambda primitive λ with the symbol primitive $ to form the lambda-symbol primitive λ-$ in its primitive register. The tree 2 address of the cell 511 transmitted to cell 509 replaces the tree 2 pointer to cell 510 in the tree 2 pointer register of cell 509.

Since cell 511 has become a lambda-symbol cell, cell 511 next calls to its own lexicon head cell, which is cell 508, and transmits m, n, and NMINUS1 to cell 508 for storage in the latter's tree 2, tree 3, and tree 4 symbol registers respectively, and then resets to the free state.

The cell 509 locates a further free cell through a tree 3 route, and this cell calls a definition cell 512 using the tree 3 pointer provided by cell 509. The formerly free cell, cell 513, copies the expression contents of cell 512 and thus obtains a true primitive T, which is immediately loaded into its primitive register, and a tree 2 pointer to a definition cell 514 and a tree 4 pointer to a definition cell 515. The cell 513 is supplied by the cell 509 with the own lexicon-head pointer of cell 509 to inherit as own lexicon-head pointer.

The process of forming an active copy of the definition 501 continues in this manner except that when the definition cell 515 has been copied by a cell 516, the latter cell 516 establishes at first only a tree 1 child cell 529.

The tree 1 child 529 of cell 516 is sent a true primitive T by the cell 516 and becomes an active copy of the corresponding definition cell 524, i.e. inverts the inverted primitive received from cell 524.

The tree 2 child of cell 513 is a cell 525 which establishes a tree 2 child cell 526 that is an active copy of a definition cell 527a, and subsequently a tree 4 child cell 528 that is an active copy of a definition cell 527b. These two cells 526 and 528 use their inherited own lexicon-head pointers, which point to lexicon cell 2, i.e. cell 508, and carry out substitution processes so that the cell 526 receives the value of n, which is 2, from the cell 508, and the cell 528 receives the value of m, which is 3, from the cell 508. In the substitution process, the cell 508 receives n from cell 526, compares the received n with the stored m and then the stored n, and transmits to cell 526 the value stored in the tree 3 pointer register, which is 2. Similarly, the cell 508 receives m from the cell 528, compares the received m with the stored m, and transmits to cell 528 the value stored in the tree 2 pointer register, which is 3.

When the cells 526 and 528 have received the respective values for n and m and stored them, these cells test the contents of their registers, find only a value, and transmit the respective values to the parent cell 525 using their respective return pointers, which are a tree 2 pointer and a tree 4 pointer, so that the parent cell 525 stores the value 2 in its tree 2 pointer register and the value 3 in its tree 4 pointer register. The cell 525 does not establish its tree 4 child cell 528 until it has received a value from its tree 2 child cell 526 and found a value, NIL, in its tree 3 symbol register. The cell 525, in response to an identity primitive, =, in its primitive register, then tests the contents of its registers and finds that it has values in all three argument registers i.e. the tree 2 symbol register, the tree 3 symbol register, and the tree 4 symbol register. The cell 525 is therefore able to evaluate its expression contents which it does by comparing the tree 2 symbol register contents with the tree 3 symbol register contents. Since identity is not found, the cell 525 does not transmit the contents of the tree 4 symbol register to its parent cell 513 but transmits NIL, thereby indicating a null result. The parent cell 513 stores the NIL value in its tree 2 pointer register. Since the cells 525, 526 and 528 have each transmitted their value or result to the respective parent cell, these three cells 525, 526, and 528 automatically reset themselves to the free state.

The tree 1 child 529 of cell 516 which becomes an active copy of the definition cell 524 is distinguished by being sent by the parent cell 516 to use as own lexicon-head pointer the tree 4 address of the parent cell 516, as indicated by the numeral 3 subscript to this child cell 529 and the numeral 3 in a square adjacent the cell 516, indicating that the cell 516 is the lexicon 3 head cell.

The cell 529 operates in the same way as the cell 509 (compare FIGS. 29 and 30) and becomes an active copy of the cell 504, which is the head cell of the definition 501 of NPLUSM. It will be noted that this definition 501 is recursive. In order to become a copy of the definition cell 504, the cell 529 calls the lexicon 3 head cell 516 using its own lexicon-head pointer and transmits NPLUSM, receives NIL and the own lexicon-head pointer of cell 516 in response and therefore calls lexicon 2 head cell 508 and transmits NPLUSM, receives NIL and the own lexicon-head pointer of cell 508 in response and therefore calls lexicon 1 head cell 500, transmits NPLUSM, and receives the tree 2 pointer to cell 504 from the cell 500. The lexicon pointer from the cell 508 replaces the lexicon pointer from the cell 516 as the new lexicon-head pointer in the cell 529 during the process of finding the lexicon head cell, cell 500, holding the matching symbolic data NPLUSM.

FIG. 31 shows cell 529 after that cell has copied the expression contents of definition cell 504, and has established the necessary tree 2 and tree 3 child cells 530 and 531. As soon as the cell 529 holds the lambda primitive λ rather than the symbol primitive $, the new lexicon head pointers are eliminated and the cell reverts to its own lexicon-head pointer to lexicon 3 head cell 516.

The cell 530 becomes an active copy of the cell 510, with an own lexicon-head pointer to lexicon 3 head cell 516. The cell 531 becomes an active copy of the cell 512, with an own lexicon-head pointer to cell 516. Cell 530 also receives the lambda primitive λ from cell 529 which is combined in cell 530 with the symbol primitive $, using the logic OR operation, to form the lambda-symbol primitive λ-$, and therefore transmits the symbolic data m, n, and NMINUS1 through a tree 4 route to cell 516 using its own lexicon-head pointer. These symbolic data are indicated in FIG. 30 as stored in the appropriate symbol register of the lexicon 3 head cell 516. At this point, the cell 516 establishes, in turn, a tree 2 child cell 517, a tree 3 child cell 518, and a tree 4 child cell 519. The three child cells established, respectively, through routes in trees 2, 3, and 4, are sent NIL primitives by the parent cell 516. Each of these child cells 517, 518, and 519 (FIG. 30) writes the inherited NIL primitive in its primitive register and, on receiving the inverted primitive from the corresponding definition cell, writes the inverted primitive in its primitive register in place of the NIL primitive. As a result, cells 517, 518, and 519 become further definition cells, and transmit the NIL primitive to their child cells, where needed, to ensure that their child cells 520 to 523 become definition cells.

Cell 531 establishes two child cells 532 and 533 which become respectively active copies of the definition cells 514 and 515. The cell 533 establishes a tree 1 child cell 555 and subsequently definitions through tree 2, tree 3, and tree 4 child cell processes, in the same way as described hereinbefore in relation to cell 516, so that groups of definition cells 534, 535, 536, 537, 538, 539, and 540 are established. The establishment of the tree 4 child cell 533 is actually delayed until the parent cell 531 receives a NIL from the tree 2 child cell 532.

Cell 532 establishes a tree 2 child cell 541 which becomes an active copy of the definition cell 527a, with own lexicon-head pointer to lexicon 3 head cell 516. The establishment of the tree 4 child cell of cell 532 is delayed as in the case of the cell 528 (FIG. 30). Cell 541 calls the cell 516 to find the definition of n. In this case, the definition is not simply a value, as was the case for cell 526 and for cell 528, but is a definition pointed to by the tree 3 pointer in the lexicon 3 head cell 516. Therefore cell 541 receives from cell 516 a pointer to cell 518, calls and copies the expression contents of cell 518, establishes two child cells 543 and 544 (FIG. 32), and supplies these two cells with the tree 1 and tree 2 pointers of cell 518 to cells 522 and 523. The cell 543 becomes an active copy of cell 522, and cell 544 becomes a passive copy of cell 523, i.e. a definition cell, as a result of the difference in processing described hereinbefore with reference to cells 516 and 533.

When the symbol cell 541 copies cell 518, cell 518 sends cell 541 its own lexicon-head pointer which in this case is a tree 4 pointer to lexicon 2 head cell 508. Cell 541 makes this received copy pointer its own lexicon-head pointer since the definition cell 518 has not sent an inverted lambda primitive.

In its new form, shown in FIG. 32, cell 541 is a function cell, so that its respective tree 2 child cell has the same own lexicon-head pointer as the parent cell 541, which is a pointer to lexicon 2 head cell 508. For the tree 1 child cell, the function cell 541 becomes the respective new lexicon head cell. The development of child cells from cell 541 is shown in part. The tree 1 child cell 543 becomes a copy of the cell 522 initially (not shown) with an own lexicon-head pointer to lexicon 4 head cell 541, so that the symbol NMINUS1 copied from cell 522 is transmitted for comparison first at cell 541, then at cell 508, where a match is found. Cell 543 therefore receives a tree 4 pointer to a lambda cell 545 (FIG. 29) which is the head cell of the definition of NMINUS1. Copying proceeds as described for the development of an active copy of NPLUSM in relation to cell 529 but in this case for the development of an active copy, composed of the cell 543 and cells 546, 547, 548, 549, 550, 551, 552, and others as indicated in FIG. 32, of NMINUS1. The cell 550 initially becomes a copy of a ($n) cell 553 in the definition 503 but with an own lexicon-head pointer to lexicon 4 head cell 541. The symbol n is therefore transmitted to the cell 541 for comparison where a match is found and the pointer to definition cell 544 is returned to the cell 550, which accordingly becomes a copy of the cell 544. This copy process includes copying the own lexicon-head pointer of cell 544, since cell 544 is not a lambda cell, so that cell 550 becomes a ($n) cell with an own lexicon-head pointer to lexicon 2 head cell 508. Cell 550 therefore transmits the symbol n to cell 508 which finds a match and returns the value 2. The same successive copying processes occur at all the other ($n) cells of the actve definition of NMINUS1, such as cell 552. As soon as these cells have received their values, they transmit them to their respective parent cells, which are the identity primitive cells of the definition. Since the values are all 2, only cell 551 transmits its third value to its parent cell 549, all the other identity primitive cells transmitting NIL since there is no identity between 2 and 3 or 4 or 5.

True primitive (T) cells, such as the cells 531, 547, and 549, which have no value associated with tree 1, transmit to their parent the first non-NIL value found in their tree 2, and tree 3 symbol registers, taken in that order, or transmit if both are NIL and their tree 4 register is empty, the value NIL, or the value in their tree 4 symbol register. Consequently in the present example, cell 549 transmits the value 1, received from cell 551, to cell 547, which accordingly transmits the value 1 to cell 543. Lambda primitive cells and function cells that receive values from their child cells pass those values on to the parent cells. Hence the value 1 is transmitted on by the cells 543 and 541 to cell 532. Since the cell 532 is an identity primitive cell and now has values in its tree 2 and tree 3 symbol registers, that cell will evaluate by comparing the said two values and, if they are identical, transmitting to its parent cell the value in its own tree 4 symbol register. However, the cell 532 will only transmit NIL to cell 531 since there is no identity between 1 and NIL in cell 532. The tree 4 pointer to definition cell 529 (FIG. 29) remains unused. The true primitive cell 531 simply stores the NIL value received from cell 532, establishes its tree 4 child cell 533, and waits for a value to be transmitted by the child cell 533.

The cell 533 is a function cell which has as its tree 1 child a cell 555 which, as indicated in FIG. 31, is initially a copy of the symbol cell 524 (FIG. 29) with an own lexicon-head pointer to the lexicon 5 head cell 533. By successive comparisons, the cell 555 eventually receives the tree 2 pointer to lambda cell 504 from cell 500, and copies cell 504, retaining the own lexicon-head pointer to lexicon 5 head cell 533. Thus a further active copy of the function NPLUSM is started and develops as indicated with cells 556, 557, 558, and 560 in FIG. 32. All the cells in this active copy initially have own lexicon-head pointers to lexicon 5 head cell 533. A tree 4 child cell 561 is also shown but is not present at this stage.

Figure 33:
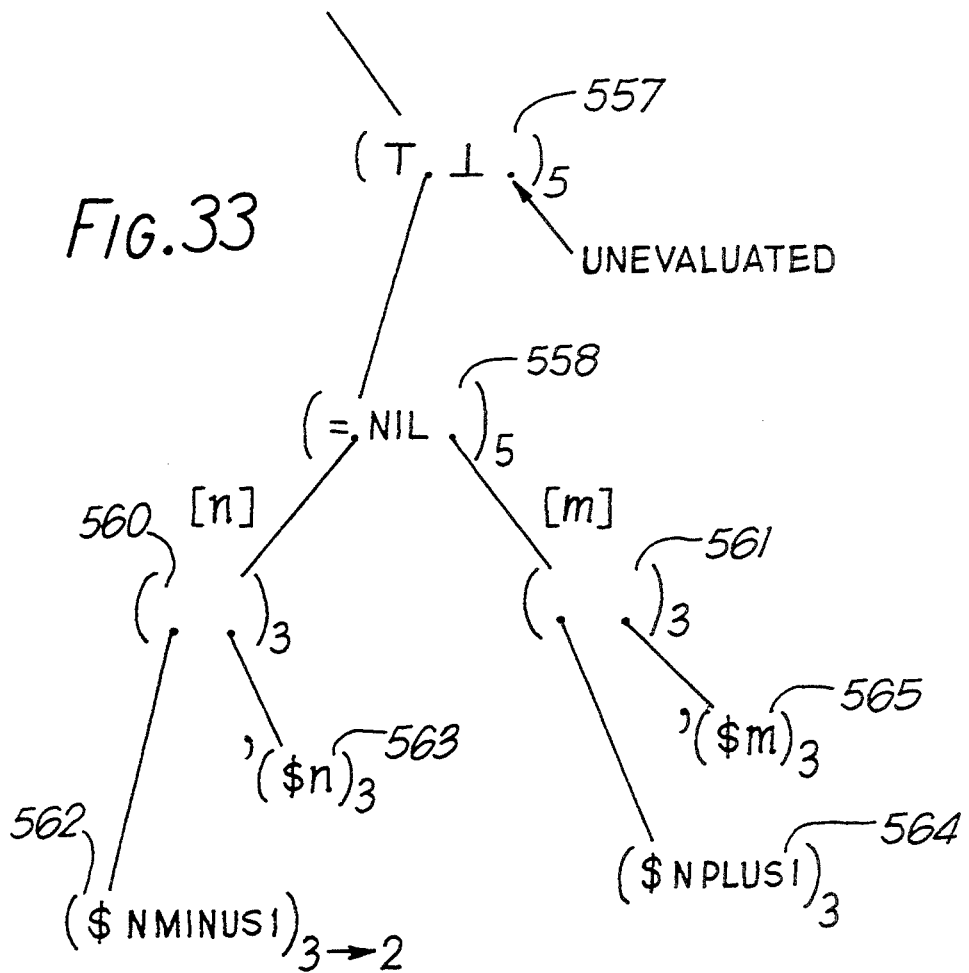
FIG. 33 is a diagram illustrating a stage in the use of the embodiment of FIG. 1 to evaluate a lambda expression.

FIG. 33 shows the cells 558, 560, and 561 again after the cells 560 and 561 have copied, respectively, the cells 535 and 534, and established child cells 562, 563, 564, and 565 which are copies of the definition cells 539, 540, 537, and 538 respectively. It will be noted that the cells 560 to 565 have by this process obtained own lexicon-head pointers to lexicon 3 head cell 516. The establishment of the tree 4 child cell 561 is delayed until the tree 2 child cell 560 has returned a value to the parent cell 558.

Figure 34A:
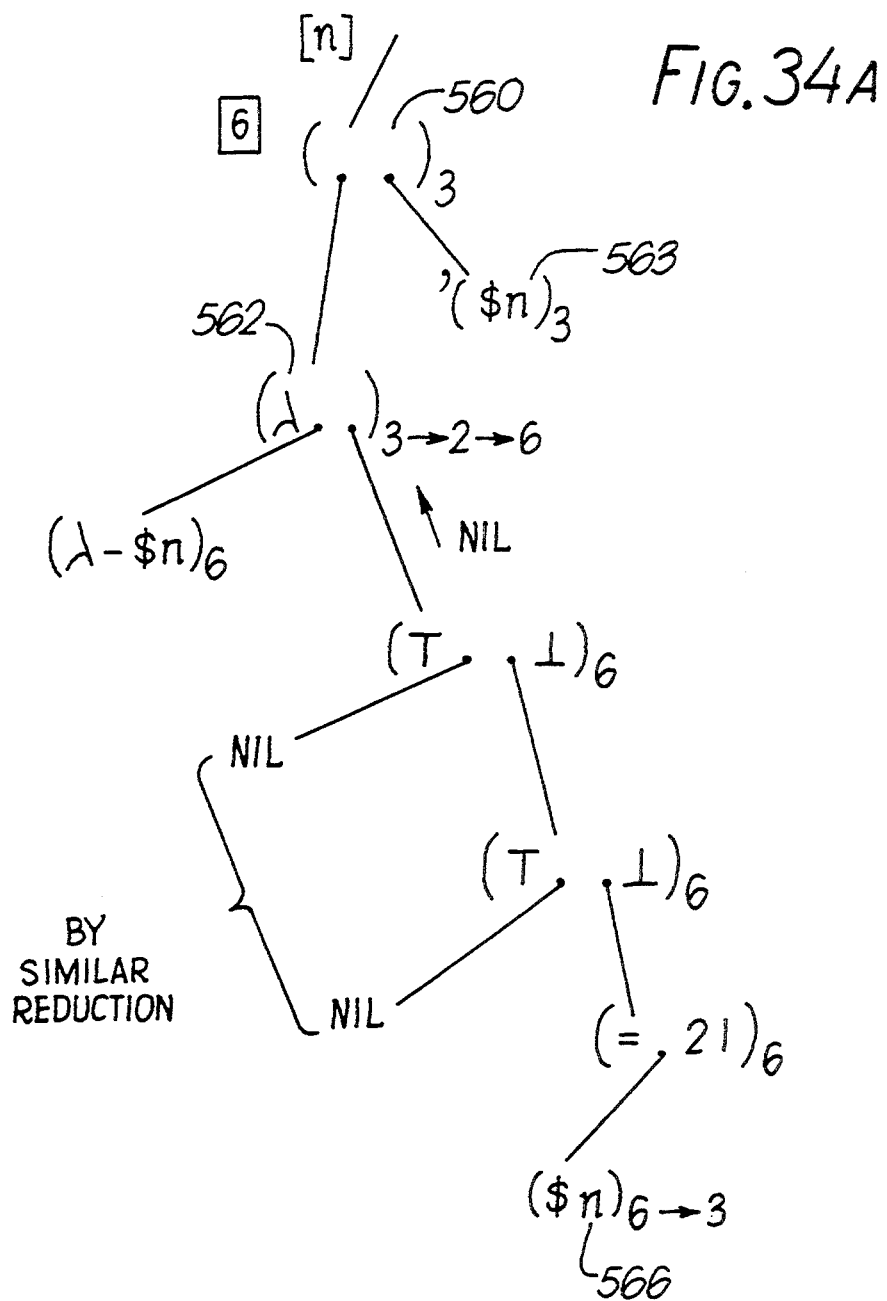
FIG. 34 is a diagram illustrating a stage in the use of the embodiment of FIG. 1 to evaluate a lambda expression.

FIG. 34A shows cells 560, 562 and 563 again after the cell 562 has become a copy of the corresponding lambda cell 545 as a result of the pointers received from lexicon head cells 516 and 508. In the case of cell 562, the call to cell 516 for a definition of NMINUS1 results in cell 562 copying cell 519 which in turn results in cell 562 calling lexicon 2 head cell 508 for a definition of NMINUS1.

Formation of the active copy of NMINUS1 as defined at 503 proceeds with cell 560 becoming the local lexicon head cell, which is denoted lexicon 6 head cell. Substitution for ($n) in NMINUS1 therefore results initially in copying of the cell 563, which has an own lexicon-head pointer to cell 516. One such cell for the function NMINUS1 is indicated in FIG. 34A, this cell being cell 566 for NMINUS1.

FIG. 35 shows cell 566 again after the cell has copied cell 518 from the definition of symbol n at cell 516. It will be seen that a further active copy of the function NMINUS1 results from the tree 1 child of of cell 566, corresponding to lambda cell 545 of definition 503. Cell 566 become local lexicon 8 head cell. The definition for symbol n given by lexicon 8 head cell 566 is ($n) with an own lexicon-head pointer to cell 508, so that the parameter n here becomes replaced by the value 2, as indicated at a cell 568. The parent cell of cell 568 therefore produces the value 1 and transmits this value to its own parent. The other identity primitive cells in FIG. 35 all produce NIL as their result. Therefore the function cell 566 receives the value 1 and passes this value to its parent cell which is an identity primitive cell for the value 2. Consequently this latter identity cell produces and transmits the value NIL, which is passed from child to parent. It will be seen from inspection of the definition of NMINUS1 that the active function in FIG. 34A produces only a NIL value at the function cell 560, which is therefore transmitted to the identity primitive cell 558 shown in FIGS. 33 and 32. The cell 558 at this point finds values in its tree 2 and tree 3 symbol registers and therefore establishes its tree 4 child cell 561.

Figure 34B:
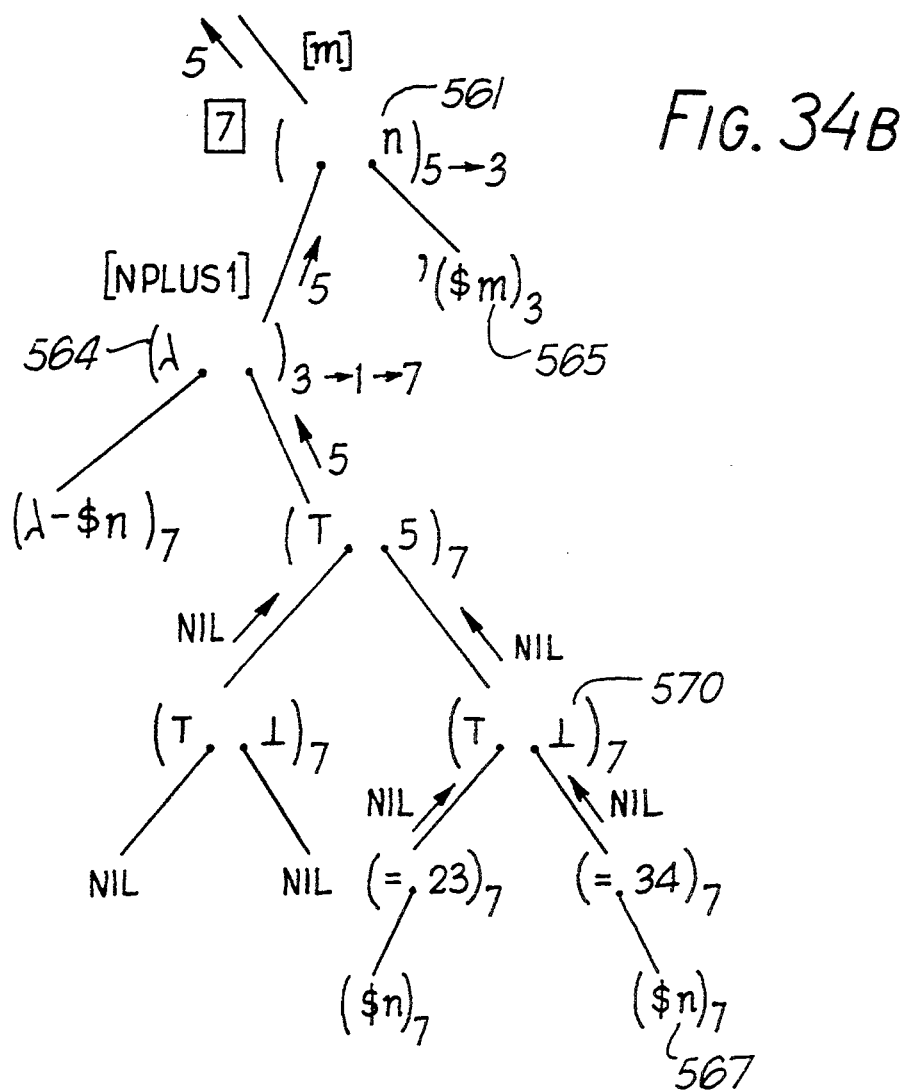
Figure 35:
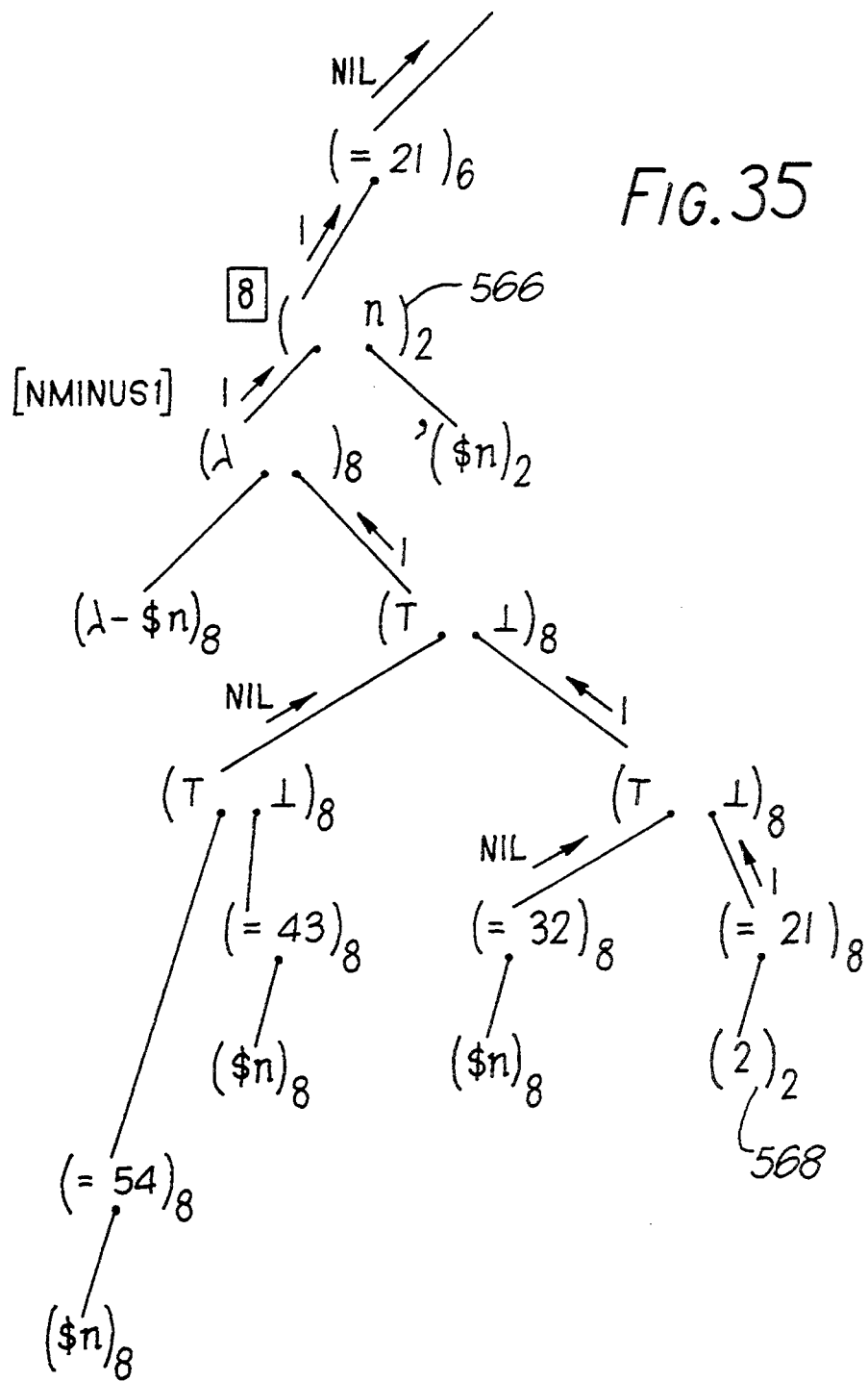
FIG. 35 is a diagram illustrating a stage in the use of the embodiment of FIG. 1 to evaluate a lambda expression.

FIG. 34B shows the cell 561 after it has become a copy of the definition cell 534 and established its child cells 564 and 565.

In the case of cell 564, the cell 564 calls cell 516, receives only a pointer to lexicon 2 head cell 508, calls cell 508, receives only a pointer to lexicon 1 head cell 500, and finally receives the pointer to lambda cell 505.

Substitution for ($n) in NPLUS1 results initially in copying of the cell 565, which also has an own lexicon-head pointer to cell 516. The result for one such parameter cell 567 will now be described with reference to FIG. 36.

Figure 36:
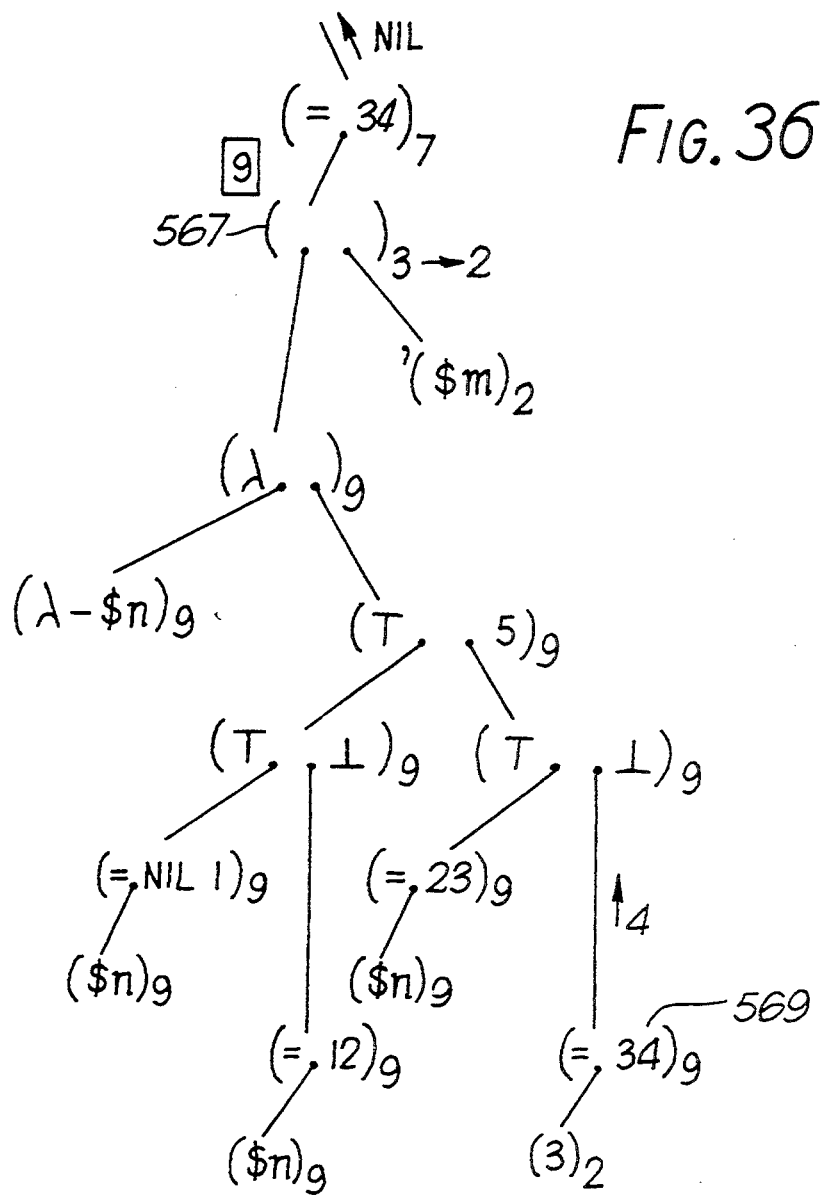
FIG. 36 is a diagram illustrating a stage in the use of the embodiment of FIG. 1 to evaluate a lambda expression.

FIG. 36 shows that the parameter cell 567 becomes a copy of the function cell 517 and acts as local lexicon 9 head cell for a further active copy of the function NPLUS1 in which the parameter is replaced by the value 3 from cell 508. As a result, all the identity primitive cells in FIG. 36 except a cell 569 transmit NIL to their respective parents. The cell 569 transmits the value 4, since 3 and 3 are identical, and the function cell 567 receives the value 4. From FIG. 34B it will be seen that the value from the cell 567 is compared with the value 3, and that therefore the parent of cell 567 transmits the value NIL to its own parent, which is a three value true primitive cell 570 (FIG. 34B). Other values generated by the active function NPLUS1 in FIG. 34B can be shown to be NIL. The tree 4 value of cell 570 is NIL, therefore since it receives NIL as its tree 2 and tree 3 values, the cell 570 transmits NIL to its parent cell 571 which is another three value true primitive cell. In this case the tree 4 value of the cell 571 is 5. Consequently the cell 571 transmits the value 5 which is passed up to the function cell 561. Hence the identity primitive cell 558 shown in FIGS. 33 and 32 receives the value 5 as its tree 4 value, and transmits this value to the cell 557.

The cell 557 therefore receives as its tree 2 value the value 5, and transmits this value to the lambda cell 555. Since the cell 557 now has a tree 2 value and a tree 3 value (NIL), it does not establish a tree 4 child cell, because of the conditional mode of operation of the true primitive cell 557 i.e. the rule that the values transmitted are the tree 2 and tree 3 values unless both are NIL, in which case the tree 4 value is obtained and transmitted whether or not NIL.

The lambda cell 555 (FIG. 32) passes the value 5 to the function cell 533, which is turn passes the value 5 to the true primitive cell 531. The latter cell 531 has been waiting for a value to replace the pointer in its tree 4 pointer register. As soon as this cell 531 receives the tree 3 value 5, it transmits that value to the lambda cell 529. From an inspection of FIG. 30 it will be seen that by the same process of transmission from child to parent, the value 5 ultimately reaches the function cell 500.

The cell 500 is an input/output type of special cell 13, and therefore makes the result value 5 available to the attached peripheral input/output equipment (not shown).

It will be seen from the example of computation described hereinbefore with reference to FIGS. 29 to 36 that a cell which serves as a function cell has, despite the fact that in initially only stores pointers and possibly values, a number of roles in the computation. A function cell points to a lambda primitive cell with its tree 1 pointer, and to one or more definitions with its tree 2, tree 3, and tree 4 pointers, if present. The tree 2, tree 3 and tree 4 pointer registers may store values instead of pointers. The lambda primitive tree 1 child cell initiates a process in which the tree 2 child cell of the lambda cell, which will be a symbol primitive cell, transmits its symbols to the function cell where they are stored in the appropriate symbol registers of the function cell to identify the values or pointers to be associated with those symbols. A pointer thus associated with a symbol will be a pointer to a definition, which may itself be a symbol requiring a further definition. A function cell also determines the own lexicon-head pointers of cells in the definitions to which the function cell points, these definition cells being given the same own lexicon-head pointer as the function cell, and determines the own lexicon-head pointers of its tree 1 child cell, the lambda cell, which is given the tree 4 address of the function cell as own lexicon-head pointer. This latter process ensures that the function cell becomes the local lexicon head cell, since the tree 3 child cell of the lambda cell inherits the same own lexicon-head pointer from the lambda cell, and each cell in the active definition headed by the lambda cell inherits the same own lexicon-head pointer. It should be noted however that when quoted definition cells, such as those making up the definitions 501, 502 and 503, including quoted symbolic definition cells such as the cells 553, 521, 527 and 518 are called to be copied, such cells transmit their own lexicon-head pointers which are or are not adopted by the calling cell depending upon the nature of the calling cell at the time of the process. The rule is that (i) if the calling cell is not a symbol primitive ($) cell, then the cell will not utilize the own lexicon-head pointer of the called definition cell but will retain the own lexicon-head pointer inherited from its own (i.e. the calling cell's) parent cell; (ii) if the calling cell is a symbol primitive ($) cell, then the cell will utilize the own lexicon-head pointer of the called definition cell, unless that cell is a lambda primitive cell (strictly, a NIL-LAMBDA cell since a quoted cell only has the inverse primitive instruction corresponding to the lambda primitive), in which the case the calling cell retains its own lexicon-head pointer. The second clause of this rule ensures that information required to enable cells to obtain the correct substitutions for their symbolic data is made available. In the example of FIGS. 31 and 32, cell 541 can be seen using the second clause of the rule.

Each active cell, i.e. a cell not in a quoted state, involved in a computation will either reset itself to the free state if and when it has carried out the operation determined by the primitive or other instruction held in its primitive register, or will reset to the free state in response to a message containing a resetting instruction from its parent cell. In some cases, a cell will be the parent cell of another cell that has not completed its own operation by the time that the parent cell is ready to reset to the free state. In such a case, the parent cell, before resetting to the free state, establishes a route through the network 14 to the child cell, using the pointer for that child cell, and transmits a transient high signal on the acquire signal line to the child cell, and then resets itself to the free state. When a cell is called by another cell, so that the route is formed by a high acquire signal, the reception by the called cell of a transient high acquire signal acts as an instruction to the called cell to set itself in the free state, which it will then do after, if necessary, transmitting a transient high acquire signal to each of its child cells. Such processes of resetting cells to the free state may be regarded as garbage collection by analogy with garbage collection in conventional functional programming in architectures using conventional memory.

A cell having the lambda primitive in its primitive register, such as the cells 506 and 509, must remain as a link in the chain of cells that passes the result or results up to the head function cell, such as the cell 500. A lambda cell therefore does not reset itself into the free state until it has returned a value received from its tree 3 child to its own parent, or receives a resetting command, the transient high acquire signal, from its own parent cell. Similarly a function cell does not reset itself to the free state until it has returned a value received from its tree 1 child to its own parent, or receives a resetting command from its own parent cell.

Figure 37A:
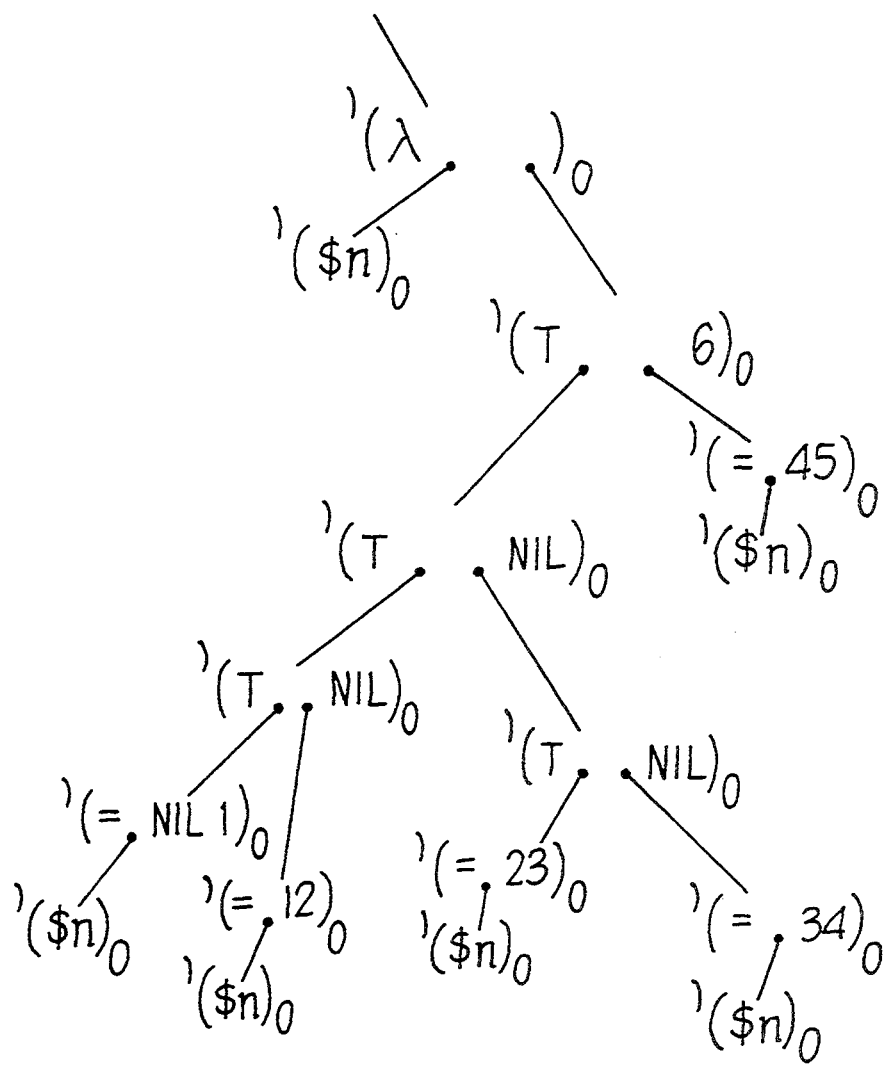
FIGS. 37A and 37B are diagrams illustrating definitions of function symbols NPLUS1 and NMINUS1 for the domain 0 to 6.
Figure 37B:
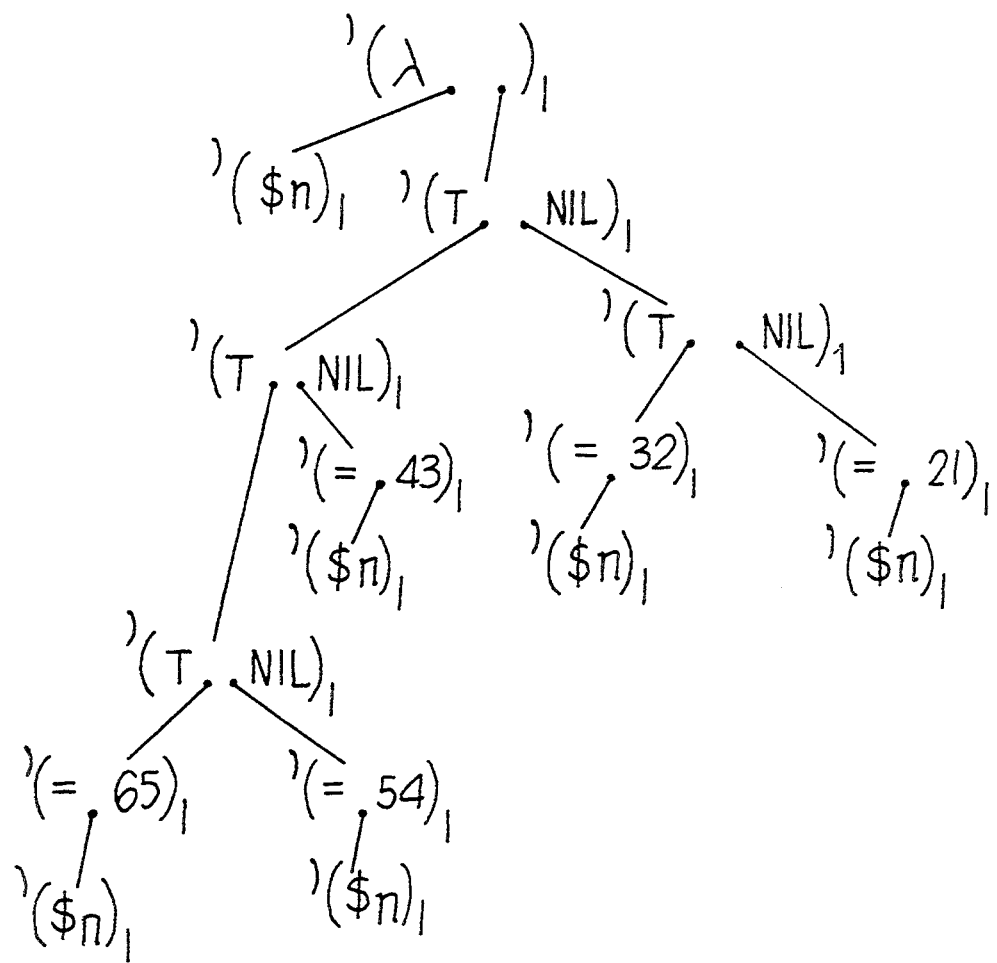

In FIG. 29 the definitions 502 and 503 of NPLUS1 and NMINUS1 are given for the domain 0 to 5 only. It will be apparent from the rules of operation of the primitive instructions TRUE and IDENTITY that the domain can be extended to any higher number. FIGS. 37A and 37B show respectively the definitions of NPLUS1 and NMINUS1 for the domain 0 to 6.

Figure 37C:
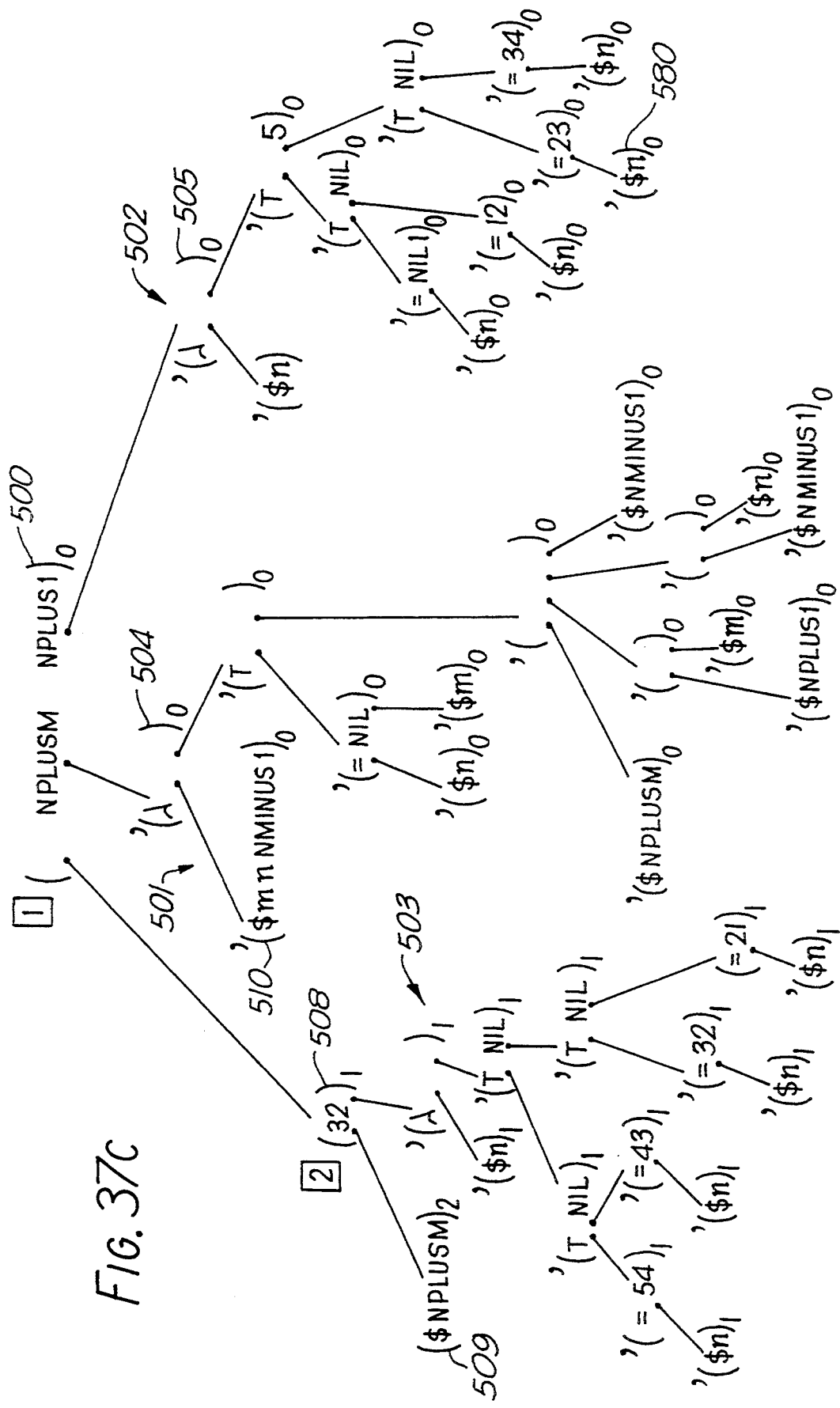
FIG. 37C is a diagram of an alternative starting state for the evaluation represented by FIGS. 29 to 36.

FIG. 37C shows an alternative initial loading to that of FIG. 29. In FIG. 37C the same reference numerals are used as in FIG. 29 to facilitate comparison. However, it will be understood that the cells represented in FIG. 37C are not necessarily the same cells as those represented in FIG. 29.

In FIG. 37C, there are no cells corresponding to the lambda cell 506 and the symbol cell 507 of FIG. 29. Cell 508 in FIG. 37C is made the tree 1 child cell of cell 500. Furthermore, the tree 2 and tree 3 symbol registers of the cell 500 are loaded initially with NPLUSM and NPLUS1 respectively. This initial loading of the symbol registers of the cell 500 removes the need for the actions of the lambda cell 506 and the symbol cell 507. To establish an initial loading such as that of FIG. 37C, all the cells shown in that figure are loaded by a special cell 13 (not shown) which is an input/output cell. The input mode of the special cell is used for the initial loading. The cell 500 has as its parent a special cell 13 (not shown) set to utilize its output mode. Alternatively the cell 500 may be a special cell 13 operating its output mode.

In the initial loading for FIG. 37C, the quoted cells are loaded before the active cells 500, 508, and 509, which are finally loaded in the order cell 500, cell 508, and cell 509. Such a sequence of loading ensures that cell 509 is able to carry out its operation as a symbol cell that becomes a lambda primitive cell. If the loading is carried out one cell at a time, it is preferable to start with a quoted cell remote from the head function cell 500, such as the definition cell 580. For example, the loading may be carried out in a sequence corresponding to reverse normal form in relation to Table 3 modified to take into account the absence of the cells 506 and 507.

Figure 37D:
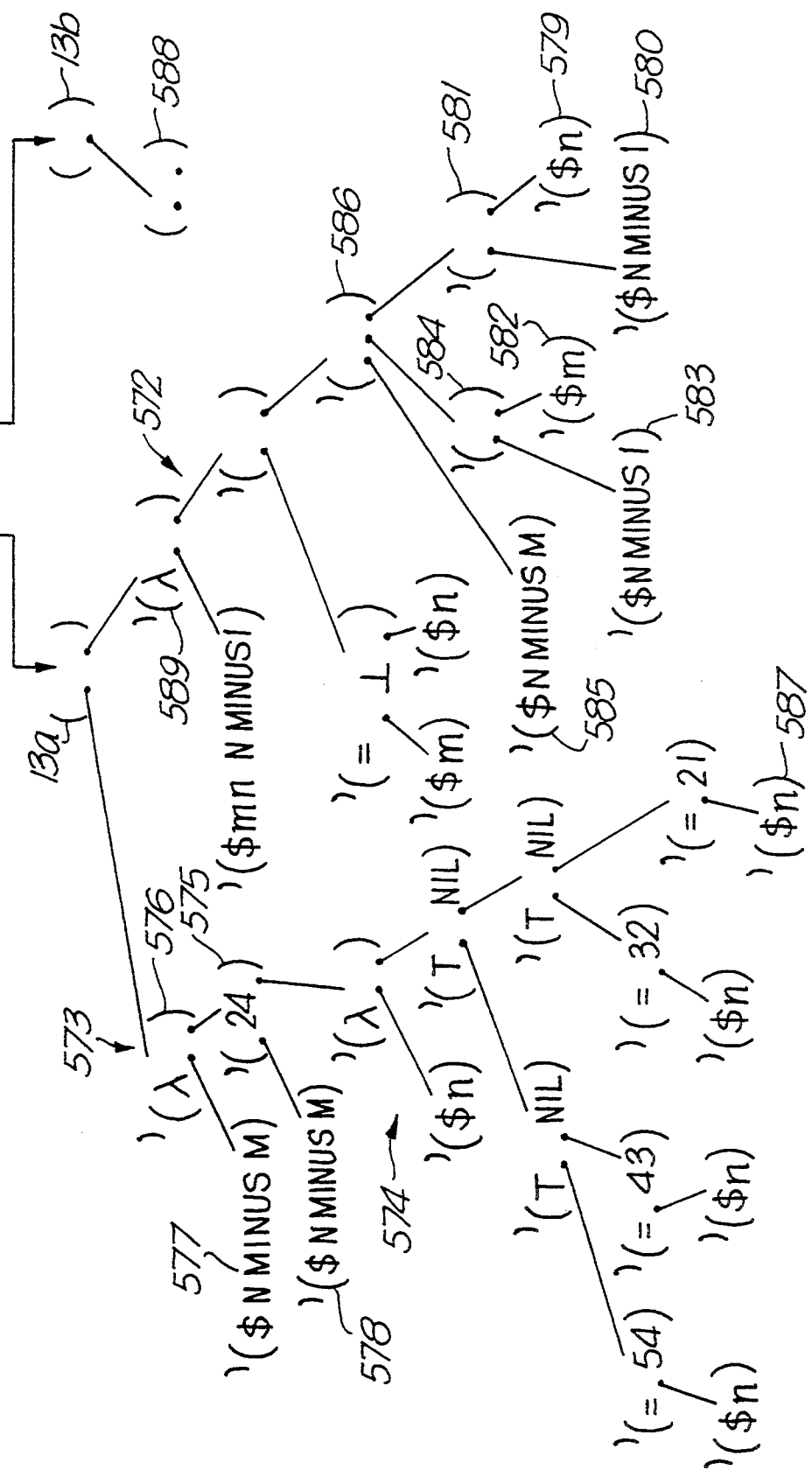
FIG. 37D, is a diagram illustrating loading of cells of the embodiment of FIG. 1 to compute a function NMINUSM for parameters n=4, m=2.

FIG. 37D illustrates a loading procedure for cells to be the starting configuration of an evaluation of the difference between two integers n and m where, in this example, n=4 and m=2. The difference function is called NMINUSM and makes use of the predecessor function NMINUS1. Peripheral equipment in the form of a workstation 571 is used to communicate with a special cell 13a that is operated to load a group 572 of fourteen formerly free cells as quoted cells forming a definition of the difference function NMINUSM, and another group 573 of seventeen formerly free cells as quoted cells, the group 573 comprising a structure including a definition 574 of the predecessor function NMINUS1, a quoted function cell 575 containing the values 4 and 2 of the parameters n and m, a quoted λ-cell 576, and two quoted symbol cells 577 and 578.

In carrying out the loading procedure, the workstation 571 translates the symbol string sequence

```
'(λ'($ m n NMINUS1)
    '(T' ( = ' ($ m ) NIL'($ n))
        ' (T ' ($ NMINUSM)
            ' (T '($ NMINUS1)'($ m))
            ' (T '($ NMINUS1)'($ n)))))
``` into control instructions for the special cell 13a which in response constructs the quoted group 572. The special cell 13a uses searching signals to find free standard cells to form the group 572, and loads the first such free cell with '($n) as a cell 579. The next free cell is loaded with '($NMINUS1) and becomes a cell 580. The cells 579 and 580 are established by searching signals from the special cell 13a on tree 2 and tree 1 respectively since cell 13a requires the tree 2 own address of cell 579 and the tree 1 own address of cell 580 for storage in the next cell, a cell 581, which is to be established as '(..) where the tree 1 and tree 2 pointers are pointers to cells 580 and 579 respectively. Cell 581 is established by a searching signal on tree 3 to provide a tree 3 pointer which is stored by the special cell 13a until the next four cells, 582, 583, 584, and 585 are established, and is then supplied to the next cell, 586, to be established. Cell 586 is loaded with a tree 1 pointer to cell 585, a tree 2 pointer to cell 584, and the tree 3 pointer to cell 581. Thus each cell used by the special cell 13a in forming the group 572 is established by means of a searching signal on the tree for which a pointer is required by the parent cell of the cell being established. The group 573 is established in the same way, starting with a cell 587.

In establishing the quoted group 573, the workstation 571 translates the symbol string sequence

```
'(λ'($ NMINUSM )
    '(T'  ( $ NMINUSM) 2 4
        ' ( λ ' ( $ n )
            ' ( T ' ( = '($n)54)
                ' ( = '($n)43)
                ' ( = '($n)32)
                ' ( = '($n)21)))))
``` into control instructions for the special cell 13a which in response constructs the quoted group 573 from free standard cells.

As will be explained hereinafter, the cells of groups 572 and 573 are prevented from treating as copy addresses the pointers that they are supplied with by the special cell 13a.

After the cell 13a has been used to establish the groups 572 and 573, the workstation establishes, through another special cell 13b, by searching through tree 1 for another free cell, an active function cell 588 loaded with the tree 1 pointer of cell 13a to cell 576 and the tree 2 pointer of cell 13a to the head cell 589 of the group 572. The loading of the active cell 588 is achieved by the special cell 13a sending to cell 588 as inherited data a TRUE primitive and a copy address which is a pointer to the first special cell 13a through any of trees #1, #2, and #3. The formerly free cell 588 then copies cell 13a. The special cell 13b then remains as parent of cell 588 and output cell for the function to the workstation 571. The active cell 588 begins by establishing a tree 1 child, not shown, which inherits the tree 1 pointer to cell 576 as copy address and proceeeds to convert itself, by the copy procedure, into an active copy of the λ-cell 576, which subsequently forms a tree 1 child (not shown) that becomes at first an active copy of the symbol cell 577, and then a λ-symbol cell which sends its symbol NMINUSM to the function cell 588. The function cell 588 thereupon establishes a free cell on tree 2 as a tree 2 child (not shown) with the tree 2 pointer to the λ-cell 589 as copy address. The tree 2 own address of this tree 2 child replaces the tree 2 pointer to cell 589 in cell 588. The group 572 is then copied into another group, headed by the copy of cell 589, so that this new group can serve as the definition of NMINUSM pointed to by the new tree 2 pointer in cell 588. The tree 1 child (not shown) of cell 588 then establishes a tree 2 child as an active copy of cell 575 and the copying process continues, an active copy of cell 578 initiating the first evaluation of NMINUSM. The sequence of evaluations of NMINUSM proceeds in accordance with the rules of cell behaviour illustrated by FIGS. 29 to 36 until the value 2 is finally transmitted to the cell 588 by its tree 1 child and relayed by cell 588 to the special cell 13b which serves as parent to cell 588. The special cell 13b passes this final value to the workstation 571 for storage and display.

The workstation 571, in this example, is a personal computer of a kind capable of handling LISP-like software, and adapted to communicate with special cells 13.

The special cell 13a can be released for other purposes once the two quoted Groups 572 and 573 have been formed and the tree 1 and tree 2 own addresses of cells 576 and 589 respectively received for use as pointers by the cell 588.

FIG. 38 illustrates schematically the structure of a special cell 13 with input and output means to a peripheral computer (not shown) from which the cell 13 can be loaded and to which results transmitted through the network 14 to the cell 13 can be passed. The special cell 13 differs from a standard cell 12, shown in FIG. 2, in lacking circuitry associated with the transmission of the free signal into the network 14. Instead of a free signal circuit, the special cell 13 provides only a terminal (not-shown) held permanently low for each free signal line 62L or 62R of the four network nodes to which its network ports are connected. The special cell 13 has, in addition to the four sets of outgoing and incoming acquire signal, address/data signal, and acknowledge signal lines, connected respectively to its four network ports, a fifth set 590 of such lines and a free signal line 62 which are connected directly to a data transfer interface 591 which interfaces the fifth set 590 of cell signal lines to a peripheral computer (not shown). The special cell 13 is able to call any other cell of the apparatus using the normal high acquire signal and low address/data signal followed by the pointer data and the high acquire signal, and is able to search for a free cell by using a high address/data signal and a low acquire signal. The cell 13 cannot become accessible as a free state cell to other cells since it does not transmit a free signal into the network 14. Data transfer transactions at the interface 591 take precedence over other transactions in the cell 13. Whenever the cell 13 enters the free state, the free signal on the line 62 is coupled by the interface 591 to the peripheral computer (not shown) as a signal indicating that the cell 13 is free to be loaded.

Once the final result from a computation has been output by a special cell as illustrated, for example, by FIG. 37D, the output special cell 13 can be cleared by being set in the free state either automatically or by a transient high acquire signals from the respective interface 591 and is thus made ready for any other use.

Figure 39:
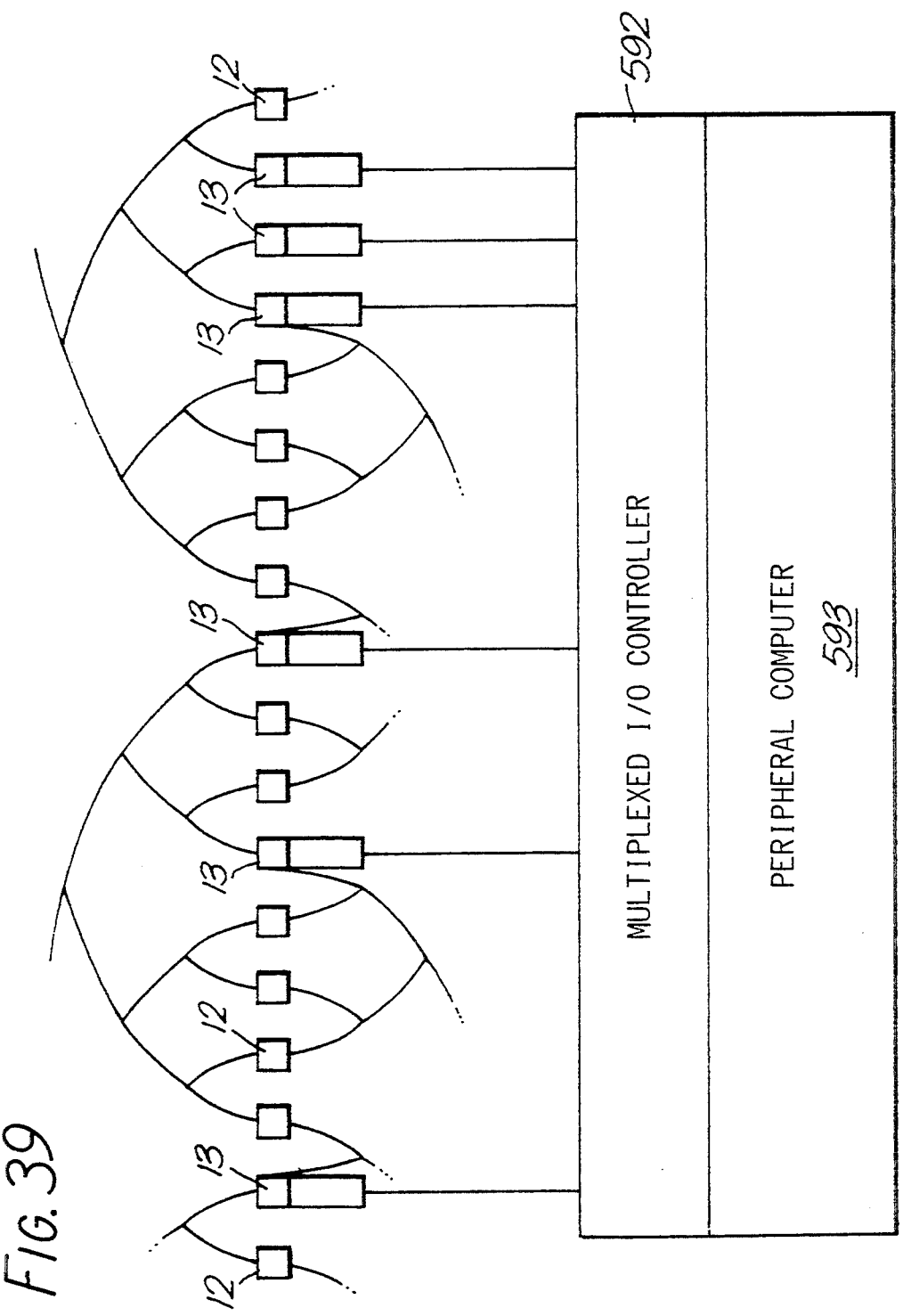
FIG. 39 is a block diagram of connections between a peripheral computer used as an input and output device and special cells of the embodiment of FIG. 1.

For loading complex data structures into large groups of standard cells 12, several peripheral computers communicating with several special cells 13 may be used. If suitable peripheral computers are used, then each may be adapted to load a plurality of special cells 13 by being coupled through a plurality of channels to the special cells 13. FIG. 39 illustrates schematically such an arrangement where one peripheral computer is coupled to six special cells 13. With appropriate circuits to form a multiplexed input/output controller 592, the peripheral computer 593 may be an IBM PC, a Xerox 1186, or a Sun 360, for example. The peripheral computer must be able to translate a string form of a functional expression, such as that shown in Table 3, into the data forms required in the various registers of the special cells 13. The multiplexed input/output controller 592 allows the peripheral computer 593 to supply these data forms to the respective special cells 13 serially with suitable additional data indicating register destinations where necessary, and control instructions for controlling the special cells 13 in establishing the loading of free standard cells 12.

The decoder-controller 16' of a special cell 13 includes, in addition to the capabilities of the decoder-controller 16 of a standard cell 12, the ability to decode and respond appropriately to a LOAD instruction which causes the special cell 13 to search for a free standard cell 12 and load it with an inverted primitive and data making the formerly free cell 12 a definition cell, or with the true, T, primitive and pointers, as in the case of cell 13b (FIG. 37D)

Executive logic processes of a standard cell 12 of the apparatus of FIG. 1 will now be described with reference to FIGS. 40 to 64, which are graphical representations of steps and decisions in the executive logic processes. In FIGS. 40 to 64, a decision is represented by a branch point in the graphical form, with one branch from the branch point representing a positive decision (or outcome to a test) and being accordingly associated with logic value 1, and the other branch from the branch point representing a negative decision (or outcome to the test) and being accordingly associated with logic value 0.

Figure 40:
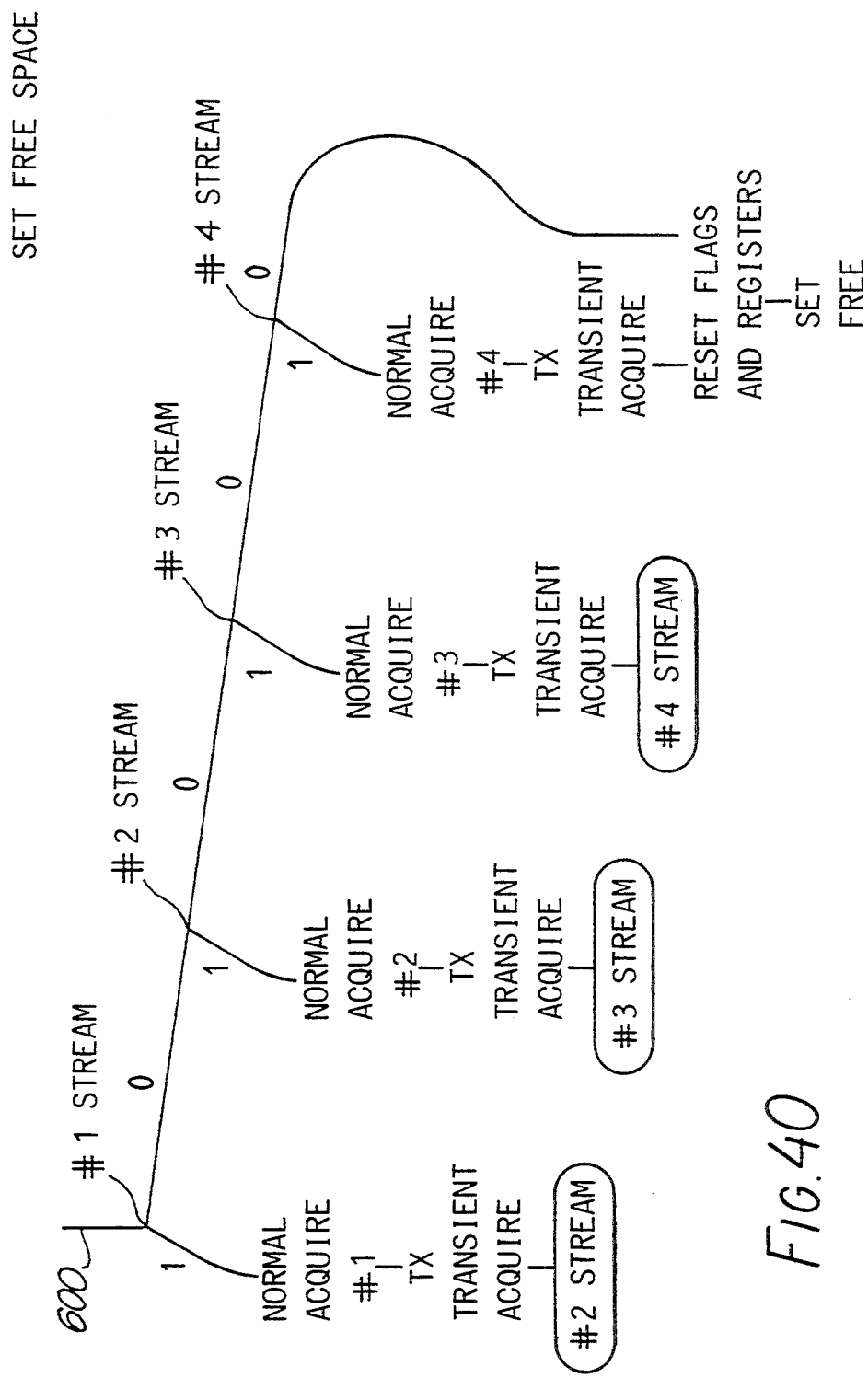
FIG. 40 is a graphical representation of steps and decisions in executive logic processes in a processor cell of the embodiment of FIG. 1.

FIG. 40 represents the process by which a standard cell 12 enters the free state from any other operative state. The cell 12 starts on the process of FIG. 40, referred to hereinafter as the SET FREE SPACE routine, at a point 600 either as a result of the cell receiving a transient high acquire signal, or as the termination of another process. The cell has four flags, referred to hereinafter as stream flags, which indicate whether or not the cell is to be ready to receive one or more data words at any of its four ports, which provide respectively the four sets of incoming channel 55 and outgoing channel 56 (FIG. 2) and their free signal line 62, corresponding to the four binary trees of the network 14. The four binary trees 1 to 4 are referred to in FIGS. 40 to 64 as #1, #2, #3, and #4 respectively. The four stream flags are associated respectively with the four ports and therefore with the four binary trees, and in FIG. 40 this is indicated by referring to the flags as #1 STREAM, #2 STREAM, #3 STREAM, and #4 STREAM.

Following entry into the SET FREE SPACE routine at the point 600, the first test or decision point is whether or not #1 STREAM is set, i.e. whether or not that flag indicates that one or more data words is expected at #1 port. If the flag is set (logic 1), meaning yes, the director section of #1 port transmits a normal acquire signal to the tree 1 child cell and, without waiting to receive an acknowledge signal in reply, transmits a transient high acquire signal to the tree 1 child cell, then jumps to a decision (branch point) to test whether #2 STREAM is set or not. If #1 STREAM is not set, the cell passes immediately to the #2 STREAM branch point. The logic 1 branch from the #2 STREAM branch point follows the same procedure as the logic 1 branch from the #1 STREAM branch point but in relation to the tree 2 child cell, ending with a jump to a #3 STREAM branch point. All four stream flags are dealt with in the same manner, as will be seen from FIG. 40, except that the logic 0 branch for #4 STREAM, and the end of the logic 1 branch for #4 STREAM are formed by the steps of resetting the cell registers to zero, and setting the cell flags, except the flag for indicating the free state, to zero, the free state flag being set to logic 1 so that all four ports of the cell transmit the free signal into the respective four binary trees of the network 14. The latter step is indicated in FIG. 40 by SET FREE.

Figure 41:
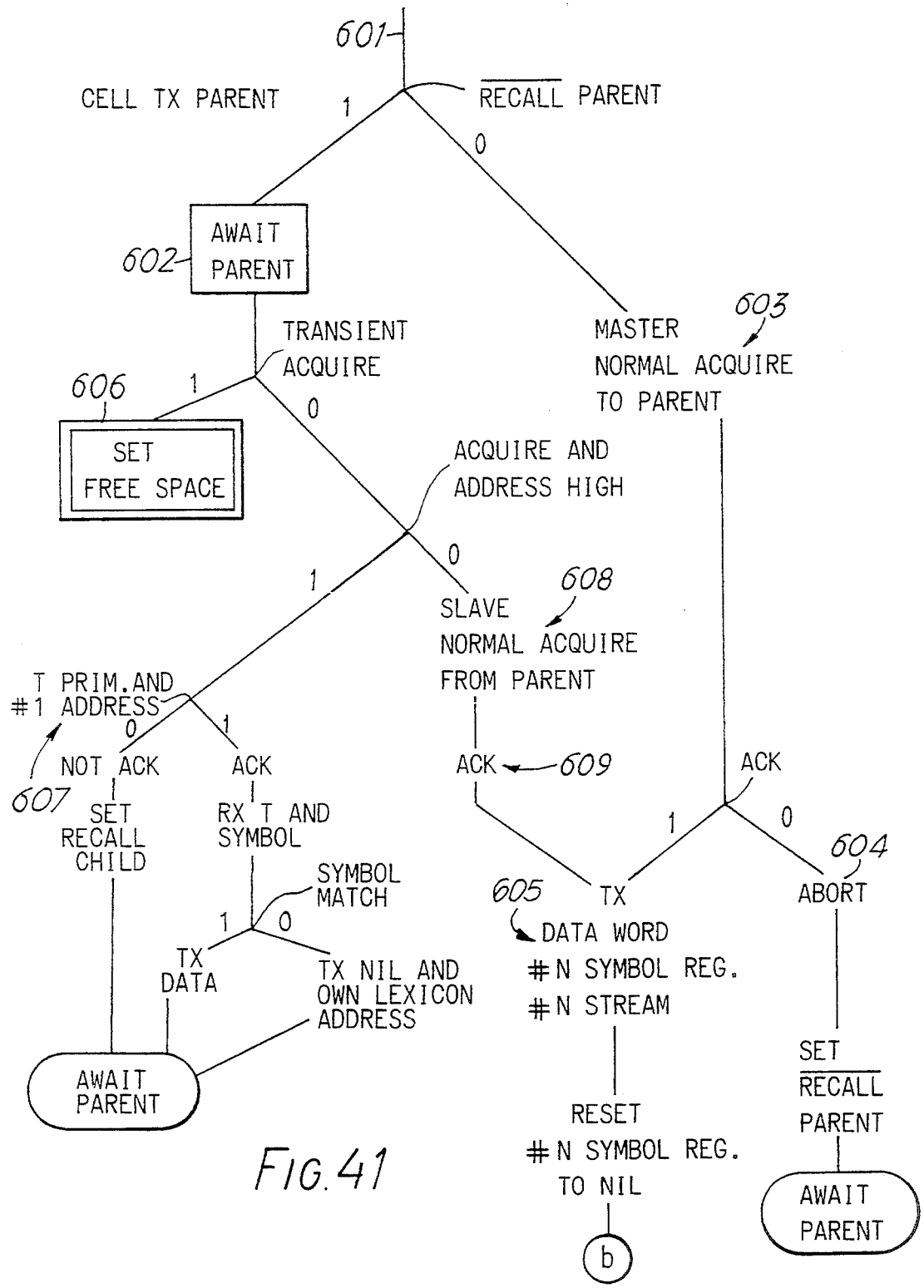
FIG. 41 is a graphical representation of steps and decisions in executive logic processes in a processor cell of the embodiment of FIG. 1.

FIG. 41 represents the process by which a standard cell 12 transmits a data word to its parent cell. This process is referred to hereinafter as the CELL TX PARENT routine, and involves the use of the return pointer of the cell to call its parent cell through whichever binary tree of the network 14 the cell was originally made a child cell by the parent cell. The port of the child cell through which the child cell transmits and receives communications on the binary tree through which the child cell was originally made a child cell of the parent cell is referred to herein as the master port. The CELL TX PARENT routine is entered at a point 601 at which the cell has a value to be transmitted to its parent cell. The cell has a $\overline{\text{RECALL PARENT}}$ flag which, when set, causes the cell, following the entry at 601, to not call the parent cell, i.e. to wait for a call from the parent cell, as indicated by an AWAIT PARENT block 602. If the $\overline{\text{RECALL PARENT}}$ flag is not set, the cell, in a step 603, calls the parent cell by transmitting a normal acquire to that cell, using the return pointer, which-in this example is the address of the parent cell on the aforementioned binary tree. If the parent cell is busy, it does not acknowledge the call, and the calling cell, in a step 604, aborts the attempt to transmit to the parent cell, then sets the $\overline{\text{RECALL PARENT}}$ flag and returns to the AWAIT PARENT state 602. If the parent cell is not busy when it receives the calling signal, it responds with an acknowledge pulse, and the calling cell transmits, in a step 605, a data word from its #N symbol register, i.e. the symbol register associated with the binary tree, N, and the value of the #N STREAM flag to indicate whether there will be at least one further data word to be transmitted. The calling cell then resets the contents of its #N symbol register to NIL, and leaves the CELL TX PARENT routine at a point b. If the cell has set in the AWAIT PARENT state 602, on receiving any calling signal at any of its ports, the cell first tests whether the calling signal is immediately followed by a transient high acquire signal. If there is a transient high acquire signal, the cell enters the SET FREE SPACE routine at 606. If there is no transient high acquire signal, the cell next tests whether the high acquire signal is accompanied by a high address/data signal, since such a signal indicates that the cell is being called by a child cell. If there is an accompanying high address/data signal, the cell branches to a test 607 at which the cell tests whether its primitive is TRUE, T, and whether there is a pointer in its tree 1 pointer register. If the result of this test 607 is yes, then the cell is a function cell and the calling signal being received is from a symbol cell, and therefore the cell acknowledges the call, receives TRUE, T, and the symbol, and compares the received symbol with any symbols stored in its symbol registers #2, #3, and #4. If the symbol received does not match any of the stored symbols, the cell transmits NIL and its own lexicon head pointer to the symbol cell and returns to the AWAIT PARENT state 602. If one of the stored symbols matches the received symbol, the cell transmits the corresponding stored pointer to the symbol cell and returns to the AWAIT PARENT state 602. If at the test 607 the result is negative, the cell does not transmit an acknowledge pulse, as indicated by NOT ACK, and proceeds to set a flag to recall the calling child cell, as indicated by SET RECALL CHILD, and returns to the AWAIT PARENT state 602. If there is no accompanying high address/data signal, the cell proceeds to a step 608 at which it prepares to receive the call from the parent cell, then transmits an acknowledge pulse 609, and then executes the step 605 and the following steps to point b.

The value of the #N STREAM flag is 1 if the cell has a value in any of its other symbol registers to be transmitted to the parent cell, or if the cell is waiting for one or more values to be transmitted to it by one or more of its own child cells, i.e. cells which are grand children in relation to the parent cell.

Figure 42:
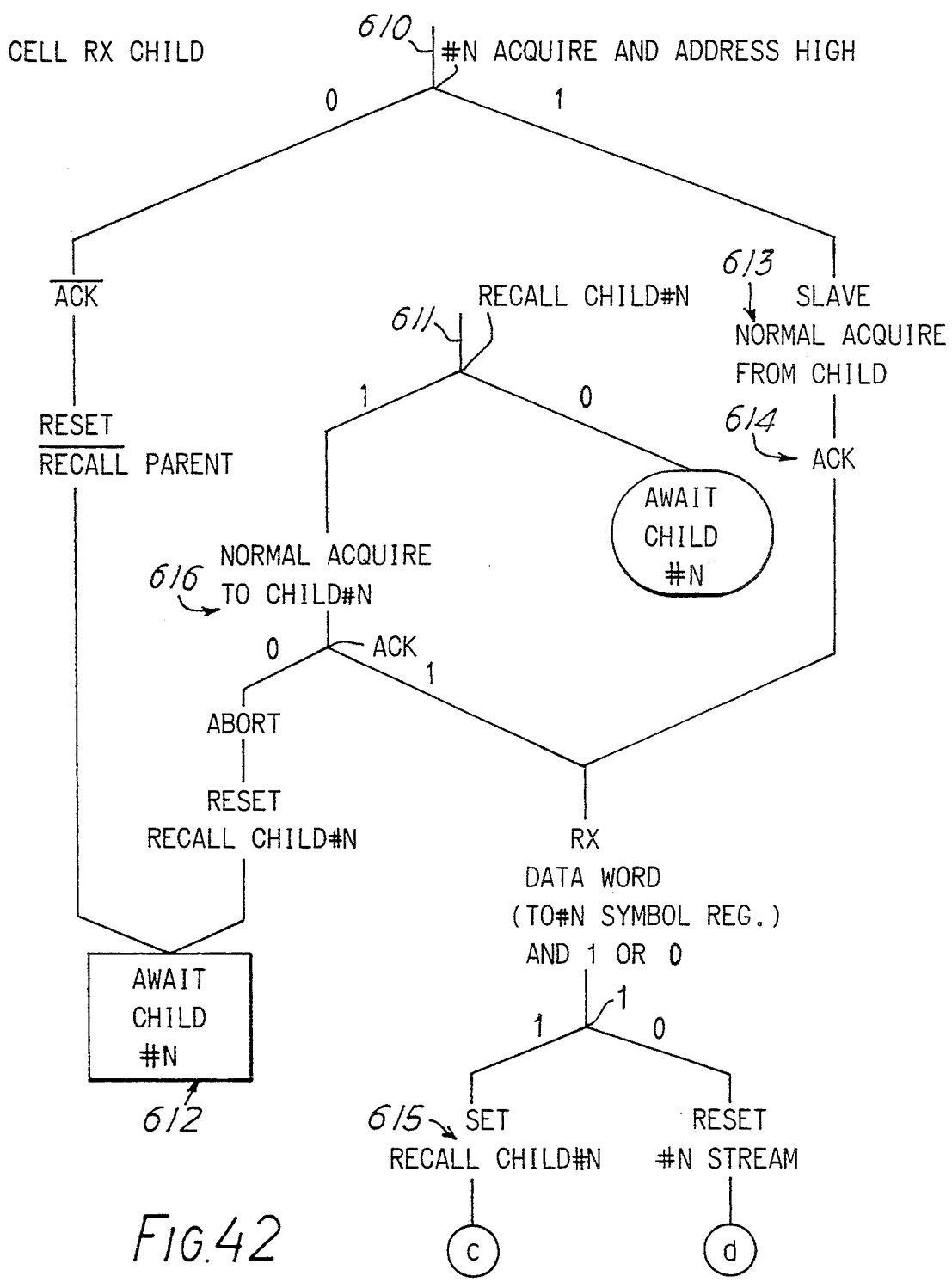
FIG. 42 is a graphical representation of steps and decisions in executive logic processes in a processor cell of the embodiment of FIG. 1.

FIG. 42 represents the process by which a cell receives a data word from a particular child cell, which in FIG. 42 is the child cell established through #N binary tree of the network 14. The process is preceded by an AWAIT CHILD #N state (not shown) in which the cell is waiting to receive a call from that child cell. The parent of the waiting cell may or may not also be related to the waiting cell by a pointer belonging to the #N binary tree. The process of FIG. 42 is referred to hereinafter as the CELL RX CHILD routine, and has a starting point 610, corresponding to the moment at which a calling signal on #N binary tree reaches the #N port of the cell, and a re-entry point 611. In some cases there may be one or more decisions between the AWAIT CHILD #N state and the starting point 610.

Immediately following the starting point 610, the cell tests for whether or not the cell is receiving a calling signal from a child cell, i.e. whether or not the high acquire signal is accompanied by a high address/data signal. If there is no high address/data signal, the call is from the parent cell of the called cell, so the called cell does not transmit an acknowledge pulse, as indicated by $\overline{ACK}$, and resets the $\overline{RECALL\ PARENT}$ flag, and enters an AWAIT CHILD #N state at 612. If the calling signal at the starting point 610 is accompanied by a high address/data signal, then the cell prepares, at 613, to receive a transmission from the #N child cell, transmits an acknowledge pulse 614, and receives from the #N child cell a data word, which is stored in the #N symbol register of the called cell, and the value 1 or NIL of the #N STREAM flag of the child cell. The value 1 indicates that the child cell has at least one further data word to transmit, and the value NIL indicates that the child cell has no further data words to transmit. The called cell therefore tests for 1, and if 1 was received, sets a RECALL CHILD #N flag at 615 and leaves the routine at a point c. If NIL has been received, the called cell instead resets the #N STREAM flag and leaves the routine at a point d.

If the RECALL CHILD #N flag is set, the cell returns at some time to the re-entry point 611 and tests for setting of RECALL CHILD #N. On finding that flag set, the cell, in a step 616, calls the #N child cell. If there is no acknowledgement pulse in reply, the call is aborted, the cell resets the RECALL CHILD #N flag and enters the AWAIT CHILD #N state at 612. If the child cell is not busy, it transmits an acknowledge pulse and the calling cell receives a data word, which is then stored in its #N symbol register, and 1 or NIL, and accordingly follows the steps to point c or point d.

It should be noted that the routines of FIGS. 41 and 42 are only used embedded within executive logic sequences, as will be described hereinafter, so that whether or not a cell may enter either of these two routines depends upon what primitive instruction it holds and what stage it has reached in its response to the presence of that primitive instruction.

With regard to the CELL RX CHILD routine of FIG. 42, it should be noted that if a primitive instruction is provided to which the response includes that the cell shall at some stage be awaiting a call from any two or more child cells, then the routine of FIG. 42 can be modified to include a process whereby if two or more normal acquire (calling) signals with high address/data signals are received at the waiting cell within a predetermined short interval of time, then the second and any subsequent ones of those calling signals are not acknowledged, and the cell sets the respective RECALL CHILD flag for each such second and subsequent calling signal. The child cell or cells which originated the second and possible subsequent calling signals are therefore subsequently called by the parent cell after the parent cell has completed its transaction with the child cell that was first to call. Furthermore, in addition to the steps for responding to a call from the parent cell of a cell waiting to receive a call from a child cell, indicated by the left hand branch of FIG. 42 which ends at the AWAIT CHILD #N state 612, it is arranged that if at any time during a CELL RX CHILD routine the cell receives a call from its parent cell, in the form of a high acquire signal with a low address/data signal received at the master port, then the existing internal operation of the cell and any current communication operation at another port is frozen, and the call at the master port is tested for transient high acquire. If the high acquire is transient, then the current communication operation at any other port is broken off by the cell setting its acquire signal low, and the cell enters the SET FREE SPACE routine. The child cell, if any, that was involved in the now aborted communication at another port interprets the setting low of the acquire signal from that port as a transient acquire, and acts accordingly.

Figure 43A:
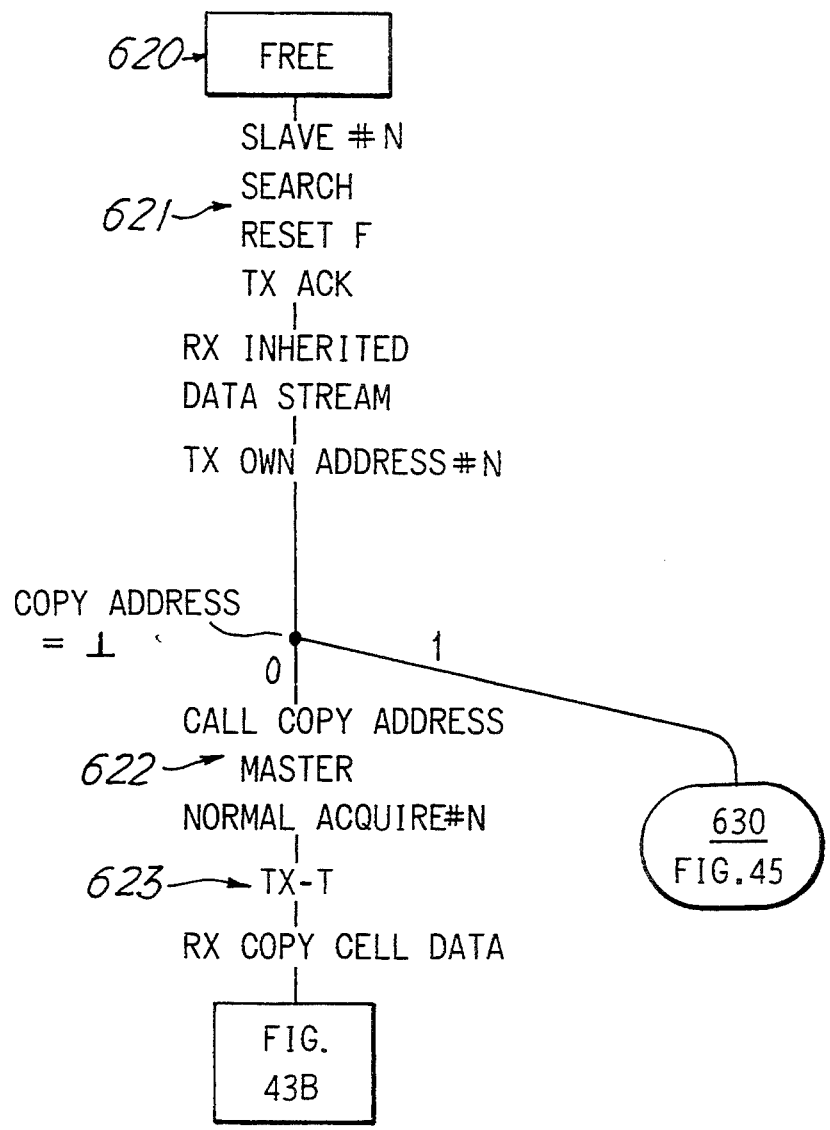
FIG. 43 is a graphical representation of steps and decisions in executive logic processes in a processor cell of the embodiment of FIG. 1.
Figure 43B:
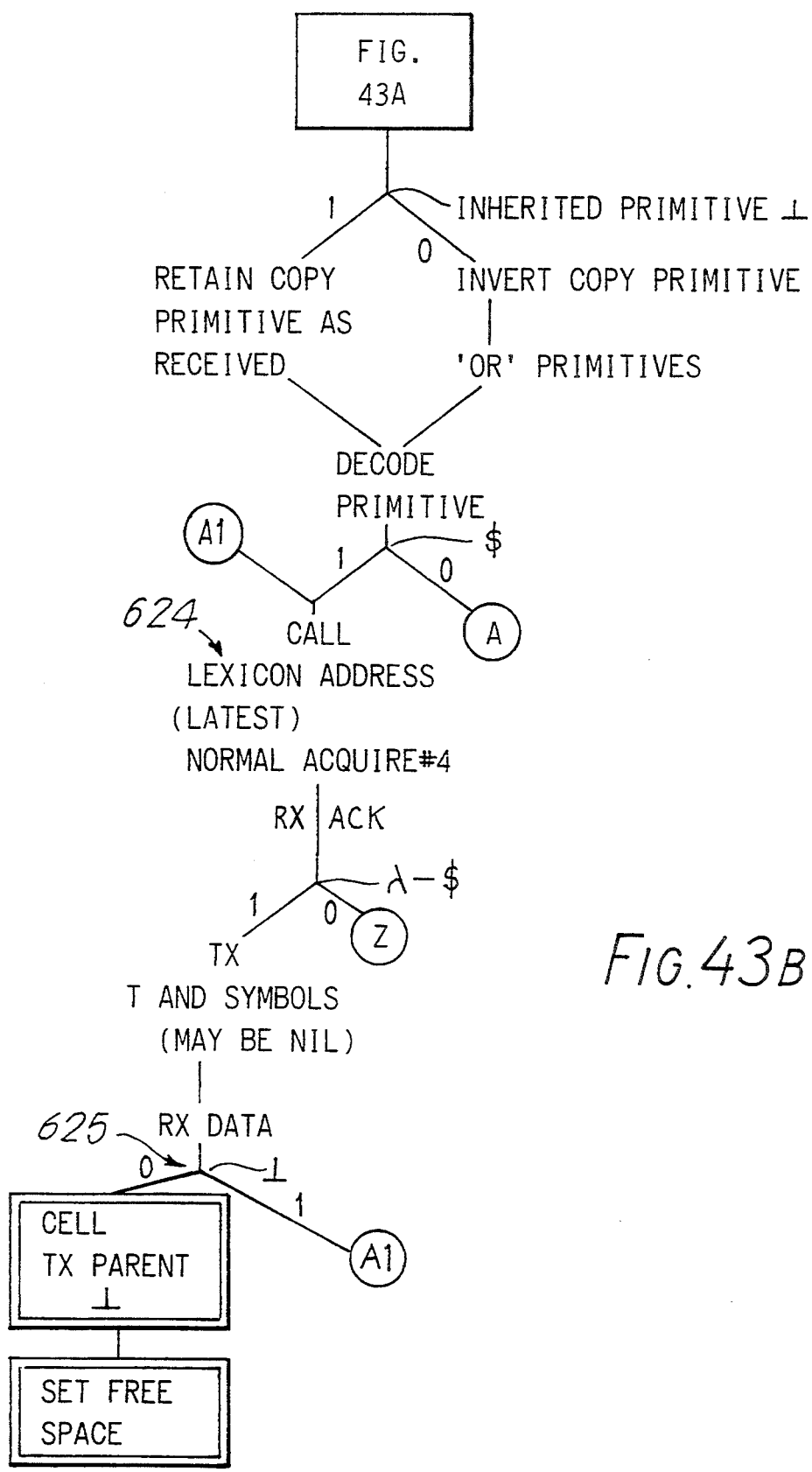

FIGS. 43A and 43B represent the process by which a standard cell passes from the free state 620 (FIG. 43A) to a state in which it has a primitive instruction in its primitive instruction register. The cell begins to leave the free state 620 when it receives at the slave portion of any one of its ports a search signal, i.e. a high address/data signal with a low acquire signal. The cell responds by resetting an internal free state flag F, which results in the free signals transmitted by the cell being cleared immediately at the three ports which have not received the search signal, and cleared after transmission of an acknowledge pulse at the receiving port, as explained hereinbefore with reference to FIG. 26A. This step is indicated at 621 in FIG. 43A. The receiving port becomes the master port of the cell. The cell then receives data from the searching cell, as indicated by RX INHERITED DATA STREAM in FIG. 43A. The data stream, i.e. a sequence of data words, is referred to as inherited since the searching cell becomes the parent cell of the formerly free cell. The inherited data stream consists of or includes a primitive instruction, a return address to the searching cell, a copy address on binary tree #N or a NIL, and a lexicon address. If there is a copy address, it is accompanied by data identifying the tree #N to which it applies. This tree #N will be the same tree as that through which the parent cell has formed a route to the formerly free cell. The primitive instruction is stored in the primitive register of the formerly free cell, the return address is stored in its return pointer register, the copy address, if one has been received, is stored, together with the tree #N identifying data, in the new lexicon-head pointer register, and the lexicon address is stored in its own lexicon-head pointer register. If no copy address was received, the NIL received is stored in the new lexicon-head pointer register. The cell also transmits, through the acknowledge signal line at the receiving port its own address in the corresponding binary tree to the searching cell. If the cell has received NIL instead of a copy address, the inherited data stream also includes data to be loaded into one or more of the trees #1 to 4 registers and the four symbol registers of central registers 17. Furthermore the primitive instruction inherited by the cell will be an inverted primitive.

After storing in the appropriate registers the various items received as inherited data, the cell tests the contents of its new lexicon-head register to discover whether or not a NIL was received instead of an address. If the test is affirmative, i.e. NIL was received, the cell branches to a WAIT state 630 shown in FIG. 45. If NIL was not received, there is a tree #N copy address in the new lexicon-head pointer register and the cell proceeds to a step 622 at which it calls the cell at the copy address in tree #N. On receiving an acknowledge pulse (not shown) from the called cell, which will be a definition cell, the calling cell transmits a copy request in the form of the value TRUE (T), as indicated at 623, and receives in response the data from the copy, i.e. definition, cell. The copy cell data consists of a primitive instruction, one or more values or addresses to further definition cells, and a lexicon address. At this point the cell tests, as shown in FIG. 43B, for whether or not its inherited primitive instruction is NIL. If the answer is yes, the copy cell primitive instruction is written into the cell's primitive instruction register in place of the NIL. If the inherited primitive instruction is not NIL, the cell inverts the copy cell primitive instruction then carries out a logical OR of the inverted copy cell primitive instruction and the inherited primitive instruction and writes the result in the primitive instruction register in place of the inherited instruction. The inherited primitive instruction when not NIL is either TRUE (binary code 1000) or lambda (binary code 1110). Consequently the result of the OR operation is no change if the inherited primitive instruction is TRUE. Furthermore, it is arranged in the loading of lambda expressions into the cells that if the inherited primitive instruction is lambda, λ, then the inverted copy cell primitive instruction is symbol, $, (binary code 1101) so that the result of the OR operation is the lambda-symbol, λ - $, (binary code 1111). Of the remainder of the copy cell data, i.e. values and/or addresses to further definition cells, and the copy lexicon address, only the values or definition cell addresses replace the inherited data, the copy lexicon address being discarded. Following retention of the copy cell primitive instruction as received or the OR operation, according to whether or not NIL was inherited, the cell decodes the primitive instruction now resident in its primitive instruction register. The first test in the decoding determines whether or not the primitive instruction is a symbol-type instruction, i.e. whether or not it is $ or λ - $. If the answer is no, the cell proceeds to a point A. However, if the instruction is $ or λ - $, the cell calls, in a step 624, the lexicon cell at its own lexicon-head address, which is the inherited lexicon-head address at this stage. All lexicon addresses are tree 4 addresses.

When this call is acknowledged, the cell tests whether its primitive is lambda symbol, λ - $, and if yes, transmits the contents of its symbol registers to the lexicon-head cell. The lambda-symbol cell receives in response from the lexicon-head cell either NIL, ⊥, and a new lexicon-head pointer, or TRUE, T. The protocol of the transmission of symbols from the lambda-symbol cell is such that the identity of the tree with which the each symbol is associated is included in the transmission, so that the receiving lexicon-head cell can determine immediately whether or not its corresponding symbol register is already loaded. If the corresponding symbol register or registers are not already loaded, the lexicon-head cell stores the received symbols in the appropriate ones of its symbol registers and transmits TRUE, T, back to the lambda-symbol cell. If, however, the or any of the corresponding symbol registers of the lexicon-head cell are already loaded, the lexicon-head cell transmits NIL, ⊥, back to the lambda-symbol cell, together with a new lexicon-head pointer which is the lexicon-head cell's own lexicon-head pointer. At a branch point 625, the lambda-symbol cell tests for reception of NIL, ⊥. On receiving NIL, ⊥, the lambda-symbol cell branches to a point A1 which returns the cell to step 624 but with the new lexicon-head pointer stored in its new lexicon-head pointer register. This loop can be repeated using new lexicon-head pointers until the lambda-symbol cell receives TRUE, T, from a lexicon-head cell. Whenever the lambda-symbol cell receives TRUE, T, it branches at point 625 to the CELL TX PARENT routine, as shown, and transmits NIL, ⊥, to its parent cell, then proceeds to the SET FREE SPACE routine whereby it becomes a free cell again.

If the symbol-type primitive instruction is not the lambda symbol primitive, then the cell proceeds to a point z.

Figure 44:
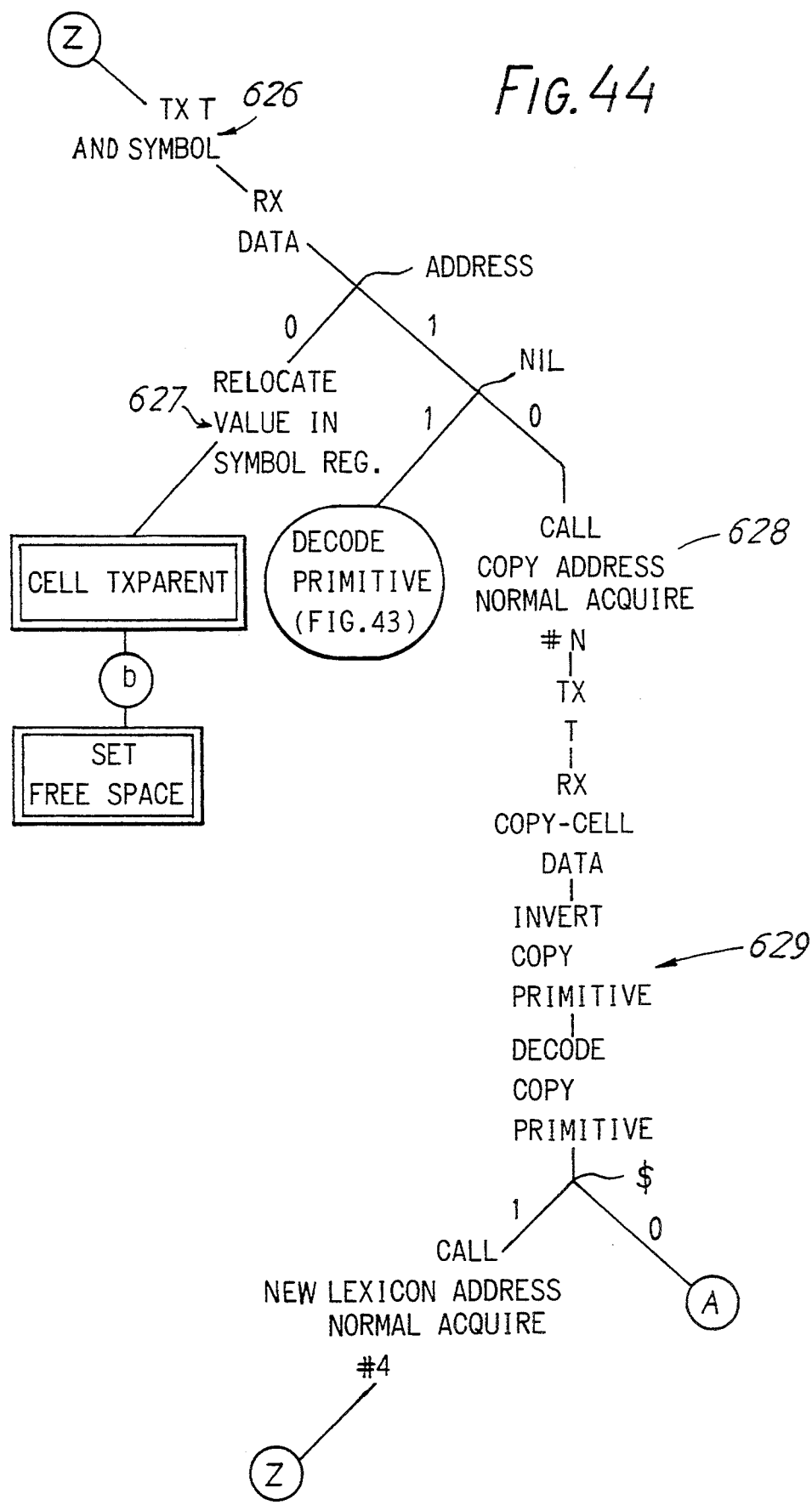
FIG. 44 is a gaphical representation of steps and decisions in executive logic processes in a processor cell of the embodiment of FIG. 1.

FIG. 44 shows the process from the point z. The primitive instruction of a cell at this point is the symbol primitive $. The cell will have symbolic data in its tree 2 symbol register and transmits TRUE, T, and this data to the lexicon-head cell, as indicated at 626. In response, the cell receives data from the lexicon-head cell. First the cell tests whether the received data is an address. If the data is not an address it is a value and must be transmitted to the parent cell. The cell therefore in this case initially relocates the received value in the symbol register corresponding to the binary tree through which the cell is related to its parent cell, at step 627, then carries out the CELL TX PARENT routine followed by the SET FREE SPACE routine. If the received data is an address, it may be either a new lexicon address accompanied by NIL, indicating that a match for the transmitted symbolic data must be sought at the lexicon-head cell of the cell to which the symbolic data had been transmitted, or a copy cell address and tree identity. If the received address is a new lexicon address, the cell stores the new lexicon address in its new lexicon-head pointer register, returns to the DECODE PRIMITIVE new primitive instruction and, if the symbol primitive $, calls the new lexicon-head cell using its new lexicon-head address, and returns to point z. If the new primitive instruction is not the symbol primitive $, the cell proceeds to point A.

Table 4 below summarises six types of transaction between cells in accordance with FIGS. 40 to 44.

TABLE 4

Figure 45:
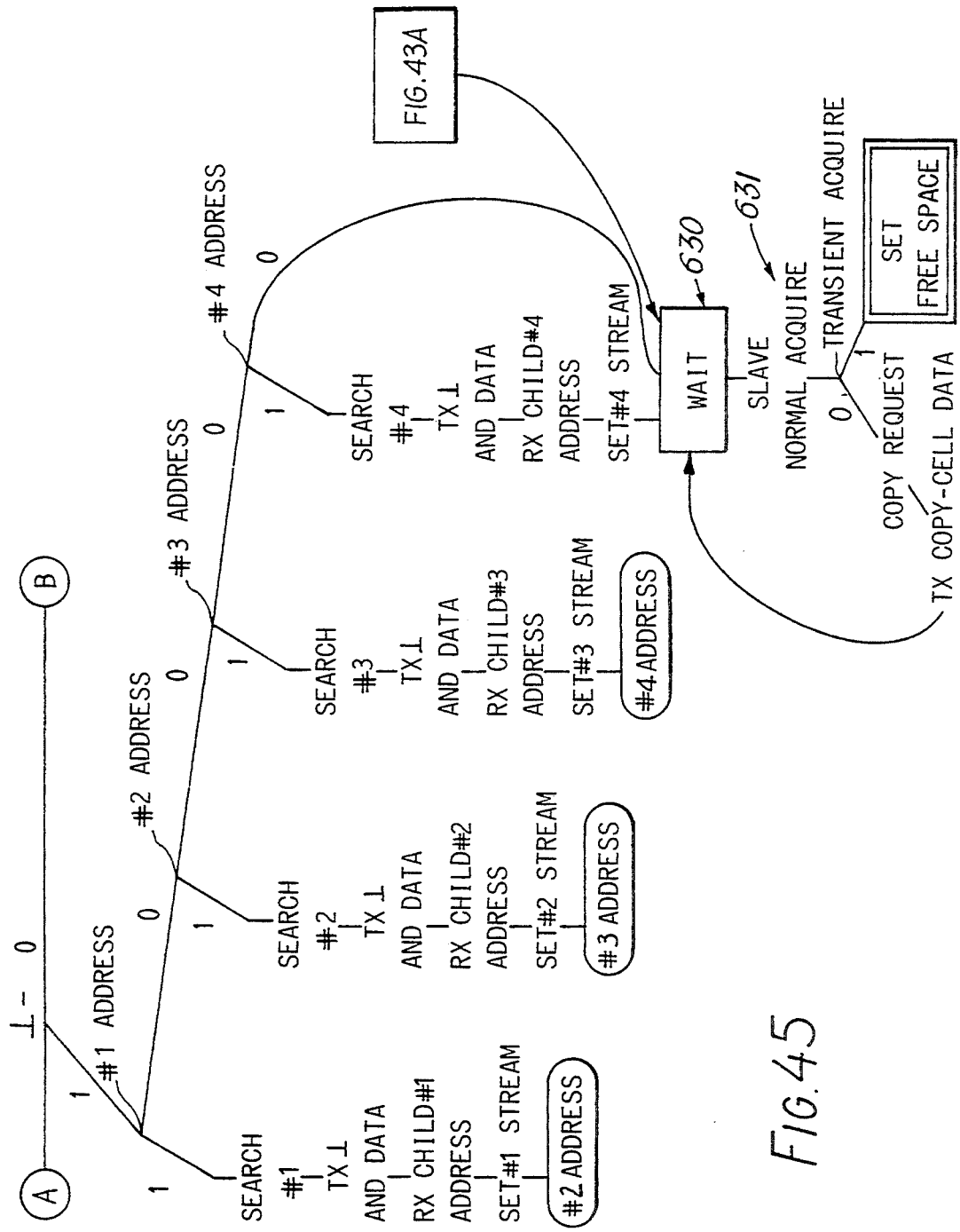
FIG. 45 is a graphical representation of steps and decisions in executive logic processes in a processor cell of the embodiment of FIG. 1.

| 1. CLAIM FREE-SPACE CELL | |
| --- | --- |
| PARENT CELL | FREE CELL |
| MASTER FREE-SPACE SEARCH ON #N TX NIL/DATA | ACK |
| | RX INHERITED DATA TX OWN ADDRESS |
| RX CHILD ADDRESS | |
| 2. COPY REQUEST | |
| | NIL-PRIMITIVE CELL |
| NEW CELL | (QUOTED CELL) |
| CALL COPY CELL ON #N TXT | ACK |
| | RXT ON #N (COPY REQUEST) TX COPY-CELL DATA |
| RX COPY-CELL DATA | |
| 3. LAMBDA-SYMBOL TRANSFER | |
| λ-SYMBOL CELL | FUNCTION CELL |
| CALL FUNCTION CELL ON #4 TXT-SYMBOL-SYMBOL ... | ACK |
| | RXT-SYMBOL-SYMBOL... ON #4 TXT, IF COMPLETE. TX NIL WITH LEXICON ADDRESS IF NO ROOM |
| RX ACKNOWLEDGEMENT DATA | |
| 4. SYMBOL SUBSTITUTION | |
| SYMBOL CELL | LEXICON (FUNCTION) CELL |
| CALL LEXICON CELL ON #4 TXT-SYMBOL | ACK |
| | RXT-SYMBOL ON #4 TX NIL-LEX.ADDR, IF NO MATCH TXT-DATA, OTHERWISE |
| RX DATA | |
| 5. CHILD TO PARENT | |
| CHILD CELL | PARENT CELL |
| CALL PARENT CELL ON #N IF ACK, TX DATA WORD, STREAM BIT (IF NOT-ACK, ABORT) | ACK IF NOT BUSY |
| | RX DATA WORD, STREAM BIT |
| 6. PARENT TO CHILD | |
| PARENT CELL | CHILD CELL |
| CALL CHILD CELL ON #N (IF NOT ACK.ABORT) | ACK IF NOT BUSY |
| | TX DATA WORD, STREAM BIT |
| RX DATA WORD, STREAM BIT | | point in FIG. 43, and carries out step 624 using the new lexicon address. If the received address is a copy address, the cell stores the copy address and tree identity in its new lexicon-head pointer register and calls the cell at the copy address, as indicated at a step 628. Since the copy address is provided with an identification of which binary tree that address applies to, the symbol cell accordingly makes the call through that binary tree, which, for generality, is represented by #N in step 628 on FIG. 44. On receiving acknowledgement of this call, the cell transmits a copy request (T), receives the copy cell data, inverts the copy data primitive instruction, replaces all its pointer-register contents with those of the copy data, and stores in its new lexicon-head pointer register the copy data own lexicon-head address (step 629). The cell retains its inherited own lexicon-head pointer in its own lexicon-head pointer register, but sets a lexicon flag LEXICON to indicate that the pointer in its new lexicon-head pointer register is to be used initially in subsequent operations. The cell then decodes its FIG. 45 represents the process from the point A to a test for whether or not the primitive instruction is an inverted primitive instruction, i.e. one of the second set consisting of Nil-True $\overline{T}$, Nil-Symbol $\overline{S}$, Nil-Lambda $\overline{\lambda}$, and Nil-Identity $\overline{=}$. This test therefore checks whether the binary code of the primitive instruction begins with 0 (see Table 2). In FIG. 45, the test is indicated bye $\perp$ - at a point after A. If the answer is no, the cell proceeds to a point B. If the answer is yes, the cell checks whether it has an address in its tree 1 pointer register and if the answer if yes, transmits a search signal into tree 1 and locates a free cell to which it transmits NIL ($\perp$) and other data (which will consist of the address of a cell to be copied). The free cell transmits its own tree 1 address back (see FIG. 43 following step 621). The inverted primitive cell then sets its #1 STREAM flag, as an internal indication of the existence of a tree 1 child cell, and jumps to a test for whether or not it has a tree 2 address in its tree 2 pointer register, as indicated by #2 ADDRESS in FIG. 45. If there is no tree 1 address in the tree 1 pointer register, the cell passes immediately to the test #2 ADDRESS. The same procedure is followed for #2 ADDRESS and a #3 ADDRESS test as for #1 ADDRESS. At a final test for #4 ADDRESS, if there is no tree 4 address in the tree 4 pointer register the cells passes to a WAIT state 630 immediately. If there is a tree 4 address, the cell follows the same procedure as for #1 ADDRESS except that after setting the #4 STREAM flag it passes directly to the WAIT state 630.

A cell with an inverted primitive instruction (i.e. an instruction from the second set) is a definition (copy) cell, and therefore waits to be called by another cell which is to carry out the copying procedure. FIG. 45 shows a call at 631 to the inverted primitive cell, which then tests whether the call ends with a transient high acquire signal. If the answer is yes, the cell carries out the SET FREE SPACE routine. If the answer is no, the cell receives a copy request, i.e. a TRUE value, from the calling cell (see step 623 in FIG. 43), then transmits its copiable data to the calling cell, which consists of the inverted primitive cell's primitive instruction, values or copy addresses, and own lexicon-head address, and returns to the WAIT state 630.

Figure 46:
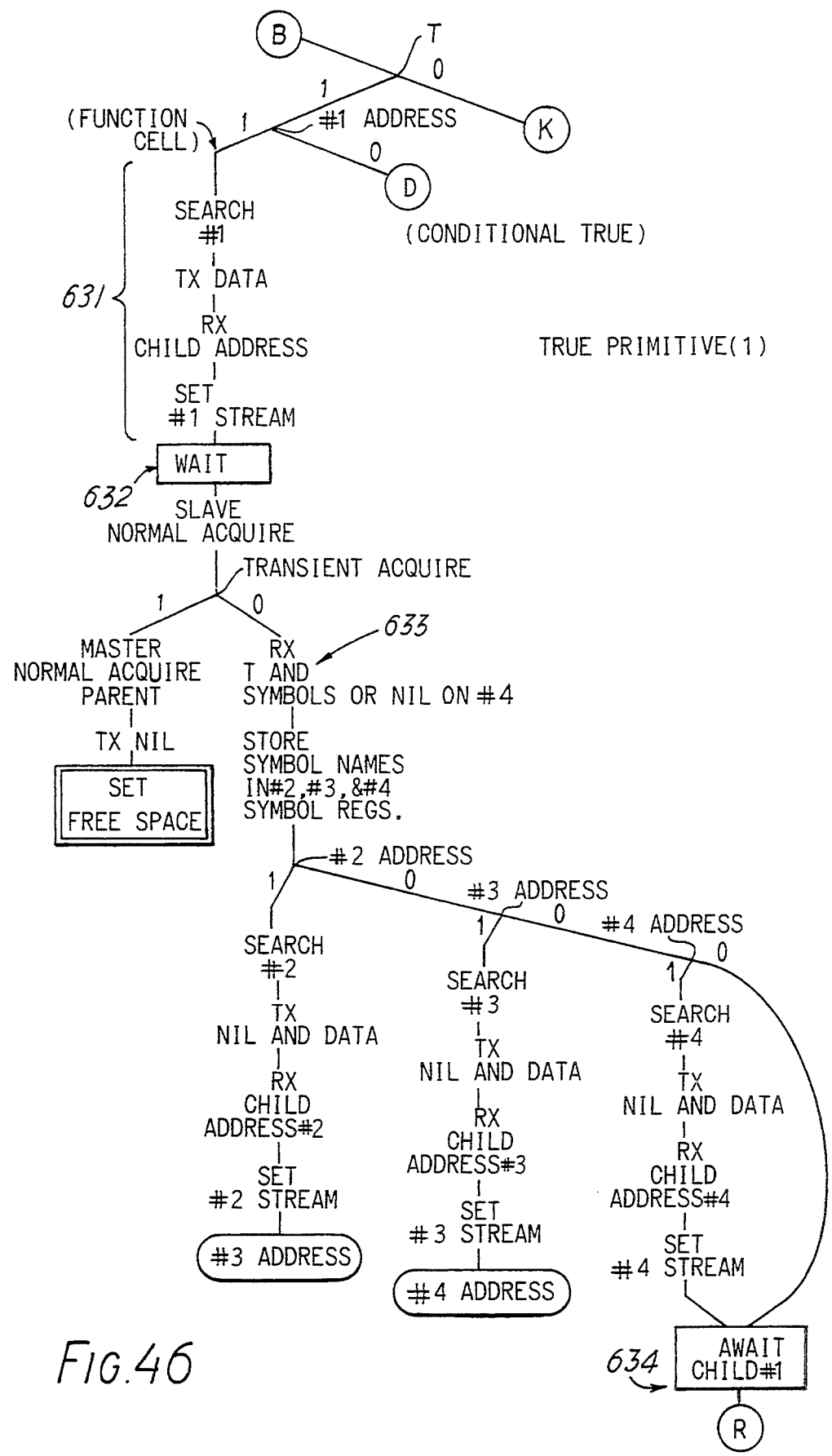
FIGS. 46 and 47 are graphical representations of steps and decisions in executive logic processes in a processor cell of the embodiment of FIG. 1.
Figure 47:
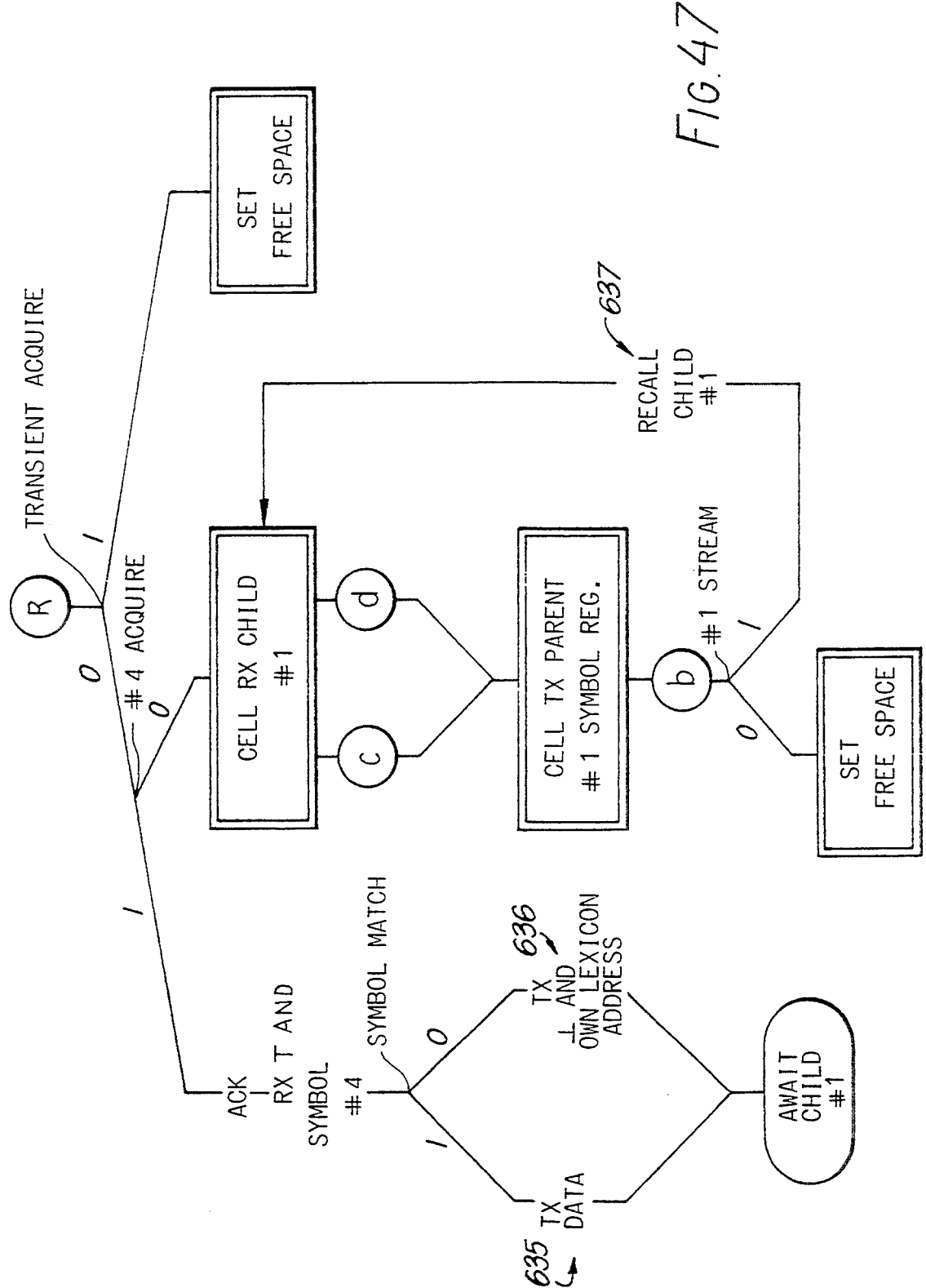

FIG. 46 shows the process from the point B to a test for whether or not the cell's primitive instruction is the TRUE (T) instruction. If it is not, the cell passes to a point K. If the primitive instruction is the TRUE instruction, the cell tests for whether or not it has a tree 1 address in its tree 1 pointer register. If the answer is no, the cell passes to a point D. If the answer is yes, the cell is a function cell (for example the cell 533 in FIG. 31) and proceeds to carry out the process of establishing a tree 1 child cell, as indicated at 631 in FIG. 46, and then enters a WAIT state 632. The cell at this point is waiting to be called by a lambda-symbol cell which will transmit any necessary symbolic data to be stored by the function cell as identifier(s) for one or more definitions to be established by the function cell. Accordingly on receiving a normal acquire, the function cell tests for whether it is immediately followed by a transient high acquire signal. If there is a transient high acquire signal, the cell transmits the value NIL to its parent cell and enters the SET FREE SPACE routine. If there is no transient high acquire signal, the function cell receives the value TRUE (T) and symbolic data or NIL, at 633 (see FIG. 43 for λ-$). The received symbolic data, if any, consists of one or more symbolic names which the function cell proceeds to store in the appropriate symbol registers. The order of reception of these symbolic names determines which symbol register they are stored in, beginning with the tree 2 symbol register. A NIL, ⊥, is received for each symbol register not being provided with a symbolic name. Next the function cell establishes tree 2, tree 3 or tree 4 child cells, depending on the results of #2, #3, and #4 ADDRESS tests. These steps are carried out in the same way as for an inverted primitive cell (see FIG. 45), with the function cell finally passing to an AWAIT CHILD #1 state 634, in which it waits to be called by the child cell on tree 1. On receiving a calling signal the function cell passes a point R from which it immediately tests for the reception of a transient high acquire signal (FIG. 47). If there is a transient high acquire signal, the function cell enters the SET FREE SPACE routine. If there is no transient high acquire signal, the function cell tests whether the call is through binary tree 4, as indicated by #4 ACQUIRE in FIG. 47. If the answer is yes, the call may be from a symbol cell attempting to match its symbol to a lexicon definition and the function cell acknowledges the call. If the function cell then receives T and symbolic data through the tree 4 route, the cell compares the symbolic data with the contents of its tree 2, tree 3, and tree 4 symbol registers in that order until there is a match or none match. If there is a match, then at step 635 the function cell transmits through the tree 4 route to the calling cell either both the pointer which is held in the pointer register corresponding to the symbol register which holds the matching symbolic data, and data that identifies the tree to which this pointer must be used, or the value held in that pointer register. The function cell then returns to the AWAIT CHILD #1 state 634. If no matching symbolic data is found, the function cell transmits NIL (⊥) and its own lexicon-head address to the calling cell, at a step 636, and returns to the AWAIT CHILD #1 state 634.

If the normal acquire signal is not received through a tree 4 route, it will be received through a tree 1 route from the tree 1 child cell, so the function cell enters the CELL RX CHILD #1 routine, then enters a CELL TX PARENT routine in which it transmits the contents of its tree 1 symbol register to the parent cell, the tree 1 symbol register having been loaded with a value from the tree 1 child cell in the CELL RX CHILD #1 routine. The function cell then tests whether or not the #1 STREAM flag is set, which flag would if set indicate that one or more further data words are expected from the tree 1 child cell, and if the answer is yes, carries out a RECALL CHILD #1 step 637 by which the function cell returns to the point 611 (see FIG. 42) point in the CELL RX CHILD #1 routine. If the answer is no, the function cell passes to the SET FREE SPACE routine, since no more values are expected from the tree 1 child.

Figure 48:
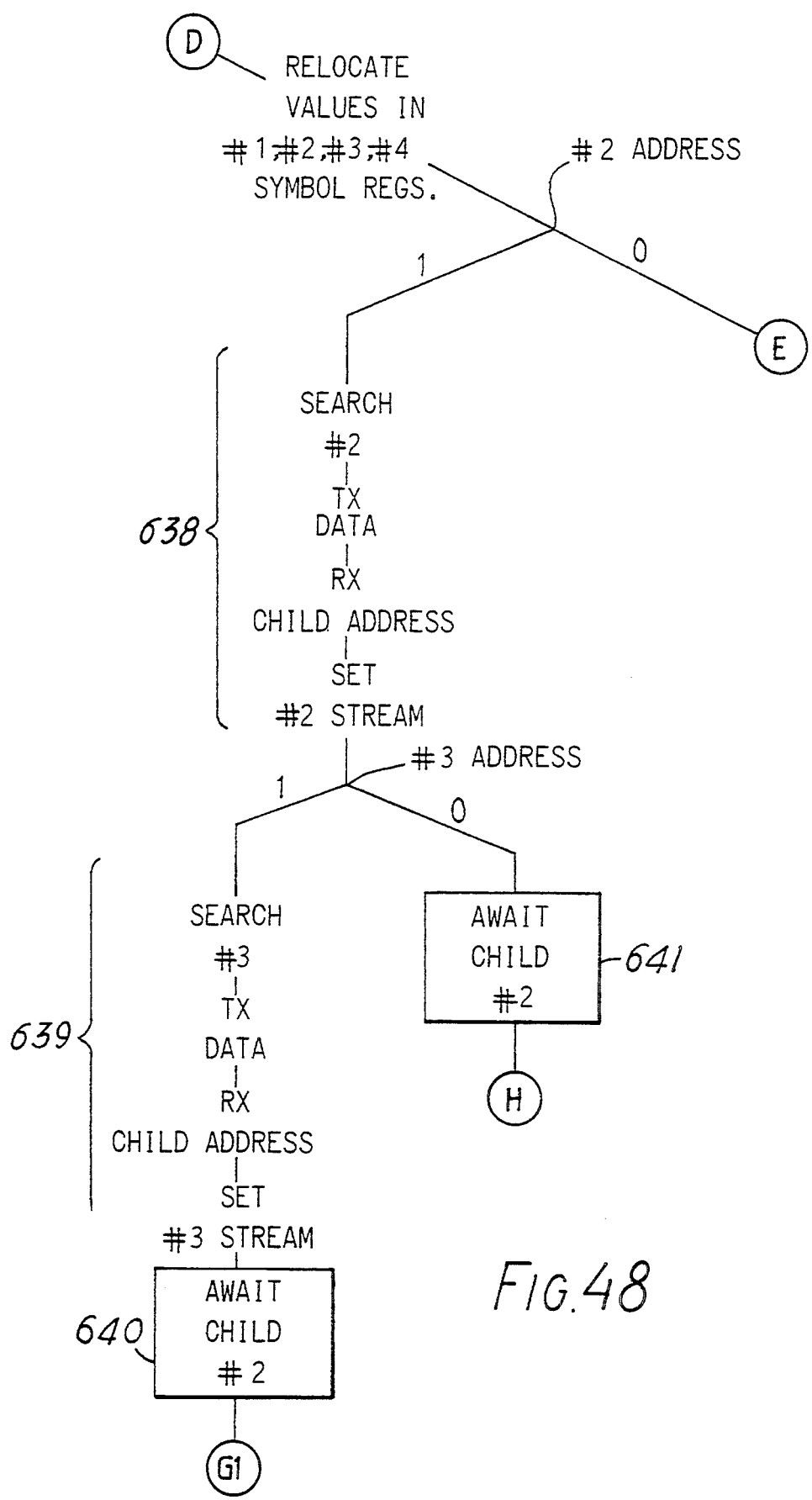
FIG. 48 is a graphical representation of steps and decisions in executive logic processes in a processor cell of the embodiment of FIG. 1.

From FIG. 46 it will be see that if the cell with the TRUE primitive resident in its primitive instruction register does not find an address in its tree 1 pointer register, the cell passes to the point D from which the process of FIG. 48 follows. The absence of a tree 1 address in the tree 1 pointer register results in a cell which is not a function cell but a TRUE primitive cell (for example the cell 557 of FIG. 33) which operates in a conditional manner and may be referred to as a true conditional cell. Such a cell normally has at least two addresses stored in its tree 2, 3, and 4 pointer registers. Immediately after the point D, the cell transfers any values held in its four tree pointer registers to the corresponding symbol registers, as indicated by RELOCATE VALUES IN #1, #2, #3, #4 SYMBOL REGS. in FIG. 48. The cell then tests for the presence of a tree 2 address in its tree 2 pointer register and, if the answer is yes, establishes the corresponding tree 2 child cell, as indicated at 638 in FIG. 48.

If there is no tree 2 address in the tree 2 pointer register, the cell passes to point E.

Following the establishment of the tree 2 child cell at 638, the cell passes directly to a #3 ADDRESS test.

If there is a tree 3 address, the corresponding tree 3 child cell is established at 639, and the cell passes to an AWAIT CHILD #2 state 640. On receiving a call whilst the cell is in this waiting state 640, the cell passes to a point G1. If following the establishment of the tree 2 child cell at 638 the #3 ADDRESS test gives a negative result, the cell passes to an AWAIT CHILD #2 state 641. If a call is received whilst the cell is in this waiting state 641, the cell passes to a point H.

Figure 49:
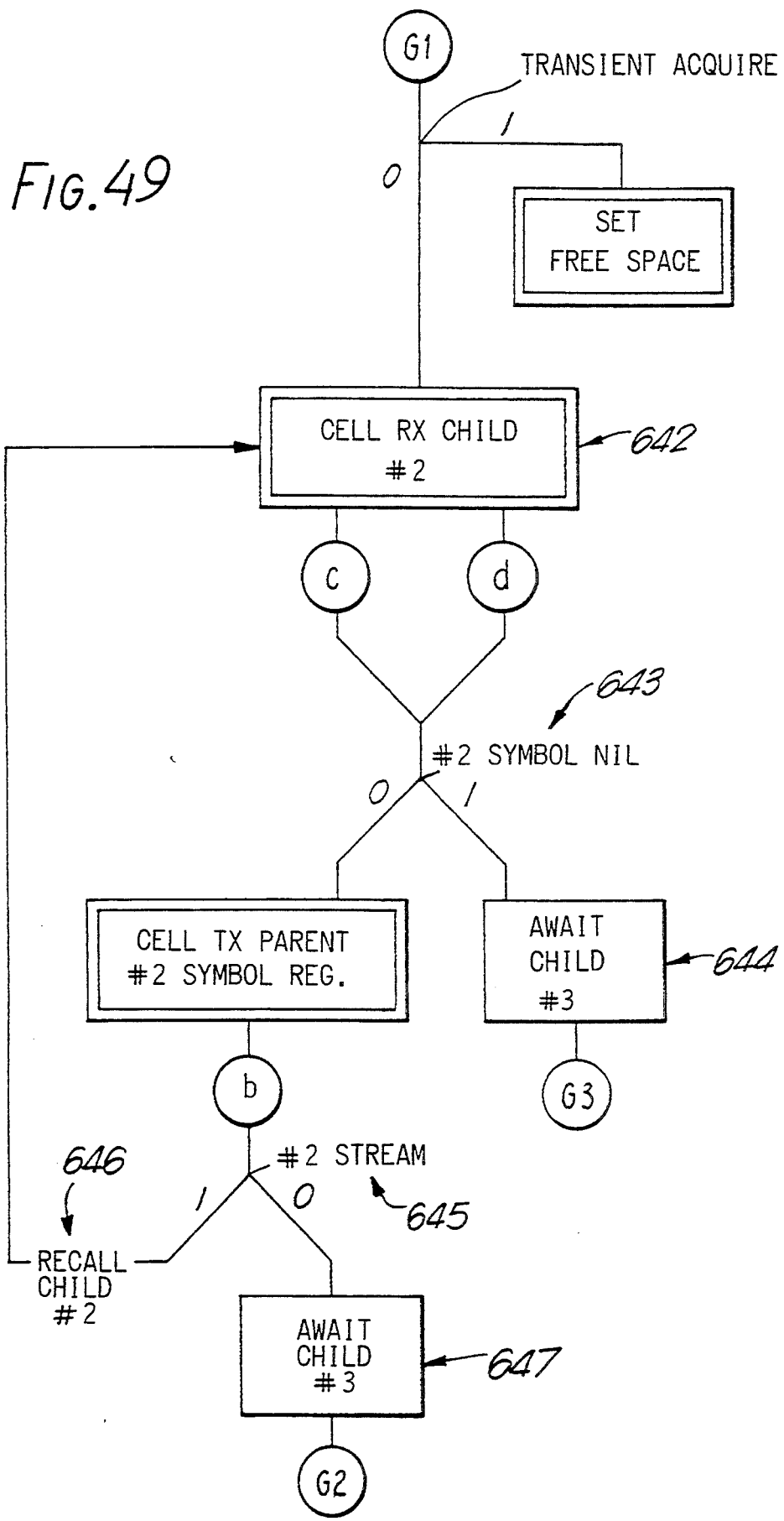
FIG. 49 is a graphical representation of steps and decisions in executive logic processes in a processor cell of the embodiment of FIG. 1.

FIG. 49 shows the process from the point G1. The first step after the point G1 is a test by the cell for whether the call is followed by a transient high acquire signal. If the test is affirmative, the cell enters the SET FREE SPACE routine. If there is no transient high acquire signal, the cell executes a CELL RX CHILD #2 routine 642. On leaving the routine 642 at either point c or point d, the cell carries out a test 643 for whether the tree 2 symbol register contains the value NIL, and if the answer is yes, enters an AWAIT CHILD #3 state 644. If the tree 2 symbol register contains a value other than NIL, the cell passes to the CELL TX PARENT routine in which it transmits the value held in its tree 2 symbol register to the parent cell, and then to a test 645 for whether the #2 STREAM flag is set. If the answer is yes, the cell passes by a RECALL CHILD #2 step 646 to the point 611 (FIG. 42) in the routine 642. If the #2 STREAM flag is not set, the cell enters an AWAIT CHILD #3 state 647.

Figure 50:
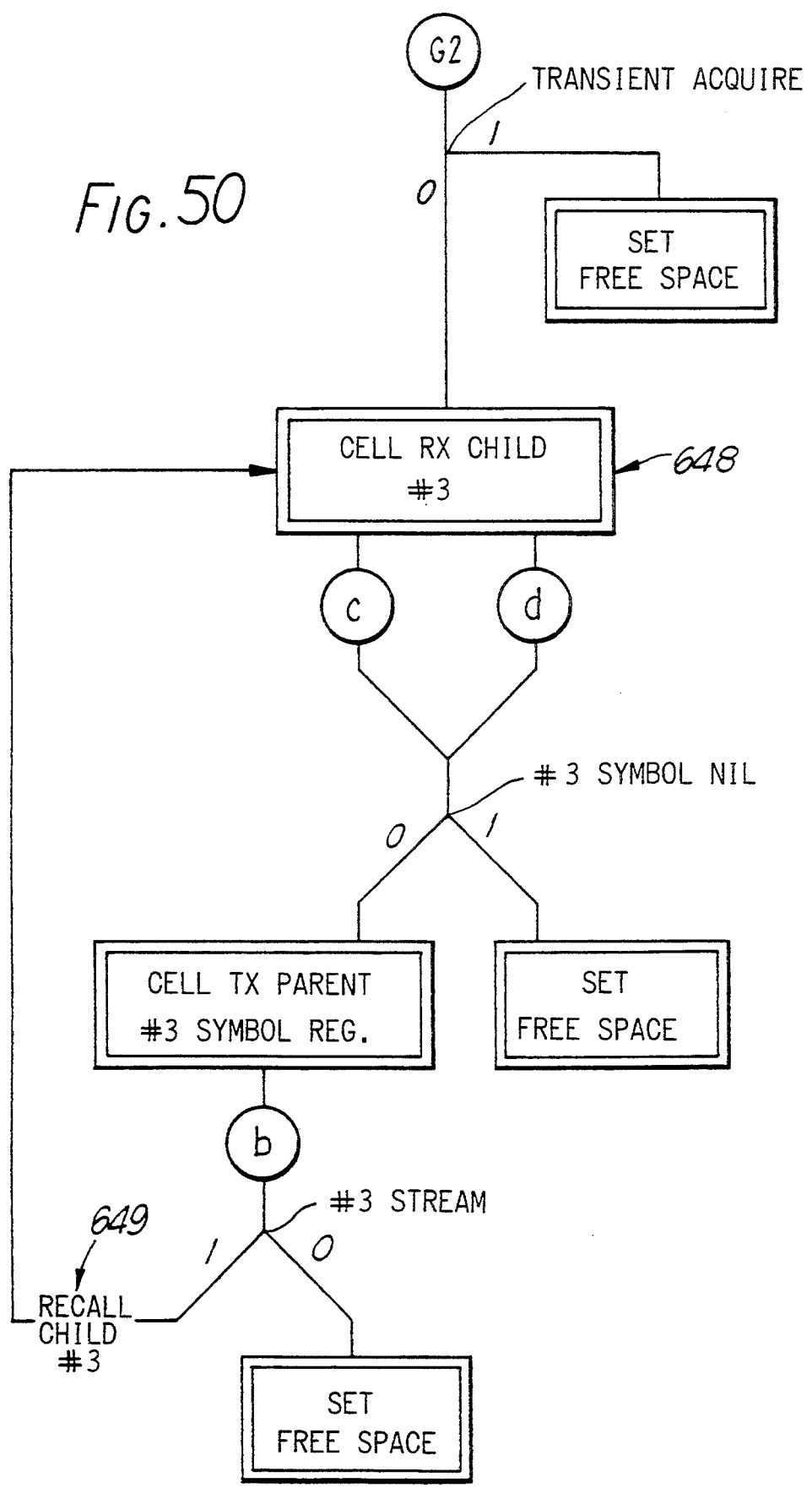
FIG. 50 is a graphical representation of steps and decisions in executive logic processes in a processor cell of the embodiment of FIG. 1.

When the cell receives a call whilst in the state 647, the cell passes to a point G2 following which, as shown in FIG. 50, the cell either enters the SET FREE SPACE routine if the call was followed by a transient high acquire signal, or a CELL RX CHILD routine 648 for receiving data from the tree 3 child cell if there was no transient high acquire signal. On leaving the routine 648 at either point c or point d, the cell tests whether its tree 3 symbol register contains NIL or not, and if there is NIL, enters the SET FREE SPACE routine. If the value in the tree 3 symbol register is not NIL, the cell carries out a CELL TX PARENT routine in which the value held in the tree 3 symbol register is transmitted to the parent cell, then tests for whether or not the #3 STREAM flag is set. If the flag is not set, the cell enters the SET FREE SPACE routine. If the flag is set the cell passes, by a step 649, to the point 611 in the routine 648.

Figure 51:
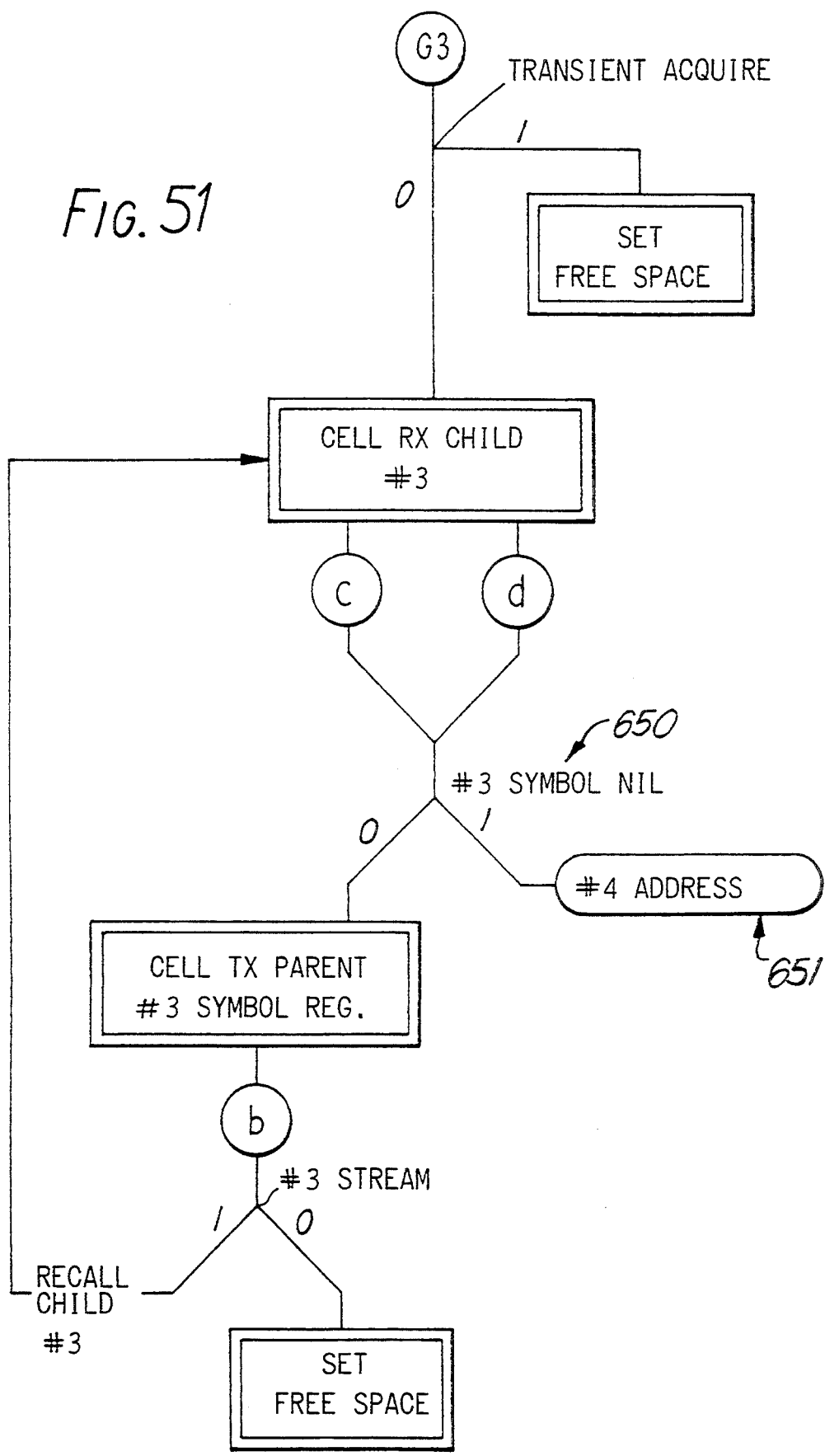
FIG. 51 is a graphical representation of steps and decisions in executive logic processes in a processor cell of the embodiment of FIG. 1.

When the cell receives a call whilst in the state 644 (FIG. 49), the cell passes to a point G3 following which, as shown in FIG. 51, the cell carries out a process as described hereinbefore in relation to FIG. 50 except that at the test 650 for whether or not the tree 3 symbol register contains the value NIL, if that register does contain NIL, the cell passes to a test 651 (see also FIG. 57) for the presence of an address in the tree 4 pointer register.

Figure 52:
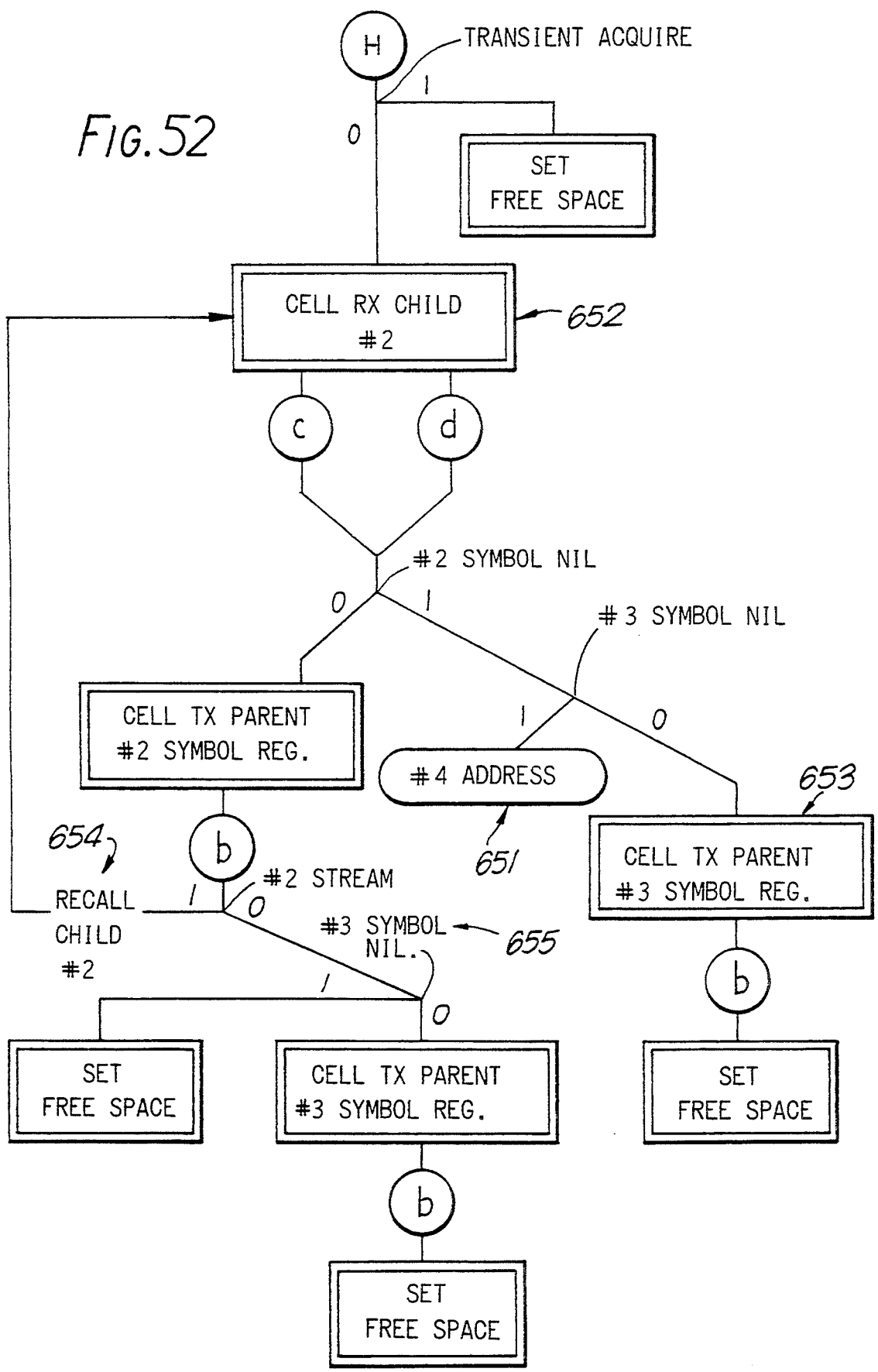
FIG. 52 is a graphical representation of steps and decisions in executive logic processes in a processor cell of the embodiment of FIG. 1.

FIG. 52 shows the process following the point H of FIG. 48. After H, the cell tests for the presence of a transient high acquire signal and, if such a signal is detected, enters the SET FREE SPACE routine. If there is no transient high acquire signal, the cell executes a CELL RX CHILD routine 652 in relation to the tree 2 child cell, then, on leaving at either point c or point d, carries out a test for whether the tree 2 symbol register contains the value NIL. If that register does contain NIL, the cell tests for whether the tree 3 symbol register contains the value NIL, and if it does, passes to the #4 ADDRESS test 651. If the tree 3 symbol register contains another value, the cell executes a CELL TX PARENT routine 653 in which the value held in that register is transmitted to the parent cell, then enters the SET FREE SPACE routine.

If on leaving the routine 652, the tree 2 symbol register contains a value other than NIL, the cell executes a CELL TX PARENT routine to transmit that value to the parent cell, then tests for whether #2 STREAM flag is set. If the flag is set, the cell returns, by a step 654, to the point 611 in the routine 652. If the #2 STREAM flag is not set, the cell carries out a test 655 for whether the tree 3 symbol register contains the value NIL, and if it does, enters the SET FREE SPACE routine. If the tree 3 symbol register contains a value other than NIL, the cell executes a CELL TX PARENT routine to transmit that value to the parent cell, then enters the SET FREE SPACE routine.

Figure 53:
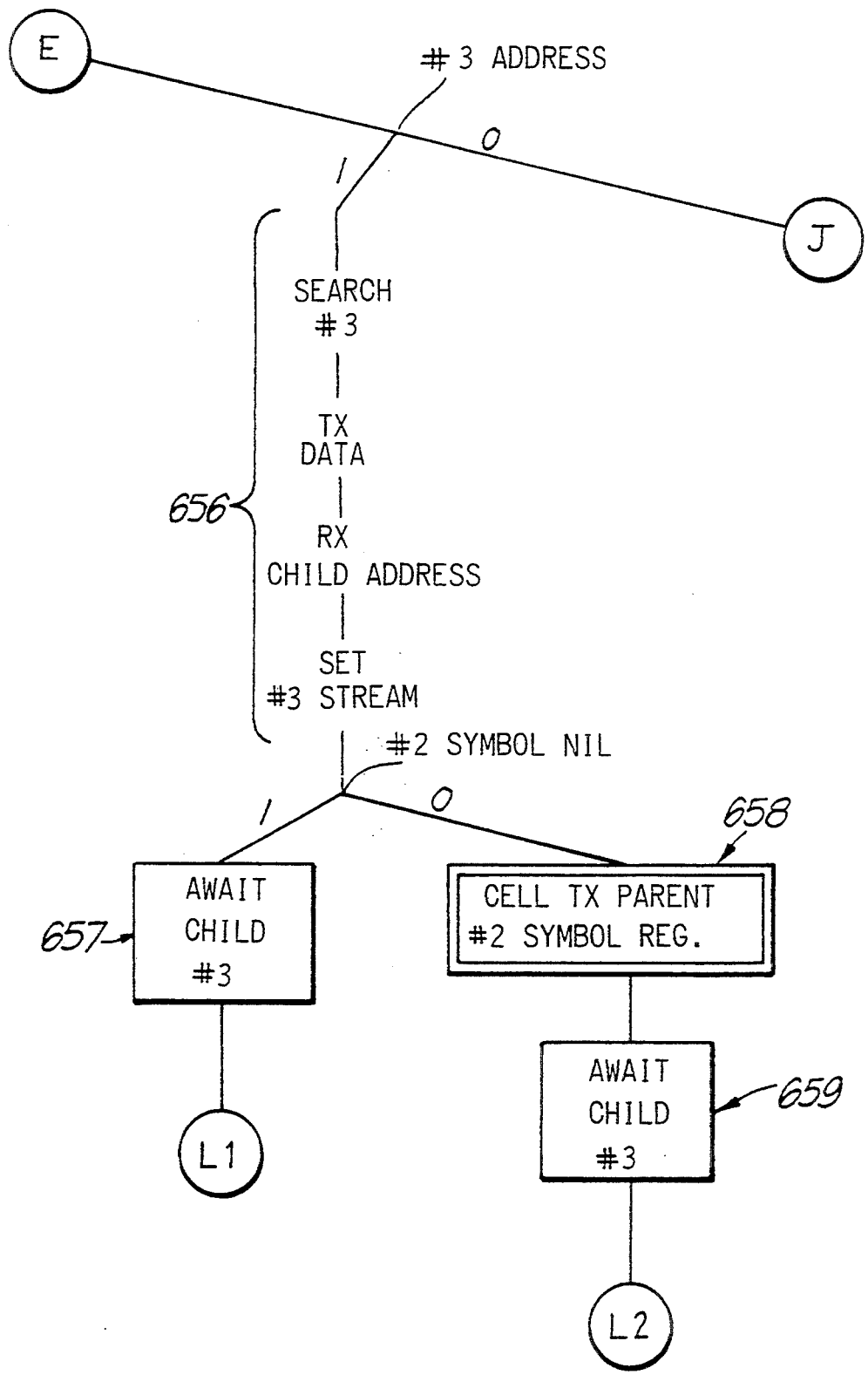
FIG. 53 is a graphical representation of steps and decisions in executive logic processes in a processor cell of the embodiment of FIG. 1.

The cell at the point E in FIG. 48 has found no address in its tree 2 pointer register and passes, as shown in FIG. 53, to a test for the presence of an address in its tree 3 pointer register. If no such address is found, the cell passes to a point J. If there is a tree 3 address, the cell establishes the corresponding tree 3 child cell, as indicated at 656, then determines whether the value in the tree 2 symbol register is NIL. If the value is NIL, the cell enters an AWAIT CHILD #3 state 657. If the tree 2 symbol register contains a value other than NIL, the value held in that register is transmitted to the parent cell in a routine 658, and then the cell enters an AWAIT CHILD #3 state 659.

Figure 54:
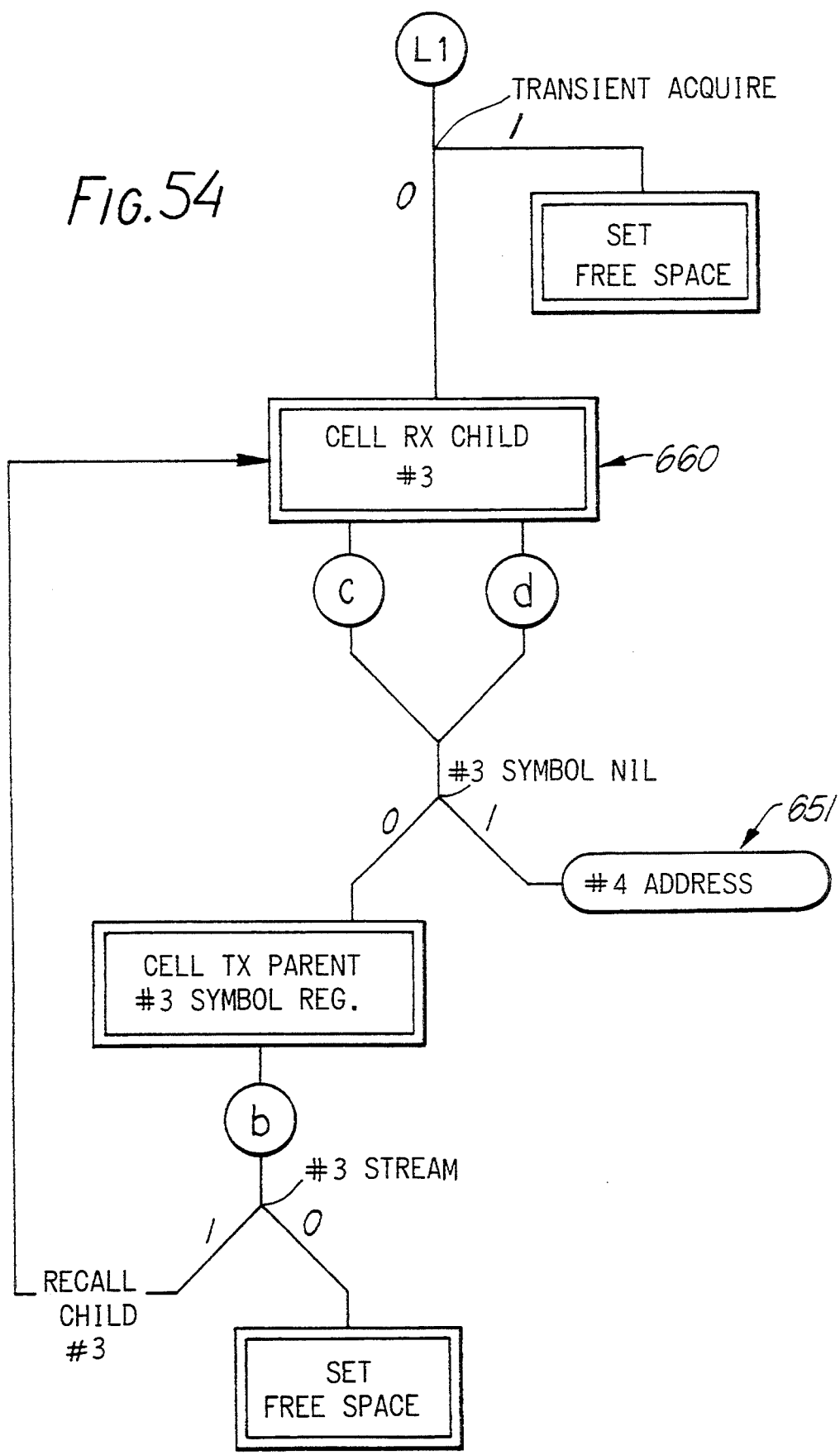
FIG. 54 is a graphical representation of steps and decisions in executive logic processes in a processor cell of the embodiment of FIG. 1.

On receiving a call whilst in the state 657, the cell passes to a point L1 from which, as shown in FIG. 54, the cell tests for a transient high acquire signal and, if one is found, enters the SET FREE SPACE routine, or, if there is no transient high acquire signal, executes a CELL RX CHILD #3 routine 660. The process continues as described hereinbefore with reference to FIG. 51.

Figure 55:
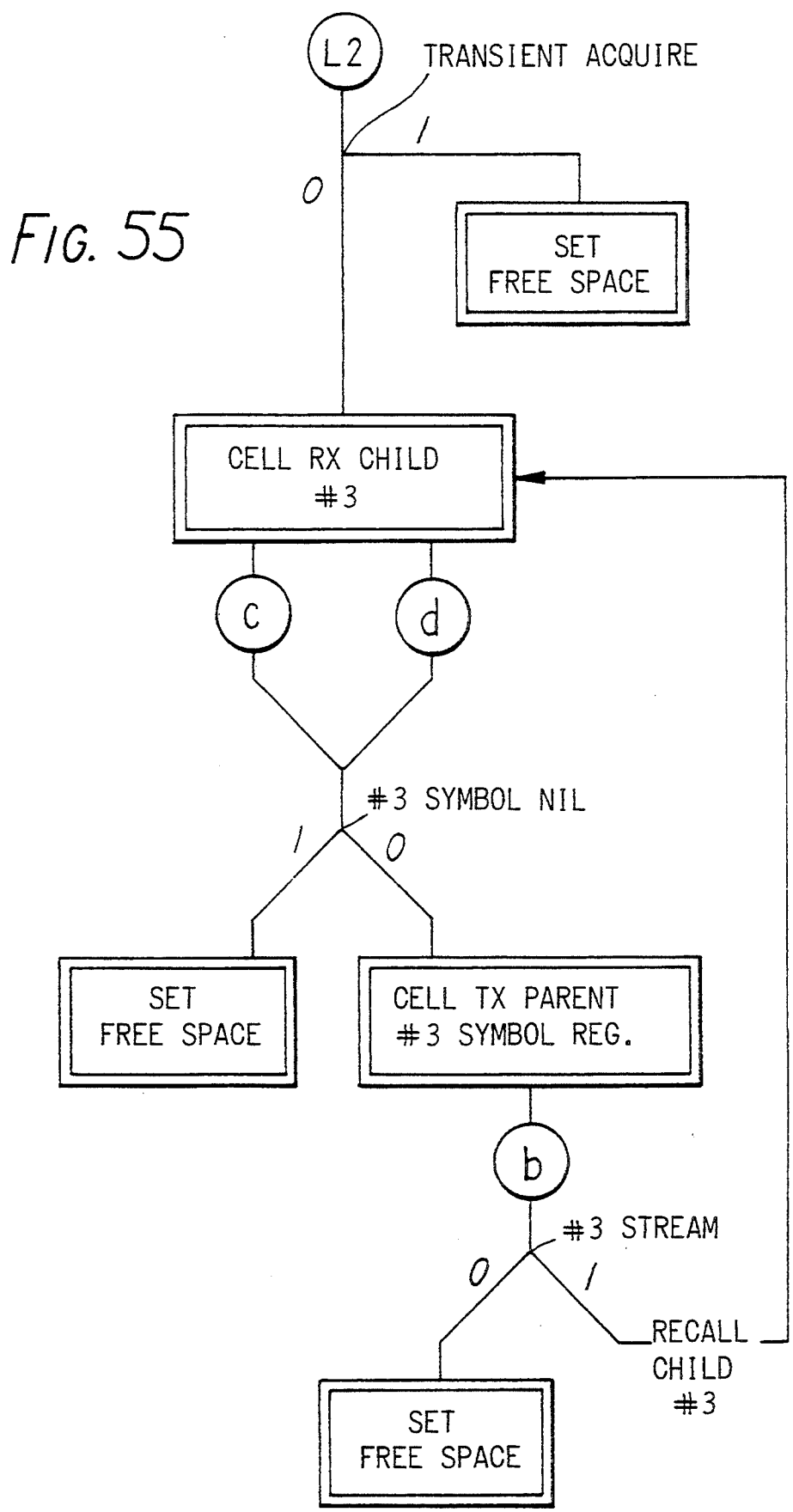
FIG. 55 is a graphical representation of steps and decisions in executive logic processes in a processor cell of the embodiment of FIG. 1.

On receiving a call whilst in the state 659, the cell passes to a point L2 from which, as shown in FIG. 55, the cell carries out the same process as described hereinbefore with reference to FIG. 50.

Figure 56:
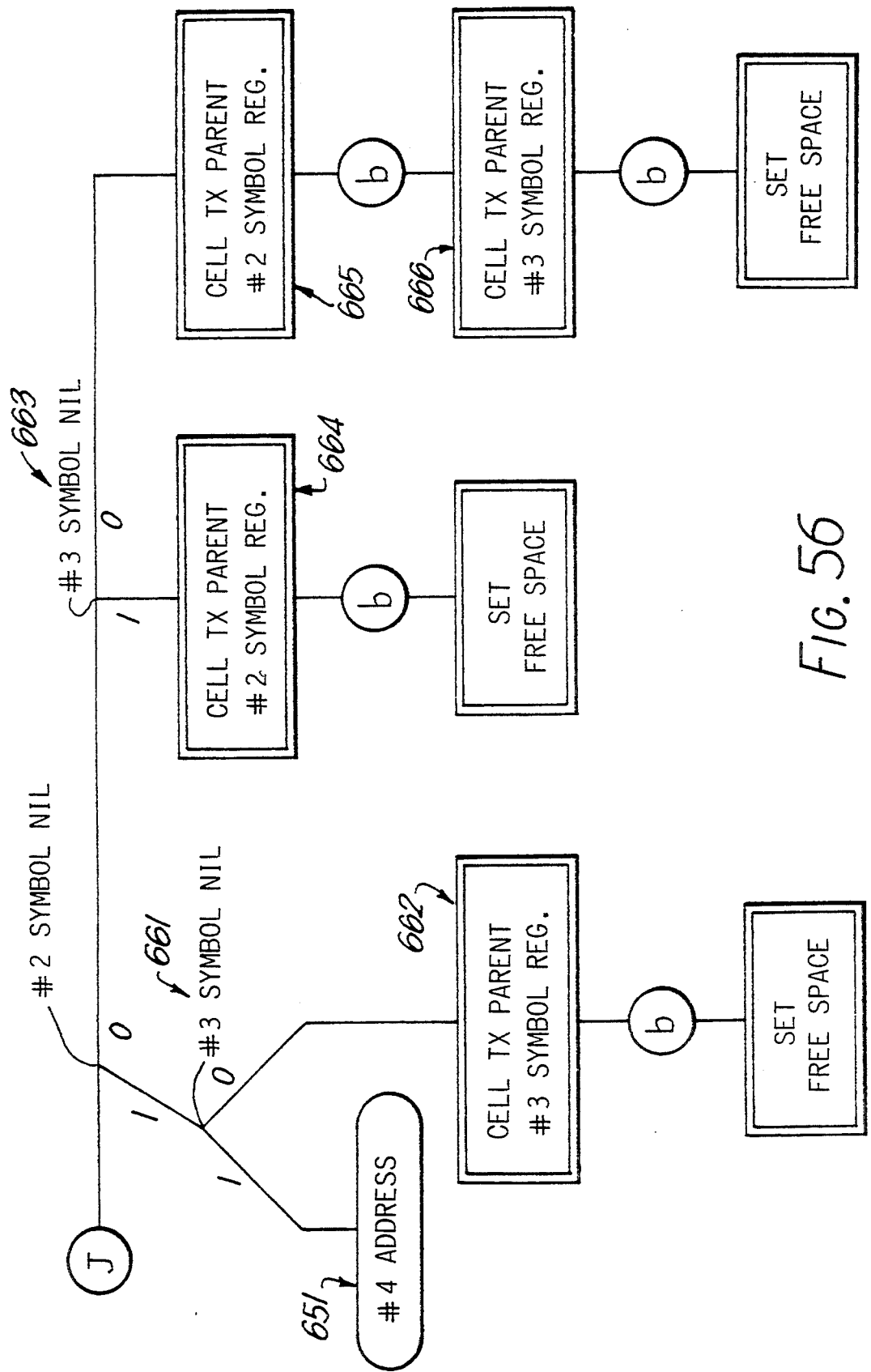
FIG. 56 is a graphical representation of steps and decisions in executive logic processes in a processor cell of the embodiment of FIG. 1.

If the cell reaches the point J of FIG. 53, the cell carries out the process shown in FIG. 56 where, after the point J, the cell tests for whether the value held in the tree 2 symbol register is NIL. If the answer is yes, the cell carries out a test 661 for whether the tree 3 symbol register contains the value NIL and, if the answer is yes, passes to the #4 ADDRESS test 651. If the tree 3 symbol register contains a value other than NIL, the cell transmits the value in that register to the parent cell in a routine 662 then enters the SET FREE SPACE routine.

If the tree 2 symbol register is found, after point J, to contain a value other than NIL, the cell carries out a test 663 to determine whether the tree 3 symbol register contains the value NIL. If the value in the tree 3 symbol register is NIL, the cell transmits the value in the tree 2 symbol register to the parent cell in a routine 664 then enters the SET FREE SPACE routine.

If the test 663 shows that the tree 3 symbol register also contains a value other than NIL, the cell transmits the tree 2 symbol register and tree 3 symbol register values to the parent cell in routines 665 and 666, then enters the SET FREE SPACE routine.

Figure 57:
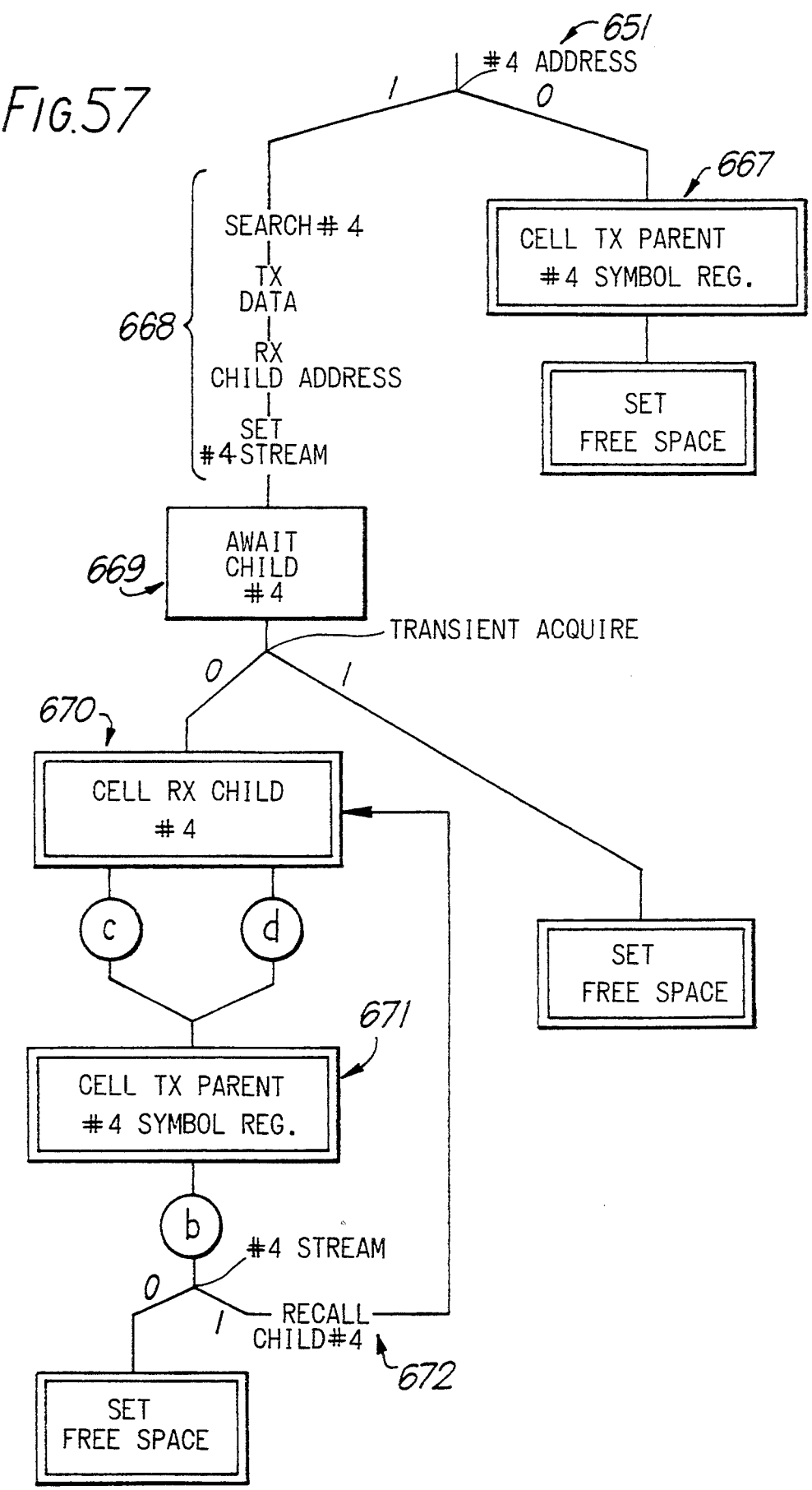
FIG. 57 is a graphical representation of steps and decisions in executive logic processes in a processor cell of the embodiment of FIG. 1.

FIG. 57 shows the process beginning with the #4 ADDRESS test 651.

If the cell reaches the test 651 for a tree 4 address in its tree 4 pointer register (#4 ADDRESS in FIGS. 51, 52, 54 and 56), and there is no tree 4 address, the cell passes to the CELL TX PARENT routine 667 in which the contents of the tree 4 symbol register are transmitted to the parent cell. The cell then enters the SET FREE SPACE routine.

If there is a tree 4 address in the tree 4 pointer register, the cell establishes the tree 4 child cell in a procedure 668 then enters an AWAIT CHILD #4 state 669.

If whilst in the AWAIT CHILD #4 state 669 the cell receives a call, the cell tests for a transient high acquire signal and, if such a signal is present, enters the SET FREE SPACE routine. If there is no transient high acquire signal at this point, the cell enters a CELL RX CHILD #4 routine 670 to receive a value from the tree 4 child cell. On leaving the routine 670, the cell enters a CELL TX PARENT routine 671 in which the cell transmits the contents of its tree 4 symbol register to its parent cell. From the routine 671 the cell passes to a test for whether or not #4 STREAM FLAG is set and, if it is not set, the cell enters the SET FREE SPACE routine since no further values will be transmitted. If the flag is set, the cell passes, by a step 672, to the point 611 (FIG. 42) in the CELL RX CHILD #4 routine 670.

Figure 58:
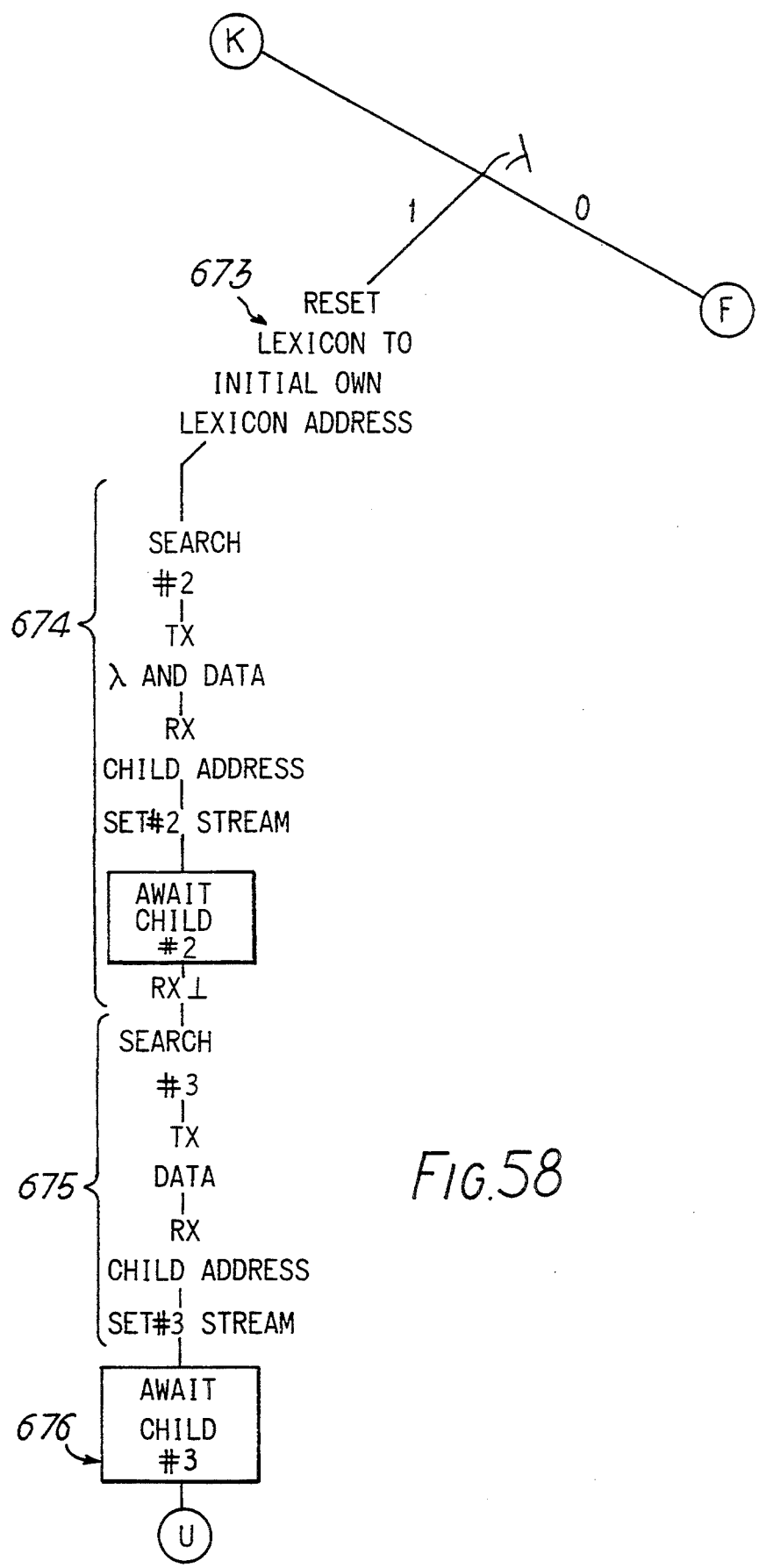
FIG. 58 is a graphical representation of steps and decisions in executive logic processes in a processor cell of the embodiment of FIG. 1.

FIG. 58 shows the processes occurring from the point K of FIG. 46. From the point K, the cell passes to a test for whether the primitive instruction register holds the lambda primitive, $\lambda$. If the answer is no, the cell passes to a point F. If the answer is yes, the cell resets the lexicon flag LEXICON to indicate that the cell's own lexicon-head address in the own lexicon-head pointer register is to be used (step 673). The cell then establishes a tree 2 child cell by a process 674 which includes transmitting the lambda primitive $\lambda$ to the tree 2 child cell as the inherited primitive instruction for that child cell (see also the description of FIG. 43 hereinbefore), and waiting for the tree 2 child to transmit NIL ($\perp$), indicating successful completion of the tree 2 child operation (see FIG. 43B from point 625). The cell then establishes a tree 3 child cell by a process 675, and enters an AWAIT CHILD #3 state 676.

Figure 59:
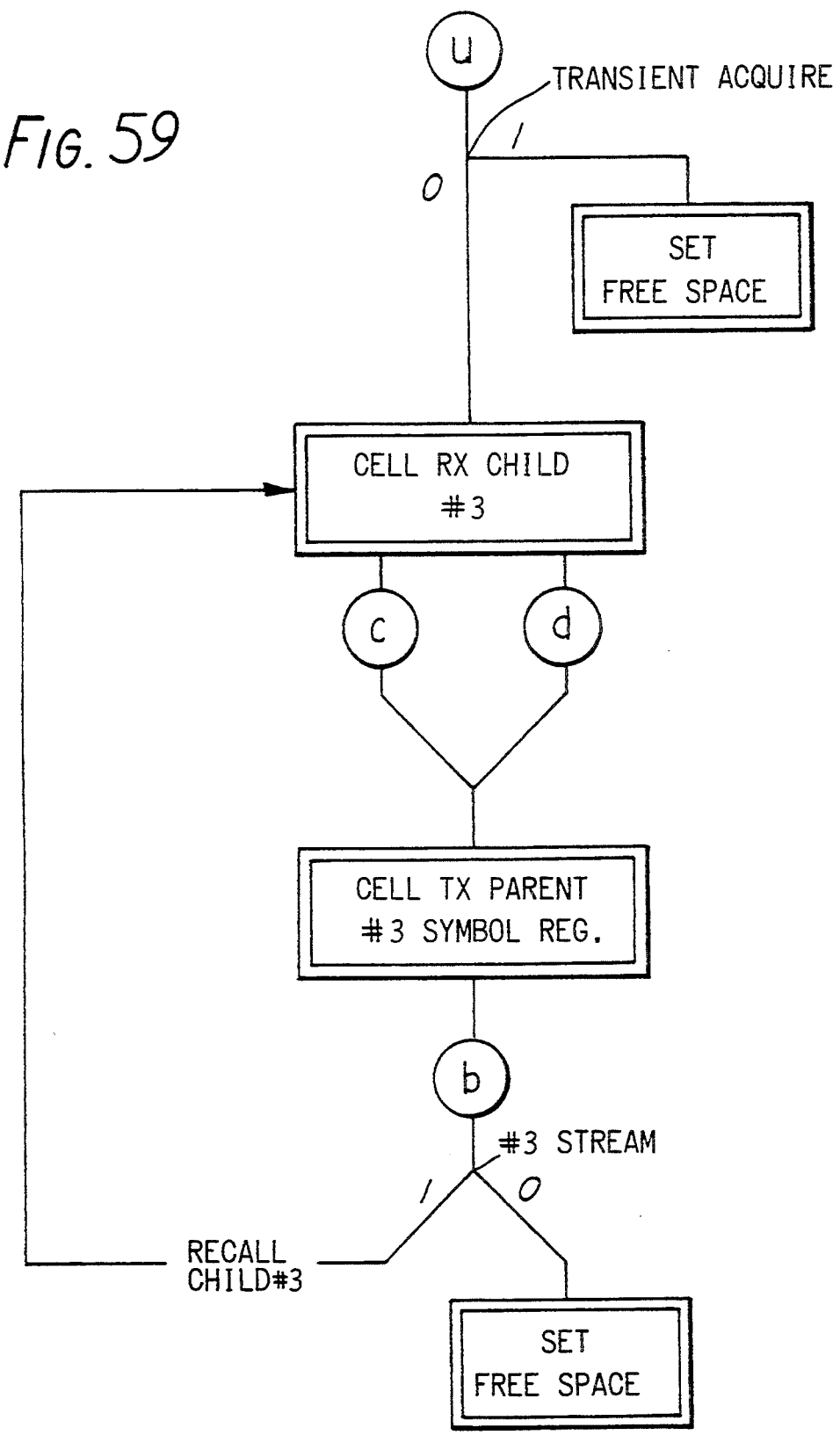
FIG. 59 is a graphical representation of steps and decisions in executive logic processes ina processor cell of the embodiment of FIG. 1.

If whilst in the AWAIT CHILD #3 state 676 the cell receives a call, the cell passes to a point U from which, as shown in FIG. 59, the cell tests for the presence of a transient high acquire signal. If there is a transient high acquire signal, the cell enters the SET FREE SPACE routine. If there is no transient high acquire signal, the cell executes the CELL RX CHILD routine in relation to the tree 3 child cell, then the CELL TX PARENT routine to transmit the value in its tree 3 symbol register. Next the cell tests whether or not the #3 STREAM flag is set, and if it is not, enters the SET FREE SPACE routine. If this flag is set, the cell passes by a step RECALL CHILD #3 to the point 611 in the CELL RX CHILD #3 routine.

Figure 60:
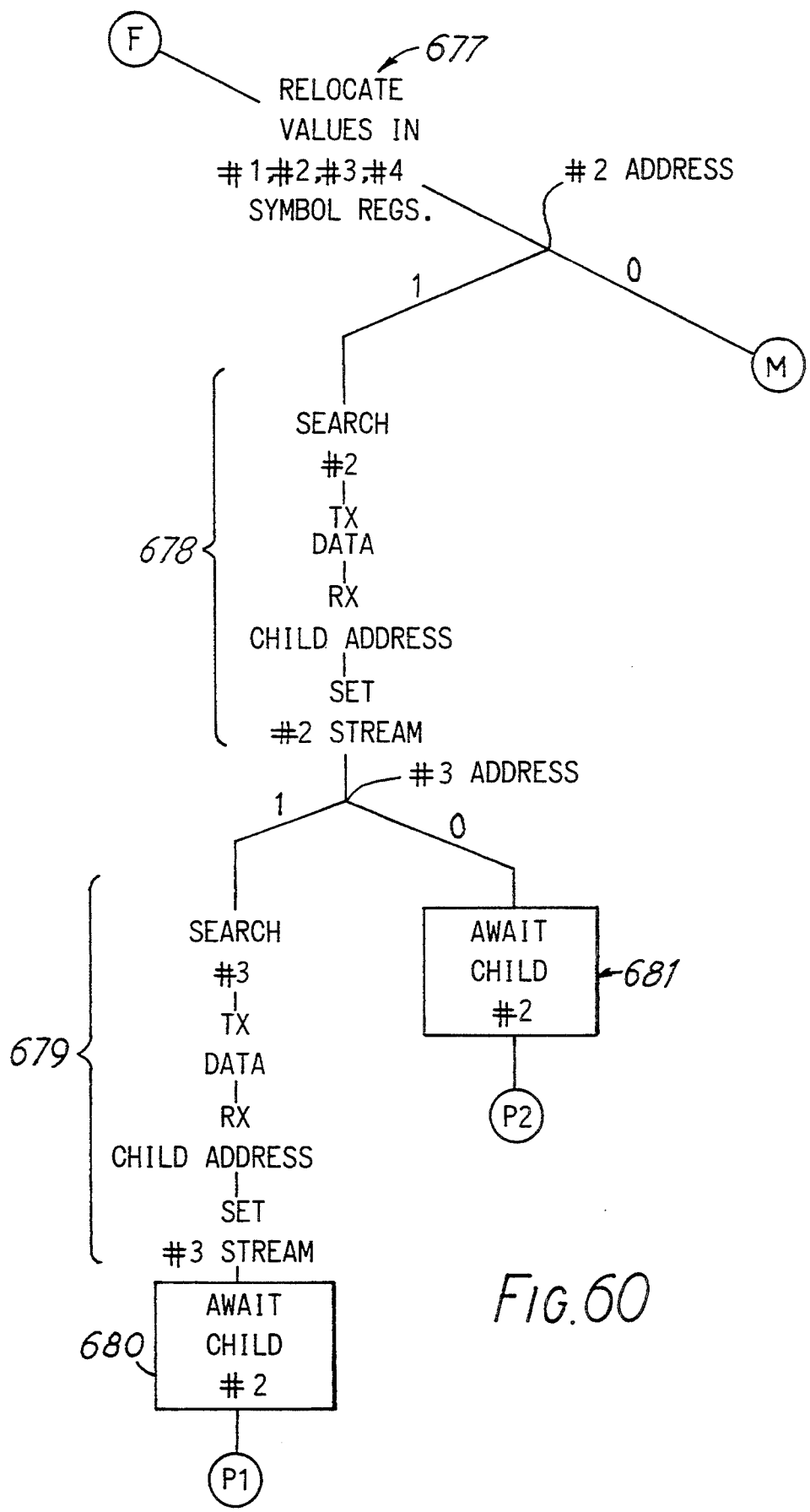
FIG. 60 is a graphical representation of steps and decisions in executive logic processes in a processor cell of the embodiment of FIG. 1.

The process from the point F of FIG. 58 is shown in FIG. 60. Since the primitive instruction is not $, \lambda - $, an inverted primitive, T or $\lambda$, by elimination the primitive instruction must be the identity primitive =. At an initial loading or copying process, values may be stored in the tree 2, tree 3, and tree 4 pointer registers. The first step of the cell following the point F is therefore to relocate any such values in its tree 2, tree 3, and tree 4 symbol registers. Thus, from the point F in FIG. 58 the cell passes to the process shown in FIGS. 60 to 64, in which the first step, 677, is relocation of any values present in the tree 1, tree 2, tree 3, and tree 4 pointer registers in the corresponding symbol registers.

The process of FIGS. 60 to 64 is the set of operations required by the presence of the identity primitive, =, in the primitive register. However, there is no actual test for the presence of this primitive since if the cell has reached the point F, it must by a process of elimination hold the identity primitive in its primitive register. In other embodiments in which further primitives similar to the identity primitive are provided, an explicit test for the presence of the identity primitive, and subsequently any such further primitive, is of course included.

The cell, after executing the step 677, tests for the presence of an address in its tree 2 pointer register and if there is no address there, passes to a point M. If there is a tree 2 address, the cell establishes the corresponding tree 2 child cell, as indicated at 678, then tests for the presence of an address in its tree 3 pointer register. If there is a tree 3 address, the cell establishes the corresponding tree 3 child cell, as indicated at 679, then enters an AWAIT CHILD #2 state 680. If there is no tree 3 address, the cell passes immediately into an AWAIT CHILD #2 state 681.

Figure 61:
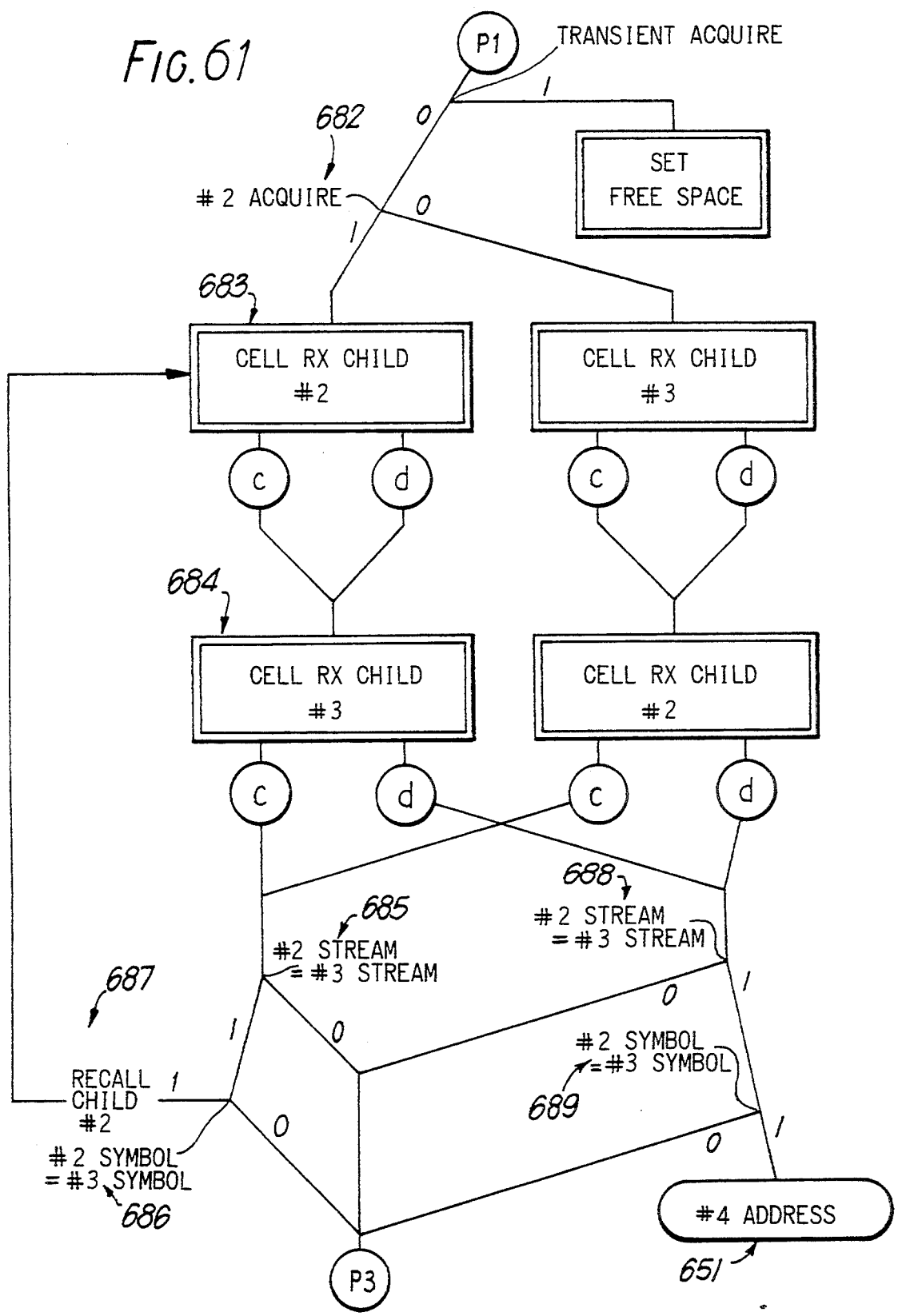
FIG. 61 is a graphical representation of steps and decisions in executive logic processes in a processor cell of the embodiment of FIG. 1.

On receiving a call whilst waiting in the state 680, the cell passes to a point P1 following which, as shown in FIG. 61, the cell enters the SET FREE SPACE routine if there is a transient high acquire signal but if not carries out a test 682 to determine whether the call has arrived through the #2 binary tree. If the call is a tree 2 call, the cell executes a CELL RX CHILD #2 routine 683 followed by a CELL RX CHILD #3 routine 684 entered at 611. If at the end of the routine 684, the #3 STREAM flag is set, the cell exits at point c (see FIG. 42) and carries out a test 685 to determine whether #2 STREAM flag is also set. If both flags are set, the cell tests, at 686, whether the value in its tree 2 symbol register is identical to the value in its tree 3 symbol register, and if they are identical, returns to the point 611 in the routine 683 by a step 687. If at the test 685 the #2 STREAM flag is not set, i.e. was reset in routine 683 (see FIG. 42), or if the values at the test 686 are not identical, the cell passes to a point P3.

If at the end of the routine 684 the #3 STREAM flag is reset, the cell exits at point d, and carries out a test 688 to determine whether #2 STREAM flag is also reset. If both flags are reset, the cell tests at 689 whether the values in the tree 2 and tree 3 symbol registers are identical and, if they are, passes to the #4 ADDRESS test 651 of FIG. 57. If the values are not equal, or if the two STREAM flags at test 688 are not both reset, the cell passes to the point P3. From FIGS. 42 and 61 it will be seen that if the data from the tree 3 child cell is identical to the data from the tree 2 child cell, the cell passes to the #4 ADDRESS test 651, whereas if the two sets of data are not identical, the cell passes to the point P3. An initial call from tree 3 child cell is treated similarly.

Figure 62:
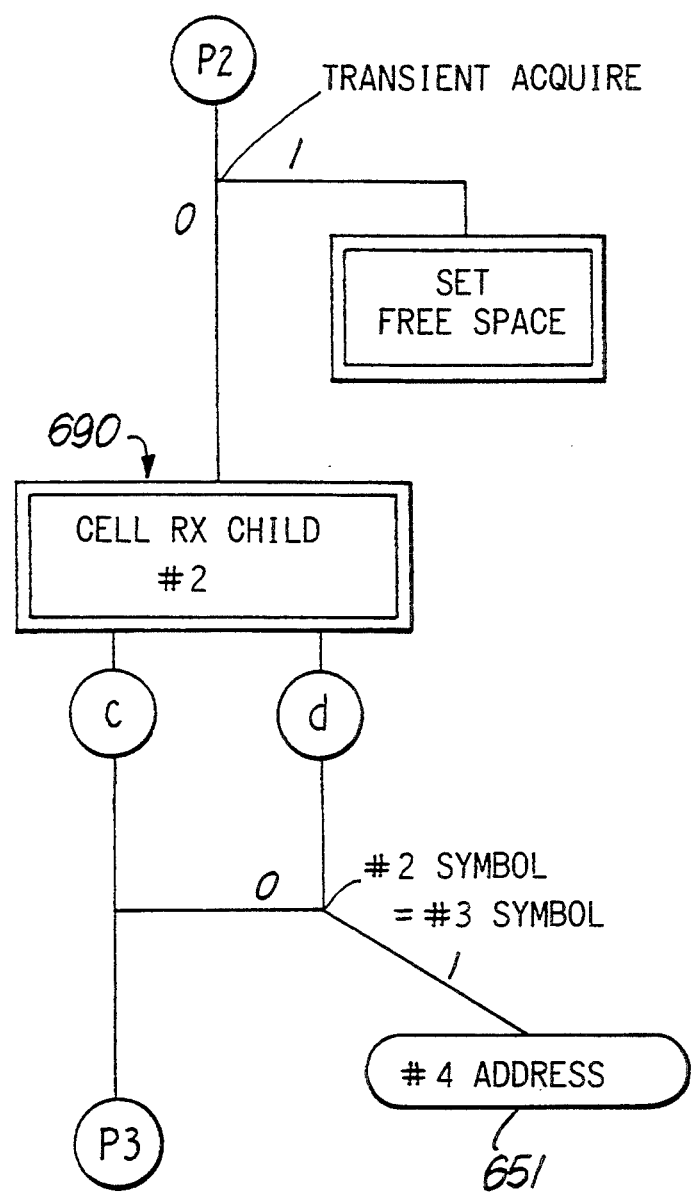
FIG. 62 is a graphical representation of steps and decisions in executive logic processes in a processor cell of the embodiment of FIG. 1.

On receiving a call whilst waiting in the state 681 of FIG. 60, the cell passes to a point P2 following which, as shown in FIG. 62, the cell tests for the presence of a transient high acquire signal and, if such a signal is present, enters the SET FREE SPACE routine. If there is no transient high acquire signal, the cell executes a CELL RX CHILD #2 routine 690. Since the tree 3 symbol register holds a value (see FIG. 60), the cell passes directly to the point P3 if the #2 STREAM flag is set (point c) on exit from the routine 690. If the #2 STREAM flag has been reset by the routine 690 (point d), the cell tests whether the values in the tree 2 and tree 3 symbol registers are identical. If the values are not identical, the cell passes to point P3; if the values are identical, the cell passes to #4 ADDRESS 651.

Figure 63:
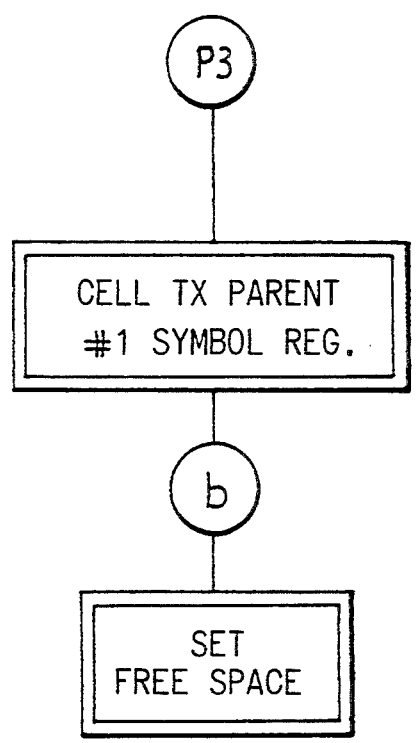
FIG. 63 is a graphical representation of steps and decisions in executive logic processes in a processor cell of the embodiment of FIG. 1.

FIG. 63 shows the process from the point P3 of FIGS. 61 and 62. Following on from P3, the cell executes a CELL TX PARENT routine in which the value held in its tree 1 symbol register is transmitted to the parent cell, then enters the SET FREE SPACE routine. The value in the tree 1 symbol register is arranged to be NIL, either as part of the step 677 of FIG. 60 or as a result of the initial process of definition of the contents of the registers by copying from a definition cell, the tree 1 symbol register of the definition cell being loaded with the value NIL.

Figure 64:
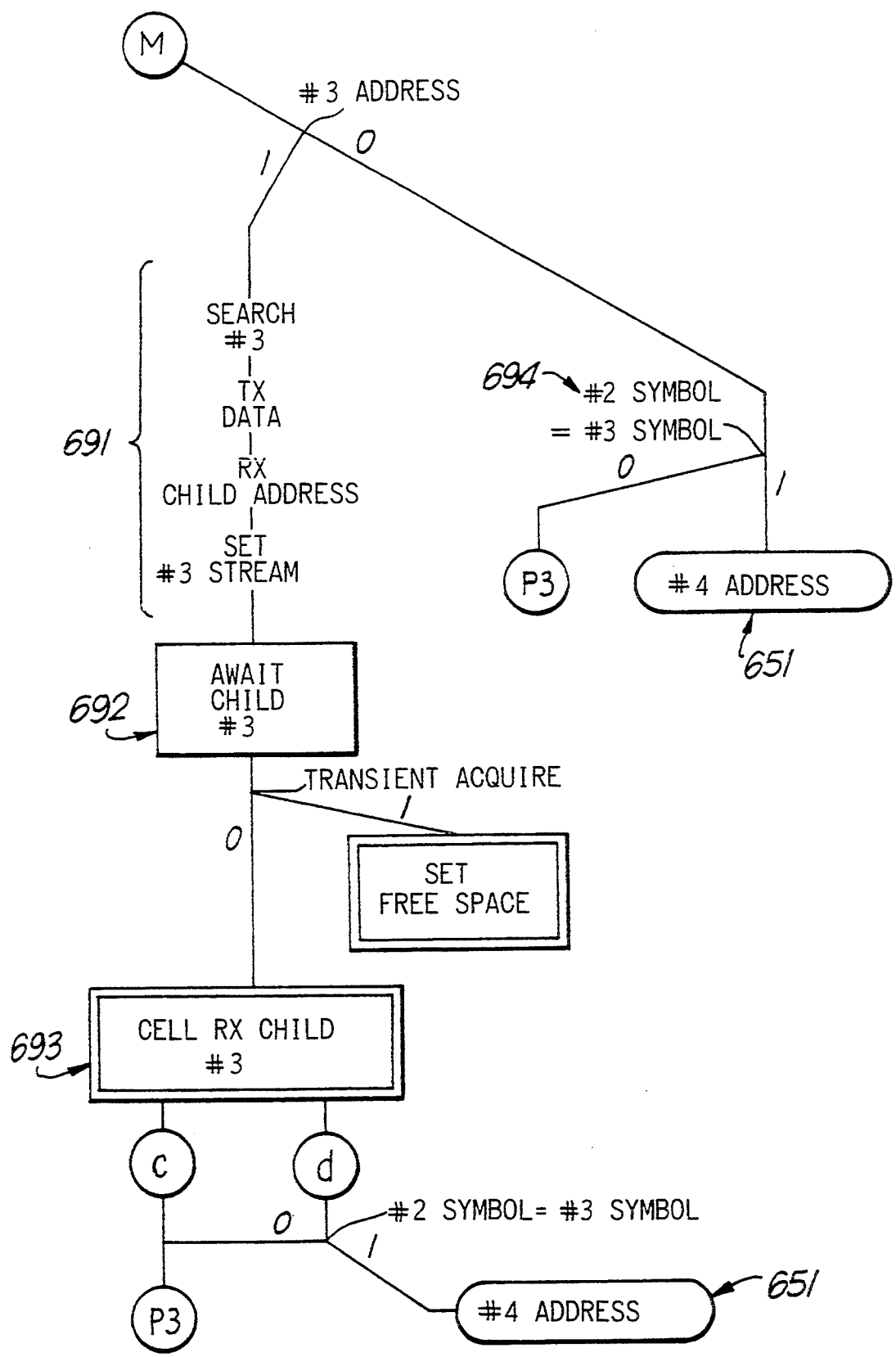
FIG. 64 is a graphical representation of steps and decisions in executive logic processes in a processor cell of the embodiment of FIG. 1.

If the cell passes to the point M of FIG. 60, the cell carries out the process of FIG. 64 in which, after the point M, the cell determines whether its tree 3 pointer register holds an address and, if yes, establishes the corresponding tree 3 child cell as indicated at 691, then enters an AWAIT CHILD #3 state 692.

On receiving a call whilst in the state 692 the cell either enters the SET FREE SPACE routine if there is a transient high acquire signal or executes a CELL RX CHILD #3 routine 693 if there is no transient high acquire signal. The process after the routine 693 is as described herein before with reference to FIG. 62 in relation of the routine 690.

If there is no tree 3 address in the tree 3 pointer register, the cell carries out a test 694 to determine whether the value in the tree 3 symbol register is identical to the value in the tree 2 symbol register. If the values are not identical the cell passes to the point P3, and if the values are identical the cell passes to the #4 ADDRESS test 651.

Figure 65:
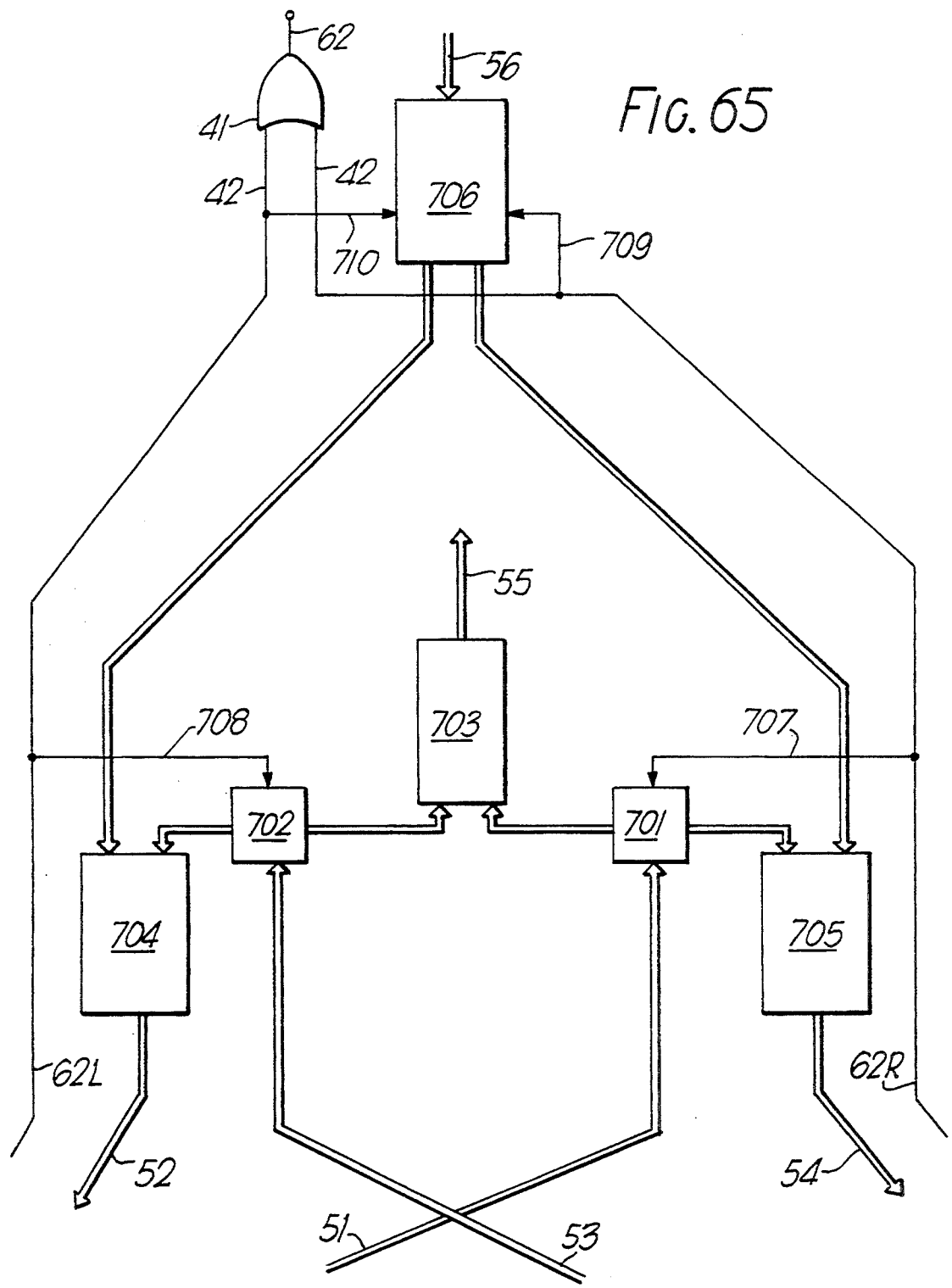
FIGS. 65 is a block diagram of an alternative network node of an embodiment of the invention.

FIG. 65 illustrates schematically an alternative node structure for a network of an embodiment of the invention. Connections and components of the node of FIG. 65 which correspond to connections and components of the node of FIG. 5 are given the same reference numerals in FIG. 65.

The node of FIG. 65 is designed to respond to the acquire, address/data, acknowledge, and free signals as in the case of the node of FIG. 5, except for some differences which will be explained hereinafter.

In the node of FIG. 65, the lefthand lower upwards channel 51 and the righthand lower upwards channel 53 are connected to respective crossover/upwards selectors 701 and 702. Each of the selectors 701 and 702 passes signals on the respective upwards channel 51 or 53 either to an upwards arbiter 703 or to a respective downwards arbiter 704 or 705. The upwards arbiter 703 supplies the upwards channel 55 of the upper path segment to the node. The downwards channel 56 of the upper path segment supplies a left/right selector 706 which passes signals on the downwards channel 56 either to the downwards arbiter 704 or to the downwards arbiter 705. The downwards arbiter 704 passes the signals supplied by the left/right selector 706 or the signals supplied by the crossover/upwards selector 702 to the lefthand lower downwards channel 52, and the downwards arbiter 705 passes the signals supplied by the left/right selector 706 or the signals supplied by the crossover/upwards selector 701 to the righthand lower downwards channel 54. Free signals supplied to the righthand free signal line 62R are supplied through connections 707 and 709 to the crossover/upwards selector 701 and to the left/right selector 706, and free signals supplied to the lefthand free signal line 62L are supplied throught connections 708 and 710 to the crossover/upwards selector 702 and to the left/right selector 706.

Figure 66:
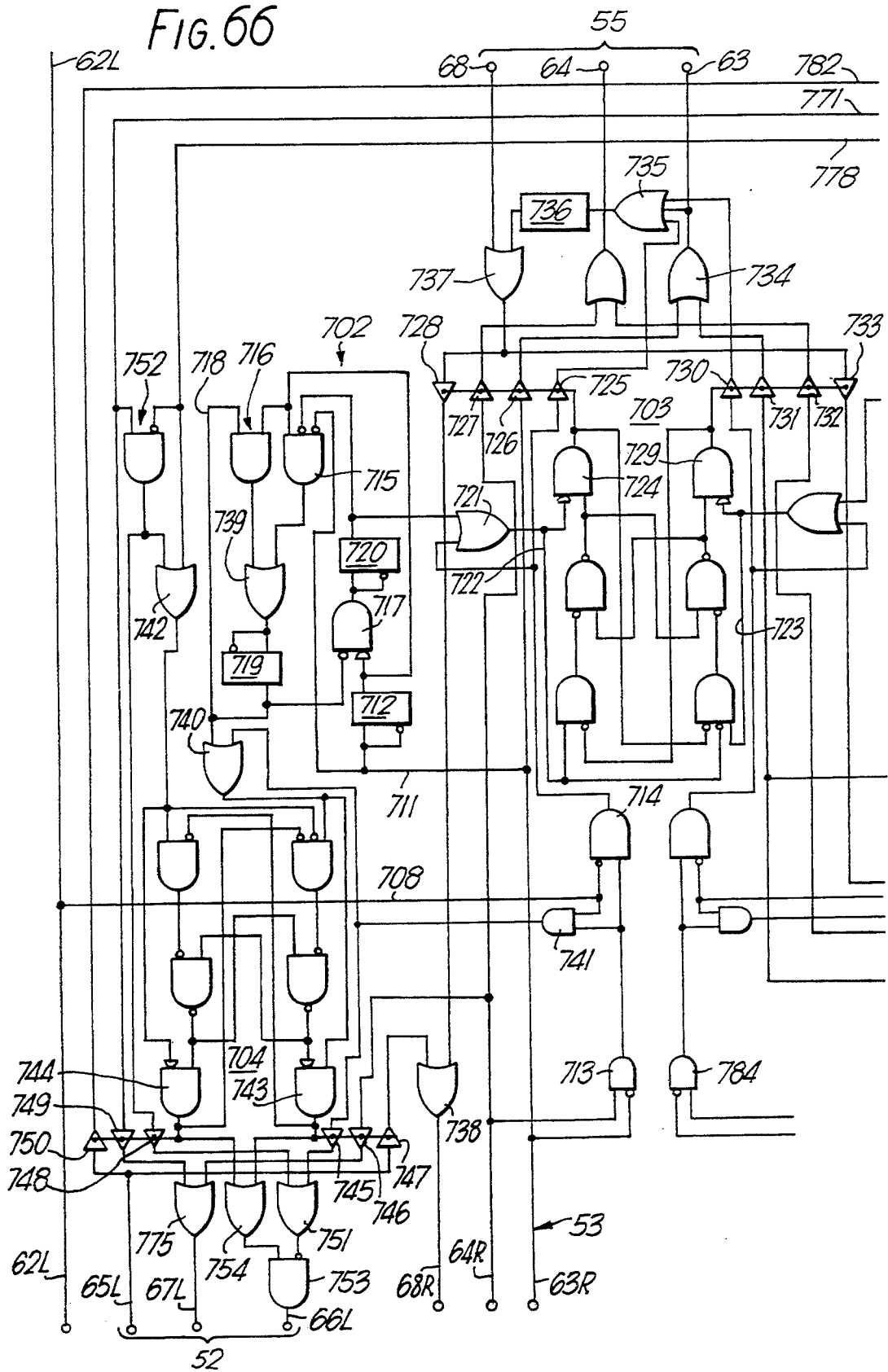
FIGS. 66, 67, and 68 are circuit diagrams of parts of the node of FIG. 65.

FIG. 66 shows the circuitry of the lefthand downwards arbiter 704, the crossover/upwards selector 702, and the upwards arbiter 703.

When a normal acquire signal appears on the righthand lower upwards channel 53, there is a high acquire signal on line 63R and a low address/data signal on line 64R, which provides a high signal on a connection 711 to a bistable circuit 712, and establishes a low output signal from an AND gate 713 having an inverted input from the line 63R. The low output from the AND gate 713 is connected directly to one input of an AND gate 714 which accordingly also produces a low output signal.

The high signal on the connection 711 sets the bistable circuit 712 which therefore supplies a high signal directly to respective inputs of two AND gates 715 and 716, and through a delay element to one input of an AND gate 717. The AND gate 715 is held closed by the high signal on the connection 711 which is applied through an inverter to the gate 715. The AND gate 716 is also held closed by a low signal on a connection 718 from a bistable circuit 719 in the reset state. If the acquire signal remains high until the delay at the input to the AND gate 717 has elapsed, the AND gate 717 produces a high output signal since its other input is supplied through an inverter by the output from the reset bistable circuit 719. The high output from the AND gate 717 sets a further bistable circuit 720 which therefore supplies a high signal to an inverted input of the AND gate 715 and to an OR gate 721 which is open because the AND gate 714 is supplying a low output signal to the other input of the OR gate 721. Thus the OR gate 721 supplies a high signal to a connection 722 in the upwards arbiter 703. The connection 722 is part of a latching circuit having the same configuration as the latching circuit 74 of FIG. 7. Accordingly, if the connection 722 receives a high signal before another connection 723 therein, an AND gate 724 of the latching circuit provides a high output signal that enables four line switches 725 to 728, and an AND gate 729 of the latching circuit remains closed and maintains a low output signal that holds four line switches 730 to 733 disabled. The high signal on acquire line 63R therefore passes through the line switch 726 and an OR gate 734 to the upwards outgoing acquire line 63 of the upwards channel 55 of the upper path segment. The high output signal from the OR gate 734 also passes through an OR gate 735 to an edge triggered monostable circuit 736 that therefore generates an acknowledge pulse which passes through an OR gate 737 and the line switch 728 to an OR gate 738 that supplies the righthand lower upwards channel acknowledge line 68R.

Figure 67:
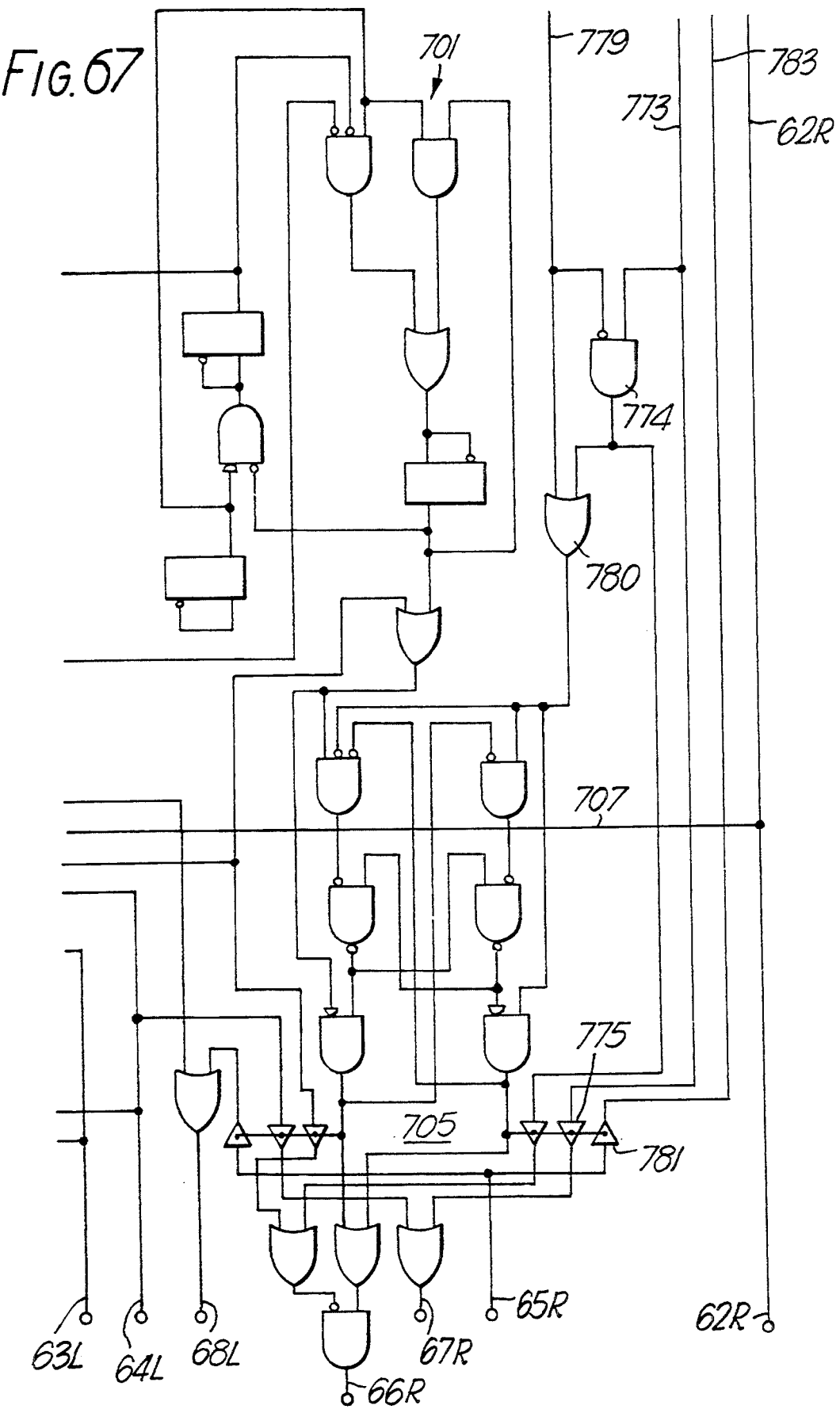

If the high signal on the acquire line connection 711 is dropped momentarily before the AND gate 717 with the delayed input produces a high output signal, the AND gate 715 receives a high input signal directly from the bistable circuit 712, and low signals from the bistable circuit 720 and the connection 711 at its inverted inputs, and therefore produces a high output signal that passes through an OR gate 739 to set the bistable circuit 719. This circuit 719 when set holds the AND gate 717 closed by a high signal to an inverted input, and latches the crossover/upwards selector 702 into the crossover state by applying the high signal through the connection 718 to the AND gate 716. The high output of the bistable circuit 719 is also supplied through an OR gate 740 to the downwards arbiter 704. The OR gate 740 is open because its other input is supplied by the output of an AND gate 741 receiving as an input the low output signal from the AND gate 713. The output of the OR gate 740 is connected to a latching circuit having the same configuration as the latching circuit 127 of FIG. 10 and, if the latching circuit has not already been seized by a high output signal from an OR gate 742, an AND gate 743 of the latching circuit produces a high output signal, and an AND gate 744 of the latching circuit maintains a low output signal. The AND gate 743 thus enables three line switches 745, 746 and 747, and the AND gate 744 holds three line switches 748, 749 and 750 disabled. An OR gate 751 is therefore supplied with low input signals by the AND gate 741 and the switch 748, and supplies a low output signal to an inverted input of an AND gate 753 the output of which supplies the lefthand lower downwards channel acquire line 66L. The other input of the gate 753 is supplied with a high signal directly from an OR gate 754 supplied with the output signals from the AND gates 743 and 744. The address/data signal on line 64R passes through the line switch 746 to an OR gate 755 supplying the lefthand lower downwards channel address/data line 67L. A crossover connection for the acknowledge signals on line 65L is provided through the line switch 747 to the OR gate 738. By inspection of FIG. 66 and FIG. 67 it will be seen that the crossover/upwards selector 701 and the downwards arbiter 705 are constructed to operate in the same manner as the selector 702 and the arbiter 704.

Figure 68:
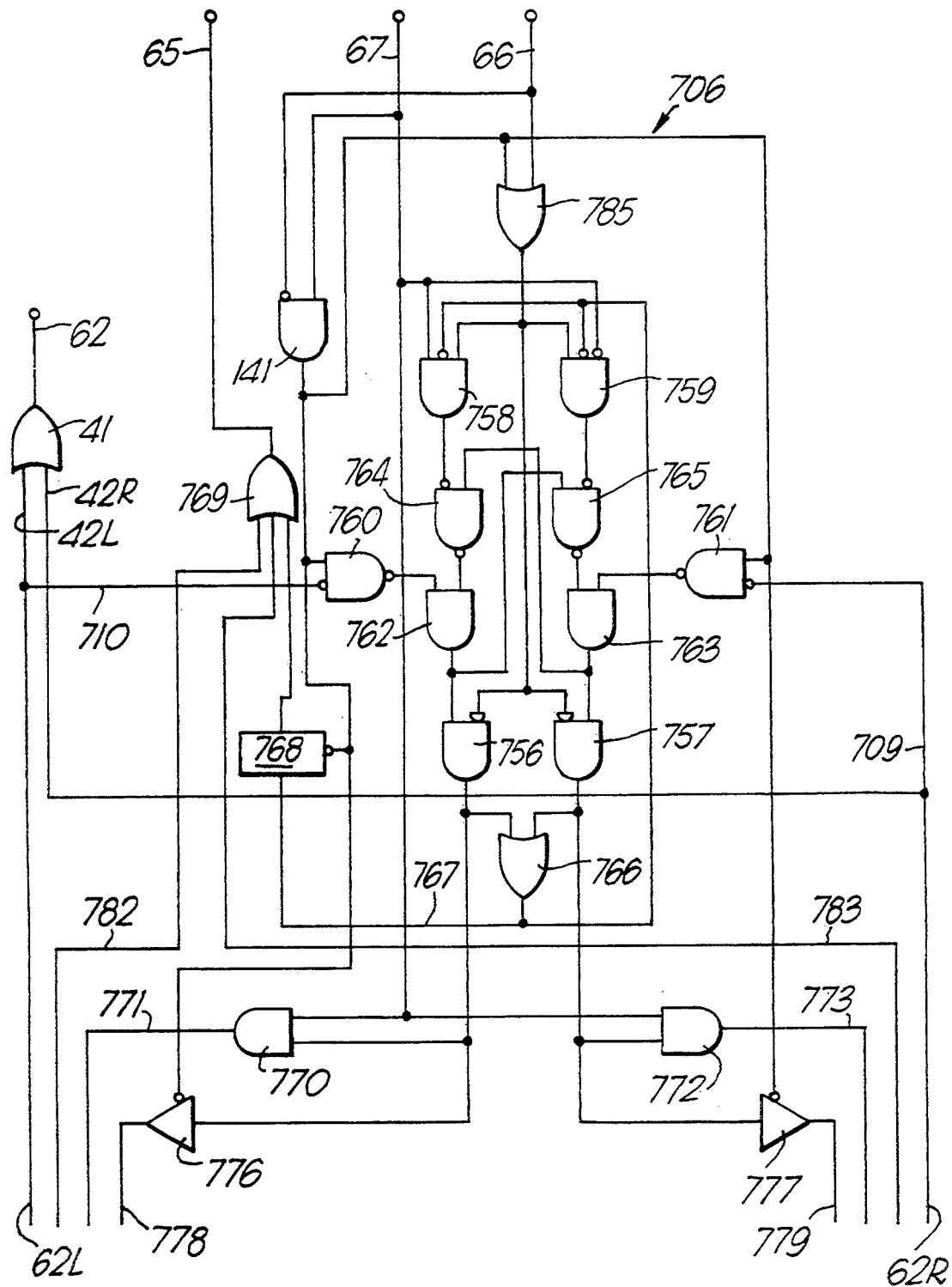

FIG. 68 shows the circuitry of the left/right selector 706. For an incoming normal acquire signal, there is a high signal on the acquire line 66 and a low signal or a high signal on the address/data line 67. The AND gate 141 is therefore closed. The high acquire signal is supplied through delay elements to two output AND gates 756 and 757, and directly to respective inputs of two input AND gates 758 and 759. If the address/data signal on line 67 is high the gate 758 opens, and if that signal is low, the gate 759 opens.

The low output signal from the gate 141 is supplied directly to inputs of two NAND gates 760 and 761 which therefore supply high output signals to respective AND gates 762 and 763 which are thereby opened to pass signals from respective NAND gates 764 and 765 to the AND gates 756 and 757. The NAND gates 764 and 765 receive inputs from the AND gates 758 and 759 through inverters, and have respective direct inputs from the AND gate 762 or 763 of the other side of the circuit, so that the NAND gates 764 and 765 are effectively cross coupled. Hence when both AND gates 762 and 763 are open, the gates 762 to 765 latch a high output from input AND gate 758 to output AND gate 756, or a high output from input AND gate 759 to output AND gate 757. An OR gate 766 couples the high output from gate 756 or gate 757 to inverted inputs of both input AND gates 758 and 759, thereby isolating the output AND gates 756 and 757 from further changes in the address/data signal on line 67. The high signal from OR gate 766 is also applied through a connection 767 to an edge triggered monostable circuit 768 that is enabled by inversion of the low output signal from the AND gate 141 and therefore generates an acknowledge pulse which is coupled through an OR gate 769 to the acknowledge line 65.

A high output signal from gate 756 opens an AND gate 770 to allow the address/data signal on line 67 to pass to a connection 771 to an AND gate 752 and line switch 749 of FIG. 66. A high output signal from gate 757 opens an AND gate 772 to allow the address/data signal on line 67 to pass to a connection 773 to a corresponding AND gate 774 and line switch 775 of FIG. 67.

Two line switches 776 and 777 of FIG. 68 have inverters at their respective enabling inputs, and the signal from the output of AND gate 141 is supplied to these inverters. In the present example, the output signal from gate 141 is low, so that the line switches 776 and 777 are enabled. Accordingly, the line switch 776 passes the output signal of the AND gate 756 to a connection 778 to the AND gate 752 and OR gate 742 of FIG. 66, and the line switch 777 passes the output signal of the AND gate 757 to a connection 779 to the corresponding AND gate 774 and a corresponding OR gate 780 of FIG. 67.

Acknowledge pulses from the lines 65L (FIG. 66) and 65R (FIG. 67) which pass respectively through the line switch 750 and a line switch 781 reach the OR gate 769 through connections 782 and 783 respectively.

The presence or absence of a free signal on the free signal lines 62L and 62R when there is a high acquire signal on line 66 in FIG. 68 has no effect on the operation of the left/right selector 706 since the high acquire signal results in a low output signal from the gate 141 which forces high output signals from the NAND gates 760 and 761.

Similarly, the presence or absence of a free signal on the free signal line 62L when there is a high acquire signal on the acquire line 63R (FIG. 66) has no effect on the upwards arbiter 703 and no effect on the lefthand downwards arbiter 704 since the high acquire signal results in a low output signal from the AND gate 713 which forces low output signals from the AND gates 714 and 741. In the same way, the presence or absence of a free signal on the free signal line 62R when there is a high acquire signal on the acquire line 63L (FIG. 67) has no effect on the upwards arbiter 703 and no effect on the righthand downwards arbiter 705 since the high acquire signal results in a low output signal from an AND gate 784.

When a search signal appears on the lines 66 and 67 at the left/right selector 706, there is a low acquire signal on line 66 and a high address/data signal on line 67. The AND gate 141 therefore produces a high output signal which is supplied through an OR gate 785 to the input AND gates 758 and 759 and, through the respective delay elements, to the output AND gates 756 and 757. The high address/data signal on line 67 is applied directly to the two AND gates 770 and 772 which are thereby opened. The high address/data signal is also applied directly to the input AND gate 758 and through an inverter to the input AND gate 759. Low outputs from the AND gates 756 and 757 are coupled through the OR gate 766 to inverted inputs of the AND gates 758 and 759. Consequently the AND gate 758 produces a high output signal and the AND gate 759 produces a low output signal.

The high output signal from AND gate 141 opens the NAND gates 760 and 761 to the effect of the presence or absence of free signals on the free signal lines 62L and 62R. If there is a free signal (high) on both lines 62L and 62R, the AND gate 762 produces a high output signal and the AND gate 763 produces a low output signal, so that through the consequent operation of the AND gates 756 and 757, the AND gate 770 produces a high output signal on connection 771, and the AND gate 772 produces a low output signal on connection 773.

If there is a free signal on line 62L but not On line 62R, the AND gate 762 produces a high output signal and the AND gate 763.7 produces a low output signal so that again the AND gate 770 produces a high on connection 771, and AND gate 772 produces low on connection 773.

If there is a free signal on line 62R but not on line 62L, the AND gate 762 produces a low output signal that forces a high output signal from the NAND gate 765, so that AND gate 763 produces a high output signal. Hence in this case the AND gate 772 provides a high on connection 773, and AND gate 770 provides a low on connection 771.

If there is a free signal on neither line 62L nor line 62R, both NAND gates 760 and 761 produce low output signals so that both connections 771 and 773 are held low, and the search signal is blocked by this operation of the left/right selector 706.

A search signal that seizes the left/right selector 706 appears either as a search signal on connections 771 and 778, or as a search signal on connections 773 and 779. Consequently either AND gate 752 (FIG. 66) or AND gate 774 (FIG. 67) produces a high output signal that may seize the left hand downwards arbiter 704 or the right hand downwards arbiter 705 respectively, which may accordingly propagate the search signal on lines 67L and 66L or 67R and 66R respectively. It will be noted that the high output from the AND gate 752 or 754 closes the AND gate 753 (FIG. 66) in the corresponding AND gate in FIG. 67 respectively.

The presence of a search signal at the lines 67 and 66 ensures that the acquire signal connections 778 and 779 to the left and righthand downwards arbiters 704 and 705 are held low through the action of the AND gate 141 and the line switches 776 and 777.

When a search signal appears on the lines 63R and 64R (FIG. 66) at the crossover/upwards selector 702, there is a low acquire on line 63R and a high address-/data signal on line 64R. The low acquire signal on line 63R holds the bistable circuit 712 in its reset state so that the OR gate 740 continues to receive a low input signal from the bistable circuit 719, and the OR gate 721 continues to receive a low input signal from the bistable circuit 720. The AND gate 713 produces a high output signal which opens the AND gates 741 and 714 to the effect of the presence or absence of a free signal on the free signal line 62L. If there is no free signal, i.e. low on line 62L, the gate 741 produces a low output signal, and the gate 714 produces a high output signal which passes through the OR gate 721 to seize the latching circuit of the upwards arbiter 703 if that circuit has not already been seized by a signal from the other crossover/upwards selector 701. The search signal may therefore pass upwards through the line switches 726 and 727, and an acknowledge pulse be generated by the monostable circuit 736 by the transmission of the high output signal from the AND gate 714 through the line switch 725 and the OR gate 735.

If there is a free signal on the line 62L, the AND gate 714 produces a low output signal, so that the upwards arbiter 703 will not be seized by the search signal, and the AND gate 741 produces a high output signal which passes through the OR gate 740 to seize the lefthand downwards arbiter 704 if this arbiter has not already been seized by a signal from the left/right selector 706. The high output signal from the AND gate 741 also passes through the line switch 745 if the search signal seizes the arbiter 704, and thence through the OR gate 751 to an inverted input of the AND gate 753 which therefore produces a low output signal on the acquire signal line 66L. The high address/data signal on line 64R passes through the line switch 746 to the OR gate 775 which thus provides a high address/data signal on the address/data signal line 67L.

A search signal appearing on the lines 63L and 64L (FIG. 67) has corresponding effects because of the symmetry of the node circuitry.

The node of FIGS. 65 to 68 allows concurrent existence of a route through the crossover/upwards selector 701 to the righthand downwards arbiter 705 and a route through the crossover/upwards selector 702 to the lefthand downwards arbiter 704. A network 14 having nodes in accordance with FIGS. 65 to 68 is therefore able to support a higher density of concurrent routes therein than a network 14 having nodes in accordance with FIGS. 5 to 12. The processor cells 11 are, in order to co-operate with the nodes of FIGS. 65 to 68, modified to transmit a momentary low in the normal acquire high acquire signal to effect crossover at a node. Alternatively, the circuitry of the node of FIGS. 65 to 68 may be so modified as to effect crossover in response to the high address/data crossover signal transmitted by the processor cells of FIGS. 2 and 38.

If the node of FIGS. 65 to 68 is the highest node, i.e., the root node, of a binary tree, then the lines 63 to 68 forming the upwards and downwards channels 55 and 56 must, if not connected to a peripheral unit, be provided with suitable terminations. Therefore, in the absence of a peripheral unit, lines 66, 67, and 68 are connected to sources of a permanent low signal, and lines 63, 64, and 65 are coupled to ground through suitable resistive elements.

Figure 69:
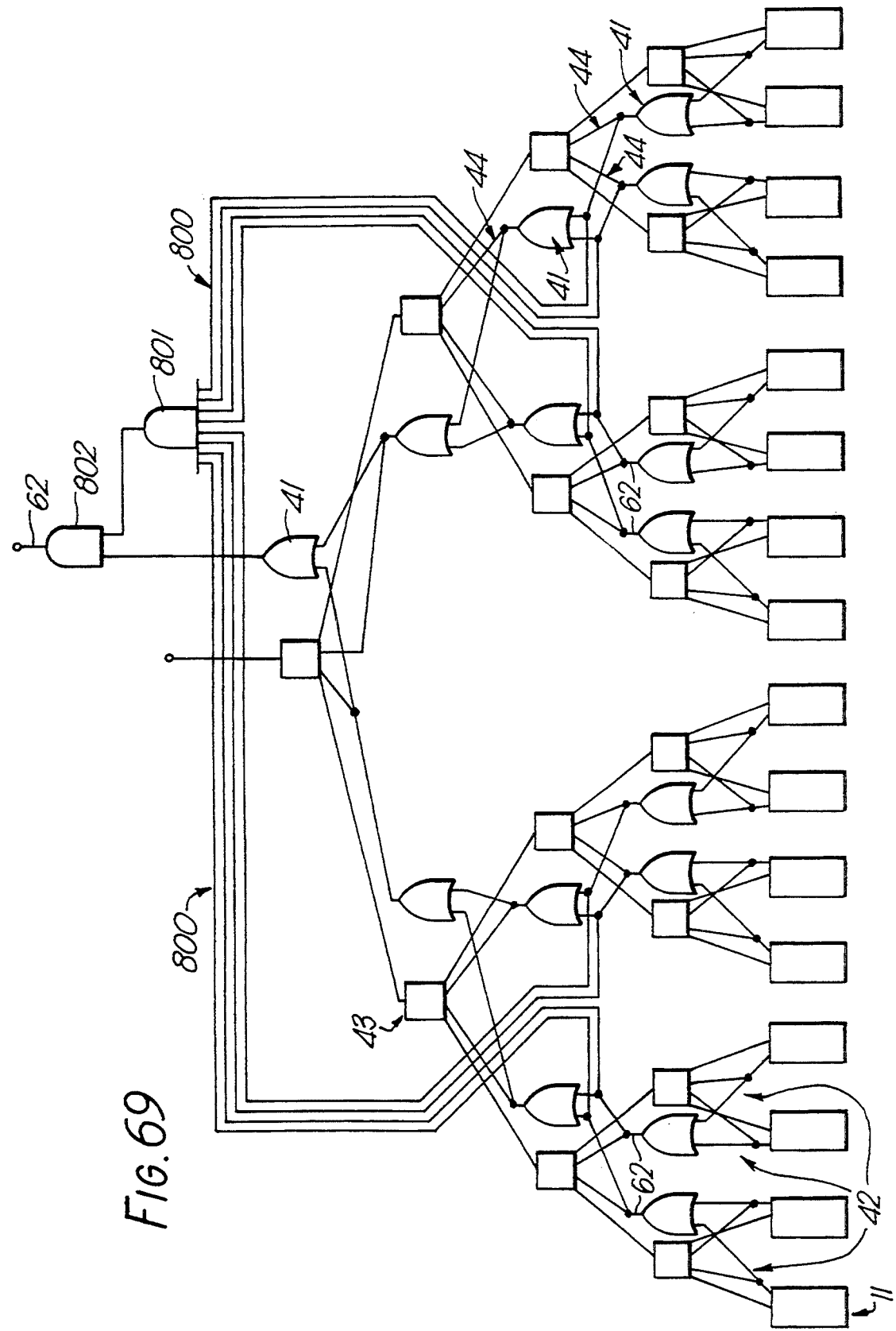
FIG. 69 is a schematic representation of part of a modification of the embodiment of FIG. 1.

FIG. 69 illustrates a further control mechanism that can be incorporated in the network 14. In FIG. 69 a binary sub-tree corresponding to sixteen leaf positions is shown together with eight connections 800 from free signal lines 62 via the connections 42. The eight connections 800 originate at the input free signal connections 42 to the OR gates 41 at the second level of nodes of the binary tree, and are connected directly to the inputs of an eight input AND gate 801. Consequently the gate 801 provides a high output signal only when at least alternate ones of the sixteen processor cells 11 are transmitting free signals into the network 14. The output from the AND gate 801 is supplied directly as one input to a two input AND gate 802 which receives the output from the fourth node level OR gate 41 as its other input, and the output from the AND gate 802 is transmitted further into the binary tree network as the resultant free signal from the sub-tree shown in FIG. 69. As a result, a searching signal can only enter the sub-tree of FIG. 69 if at least alternate ones of the sixteen processor cells 11 are in the free state. Searching signals originating from any one or more of these sixteen processor cells are not affected, and may meet and be drawn down by a free signal from another of these sixteen processor cells. Thus a mechanism is provided whereby access by searching signals can be restricted to access by searching signals originating within a defined region of the network when the density of free state processor cells in that region falls below a predetermined level and distribution. Other levels and distributions than the alternate ones of sixteen cells of FIG. 69 can be used if desired.

In an alternative embodiment of the processing apparatus, the processor cells do not store their own address, but instead regenerate them during communication procedures from signals supplied by the nodes of the communication network 14. The nodes of this alternative embodiment are adapted to generate two acknowledge signals: one of the acknowledge signals is substantially as already described hereinbefore; the other acknowledge signal provides one bit in the address of all the cells for which that node is the root of the subtree in which the cells are at the leaf positions. Thus as a calling signal ascends up a tree from a cell of the tree, each node acquired in succession generates one bit of the address of the cell and transmits that bit as a second acknowledge signal back to the calling cell. It will be apparent from consideration of binary tree structure, for example FIG. 3 herein, that the address bit stored at any node is the address bit corresponding to the path segment immediately above the node. Each cell in this embodiment stores only the least significant bit of its own address in a tree, so that each standard cell will, for a four tree network, store one bit for each of its four ports.

The two kinds of acknowledge signal can be generated either in sequence so that only one acknowledge signal line is needed in each direction, as in the node circuitry described hereinbefore with reference to FIGS. 6 to 12 or FIGS. 66 to 68, or in parallel. If the two kinds of acknowledge signal are to be generated in parallel, a second acknowledge signal line is required.

Figure 70:
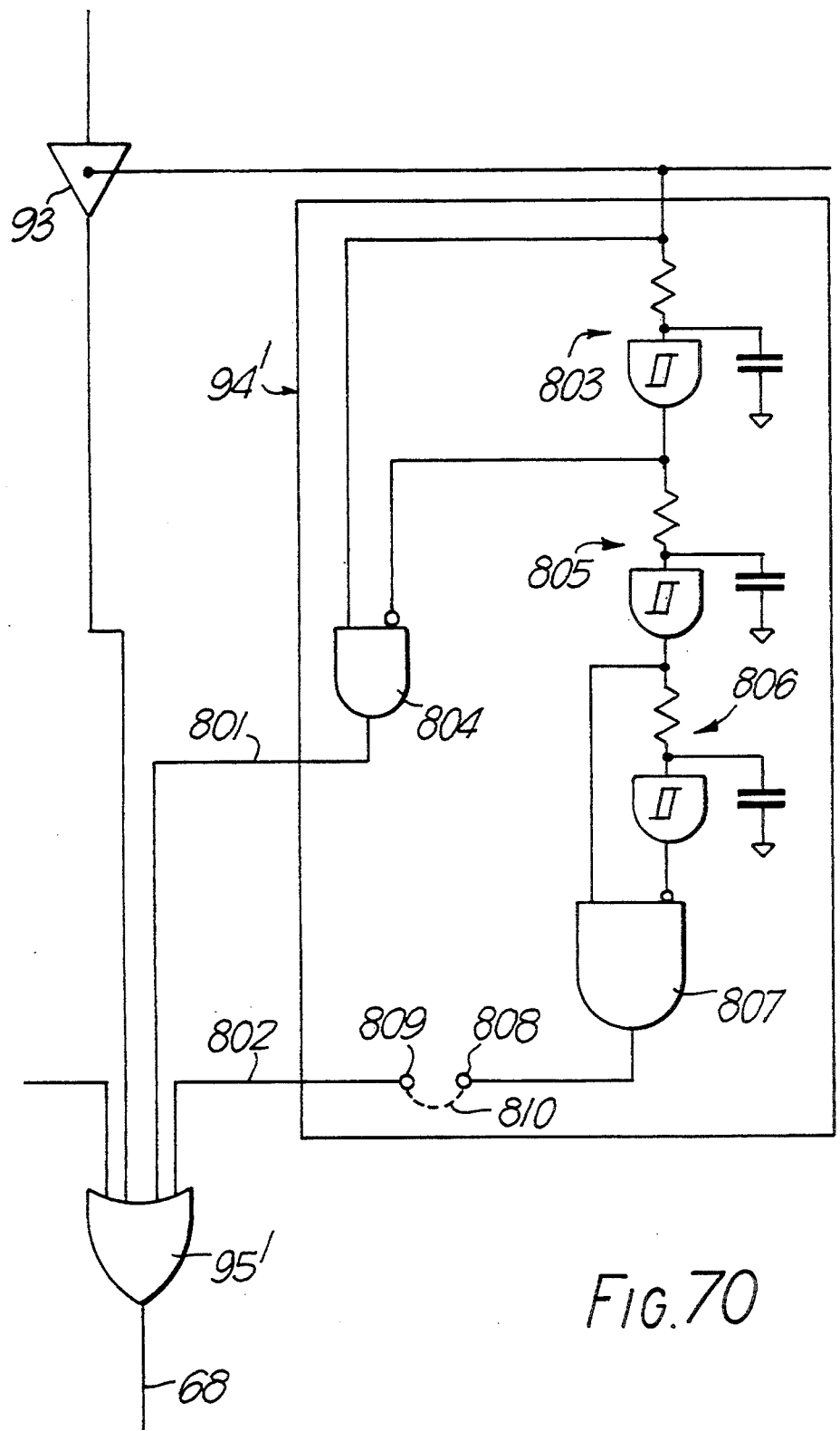
FIGS. 70 and 71 are schematic circuit diagrams of parts of a modification of the node of FIGS. 5 to 12.

FIG. 70 shows a modification to the circuit of FIG. 6 to enable an acknowledge signal of the second kind to be generated in sequence. The node is required to generate, in response to acquisition by an ascending calling or search signal that has seized the circuits 74 and 92, a first acknowledge signal consisting of a pulse on the acknowledge signal line 68, and a subsequent second acknowledge signal consisting of either 1 or 0, depending on the address bit to be transmitted, also on the line 68. Instead of the monostable circuit 94 of FIG. 6, FIG. 70 has a pulse generator circuit 94' with a first output terminal 801 for a first acknowledge signal, and a second output terminal 802 for a second acknowledge signal. The three input OR gate 95 of FIG. 6 is replaced in FIG. 70 by a four input OR gate 95' having as inputs the two acknowledge signals from the terminals 801 and 802, and the outputs from the line switches 93 and 135 (FIG. 9). The output on line 123 (FIG. 6) to the pulse generator circuit 94' is supplied here to a first acknowledge pulse generator consisting of a first Schmidt trigger delay circuit 803 with input and output connected respectively to a direct input terminal and an input inverter at a two input AND gate 804. The gate 804 produces an output pulse that begins when the output on line 123 goes to 1 and ends when the output of the first delay circuit 803 goes to 1. Thus whenever the output on line 123 goes to 1, a first acknowledge signal, in the form of a single pulse, is provided at the output terminal 801. This part of the circuit 94' merely carries out the function of the monostable circuit 94 of FIG. 6. The circuit 94' includes second and third Schmidt delay circuits 805 and 806. The input and output signals to the third delay circuit 806 are connected respectively to a direct input terminal and an input inverter at a two input AND gate 807. The three delay circuits are connected in cascade as shown so that the gate 807 produces a pulse some time after any pulse from the gate 804. The output from the gate 807 is supplied to a first address terminal 808. A second address terminal 809 is connected to the second output terminal 802. If the address bit to be transmitted by the node is 1, the address terminals 808 and 809 are connected by a link 810, shown in broken line in FIG. 70. If the address bit to be transmitted is 0, the link 810 is omitted, so that any pulse generated by the gate 807 does not reach the output terminal 802. Thus the pulse generator circuit 94' supplies to the OR gate 95' after each first acknowledge signal pulse either a further pulse, indicating address bit 1, or no further pulse thereby indicating address bit 0, depending on whether or not the link 810 is provided between the address terminals 808 and 809.

Figure 71:
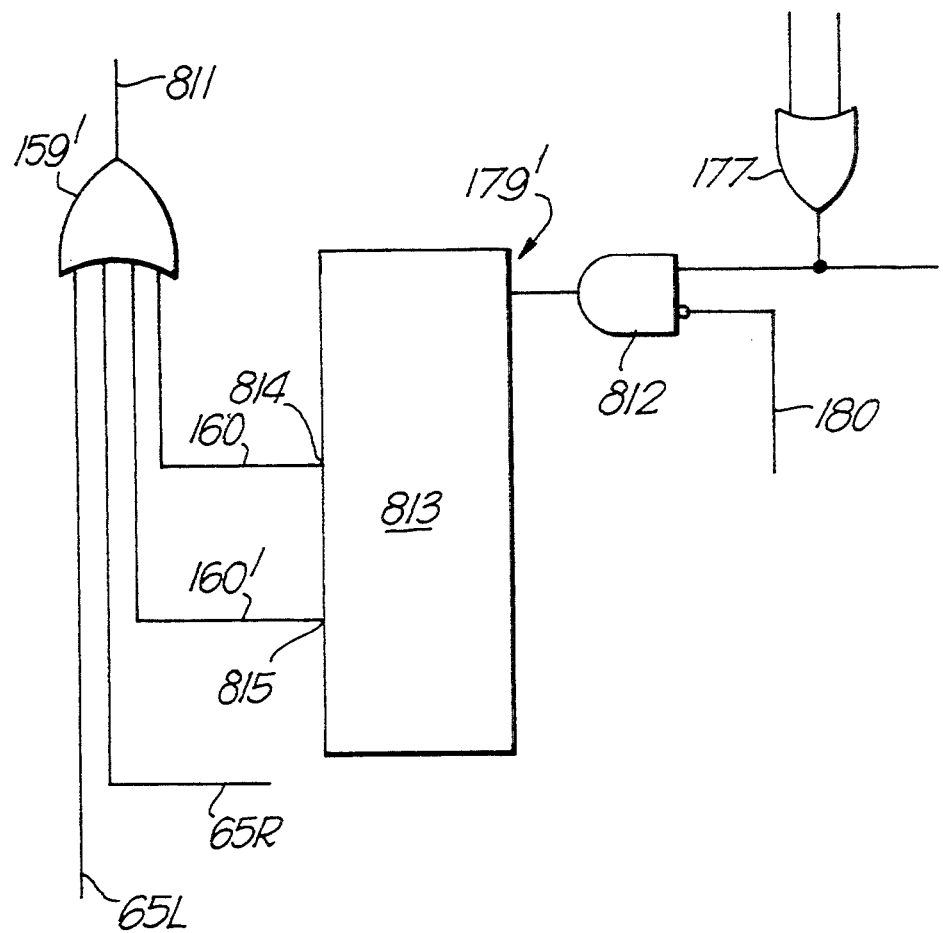

FIG. 71 shows the required modification to the circuit of FIGS. 11 and 12 to produce sequential first and second acknowledge signals on the line 811 supplying the line switches 135 and 139 of FIG. 11. Instead of a monostable circuit 179, the modification has a two input AND gate 812 supplying the input to a pulse generator circuit 813 which provides a first acknowledge signal at a first output terminal 814 and a second acknowledge signal at a second output terminal 815. The first output terminal 814 is connected by the line 160 to one input of a four input OR gate 159' that replaces the three input OR gate 159 of FIG. 11. The second output terminal is connected by a line 160' to a second input of the OR gate 159'. The other two inputs of the gate 159' are provided, as for gate 159, by the left and right upcoming acknowledge signal lines 65L and 65R. The pulse generator circuit 813 is of identical construction to the circuit 94' of FIG. 70. Hence, if the signal on line 180 is 0, the circuit 813 generates a first acknowledge pulse at the terminal 814, and either a second acknowledge pulse or no pulse at the terminal 815 depending on whether or not a link corresponding to the link 810 (FIG. 70) is present.

Figure 72:
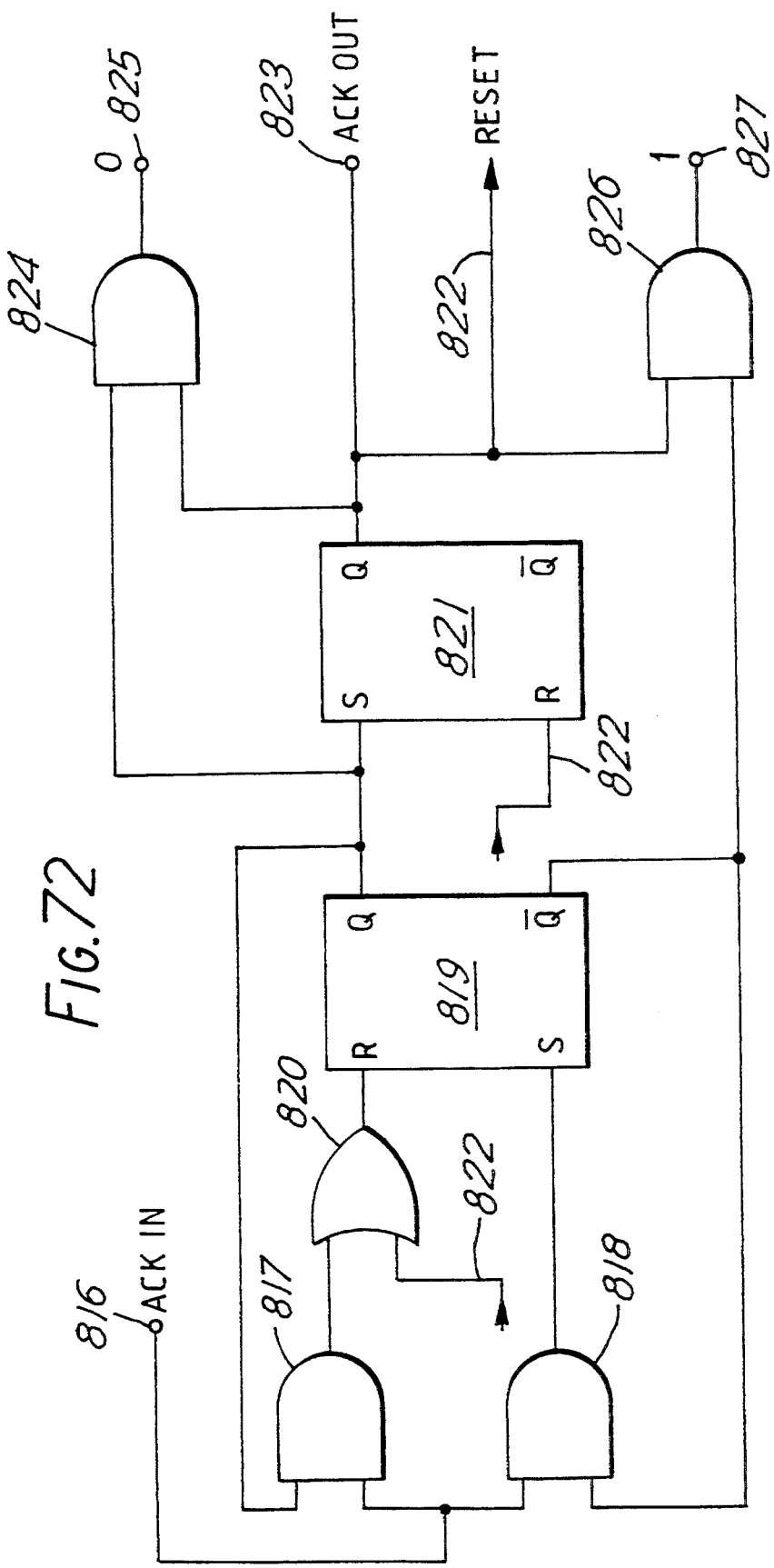
FIG. 72 is a schematic circuit diagram of cell communication circuitry for use with a network having the modified nodes of FIGS. 70 and 71.

FIG. 72 shows a circuit provided in each processor cell for separating the sequential first and second acknowledge signals into first acknowledge pulses and address bit values 0 and 1. The sequential acknowledge signals are supplied to an input terminal 816 connected to respective inputs of two two-input AND gates 817 and 818. The other inputs of the gates 817 and 818 are supplied respectively by the Q and $\overline{Q}$ outputs of an SR flip-flop 819. The S input of the flip-flop 819 is supplied by the output of the AND gate 818, and the R input of flip-flop 819 is supplied by the output of a two input OR gate 820 having one input supplied by the output of the gate 817 and the other input supplied by the Q output of a second SR flip-flop 821. The Q output of flip-flop 821 is also supplied to the R input of the flip-flop 821 so that the flip-flop 821 resets automatically, with a slight delay, after being set. The Q output of the first flip-flop 819 is supplied to the setting input S of the second flip-flop 821. The Q output of the second flip-flop 821 also serves as a momentary reset signal for the first flip flop 819 by being coupled through the OR gate 820.

If a pulse arrives at the input terminal 816 when the two flip-flops 819 and 821 are in their reset states, gate 817 is closed by Q of flip-flop 819 being 0 and gate 818 is held open by $\overline{Q}$ of flip-flop 819 being 1, so that the input pulse passes to the S input of the first flip-flop 819 which changes to its set state in response. The Q and $\overline{Q}$ outputs of the first flip-flop 819 therefore become respectively 1 and 0, which open and close the gates 817 and 818 respectively. A two input AND gate 824 having its inputs supplied by the Q outputs of the flip-flops 819 and 820 retains a 0 output at an address bit 0 output terminal 825 until, after the propagation delay of flip-flop 821, the Q=1 output from the first flip-flop 819 sets the second flip-flop 821. The second flip-flop 821 in its set state supplies the resetting signal on a line 822 to its own R input and to the OR gate 820 for flip-flop 819. However, if sufficiently before the propagation delay in flip-flop 821 has ended a second pulse arrives at the input terminal 816, the first flip-flop 819 is reset by this second input pulse before the second flip-flop 821 sets.

The AND gate 824 provides 1 at the output terminal 825 only if the first flip-flop 819 remains set until the second flip-flop 821 sets, i.e. only if there is no closely following second input pulse at the terminal 816. If there is a closely following second input pulse at the terminal 816, the complementary output $\overline{Q}$ of the first flip-flop 819 is at 1 when the output Q of the second flip-flop 821 is at 1, so that an AND gate 826 supplied by these two outputs provides a 1 at an address bit 1 output terminal 827. Each first acknowledge signal pulse results in an output terminal 823 supplied by the Q output of the second flip-flop 821 being held at logic value 1 by the Q output of the second flip-flop 821 in its set state. If the accompanying address bit is 0, the AND gate 824 holds the terminal 825 at logic value 1 during the presence of logic 1 at the terminal 823. If the accompanying address bit is 1, the AND gate 826 holds the terminal 827 at logic value 1 during the presence of logic 1 at the terminal 823.

Figure 73:
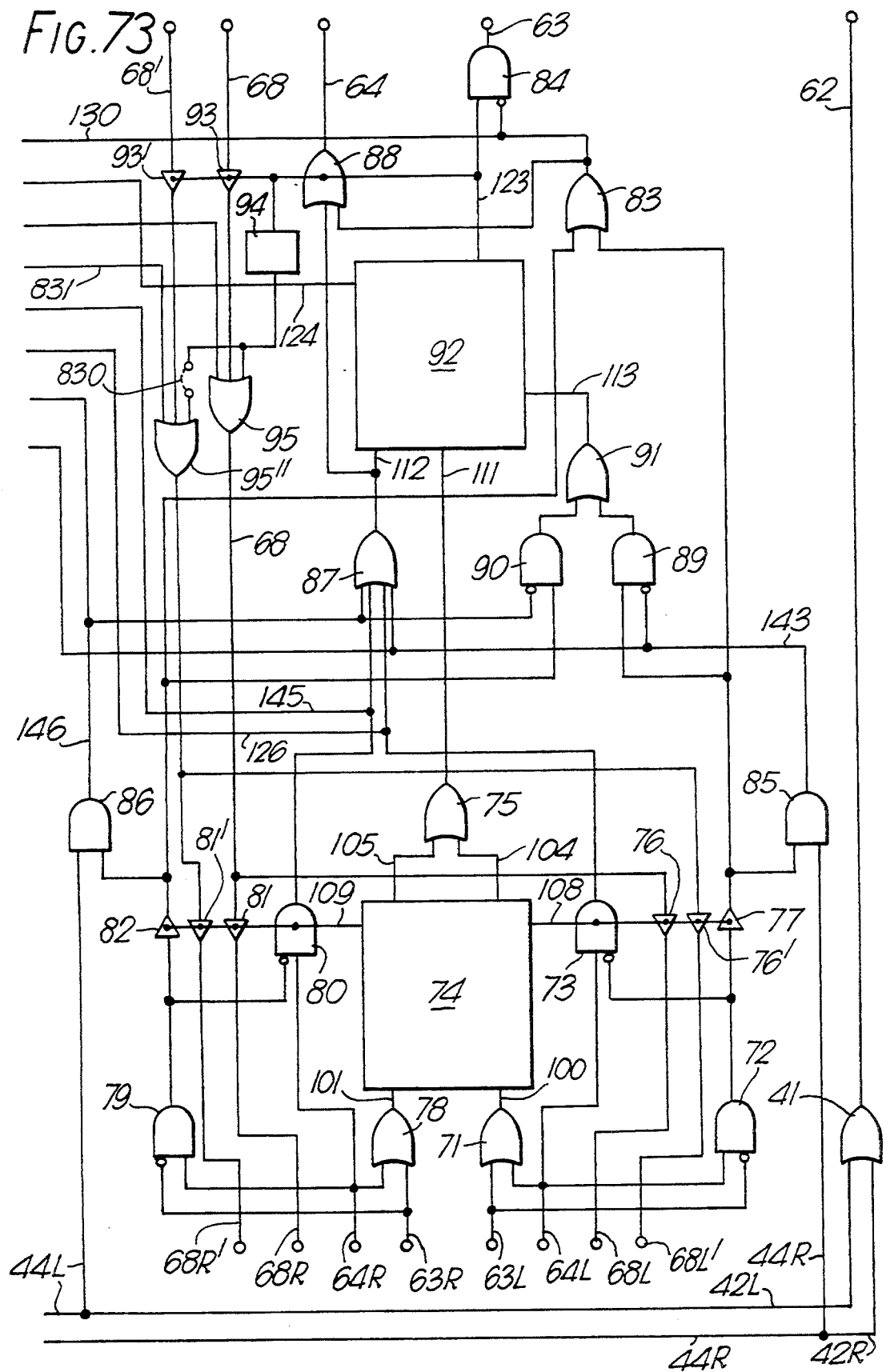
FIGS. 73 and 74 are schematic circuit diagrams of parts of another modification of the node of FIGS. 5 to 12.

FIG. 73 shows the circuit of FIG. 6 modified to provide first and second acknowledge signals synchronously on first and second acknowledge lines. In addition to the OR gate 95, the monostable 94 may supply its output pulses to second three input OR gate 95" having one input which is connected to the output of the monostable 94 by a link 830, shown in a broken line, if the node is to transmit an address bit of value 1, and which is left unconnected, the link 830 being omitted, if the node is to transmit an address bit of value 0. The other two inputs to the OR gate 95" are provided by a downcoming second acknowledge signal line 68' through a line switch 93' controlled by the signal on line 123, and a crossover connection 831 for upcoming second acknowledge signals. The output of the gate 95" supplies two line switches 76' and 81' controlled respectively by the signals on the lines 108 and 109 from the circuit 74. The output of the line switch 76' supplies a left-hand second downcoming acknowledge signal line 68L', and the output of the line switch 81' supplies a right-hand second downcoming acknowledge signal line 68R'.

Figure 74:
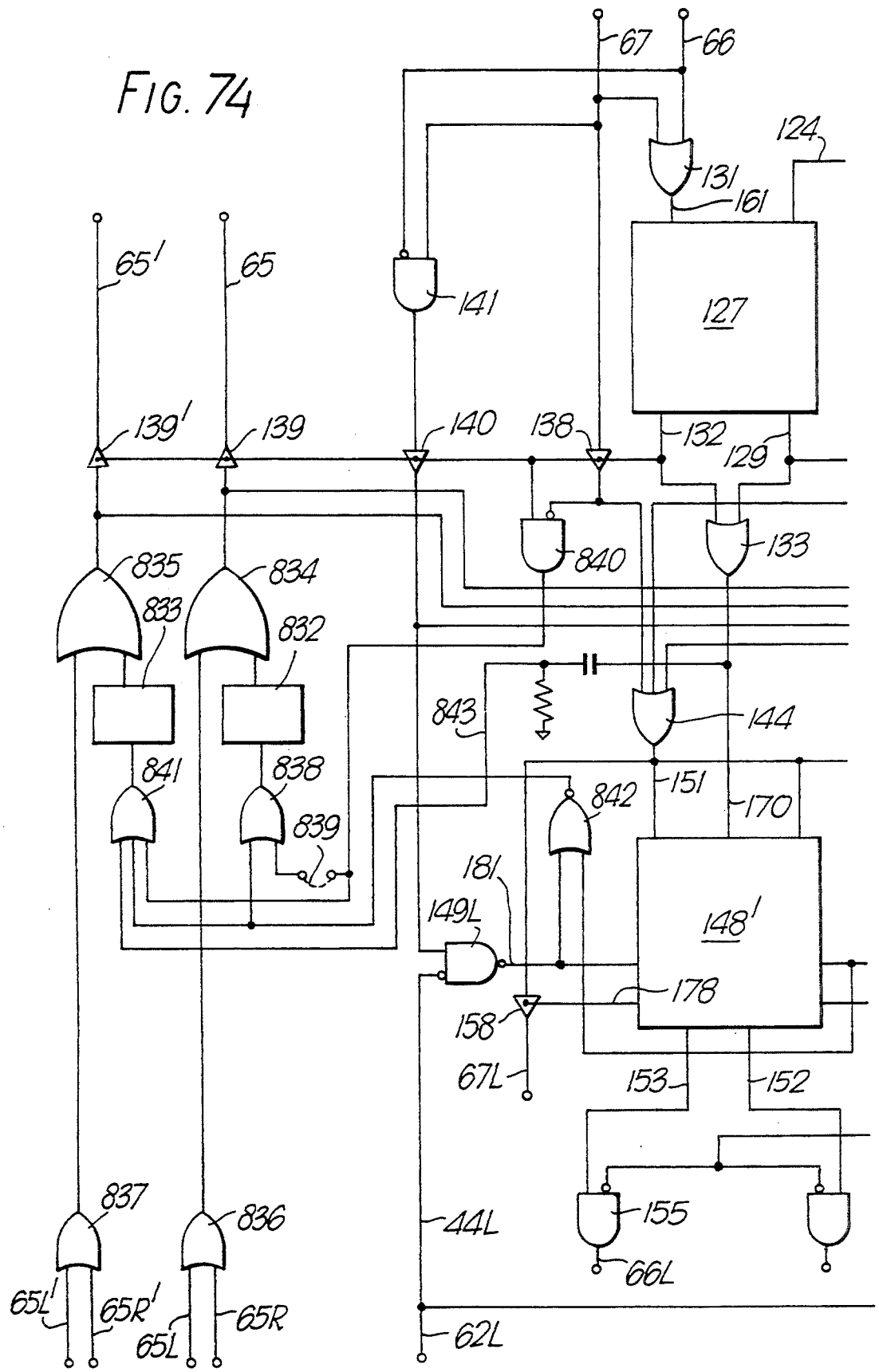

FIG. 74 shows the circuit of FIG 11 modified to provide first and second acknowledge signals synchronously on first and second acknowledge signals lines 65 and 65'. The single monostable circuit 179 of circuit 148 (FIG. 12) and its connections 160, 180 and input from the gate 177 (FIG. 12) are omitted from circuit 148' of FIGS. 74 and 75, which otherwise is identical to circuit 148. Instead, two monostable circuits 832 and 833 are provided which respectively supply inputs of two OR gates 834 and 835. Output from the gate 834 passes to the line switch 139 controlling the signal on the first upward out-going acknowledge signal line 65. Output from the gate 835 passes to a line switch 139' also controlled by the signal on the line 132 from the circuit 127 and controlling the signal on the second upward out-going acknowledge signal line 65'. There are four upward incoming acknowledge lines 65L, 65R, 65L', and 65R'. The two incoming lines 65L and 65R for first acknowledge signals are applied to the inputs of a two input OR gate 836 supplying its output to the other input of the OR gate 834, and the two incoming lines 65L' and 65R' for second acknowledge signals are applied to the inputs of a two input OR gate 837 supplying its output to the other input of the OR gate 835.

The monostable circuit 832 is triggered by the output of a two input OR gate 838 one input of which may be connected by a link 839 to the output of a two input AND gate 840 which receives as inputs the signal on the line 132 from the circuit 127, and, through an input inverter, the signal output by the line switch 138 in the address/data signal line 67. If the circuit 127 is seized by a downcoming calling signal (normal acquire) and the link 839 is present, the output of the gate 840 triggers the monostable circuit 832 and an acknowledge pulse indicating logic 1 is transmitted up the line 65. If the link 839 is not present, the monostable count 832 is not triggered, and logic O is indicated. Thus if the node address bit to be transmitted is 1, the link 839 is inserted so that the monostable circuit 832 will be triggered, and if the node address bit to be transmitted is 0, the link 839 is omitted, so that the monostable circuit 832 is not triggered by the output of the gate 840. The output of the OR gate 834 is also supplied to the line switch 135 (not shown in FIG. 74) which is controlled by the signal on the line 129, and the output of the OR gate 835 is also supplied to another line switch (not shown) which is controlled by the signal on line 129 and provides the signal on line 831 (FIG. 73).

The monostable circuit 833 is triggered by the output of a three input OR gate 841.

A two input NOR gate 842 has as inputs the signals on the lines 181 and 182 from the circuit 148', and therefore provides as output a signal which is 0 unless the circuit 127 has been seized by a downcoming searching signal (high address/data on line 67, low acquire on line 66) and there is no free signal on the two free signal lines 62L and 62R. The output of NOR gate 842 is supplied to respective inputs of the OR gates 838 and 841 so that if a downcoming searching signal acquires circuit 127 but there is no free signal at the node, both monostable circuits 832 and 833 are triggered. Thus removal of both free signals from a node is signalled to a searching cell that has formed a route to that node.

The output from the OR gate 133 goes to value 1 whenever the circuit 127 is seized. To signal this event the output from OR gate 133 is supplied through a D.C. isolating capacitor (with a discharging resistor) in a line 843 to the second input of OR gate 841 so that the second monostable circuit 833 is triggered, and the resulting pulse from the circuit 833 is coupled through the OR gate 835 to the line 831 (FIG. 73) if the circuit 127 has been seized by a crossover signal from an up coming path segment, or is coupled through the line switch 139' to the second acknowledge signal line 65' if the circuit 127 has been seized by a downcoming signal.

It will be apparent from consideration of FIG. 73 that address bits are transmitted on the second acknowledge signal lines 68', 68L', and 68R' in response to an ascending signal, i.e. a signal that is forming a route that is extending away from the level of the cells 11 in the network 14. From FIG. 74 it will be seen that at a node in part of a route that is extending towards the level of the cells 11 in the network 14 address bits are transmitted on the first acknowledge signal lines 65, 65L, 65R in response to a downcoming signal that applies a low address/data signal to the line 67, these address bits being synchronous with acknowledge pulses on the second acknowledge signal line 65' generated by the second monostable circuit 833 in response to either the signal at the output of OR gate 133 switching to high, or in response to the output of AND gate 840 switching to high, both these outputs being coupled through the OR gate 841 to the second monostable circuit 833. Thus address bits can be generated at a downcoming node by switching the address/data signal on line 67 from high to low. From FIGS. 73 and 74 it will be seen that when a cross-over occurs at the node, no address bit is generated, but an acknowledge pulse on the second acknowledge signal line 68R' or 68L' is provided by the second monostable circuit 833 of FIG. 74 in response to the output of the OR gate 133 switching from low to high.

If the node of FIGS. 73 and 74 is the highest node, i.e. the root node, of a binary tree, the line 68' of the upwards channel 55 is terminated in the sameway as the line 68, and the line 65' of the downwards channel 56 is terminated in the same way as the line 65, if no peripheral unit is connected to the channels 55 and 56.

FIG. 75 illustrates a normal acquire process in which a first processor cell PC1 forms a route to a second processor cell PC2 by transmitting a high acquire signal accompanied initially by a low address/data signal which is replaced by address bits after cross-over has been effected at the highest node in the route. To carry out this route forming process the first cell PC1 must have in one of its pointer registers a relative pointer which is the result of an exclusive-OR operation with the respective addresses of the first and second cells PC1 and PC2 as operands. In this example it is assumed for simplicity that each cell address is seven bits, shown as bits 2 to 8 in FIG. 75, where OWN ADDRESS is the address of the calling cell, PC1, and DESTINATION ADDRESS is the address of the destination cell PC2. Bit 1 in each case is a flag identifying the nature of the bits 2 to 8 and is 0 for an address and 1 for a relative pointer. The address of PC1 is 0000011, and the address of PC2 is 0000110. Hence the relative pointer is 0000101. The most significant bit having value 1 in the relative pointer is bit 6 and shows that cross-over must occur at the third node above PC1. Each cell stores the least significant bit of its address, bit 8 in the example, so PC1 stores 1 and PC2 stores 0. As explained hereinbefore, each node is able to transmit an address bit which corresponds to the address bit value of the path segment immediately above the node. FIG. 75 shows the relevant nodes, numbered 1 to 5, of the eight leaf binary subtree in which the cells PC1 and PC2 are at two leaf positions. Cross-over at the topmost node, node 3, of this subtree does not require an address bit to control it, since it occurs in response to the address/data signal being set high for node 3, as described hereinbefore with reference to FIGS. 6 and 8. However, address bits 7 and 8 of the destination address are needed for correct steering at nodes 4 and 5, as described hereinbefore with reference to FIGS. 11 and 12. The calling cell PC1 has bit 8 of its own address stored permanently, and receives bits 7 and 6 from nodes 1 and 2 on its second incoming acknowledge line 65', in addition to the acknowledge pulses (logic 1) on its first incoming acknowledge line 65. The acknowledge pulses and bits 7 and 6 are indicated below ACK1 and ACK2 in FIG. 75. Thus when the calling cell, PC1, has received the second of the acknowledge pulses on line 65 and is therefore about to set its address/data signal high to effect cross-over at node 3, the cell PC1 has also received sufficient of its address bits to be able to calculate, by carrying out an exclusive-OR operation, the required address bits of the destination cell PC2. Bits 7 and 8 of the calling cell's address and bits 7 and 8 of the relative pointer are therefore used as operands in the exclusive-OR operation to give 10, which are bits 7 and 8 of the address of the destination cell. Acknowledge pulses (logic 1) are transmitted back to the calling cell PC1 on the second acknowledge line from the cross-over node (node 3) and the nodes 4 and 5 along the descending part of the route. Address bits are transmitted on the first acknowledge line from nodes 3, 4, and 5 but are ignored in this process. Steering of the calling signal at nodes 4 and 5 is carried out as described hereinbefore with reference to FIGS. 11 and 12, bit 7 of the destination address being applied as address/data signal value (ADD 4) at node 4, and bit 8 of the destination address being applied as address/data signal value (ADD 5) at node 5. The destination cell PC2 provides an acknowledge pulse ACK6 on acknowledge signal line 2 only, which is its outgoing line 68', confirming thereby its least significant address bit of 0.

It will be appreciated from the nature of the exclusive-OR relationship that if a cell A is provided with a relative pointer P$_{AB}$ to a cell B, and with a relative pointer P$_{BC}$ from cell B to a cell C, then cell A can calculate a relative pointer P$_{AC}$ to cell C within the same binary tree arrangement. For example, if the addresses of A, B, and C are 01101, 01010, and 10011 respectively, then

P$_{AB}$=00111

P$_{BC}$=11001 and P$_{AC}$=11110

FIG. 76A illustrates the first stage of the formation of a route from a searching cell PC1 to a free cell PC2, each cell storing only the least significant bit of its address and the other address bits being transmitted back to the searching cell PC1 from the nodes along the route. The searching signal is a high address/data signal accompanied by a low acquire signal, as described hereinbefore with reference to FIGS. 6 to 12. However, with node circuitry as described hereinbefore with reference to FIGS. 73 and 74, the searching cell receives on the second acknowledge signal line 68' address bits 7 and 6 from nodes 1 and 2 which are respectively the first and second nodes along the ascending route from the cell PC1. Each of the ascending path nodes 1 and 2 also transmits an acknowledge pulse on the first acknowledge signal line 68 to the cell PC1. It is again assumed that the address of each cell has seven bits, bits 2 to 8 in FIG. 76A, and that cross-over occurs at the third node, node 3. Cross-over of a searching signal is, as explained hereinbefore, the result of interception of the searching signal by a free signal that has conditioned, in this case, node 3. The searching signal then follows the path of the free signal down to the cell, or one of the cells, from which the free signal originates. At the cross-over node 3, and at each node on the descending part of the route an acknowledge pulse is generated by the monostable 833 for the second acknowledge signal line 65'. No pulses are generated for the first acknowledge signal line 65, since the address/data signal on line 67 is high at nodes 4 and 6, and line 132 is low at node 3. The free cell PC2 which responds to the searching signal transmits a long pulse on the second acknowledge signal line 65' and a low signal on the first acknowledge signal line 65. The acknowledge signals are again represented by the numerals below ACK1 to ACK6 in FIG. 76A. The searching cell PC1, by the time it receives the acknowledgement signal from the free cell PC2, has those bits of its own address which differ from the bits of the address of the free cell PC2. In this example these bits are bits 6, 7, and 8 which are 011.

FIG. 76B illustrates the second stage of the formation of the route from the searching cell PC1 to the formerly free cell PC2. After the formerly free cell PC2 has acknowledged the reception of the searching signal, the second stage starts with the searching cell setting its acquire signal high and, immediately thereafter, setting its address/data signal low. Setting the acquire signal high retains the route from PC1 to PC2, and allows the address/data signal to be used to convey data. Setting the address/data signal low causes the AND gate 840 at nodes 4 and 5 to produce a high output which triggers the monostable circuit 832 if the link 839 is present. Since in this example the address of the formerly free cell PC2 is 0000110, the link 839 is present at both nodes 4 and 5 and an address bit 1 is transmitted by each of the nodes 4 and 5 on the first acknowledge signal line 65. The sustained (long) acknowledge pulse on the second acknowledge signal line 65 from the formerly free cell PC2 ceases when the high acquire signal reaches the cell PC2 from the node 5. The cell PC2 thereupon transmits the stored bit 8 of its address to the searching cell PC1 on the first acknowledge signal line 65 together with an accompanying pulse on the second acknowledge line 65'. The searching cell PC1 is able to identify the occurrence of the received address bits from the nodes of the descending part of the route by the synchronous generation of acknowledge pulses on the second acknowledge signal line 65' at each node (see ACK4 and ACK5 in FIG. 76B). Similarly, the formerly free cell PC2 generates an acknowledge pulse on the second acknowledge signal line at the time for transmitting its stored bit 8 of address.

The searching cell PC1 has, at the end of the second stage of the establishment of the route, those bits of the address of the formerly free cell which differ from bits of its own address. In the present example those bits are bits 6, 7, and 8 which are 110, the address of PC2 being 0000110, as indicated in FIG. 76B. The searching cell PC1 can now calculate, for future use, a relative pointer to cell PC2 by carrying out an exclusive-OR operation with bits 6, 7, and 8 of its own address and the destination address, i.e. the address of PC2, as follows $$(011) \oplus (110) = 101$$

Hence the relative pointer is 0000101, as shown in FIG. 76B,

FIG. 77A illustrates the first stage of a non-directed, remote free-space search using nodal address bits. This first stage is similar to the absolute addressing, non-directed, remote free-space search described with reference to FIG. 14B hereinbefore. In the example of FIG. 77A, a first cell PC1 arranges that the searching which it originates shall not be diverted by a free signal until at least the node, node 3, at the third level higher than the cell PC1 is reached. The searching cell PC1 therefore transmits into the network 14 a high acquire signal with a low address/data signal until the node, node 2, at the second level above the cell has been seized. The searching signal is then changed into a high address/data signal accompanied by a low acquire signal, the address/data signal being set high before the acquire signal is set low. Thus the ascending part of the route to node 2 is preserved, and a searching signal which can be diverted by a free signal is provided. In the example of FIG. 77A it is assumed that node 3 is conditioned by a free signal originating from a free cell PC2 within the eight-leaf subtree. Accordingly, the high address/data signal accompanied by low acquire is guided down to the free cell PC2 through nodes 4 and 5.

On the ascending part of the route, the searching cell PC1 receives bit 7 and bit 6 of its address from nodes 1 and 2 on the second acknowledge signal line, but only receives acknowledge pulses, on the second acknowledge signal line, from the cross-over node 3 and the nodes 4 and 5 on the descending part of the route. The free cell PC2 provides only the long (sustained) acknowledge pulse on the second acknowledge signal line. The searching cell therefore has only bits 6, 7, and 8 of its own address. It should be noted that if the searching signal continues to ascend after being changed from high acquire to high address/data, then the searching cell receives further address bits of its own address on the second acknowledge signal line with acknowledge pulses on the first acknowledge signal line. Hence the searching cell always receives sufficient of its own address bits to be able to compute a relative pointer when it has received the corresponding address bits of a free cell found by the searching signal.

FIG. 77B illustrates the second stage of the non-directed, remote free-space search using nodal address bits, and it will be seen that this second stage is identical to the second stage of the non-directed, local free-space search illustrated in FIG. 76B, and provides bits 6, 7, and 8 of the address of the found free cell PC2.

FIG. 78A illustrates the first stage of a search signal that is directed to a particular cell that is expected to be in the free state. The process of carrying out such a search is referred to as a directed, remote free-space search. This process begins in the same way as a non-directed, remote free-space search (FIG. 77A) until the desired cross-over node, which is node 3 in the present example, has been seized. At that point in the search, the address/data signal is high and the acquire signal is low. For the descending part of the route towards the intended destination, referred to in FIG. 78A as the designated address, the address/data signal is kept high at the searching cell PC1. In order to provide steering signals at the nodes in the descending part of the route, the searching cell PC1 sets the acquire signal which it transmits at the complement to the level of the required address bit at each of the nodes in the descending part. In the example of FIG. 78A, bits 7 and 8 of the designated address must be used to steer the searching signal to the intended free cell PC2. These bits are 1 and 0 respectively, and therefore the searching cell PC1 sets the acquire signal low when node 4 is seized and high when node 5 is seized. The cell PC1 holds the transmitted acquire signal low unless an address bit of value 0 is required. From consideration of FIGS. 6 to 12 it will be understood that the node circuitry transmits the address complement bits in the acquire signal through the action of the AND gates 72 (or 79) and 84 (FIG. 6) in the nodes of the ascending part of the route. The ascending address/data signal is kept high by the complementary action of the AND gates 72 and 73 (or 79 and 80). At the cross-over node, the address complement bit modulated acquire signal is re-created by the action of either AND gates 72, 85, and 154, or AND gates 79, 86, and 155, bearing in mind that the appropriate free signal must be present (on line 62R or 62L, FIGS. 6 and 11). If the ascending search signal has originated from the left hand lower segment at a node, the output of AND gate 73 will be inversely modulated by the output of AND gate 72, and will pass through AND gate 128 (FIG. 11). Thus an address/data signal modulated by address bits will be transmitted on line 67R. Similarly, if the ascending search signal has originated from the right hand lower segment at a node, an address/data signal modulated by address bits will be transmitted on line 67L from AND gate 134. At a node in the descending part of the route, the modulation of the address/data signal and the complementary modulation of the acquire signal provide a constant high signal at the output of OR gate 131 (FIG. 11) for seizing the node. If free signals are present at both lines 62L and 62R, then the modulation of the output of AND gate 141 has no effect, and the selection of left or right lower path segment at the circuit 148 (148' in FIG. 74) is determined by the modulation of the address/data signal at the output of OR gate 144. If the cell at the designated address is in the free state, the appropriate free signal is present at any node at which there is only one free signal present, so that the circuit 148 (148' in FIG. 74) guides the searching signal if the output of AND gate 141 is 1, and the address/data signal determines which lower path segment is selected if the output of AND gate 141 is 0. If the cell at the designated address is not in the free state and the searching signal reaches a node in the descending part of the route at which the free signal is present at the opposite lower path segment from the lower path segment required, the circuit 148 (148' in FIG. 74) will select the lower path segment from which the free signal which is present originates. Consequently, if the cell at the designated address is not free but one or more other cells in the sub-tree containing the designated address and the cross-over node are free, then the searching signal will be guided down to one of the free cells. If there is no free signal present at the intended cross-over node, then the cell at the designated address is not free and there are no free cells in the subtree containing the cross-over node and the designated address. Furthermore, cross-over will not occur since in a searching process it relies on the presence of a free signal. The searching cell will receive a further address bit from the node intended to be the cross-over node, and will in response switch into a non-directed, remote free-space search as described hereinbefore with reference to FIGS. 77A and 77B. In a directed remote free-space search, the transmission of address bits and acknowledgement pulses back to the searching cell from the nodes on the ascending part of the route, and from the cross-over node and the nodes on the descending part of the route occurs in the same manner as described for a non-directed remote free-space search.

FIG. 78B illustrates the second stage of the directed remote free-space search of FIG. 78A. This second stage begins with the searching cell PC1 setting the transmitted acquire signal high then immediately afterwards setting the transmitted address/data signal low, so that the route established in the first stage is maintained. The high acquire signal accompanied by the low address/data signal produce a high output from the AND gate 840 (FIG. 74) in each node of the descending part of the route (nodes 4 and 5 in this example) so that the address bits represented by presence and absence of the link 839 are transmitted from these nodes on the first acknowledge signal line 65 back to the searching cell PC1. Also, when the high acquire with low address/data reaches the free cell PC2 at the destination address, the found free cell PC2 transmits its stored (least significant) address bit back to the searching cell on the first acknowledge signal line 65 together with an acknowledge pulse on the second acknowledge signal line 65'. The calculation of pointers is as described for FIGS. 76A and B and 77 A and B.

If, at a stage in a non-directed local or remote free space search or in a directed remote free space search when the searching signal in the form of a high address/data signal with a low acquire signal has reached a node at which cross-over occurs or has reached a node in a descending part of the route being formed, the source or sources of the free signal(s) at the node just reached by the searching signal become not free, so that the free signals at the node are replaced by logic 0, then the searching signal is caused to ascend or die back as described hereinbefore with reference to FIGS. 14A and 14B. However, since the searching cell uses address bits stored in the seized nodes of the ascending part of the route to calculate the required part of its own address, it is necessary to ensure that the searching cell be able to take into account, to the extent necessary, the consequences of any further ascent or dying back due to loss of free signal at a node. As described hereinbefore with reference to FIG. 74, removal of both or the remaining free signal at a node in a descending part of the route results in an output from the NOR gate 842 of the node triggering both monostable circuits 832 and 833 so that the searching cell receives a pulse on both acknowledge signal lines. Each node at which the searching signal is thus caused to die back transmits the two acknowledge pulses, so that the searching cell can calculate how far back the route has died. If loss of free signal occurs at the cross-over node, the circuit 127 of that node will be released and the monostable circuit 94 will be triggered so that the address bit associated with the OR gate 95" will be transmitted back to the searching cell, since the circuit 92 will switch the signals on lines 123 and 124 from low and high respectively to high and low respectively.

The node circuitry of FIGS. 73 and 74 can be used for an embodiment with processor cells which use absolute addressing, i.e. which store their own addresses and use complete or truncated addresses as pointers. The advantage of such node circuitry is then that it allows directed, remote free-space searches to be carried out. The address bits transmitted from the nodes are redundant, but the acknowledge pulses transmitted on the second acknowledge signal lines 65', 65L', and 65R' from nodes on the descending part of a route provide the timing signals required for a searching cell to transmit the complementary address bits on the acquire signal as described hereinbefore with reference to FIG. 78A. It will be apparent that for absolute addressing, the node circuitry of FIGS. 73 and 74 can be simplified by omitting all links 830 and 839.

The ability to carry out directed remote free-space searches is in particular a useful facility for special cells 13.

Referring again to FIGS. 25, 29 and 37, it will be noted that several different method of organising and searching through cells holding symbolic data and pointers to definitions of those data have been described hereinbefore. It should further be noted that methods corresponding to the techniques of either lexical scoping (sometimes called static scoping) or dynamic scoping used for example in the creation of LISP data structures may also be used in the creation of data structures in operating an embodiment of the present invention.

In an embodiment of the invention, for example, a symbol holding cell requiring the definition of its symbol may first call a local lexicon-head cell which holds argument symbols for a function of which the symbol in the symbol-holding cell forms a part. The argument symbols are the bound variables in that function. If no match is found at the local lexicon-head cell, the symbol cell is provided, by the local lexicon-head cell, with a pointer to the next in a systematic order of lexicon-head cells holding argument symbols and pointers to their definitions. A failure to match at the local lexicon-head cell indicates that the symbol is a free variable in the function concerned. When, during the search from one lexicon-head cell to the next, a matching symbol is found, the lexicon-head cell at which the match occurs supplies the pointer to the head definition cell for the symbol. The head definition cell, for a symbol representing a functional operation, is a lambda cell, and it is arranged that when the definition lambda cell is copied, the former symbol cell that becomes a copy of the definition lambda cell has as its own lexicon head pointer a pointer to the original local lexicon-head cell, and passes this lexicon-head pointer on to its child cells, which also pass down this pointer so that the copied definition of the symbol is formed by cells with lexicon-head pointers to the original local lexicon-head cell.

Alternatively, a symbol holding cell may be loaded with a local lexicon-head pointer to the local lexicon-head cell which holds the argument symbols for the function of which the symbol in the symbol-holding cell is a part, and with a first lexicon-head pointer to a first lexicon-head cell in an ordered set of lexicon-head cells. If there is then no match at the local lexicon-head cell, the symbol-holding cell receives the pointer to the next lexicon, as before, but this is ignored. Instead, it responds by calling the first lexicon-head cell and transmitting the symbol for matching once more. At failure to match, the first lexicon-head cell returns to the symbol cell a pointer to the second lexicon head cell which replaces the first lexion-head pointer. The process can thus continue with the second lexicon head cell in this manner and so on until a match occurs at the $n^{th}$ lexicon-head cell which thereupon transmits to the symbol-holding cell its own (i.e. the $n^{th}$ lexicon-head cell's) address and a pointer to the definition head cell. The symbol-holding cell then replaces the first lexicon-head pointer with the $n^{th}$ lexicon-head pointer that it has received. When the symbol-holding cell subsequently establishes a child cell, the child cell inherits the local lexicon-head pointer of the symbol-holding cell and copies the local lexicon-head pointer of the definition cell it is copying, so that the child cell has both relevant lexicon-head pointers immediately, since the local lexicon-head pointer of the definition cell copied is a pointer to the $n^{th}$ lexicon-head cell.

Although in the detailed example described with reference to FIGS. 29 to 36 and FIGS. 40 to 64 the primitive instructions are limited to a group containing the identity primitive, =, as the only arithmetic/logic primitive, other embodiments of the invention may have cells which can execute further arithmetic/logic primitives such as add, subtract, AND, NAND, OR, NOR, exclusive-OR, and so on, in which two argument values are to be processed to provide a resultant value. A cell for such an embodiment has an arithmetic/logic unit, preferably operating in the serial mode, and a result register for holding results of the operations of the arithmetic/logic unit. Values from, for example, tree 2 and tree 3 symbol registers are used as argument values. The result from the result register can be transferred to another symbol register, for example a tree 1 symbol register, for transmission to a parent cell. Executive logic governing the acquisition of the argument values can be similar to that described hereinbefore in relation to the identity primitive.

Figure 79:
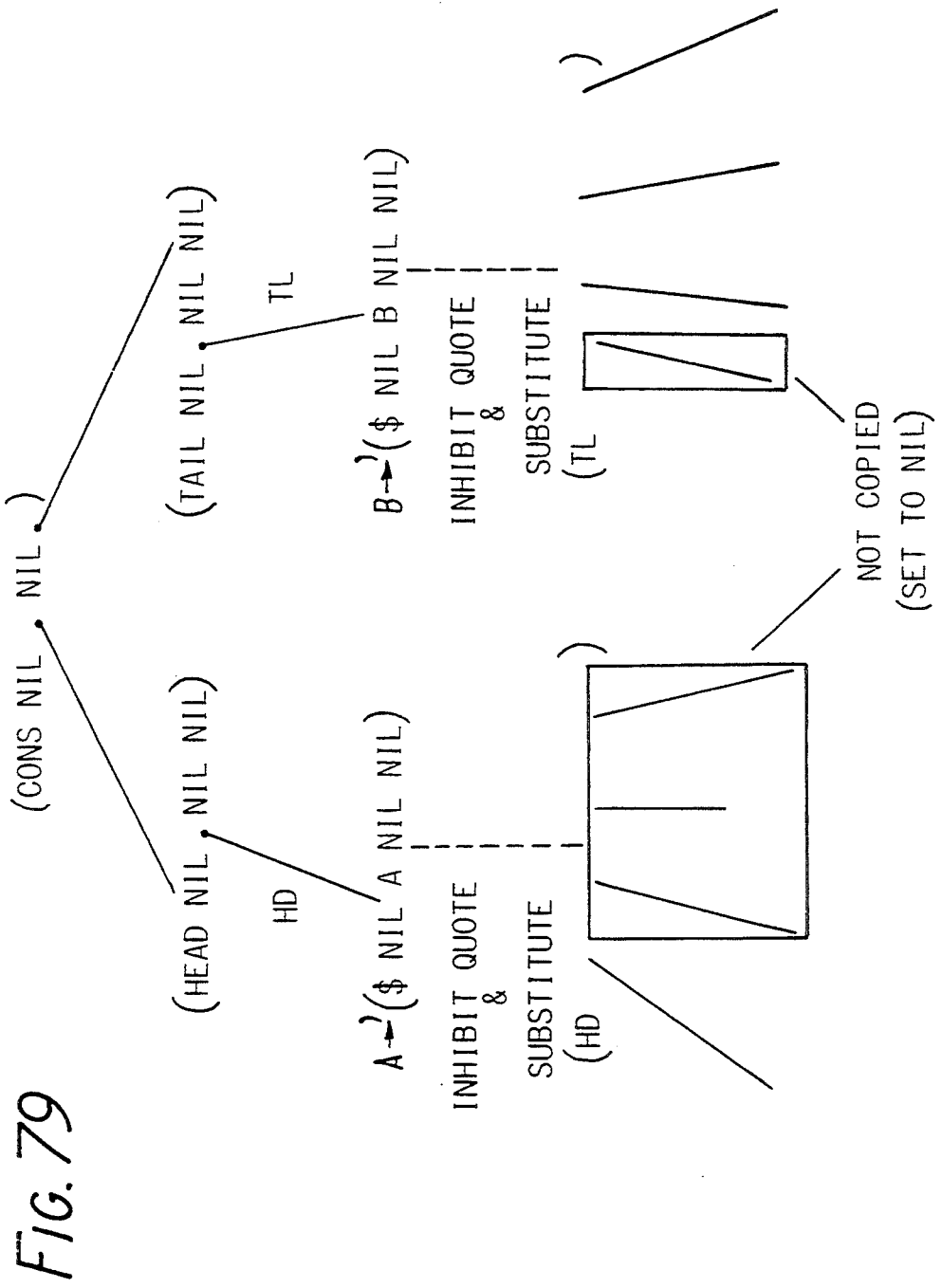
FIG. 79 is a diagram illustrating primitive instructions CONS, HEAD, and TAIL.

In other embodiments of the invention, the cells may also be capable of carrying out primitive instructions corresponding to HEAD, TAIL, and CONSTRUCT of LISP languages. Such primitive instructions are logically similar in some respects to the lambda and TRUE conditional primitives and can be implemented in a similar manner. These primitives are especially useful in manipulating lists. One possible implementation of CONSTRUCT (abbreviated to CONS), HEAD, and TAIL processes is illustrated in FIG. 79 in which HEAD operates on cell A, TAIL operates on cell B, and CONS operates on the results of HEAD and TAIL. CONS, HEAD, and TAIL are transmitted to child cells where they cause manipulation of pointers. HEAD and TAIL cause selected pointers to be replaced by NIL and a transient high acquire to be sent to the corresponding child cell. Cells A and B are set free by CONS. In the particular example of FIG. 79, cells A and B are quoted symbol cells which, on inheriting HEAD and TAIL respectively, have the 'quote' inhibited. As a result, cell A locates and copies the head cell (not shown) of the definition of symbol A, and cell B locates and copies the head Cell of the definition of symbol B. The HEAD primitive in cell A then causes the new contents of the tree 2, tree 3, and tree 4 symbol and pointer registers of cell A to beset to NIL. The TAIL primitive in cell B causes the new contents of the tree 1 symbol and pointer registers of cell B to be set to NIL. The respective parent cells of cells A and B, which initially contained the primitive instructions HEAD and TAIL and transmitted them to cells A and B, remain at this stage simply as linking cells between cells A and B on the one hand, and the cell containing, in this example, the CONS primitive. The CONS primitive then operates to leave a single cell having the new contents of the tree 1 symbol and pointer registers of cell A as the contents of its own tree 1 symbol and pointer registers, and having the new contents of the tree 2, tree 3, and tree 4 symbol and pointer registers of cell B as the contents of its own tree 2, tree 3, and tree 4 symbol and pointer registers. It will be appreciated that the mechanism of inheritance plays an important part in the operation of HEAD, TAIL, and CONS. It should be noted that in FIG. 79, for clarity, the significant contents of the central registers of each cell for all four binary trees is shown.

Furthermore, an embodiment of the invention may, instead of having two sets of primitive instructions such as those of Table 1 and Table 2 hereinbefore, include a QUOTE instruction which acts to inhibit the reduction of all cells in an expression to which it is applied, and an EVALUATE command which acts on QUOTE expression to remote the QUOTE inhibit and commence reduction. The QUOTE instruction is inherited during the copy process while the EVALUATE command is passed downwards through the expression from cell to cell permitting reduction to occur when relevant to the primitive instructions contained in the cells.

It will be apparent that if the network 14 has fewer or more than four binary tree arrangements, then the structure and operation of the cells 11 must be modified accordingly.

FIG. 80 to 92 are state diagram of a standard cell 12 of the embodiment of FIGS. 26 and 64. In these state diagrams a convention is adopted in which a double circular outline indicates that the state concerned is complex and represents a cycle of substates.

Figure 80:
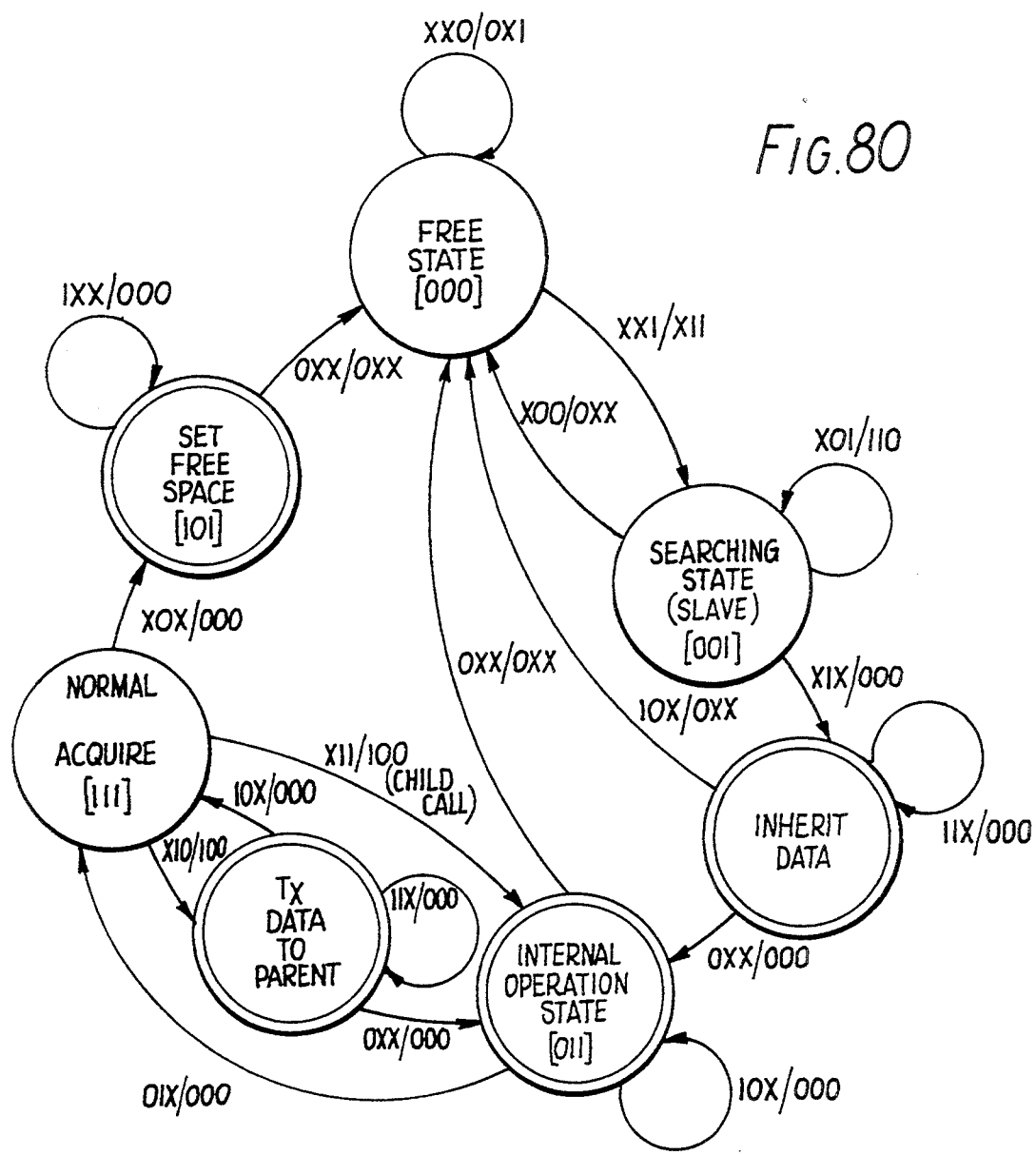
FIG. 80 is a state diagram of executive logic of a standard cell of the embodiment of FIG. 1.

FIG. 80 shows the cycle of states from the free state, through the inheriting of data, an internal operation state, and a return to the free state.

Figure 81:
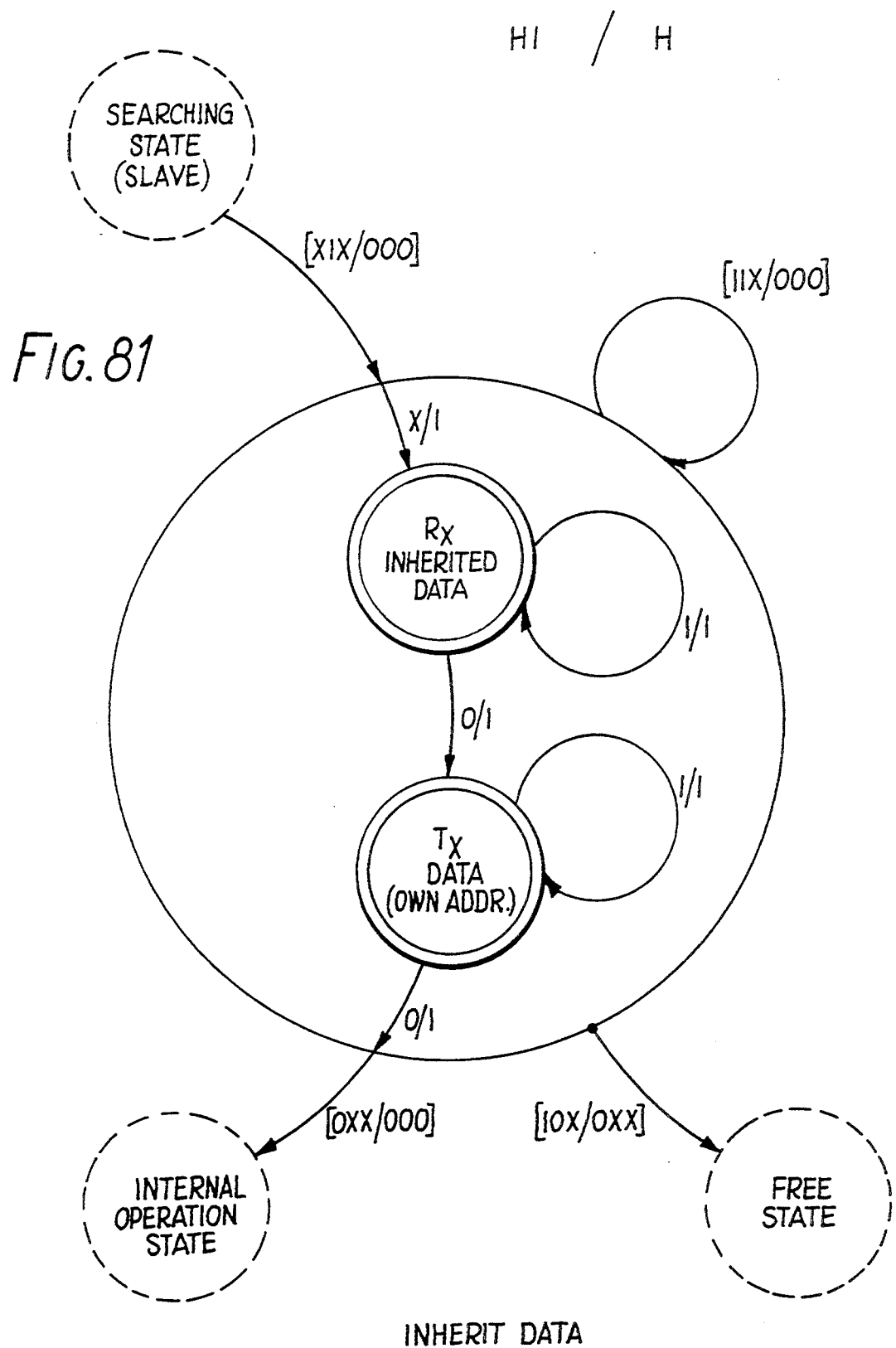
FIG. 81 is a state diagram of executive logic of a standard cell of the embodiment of FIG. 1.

FIG. 81 shows the cycle of substates in the inheriting of data.

Figure 82:
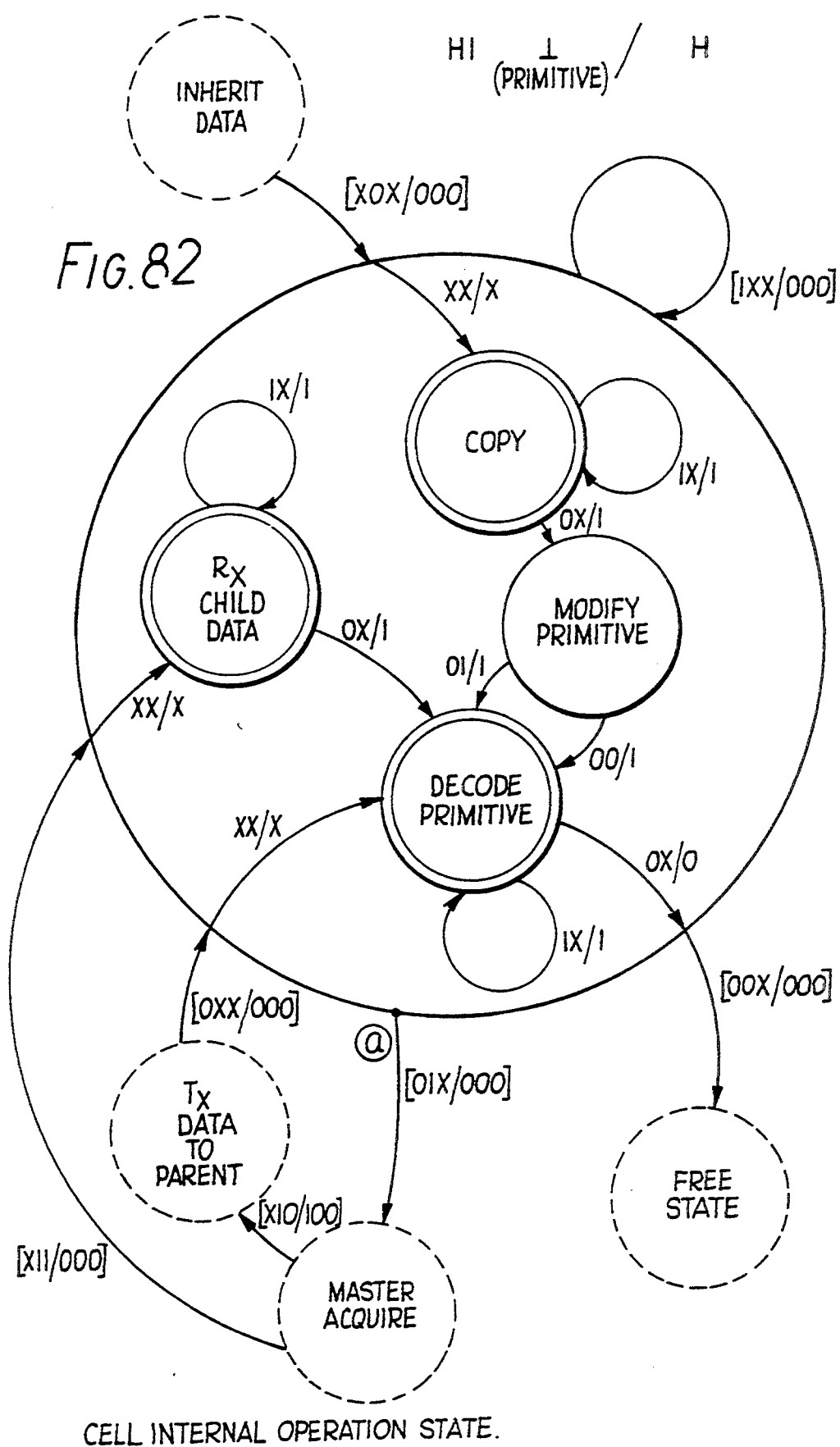
FIG. 82 is a state diagram of executive logic of a standard cell of the embodiment of FIG. 1.

FIG. 82 shows the cycle of substates in the internal operation state. Note a-Exit occurs whenever MASTER ACQ is received. This freezes internal decode primitive state until return or (except existing transaction) until free state is set.

Figure 83:
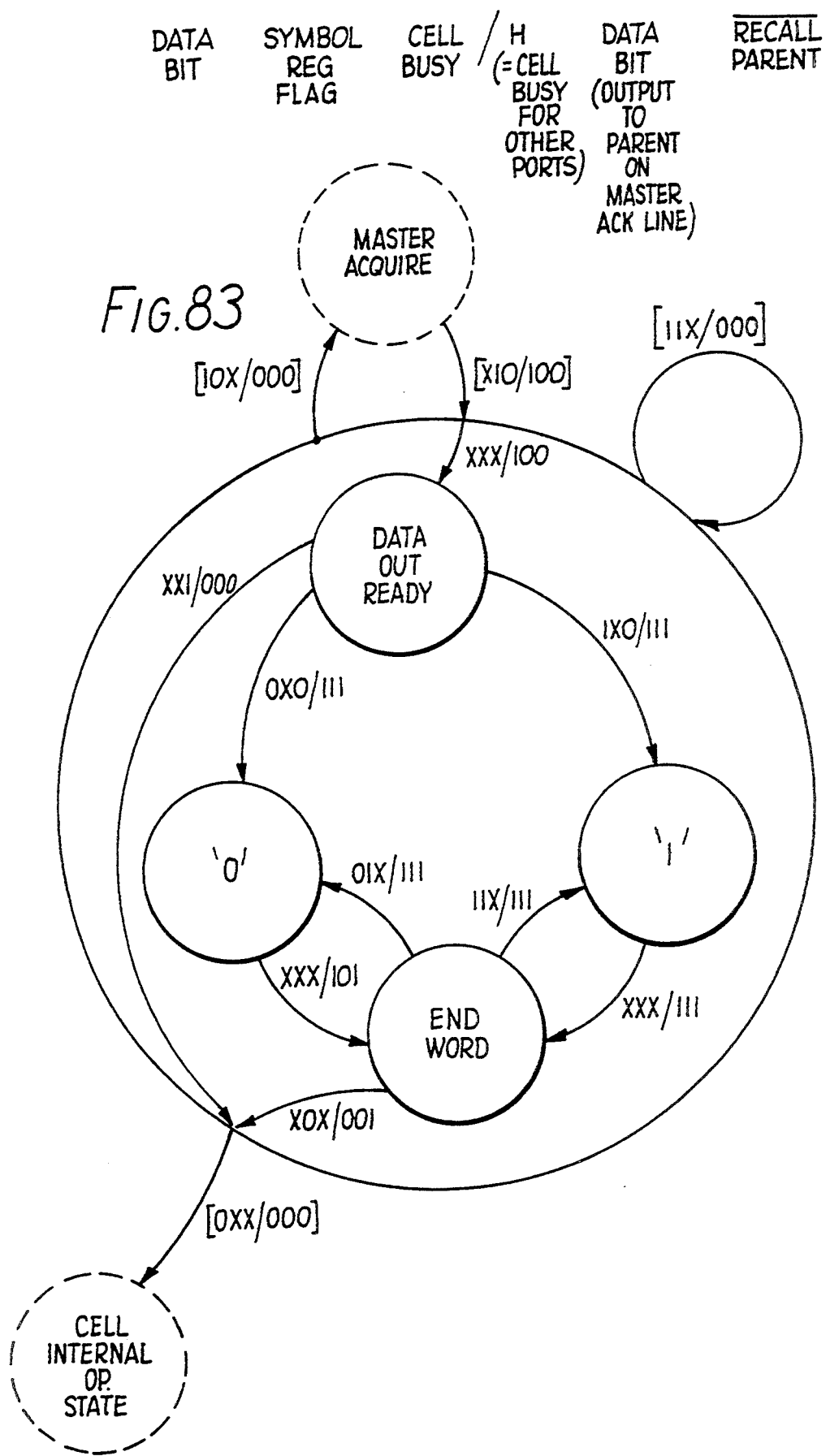
FIG. 83 is a state diagram of executive logic of a standard cell of the embodiment of FIG. 1.

FIG. 83 shows the cycle of substates in the transmission of data to the parent of the cell. Last bit of word is stream continuation bit.

Figure 84:
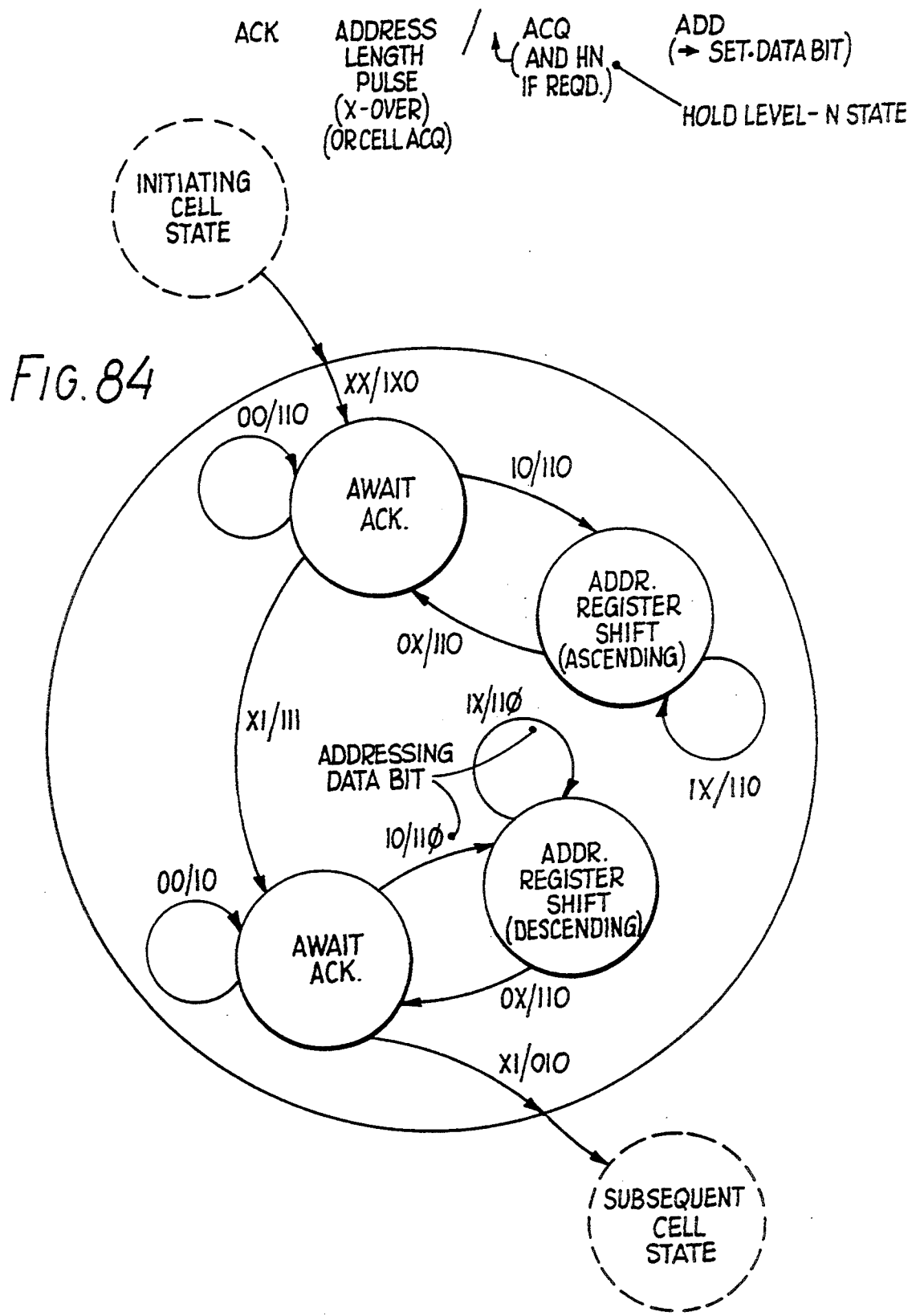
FIG. 84 is a state diagram of executive logic of a standard cell of the embodiment of FIG. 1.

FIG. 84 shows the cycle of substates in carrying out a normal acquire (non-directed/truncated absolute) to a waiting cell. This is used commonly in various cell states so entry/exit levels are not shown.

Figure 85:
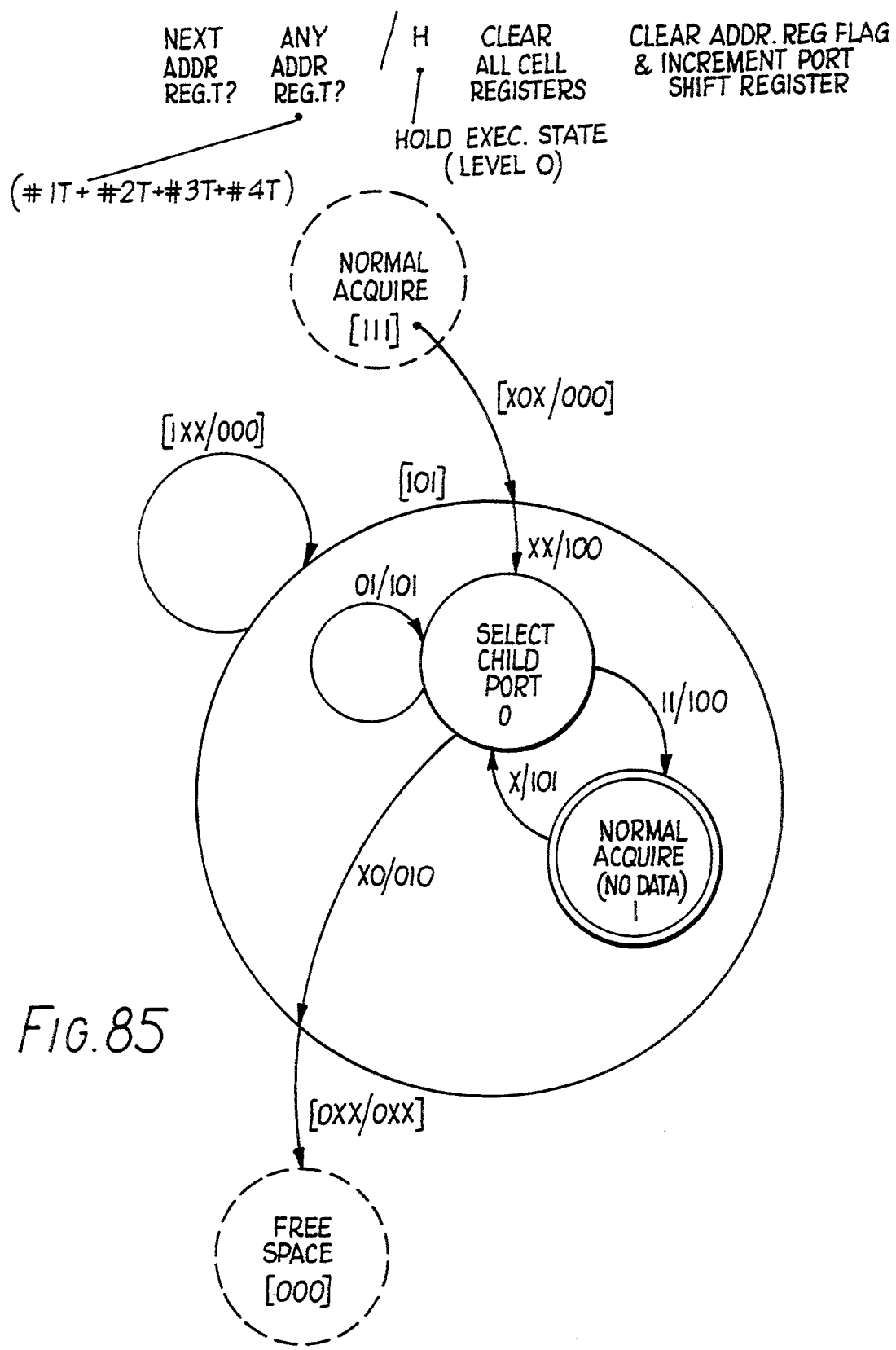
FIG. 85 is a state diagram of executive logic of a standard cell of the embodiment of FIG. 1.

FIG. 85 shows the cycle of substates in the process of returning to the free state.

Figure 86:
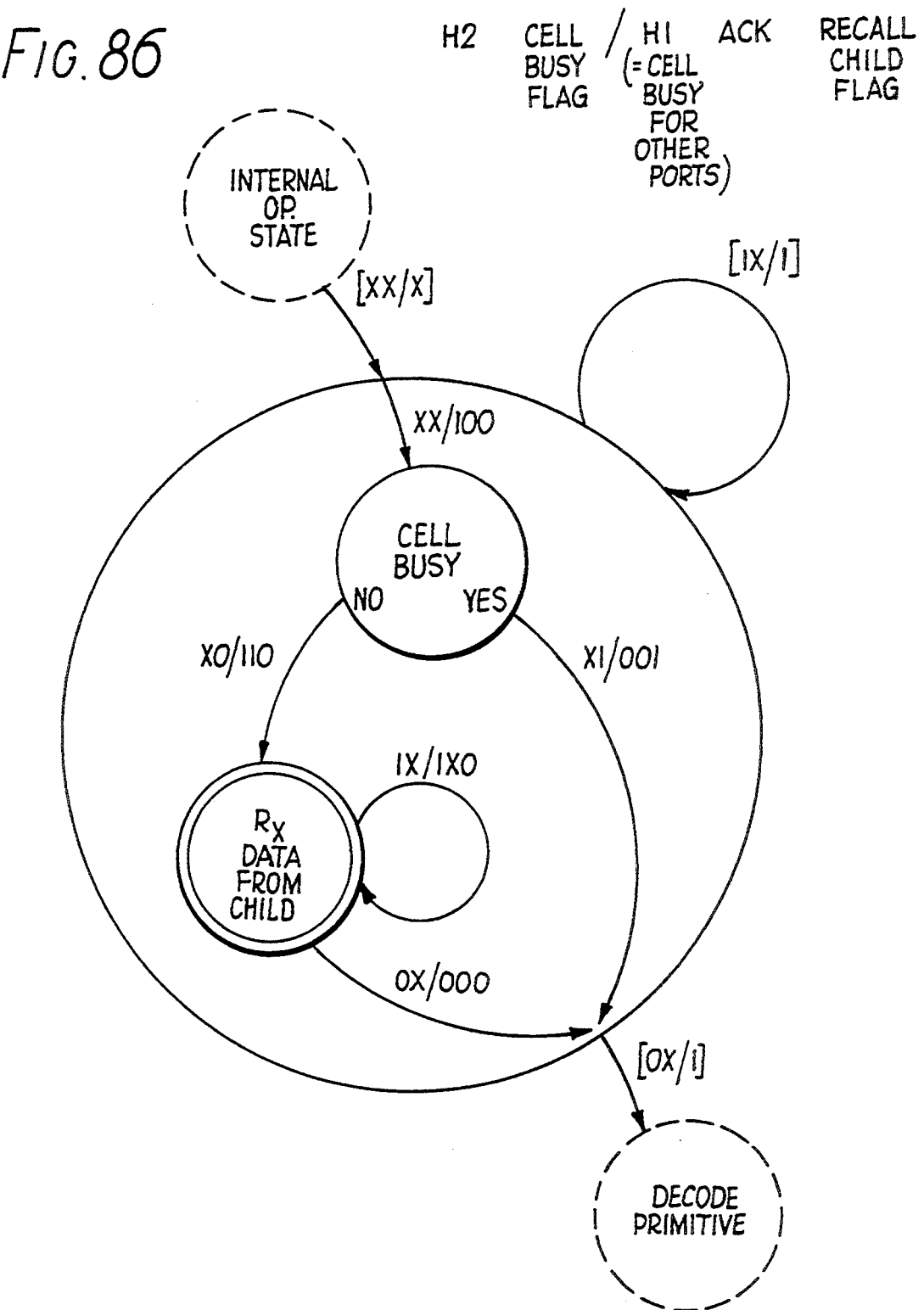
FIG. 86 is a state diagram of executive logic of a standard cell of the embodiment of FIG. 1.

FIG. 86 shows the cycle of substates forming the complex state "RX CHILD DATA" (on master tree) in the internal operation state of FIG. 82.

Figure 87:
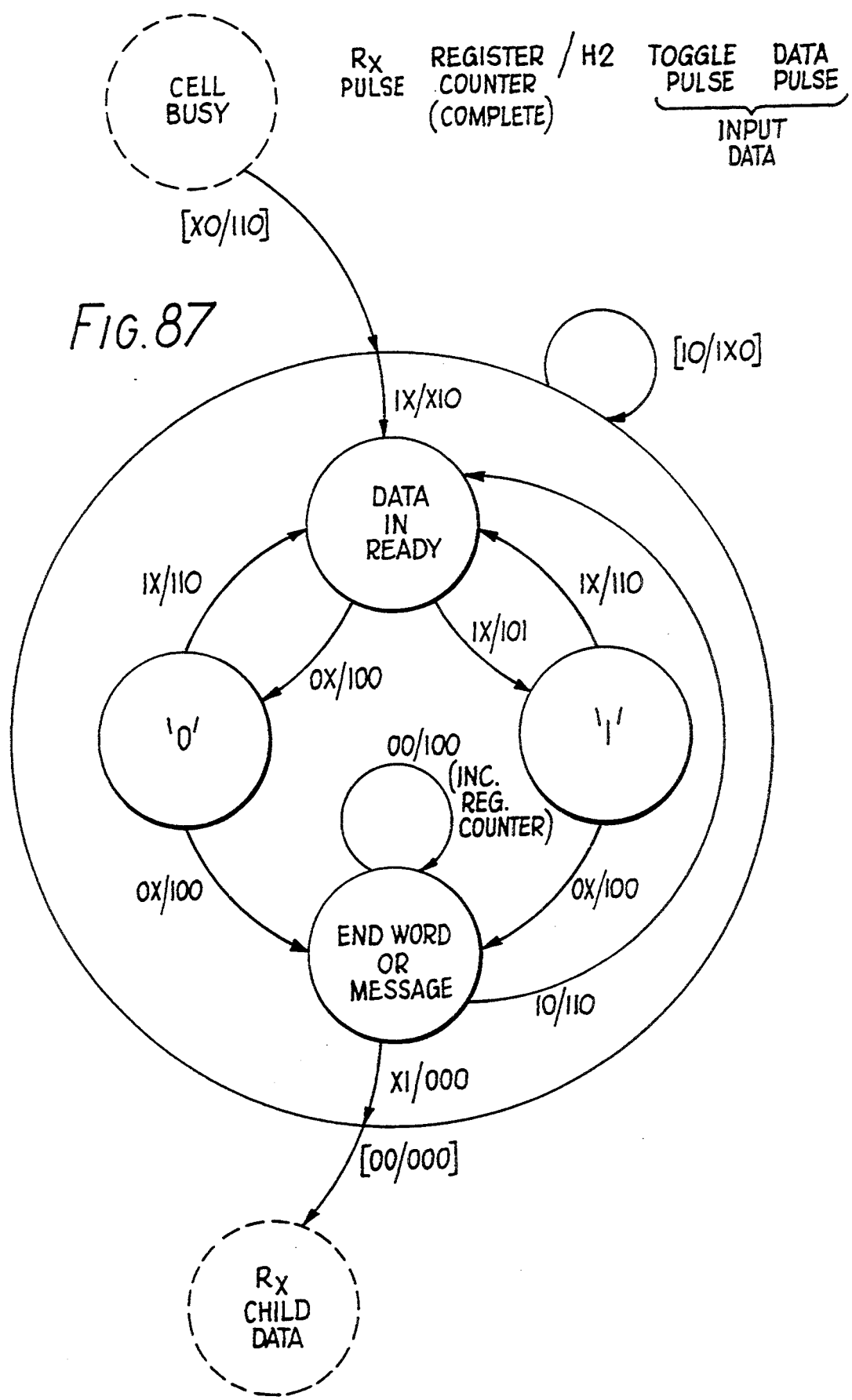
FIG. 87 is a state diagram of executive logic of a standard cell of the embodiment of FIG. 1.

FIG. 87 shows the cycle of substates forming the complex state "RX DATA FROM CHILD" (on master tree) in the "RX CHILD DATA" cycle of FIG. 86. Second word is stream continuation bit.

Figure 88:
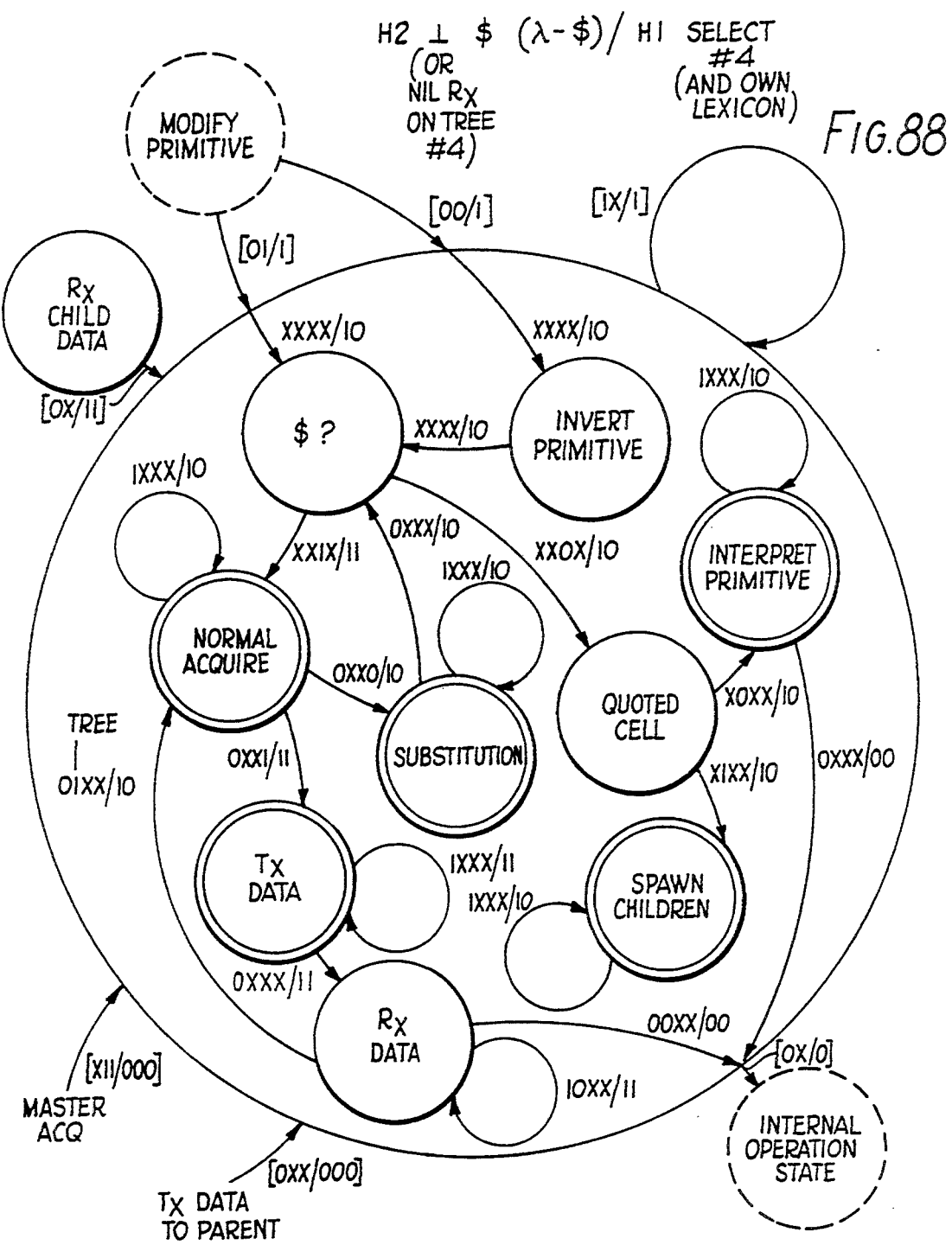
FIG. 88 is a state diagram of executive logic of a standard cell of the embodiment of FIG. 1.

FIG. 88 shows the cycle of substates (decode primitive and lambda parameter assignment) forming the complex state "DECODE PRIMITIVE" in the cell internal operation state of FIG. 82.

Figure 89:
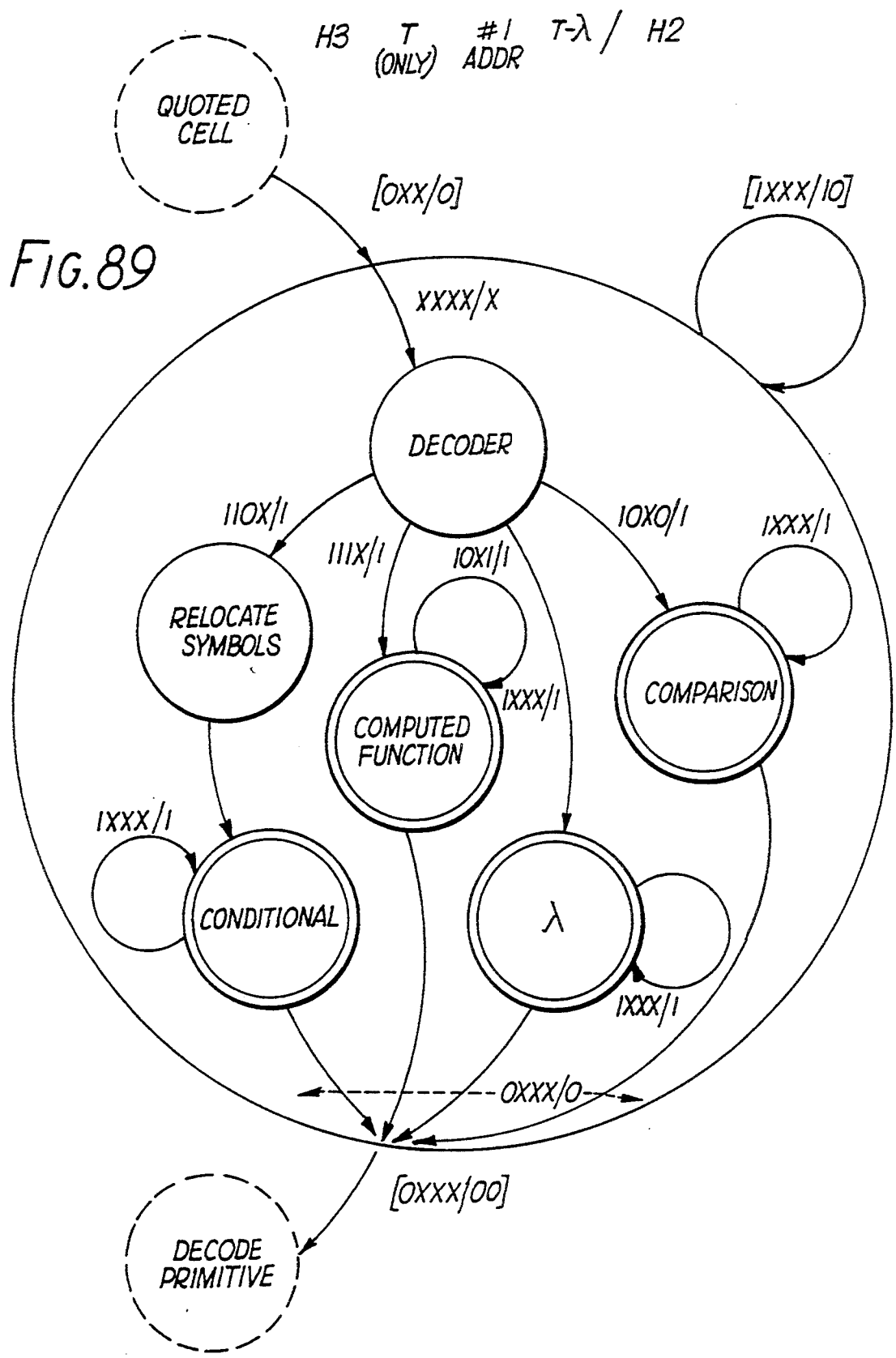
FIG. 89 is a state diagram of executive logic of a standard cell of the embodiment of FIG. 1.

FIG. 89 shows the cycle of substates forming the complex state "INTERPRET PRIMITIVE" in the cycle of FIG. 88.

Figure 90:
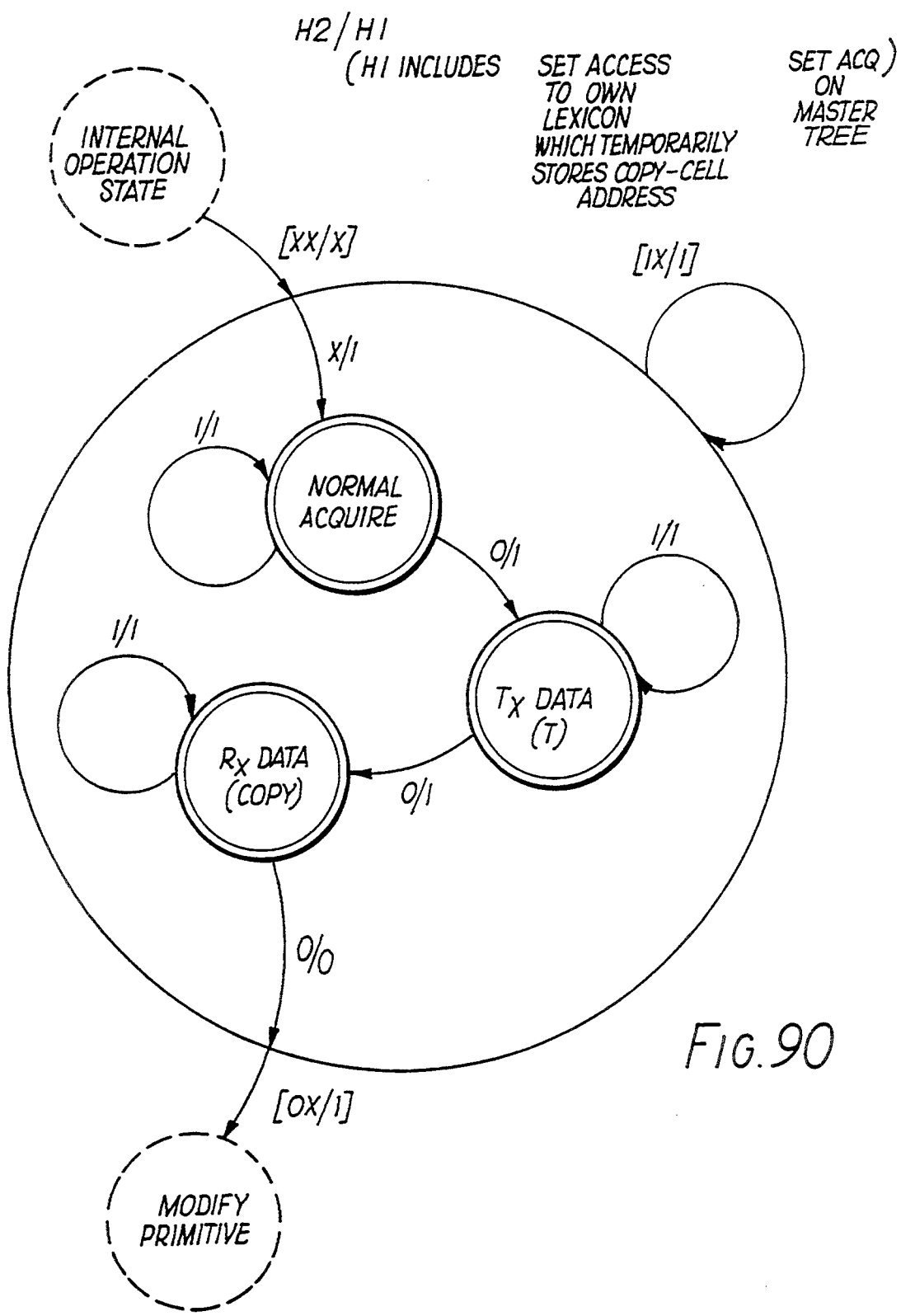
FIG. 90 is a state diagram of executive logic of a standard cell of the embodiment of FIG. 1.

FIG. 90 shows the cycle of substates forming the complex state "COPY" in the internal operation state of FIG. 82.

Figure 91:
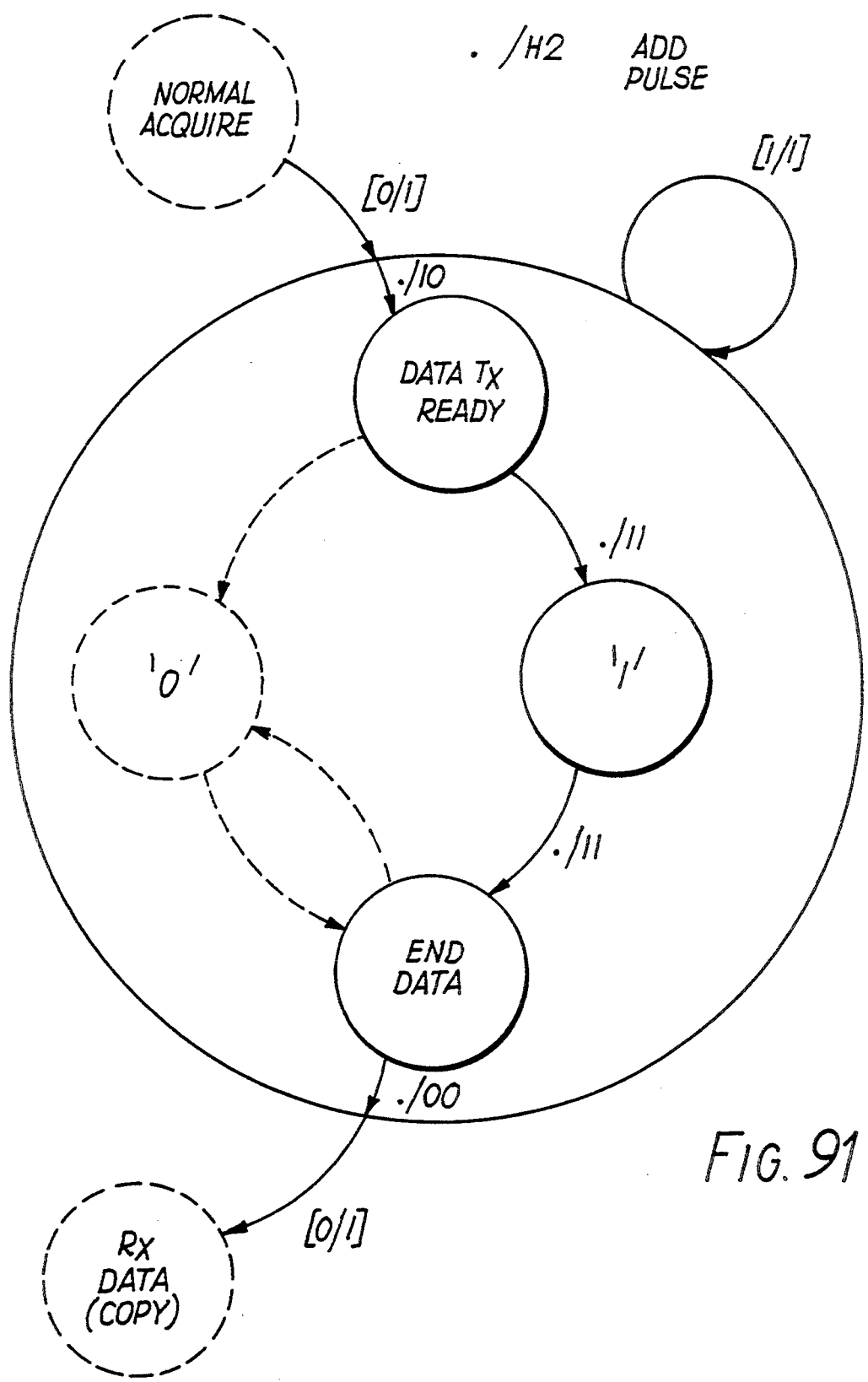
FIG. 91 is a state diagram of executive logic of a standard cell of the embodiment of FIG. 1.

FIG. 91 shows the cycle of substates forming the complex state "TX DATA (T)" in the cycle of FIG. 90.

Figure 92:
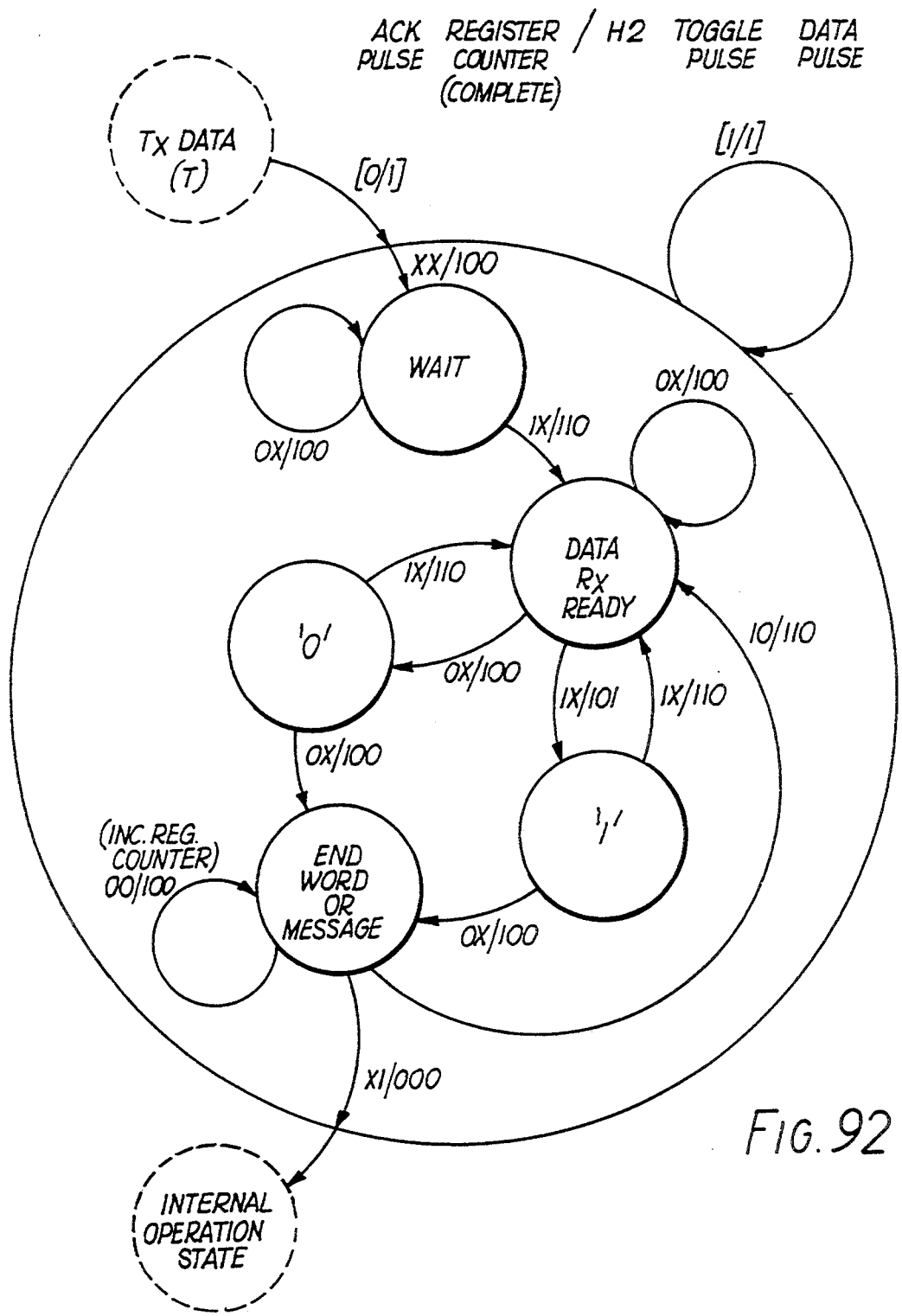
FIG. 92 is a state diagram of executive logic of a standard cell of the embodiment of FIG. 1.

FIG. 92 shows the cycle of substates forming the complex state "RX DATA (COPY)" in the cycle of FIG. 90.

Table 5 below lists the variables indicated in the state diagrams.

TABLE 5

| FIG. 80 MASTER EXECUTIVE LOGIC | |
|---|---|
| CONTROL VARIABLES | |
| H | Holds top level Flip-Flops in state while second level transitions take place. |
| MASTER ACQ | ACQuire line set high on master port by calling parent cell. |
| MASTER ADD | ADDress line set high on master port by parent cell. |
| OUTPUT VARIABLES | |
| MASTER ACK | Return ACKnowledge from cell to parent on master tree. |
| MASTER F.S. FLAG | Set high to hold master tree F-line while parent completes acquisition. |
| CELL F.S. FLAG | Set low as soon as cell receives ADD from parent in free-space search action. |
| FIG. 81 INHERIT DATA | |
| CONTROL VARIABLES | |
| H1 | Holds second level Flip-Flops in state while third level transactions take place. |
| OUTPUT VARIABLES | |
| H | Holds top level Flip-Flops in 'Inherit Data' state while the inheritance transaction takes place. |
| FIG. 82 CELL INTERNAL OPERATION STATE | |
| CONTROL VARIABLES | |
| H1 | Holds second level state while third level transactions proceed. |
| ⊥- (primitive) | Result of decoding first bit of instruction register code. Set to '1' if first bit is a zero. i.e., instruction is 'QUOTED'. |
| H | Holds top level Flip-Flop while second level transactions proceed. |
| FIG. 83 TX DATA TO PARENT | |
| CONTROL VARIABLES | |
| Data Bit | Data bit is read from selected data register (typically the symbol register) and combined with the toggle bits. The data register is then incremented. |
| Symbol/Data Register Flag | Data word is transmitted until register flag goes low, indicated end of word. |
| Parent Cell busy (freeze) | Set if parent busy (i.e., no acknowledge). Own cell sets 'don't recall parent'. This path is not invoked if parent has called child in the first place. |

TABLE 5-continued

OUTPUT VARIABLES

| | |
|---|---|
| H | Holds first level Flip-Flops until transaction is complete. |
| Data Bit | Composite toggle/data on ADD or ACK line as appropriate for parent or child initiation of transaction. |
| Don't Recall parent | If child calls parent and is rebuffed by non-acknowledgement, Own-cell sets 'Don't Recall Parent' and awaits parent. |

FIG. 84 NORMAL ACQUIRE
CONTROL VARIABLE

| | |
|---|---|
| ACK | Pulses received from network nodes during acquire. Used to increment address register in order to generate ADD pulses synchronized with node acquisition. |
| Address length Pulse | Generates Cross-Over address pulse when address register reaches most significant bit. Also starts data transaction when register has counted down to least significant bit. |

OUTPUT VARIABLE

| | |
|---|---|
| ACQ | ACQuire line from selected port is set high complete. Used to latch higher N-level flip-flops. (ie. HN). |
| ADD | Once Cross-Over is set, data bit is read out of address register, msb first, according to receipt of node acknowledge pulses. |

FIG. 86 RX CHILD DATA ON MASTER NET
CONTROL VARIABLES

| | |
|---|---|
| H2 | Holds third level Flip-Flops while fourth level transactions take place. |
| Cell Busy Flag | Set high when another port is active or when an internal operation is taking place. (Sets 'recall child' flag). |

OUTPUT VARIABLES

| | |
|---|---|
| H1 | Holds second level Flip-Flops in state while third level transactions take place. Also sets 'cell busy' flag for cell in order to inhibit other accesses. |
| ACK | Acknowledge pulse is generated to indicate that cell (parent in this case) is ready to RX data. |
| Recall Child flag | This is set if own-cell is busy so that the caller can be recalled when own-cell is free. |

FIG. 87 RX DATA FROM CHILD (ON MASTER TREE)
(Similar to RX Data (COPY))

CONTROL VARIABLE

| | |
|---|---|
| RX PULSE | Occurs an ADDress line once child connection has been made by child. Pulses are toggle-plus-data pulses and are decoded by this transaction. |
| Register Counter (completion) | When first data register is full, it permits the second word to be received which comprises a single bit with the usual toggles. Completion is indicated by the register counter in this case and the transaction is exited. |

OUTPUT VARIABLES

| | |
|---|---|
| H2 | Holds third level Flip-Flops in state while fourth level proceeds. |
| Toggle Pulse | Decoded toggle pulses are used to increment Register and indicate end of word. |
| Data Pulses | Decoded data pulses are passed to register and stream continuation flag. |

FIG. 88 DECODE PRIMITIVE
CONTROL VARIABLES

| | |
|---|---|
| H2 | Holds third level Flip-Flops while fourth level proceeds. |
| ⊥- | Represents a 'QUOTED' primitive (ie. first bit of primitive register is zero). Also indicated that a NIL is received on tree #4. |
| $ | Decoded - Symbol instruction (ie. 1101) in the primitive register). |

TABLE 5-continued

| | |
|---|---|
| λ-S | Decoded - Lambda-Symbol instruction (ie. 1111 in the primitive register). |
| OUTPUT VARIABLES | |
| H1 | Holds second level Flip-Flops while this transaction is maintained. |
| Select 4 | Select the Own Lexicon address register and #4 port and commences acquisition of Substitution cell. |
| FIG. 89 INTERPRET PRIMITIVE | |
| CONTROL VARIABLE | |
| H3 | Holds fourth level Flip-Flops while fifth level proceeds. |
| T | Set high if primitive register contains 1000. |
| No. 1 Address | Set high if address register #1 contains an address. |
| T-λ | Set high if primitive register contains 1110. |
| FIG. 90 COPY | |
| CONTROL VARIABLES | |
| H2 | Holds third level Flip-Flops in state while fourth level transactions take place. |
| OUTPUT VARIABLES | |
| H1 | Holds second level Flip-Flops in 'Internal Operation' state and also initiates copy transaction by reading 'Own Lexicon' Register that temporarily stores copy-cell address, and sets ACQuire on the master tree in order to acquire the copy-cell with the relevant ADD signals from the Own Lexicon Register. |
| FIG. 91 TX DATA (T) | |
| No control parameter is required, the transaction proceeding step by step through the operations. | |
| OUTPUT VARIABLES | |
| H2 | Holds third level Flip-Flops in state while this transaction proceeds. |
| ADD pulse | Generates transient T-Signal (with associated toggle pulses). For a data stream, the state is held while ADD is modulated according to data content. |
| FIG. 92 RX DATA (COPY) | |
| CONTROL VARIABLES | |
| ACK pulse | The first active response to the cell at this level of the Copy transaction following transmission of data (in this case T) is receipt of ACKnowledge pulse from copy-cell. A delay is allowed. A stream of ACK pulses (including toggles) then ensues. |
| Register Counter (or Data Completion) | Active if either a pulse is received from the register counter or the data transaction is terminated. These actions take place in different states at this level so no confusion results. (They could be treated as separate controls if desired). |
| OUTPUT VARIABLES | |
| H2 | Holds third level Flip-Flops in state while this transaction takes place. |
| Toggle Pulse | Decodes incoming data and toggle pulses on ACK line and generates internal toggle pulses for register Counter Control and word control (in logic diagram for data decoder). |
| Data Pulse | Decodes incoming data and toggle pulses on ACK line and generates internal data pulses for loading cell registers. |

It is well known to those skilled in the art that a state diagram provides information that enables a circuit to be constructed that carries out the operations defined by the state diagram (See, for example, Chapter Seven of Digital Circuits and Microprocessors by Herbert Taub, International Edition, published in 1985 by McGraw-Hill Book Company, London, Paris, and Tokyo, and Switching and Finite Automata Theory by Zvi Kohavi, Second Edition, published in 1985 by Tara McGraw-Hill Publishing Co. Ltd., New Delhi). Furthermore, there are commercially available software packages which automatically provide a gate circuit design in response to a state diagram, for example, ExpressV-HDL (registered trade mark) and Statemate, both produced by i-Logix, Inc., 22 Third Avenue, Burlington, Mass. 01803, United States of America.

Although dedicated circuitry is described hereinbefore for the cells of particular embodiments, it should be noted that where the communication network 14 comprises four binary tree arrangements, each standard cell 12 may be a transpurer or a similar microprocessor having four serial input/output ports. A transputer or such microprocessor is programmed to carry out the operations required by the various primitive instructions, communication operations, and data manipulating operations. Where a network 14 with fewer or more than four binary tree arrangements is used, each cell may be a non yon Neumann computer equipped with the necessary number of serial input/output ports and programmed appropriately. Where transputers are used as standard cells, two or more transputers may be suitably combined to form each special cell, or other suitable microprocessors used individually as special cells.

Since in a parallel processing apparatus embodying the invention the communication bandwidth of the apparatus is dependent upon the number of transactions taking place simultaneously, rather than upon the component logic speed, asynchronous logic can be used. Alternatively, clocked synchronous logic can be used if desired.

It is preferable that the ratio of special cells to standard cells should be about 1:300, and it is a particular advantage where the total number of cells 11 is large that several or many different computing applications can be carried out independently with the single apparatus, thus providing further parallelism.

What is claimed is:

1. Apparatus for performing parallel processing, comprising: a plurality of processor cells, and a communication network, each of a majority of the processor cells having a plurality of operating states comprising at least a searching state in which the cell transmits into the network a searching signal, and a free state in which the cell transmits into the network a free signal, the network including a plurality of nodes for transmitting searching signals and free signals, such that the network is adapted to provide a partial route in response to a searching signal supplied thereto by a processor cell in a searching state, and a partial route in response to a free signal supplied thereto by another processor cell in a free state, each such partial route extending through at least one of said nodes, each node further being adapted to direct a searching signal in the node onto a partial route provided in response to a free signal in the node and thus extend a partial route provided in response to a searching signal along a partial route provided in response to a free signal, the network being adapted to form a completed route to a processor cell in a free state from a processor cell in a searching state, said completed route extending through at least one node at which said directing occurs, the network being such that a plurality of completed routes therethrough can co-exist, each completed route interconnecting a respective pair of the cells and being established by operation of at least one of the pair of cells and permitting transmission of data between the pair of cells, and each cell being adapted to execute reduction operations in which the cell transforms data therein in accordance with rules for reducing expressions stored as data in groups of the cells.

2. Apparatus according to claim 1, wherein each of at least some of the processor cells has a plurality of operating states comprising the searching state and a waiting state, and transmits into the network a searching signal when in the searching state.

3. Apparatus according to claim 1, wherein each of at least said majority of cells has a calling state and transmits into the network a calling signal when in the calling state, and the network is adapted to route a calling signal in accordance with destination information included in the calling signal and indicative of a route extending from the calling state cell that originates the calling signal to another of the cells.

4. Apparatus according to claim 1, wherein each said route interconnecting a respective pair of the cells is formed as a monotonically progressing path through the network.

5. Apparatus according to claim 4, wherein said monotonically progressing path progresses by discrete segments.

6. Apparatus according to claim 1, wherein the network is such that a route being formed therein from a processor cell can meet a route already formed or partially formed therein from another processor cell and completion of the route being formed be delayed until said already formed or partially formed route is disestablished.

7. Apparatus according to claim 1, wherein each said route interconnecting a respective pair of the cells is disestablished by operation of said one of said pair of cells.

8. Apparatus according to claim 1, wherein the network includes one or more tree arrangements for providing routes between the cells, and the cells are at leaf positions of the tree arrangement or arrangements.

9. Apparatus according to claim 8, wherein the one or more tree arrangements are binary tree arrangements.

10. Apparatus according the claim 1, wherein each cell is adapted to execute communication operations, command operations in which the cell transmits command signals into the network to another of the cells, and slave operations in which the cell executes commands transmitted thereto by another of the cells through the network, the communication operations including operations in which the cell receives data from another of the cells through the network, and operations in which the cell transmits data to another of the cells through the network.

11. Apparatus according to claim 1, wherein the rules for reducing expressions are consistent with pure Church lambda calculus.

12. Apparatus according to claim 1, wherein the expressions are lambda expressions.

13. Apparatus according to claim 1, wherein the network is such that any one of the cells can be connected to any other one of the cells by a route through the network.

14. Apparatus according to claim 1, wherein each pair of cells can be interconnected by a plurality of routes through the network.

15. Apparatus according to claim 1, wherein each cell has a calling state and transmits into the network a calling signal when in the calling state, and each node is adapted to route a calling signal in accordance with destination information included in a calling signal and indicative of a route extending from a calling cell that originates the calling signal to another of the cells and including said node.

16. Apparatus according to claim 15, wherein destination information is stored in the network.

17. Apparatus according to claim 15, wherein the network comprises a plurality of path segments and each of at least a majority of the nodes forms a junction between three of said path segments.

18. Apparatus according to claim 1, wherein each cell has a waiting state in which the cell stores expression information.

19. Apparatus according to claim 18, wherein stored expression information includes destination information indicative of a route extending from the cell in the waiting state to another of the cells.

20. Apparatus according to claim 19, wherein destination information is stored in the network.

21. Apparatus according to claim 1, wherein each cell is adapted to test first data stored within the cell to determine whether a reduction operation can be executed on said first data and, if the result of the test is negative, to set the cell in a state such that the cell continues to store said first data until the cell receives from at least one other of the cells further data which when substituted for or combined with at least part of said first data creates data giving a positive result to said test, whereupon the cell executes the reduction operation.

22. Apparatus according to claim 1, wherein each individual cell is adapted to execute primitive operations in said rules for reducing expressions.

23. Apparatus according to claim 1, wherein said rules include rules for the execution of concurrent beta-reduction of functional expressions.

24. Apparatus according to claim 23, wherein each of at least some of the processor cells has a plurality of operating states comprising the searching state and a waiting state, and transmits into the network a searching signal when in the searching state.

25. Apparatus according to claim 24, wherein the network includes one or more tree arrangements for providing routes between the cells, and the cells are at leaf positions of the tree arrangement or arrangements.

26. Apparatus according to claim 23, wherein each individual cell is adapted to execute primitive operations in said rules for reducing expressions.

27. A communication network for forming a partial route for a searching signal supplied to the network at a first point, forming a partial route for a free signal supplied to the network at a second point, and forming a complete route for said searching signal from said first point to said second point with said partial routes, said network comprising a plurality of path segments for free signals and searching signals and a plurality of nodes, each of at least a majority of said nodes forming a junction between at least three of said path segments, and each node being adapted to select a path through the node for a searching signal in response to presence of a free signal at the node, said path connecting a path segment through which said searching signal entered the node to a path segment through which said free signal entered the node.

28. Apparatus for performing parallel processing, comprising:

(a) a communication network for forming a partial route for a searching signal supplied to the network at a first point, forming a partial route for a free signal supplied to the network at a second point, and forming a complete route for said searching signal from said first point to said second point with said partial routes, said network comprising a plurality of path segments for free signals and searching signals and a plurality of nodes, each of at least a majority of said nodes forming a junction between at least three of said path segments, and each node being adapted to select a path through the node for a searching signal in response to presence of a free signal at the node, said path connecting a path segment through which said searching signal entered the node to a path segment through which said free signal entered the node; and (b) a plurality of processor cells each having at least a searching state and a free state, and transmitting into the network a searching signal when in the searching state and a free signal when in the free state.

29. Apparatus according to claim 28, wherein the apparatus includes a further plurality of processor cells each of which has a searching state and a waiting state, and transmits into the network a searching signal when in the searching state.

30. Apparatus according to claim 28, wherein each of at least said cells having a free state has a calling state and transmits into the network a calling signal when in the calling state, and the network is adapted to route a calling signal in accordance with destination information included in the calling signal and indicative of a route extending from the calling state cell that originates the calling signal to another of the cells.

31. Apparatus according to claim 30, wherein each cell is adapted to execute reduction operations in which the cell transforms data, stored in the cell, in accordance with rules for reducing expressions stored as data in groups of cells, said reduction operations of each individual one of said cells being primitive operations in said rules for reducing expressions.

32. Apparatus according to claim 31, wherein the rules for reducing expression are consistent with pure Church lambda calculus.

33. Apparatus according to claim 32, wherein the expressions are lambda expressions.

34. Apparatus according to claim 30, wherein destination information is stored in the network.

35. Apparatus according to claim 28, wherein each of at least some of the cells has a calling state and transmits into the network a calling signal when in the calling state, each node is adapted to route a calling signal in accordance with destination information included in the calling signal and indicative of a route extending from the calling state cell that originates the calling signal to another of the cells and including said node, and the network including a plurality of binary tree arrangements of said path segments, said cells being at leaf positions of each binary tree arrangement and said nodes being at nodal positions of the binary tree arrangements, each cell occupying a different leaf position in at least two binary tree arrangements, such that two routes respectively provided in said two binary tree arrangements between two cells contain different numbers of nodes.

36. Apparatus according to claim 35, wherein destination information is stored in the network.

37. Apparatus according to claim 35 wherein the cells are arranged to form a planar array in which a unit pattern of four cells in a square is repeated to form a square array of the cells with the number of cells along any side of the array being an integer power of two.

38. Apparatus according to claim 37, wherein each cell occupies a different leaf position in four binary tree arrangements.

39. Apparatus according to claim 28, wherein each processor cell comprises storage means for storing a plurality of different categories of data, means for determining what categories of data are stored in the storage means and selecting one of a plurality of processes of said cell in dependence upon the categories of data determined to be stored in the storage means, at least one of said processes including a computation step utilizing data stored in the storage means, computation means for executing said computation step, means for receiving data for storage in the storage means, and means for outputting data resulting from said processes of the cell, the means for determining the categories of data including means responsive to presence of data in a category incompatible with said computation step to inhibit operating of the computation means on such data, and each of at least a majority of said plurality of cells having means for outputting into the communication network a status signal indicative of whether or not said selected process is a predetermined resting process constituting a free state of the cell, the status signal when indicative of the free state serving as a free signal.

40. Apparatus for performing parallel processing, comprising a plurality of processor cells and a communication network, said cells being connected to the communication network, the communication network including a plurality of nodes, each of at least some of the cells having a plurality of operating states comprising at least a searching state and a free state and transmitting into the network a searching signal when in the searching state and a free signal when in the free state, and each node being adapted to transmit through the node a searching signal and a free signal and to direct a searching signal at the node when a free signal is present at the node, and the network being adapted to establish a communication route between a cell in the searching state and another cell in the free state through one or more nodes at which said directing occurs.

41. Apparatus according to claim 40, wherein the network includes at least one binary tree arrangement of path segments, said nodes being at nodal positions of the binary tree, and the processor cells being at leaf positions of the binary tree.

42. Apparatus according to claim 41, wherein the network includes a plurality of binary tree arrangements of path segments, each of the cells being at leaf positions of each binary tree arrangement, and the nodes being at nodal positions of the binary tree arrangements.

43. Apparatus according to claim 42, wherein each cell occupies a different leaf position in at least two binary tree arrangements, such that routes containing different numbers of nodes in the said two binary tree arrangements can be established between two cells.

44. Apparatus according to claim 41, wherein the cells are arranged to form a planar array in which a unit pattern of four cells in a square is repeated to form a square array of the cells with the number of cells along any side of the array being an integer power of two.

45. Apparatus according to claim 44, wherein each cell occupies a different leaf position in four binary tree arrangements of path segments.

46. Apparatus according to claim 41, wherein the or at least one of the binary tree arrangements is an incomplete binary tree.

47. Apparatus according to claim 46, wherein the incomplete binary tree is coupled to means for simulating at least part of the remainder of the binary tree, including the nodes thereof, and the cells at the leaf positions in that part.

48. Apparatus according to claim 40, wherein each cell has a calling state and transmits into the network a calling signal when in the calling state, and each node is adapted to route a calling signal in accordance with destination information included in the calling signal and indicative of a route extending from the calling state cell that originates the calling signal to another of the cells and including said node.

49. Apparatus according to claim 48, wherein destination information is stored in the network.

50. Apparatus according to claim 40, wherein each cell is adapted to execute predetermined operations with predetermined categories of data only when such predetermined categories of data are present therein, transmit data to and receive data from others of the cells through the network, and respond to presence of data representing an inhibit command by inhibiting execution of operations on predetermined categories of data.

51. Apparatus according to claim 50, wherein the predetermined operations include reduction operations, the categories of data include symbolic data and pointers, and the cell is adapted to determine whether symbolic data and pointers are present in the cell and to inhibit one or more reduction operations if the determination is affirmative.

52. Apparatus according to claim 51, wherein the cell is adapted to respond to presence of symbolic data and pointers by transmitting in accordance with a pointer.

53. Apparatus according to claim 50, wherein each of at least some of the cells is adapted to transmit into the network a status signal indicating whether or not the cell contains data for further processing, and said free signal comprises said status signal indicating that a cell does not contain data for further processing.

54. Apparatus according to claim 53, wherein each of said cells is responsive to the inclusion of a pointer in a predetermined combination of categories of data in the cell to transmit an acquire signal into the network, and each said node is adapted to provide in response to an acquire signal received in the node a path for the acquire signal through the node without dependence on presence or absence of said free signal.

55. Apparatus according to claim 50, wherein the network includes one or more tree arrangements for providing said communication routes between the cells, and the cells are at leaf positions of the tree arrangement or arrangements.

56. Apparatus according to claim 55, wherein the one or more tree arrangements are binary tree arrangements.

57. Apparatus according to claim 50, wherein each cell is adapted to execute a plurality of operations including a set of operations including communication operations, command operations in which the cell transmits command signals into the network to another of the cells, slave operations in which the cell executes commands transmitted thereto by another of the cells through the network, and internal operations in which the cell processes data stored in the cell, the communication operations including operations in which the cell receives data from another of the cells through the network, and operations in which the cell transmits data to another of the cells through the network.

58. Apparatus according to claim 57, wherein at least some of the internal operations of the cell are reduction operations in which the cell transforms data, present in the cell, in accordance with rules for reducing expressions stored as data in groups of the cells.

59. Apparatus according to claim 58, wherein the rules for reducing expressions are consistent with pure Church lambda calculus.

60. Apparatus according to claim 58, wherein the expressions are lambda expressions.

61. Apparatus according to claim 57, wherein one of said operating states is a calling state in which the cell transmits into the network a calling signal, and the network is adapted to route a calling signal in accordance with destination information included in the calling signal and indicative of a route extending from the calling state cell that originates the calling signal to another of the cells.

62. Apparatus according to claim 61, wherein destination information is stored in the network.

63. Apparatus according to claim 57, wherein each cell is adapted to test first data stored in the cell to determine whether an internal operation can be executed on said first data and, if the result of the test is negative, to set in a state such that the cell continues to store said first data until the cell receives from one or more others of the cells further data which, when substituted for or combined with at least part of said first data, creates data giving a positive result to the test, whereupon the cell executes the internal operation.

64. Apparatus according to claim 63, wherein said cell determines the result of the test on the basis of the categories of the data tested.

65. Apparatus according to claim 64, wherein said cell is responsive to presence of destination information data in designated storage means in the cell to provide a negative result to said test.

66. Apparatus according to claim 65, wherein destination information data is stored in the network.

67. Apparatus according to claim 63, wherein the test includes testing at least one flag.

68. Apparatus according to claim 67, wherein the test includes ascertaining what categories of data are present in the cell.

69. Apparatus according to claim 40, wherein each of at least some of the cells has a calling state and transmits into the network a calling signal when in the calling state, each node is adapted to route a calling signal in accordance with destination information included in the calling signal and indicative of a route extending from the calling state cell that originates the calling signal to another of the cells and including said node, and the network including a plurality of binary tree arrangements in which the cells are at leaf positions of each binary tree arrangement and the nodes are at nodal positions of the binary tree arrangements, each cell occupying a different leaf position in at least two binary tree arrangements, such that routes containing different numbers of nodes in the two binary tree arrangements can be established between two cells.

70. Apparatus according to claim 40, wherein each cell is adapted to execute a plurality of operations, said operations including communication operations, command operations in which the cell transmits command signals into the network to another of the cells, slave operations in which the cell executes commands transmitted thereto by another of the cells through the network, and reduction operations in which the cell transforms data, stored in the cell, in accordance with rules for reducing expressions stored as data in groups of the cells, the communication operations including operations in which the cell receives data from another of the cells through the network and operations in which the cell transmits data to another of the cells through the network, said reduction operations of each individual cell being primitive operations in said rules for reducing expressions.

71. Apparatus according to claim 40, wherein each cell is adapted to execute a plurality of operations, said operations including communication operations, command operations in which the cell transmits command signals into the network to another of the cells, slave operations in which the cell executes commands transmitted thereto by another of the cells through the network, and internal operations in which the cell processes data stored in the cell, the communication operations including operations in which the cell receives data from another of the cells through the network, and operations in which the cell transmits data to another of the cells through the network, the cell further being adapted to store data in a plurality of categories, and to detect what categories of data are concurrently stored therein and to select one of a plurality of operative states of said cell in dependence upon what combination of categories of data is detected by said cell.

72. Apparatus according to claim 40, wherein each cell comprises a store for storing data, said data comprising a plurality of categories of data, logic for detecting what categories of data which are stored therein, logic for executing predetermined operations with predetermined categories of data only when such predetermined categories of data are present therein, and a transmitter/receiver for transmitting data to and receiving data from others of the cells through the communication network, said logic for detecting what categories of data being responsive to presence of data representing an inhibit command to inhibit operation of the executing logic on predetermined categories of data.

73. Apparatus according to claim 72, wherein the predetermined operations include reduction operations, the categories of data include symbolic data and pointers, and the executing logic is adapted to determine whether symbolic data and pointers are present in the cell and inhibit one or more reduction operations if the determination is affirmative.

74. A communication network comprising: a plurality of nodes, and a larger plurality of path segments connected to said nodes, each of at least a majority of said nodes forming a junction between at least three of said path segments, each path segment being adapted to transmit therethrough a searching signal and a free signal, and each node comprising a signal path selector for selecting paths through the node for searching signals, said signal path selector being responsive to presence of a free signal entering the node from a first one of said path segments connected to the node and a searching signal entering the node from a second one of said path segments connected to the node to select through the node for said searching signal a path by which said searching signal exits the node through said first path segment.

75. A communication network according to claim 74, wherein each node is responsive to an acquire signal entering the node from a path segment connected thereto for providing a path for the acquire signal through the node to a selected other one of said path segments connected to the node, without dependence on presence or absence of said free signal.

76. A communication network according to claim 75, wherein each of at least a majority of the nodes forms a junction between only three path segments, and is responsive to a binary value signal to select another of said three path segments when said binary value signal is received in the node from the same path segment as the acquire signal, said selection being made in dependence upon said binary value.

* * * * *